(12) United States Patent
Chin et al.

(10) Patent No.: US 10,098,049 B2
(45) Date of Patent: *Oct. 9, 2018

(54) METHOD AND APPARATUS FOR RELEASING CONNECTION WITH LOCAL GW WHEN UE MOVES OUT OF THE RESIDENTIAL/ENTERPRISE NETWORK COVERAGE

(71) Applicant: BlackBerry Limited, Waterloo (CA)

(72) Inventors: Chen Ho Chin, Ashford (GB); Noun Choi, Flower Mound, TX (US); Stefano Faccin, Hayward, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 117 days.

This patent is subject to a terminal disclaimer.

(21) Appl. No.: 15/055,027

(22) Filed: Feb. 26, 2016

(65) Prior Publication Data

US 2016/0183156 A1 Jun. 23, 2016

Related U.S. Application Data

(63) Continuation of application No. 13/825,996, filed as application No. PCT/US2011/053505 on Sep. 27, 2011, now Pat. No. 9,301,333.

(Continued)

(51) Int. Cl.
*H04W 36/32* (2009.01)
*H04W 74/00* (2009.01)
(Continued)

(52) U.S. Cl.
CPC ......... *H04W 36/32* (2013.01); *H04L 61/2007* (2013.01); *H04W 8/04* (2013.01);
(Continued)

(58) Field of Classification Search
None
See application file for complete search history.

(56) References Cited

U.S. PATENT DOCUMENTS 6,961,780 B2 11/2005 Kuusinen
7,251,227 B2 7/2007 de Jong
(Continued)

FOREIGN PATENT DOCUMENTS

CN 101459905 6/2009
CN 101505474 8/2009
(Continued)

OTHER PUBLICATIONS

U.S. Appl. No. 13/355,283, Notice of Allowance dated Aug. 13, 2015 (14 pages).

(Continued)

*Primary Examiner* — Candal Elpenord
(74) *Attorney, Agent, or Firm* — Trop, Pruner & Hu, P.C.

(57) ABSTRACT

In some examples, a method in a core network communicatively connected with a first radio access network (RAN) comprising a first network element, and a second RAN comprising a second network element, includes receiving a first Non Access Stratum (NAS) message via the second network element from a User Equipment (UE), where the UE has, with the first network element, a selected IP traffic offload (SIPTO) PDN connection. The mobility management node detects that the UE is connected to the second network element that is different from the first network element that has a first identifying characteristic, where the detecting comprises determining that the first NAS message is received with a second identifying characteristic of the second network element different from the first identifying characteristic associated with the SIPTO PDN connection.

19 Claims, 17 Drawing Sheets

Related U.S. Application Data

(60) Provisional application No. 61/387,297, filed on Sep. 28, 2010.

(51) Int. Cl.
| | | |
|---|---|---|
| *H04W 76/06* | (2009.01) | |
| *H04W 48/08* | (2009.01) | |
| *H04W 8/04* | (2009.01) | |
| *H04W 36/00* | (2009.01) | |
| *H04L 29/12* | (2006.01) | |
| *H04W 36/38* | (2009.01) | |
| *H04W 64/00* | (2009.01) | |
| *H04W 76/30* | (2018.01) | |
| *H04W 8/08* | (2009.01) | |
| *H04W 84/04* | (2009.01) | |
| *H04W 88/02* | (2009.01) | |
| *H04W 88/16* | (2009.01) | |

(52) U.S. Cl.
CPC ....... *H04W 36/0022* (2013.01); *H04W 36/38* (2013.01); *H04W 48/08* (2013.01); *H04W 64/003* (2013.01); *H04W 74/006* (2013.01); *H04W 76/06* (2013.01); *H04W 76/30* (2018.02); *H04W 8/082* (2013.01); *H04W 84/045* (2013.01); *H04W 88/02* (2013.01); *H04W 88/16* (2013.01)

(56) References Cited

U.S. PATENT DOCUMENTS

| | | | |
|---|---|---|---|
| 7,738,922 | B2 | 6/2010 | Hashimoto |
| 8,369,253 | B2 | 2/2013 | Faccin |
| 8,457,635 | B2 | 6/2013 | Bachmann et al. |
| 8,477,724 | B2 | 7/2013 | Bakker |
| 8,781,480 | B2 | 7/2014 | Lim |
| 8,937,924 | B2 | 1/2015 | Choi |
| 9,271,316 | B2 | 2/2016 | Bakker |
| 2006/0193289 | A1 | 8/2006 | Ronneke |
| 2008/0102896 | A1 | 5/2008 | Wang |
| 2008/0305792 | A1 | 12/2008 | Khetawat et al. |
| 2009/0232022 | A1 | 9/2009 | Savolainen |
| 2009/0264126 | A1 | 10/2009 | Khetawat et al. |
| 2009/0265543 | A1 | 10/2009 | Khetawat |
| 2009/0305699 | A1 | 12/2009 | Deshpande |
| 2010/0039993 | A1 | 2/2010 | Ramankutty et al. |
| 2010/0098023 | A1 | 4/2010 | Aghilli |
| 2010/0113024 | A1 | 5/2010 | Wu |
| 2010/0172301 | A1 | 7/2010 | Watfa |
| 2010/0216484 | A1 | 8/2010 | Zhou |
| 2010/0224563 | A1 | 9/2010 | Singh |
| 2010/0272013 | A1 | 10/2010 | Horn |
| 2010/0284333 | A1 | 11/2010 | Shirota |
| 2010/0297979 | A1 | 11/2010 | Watfa |
| 2011/0002267 | A1 | 1/2011 | Dwyer |
| 2011/0002304 | A1 | 1/2011 | Lee et al. |
| 2011/0045826 | A1 | 2/2011 | Kim |
| 2011/0045834 | A1 | 2/2011 | Kim |
| 2011/0075675 | A1 | 3/2011 | Koodli |
| 2011/0103277 | A1 | 5/2011 | Watfa |
| 2011/0116449 | A1 | 5/2011 | Hu |
| 2011/0116469 | A1 | 5/2011 | Bi et al. |
| 2011/0117931 | A1 | 5/2011 | Hu |
| 2011/0170469 | A1 | 7/2011 | Watfa |
| 2011/0171915 | A1 | 7/2011 | Gomes et al. |
| 2011/0171953 | A1 | 7/2011 | Faccin |
| 2011/0188451 | A1 | 8/2011 | Song et al. |
| 2011/0286410 | A1* | 11/2011 | Zembutsu ............ H04W 36/00 370/329 |
| 2011/0310799 | A1 | 12/2011 | Horn |
| 2011/0312321 | A1 | 12/2011 | Ramachandran |
| 2012/0002545 | A1 | 1/2012 | Watfa |
| 2012/0002637 | A1 | 1/2012 | Adjakple et al. |
| 2012/0028638 | A1 | 2/2012 | Mueck |
| 2012/0039303 | A1 | 2/2012 | Stenfelt |
| 2012/0076121 | A1 | 3/2012 | Choi |
| 2012/0083273 | A1 | 4/2012 | Mukherjee |
| 2012/0120789 | A1 | 5/2012 | Ramachandran |
| 2012/0189016 | A1 | 7/2012 | Bakker |
| 2012/0300750 | A1 | 11/2012 | Chin |
| 2013/0143515 | A1 | 6/2013 | Zhu |
| 2013/0188604 | A1 | 7/2013 | Chin |

FOREIGN PATENT DOCUMENTS

| | | |
|---|---|---|
| KR | 10-2010-0119349 | 11/2010 |
| WO | 2011142567 | 11/2011 |

OTHER PUBLICATIONS

U.S. Appl. No. 13/246,573, Notice of Allowance dated Sep. 4, 2014, pp. 1-14 and attachments.

U.S. Appl. No. 13/576,432, Notice of Allowance dated Nov. 5, 2014, pp. 1-4 and attachments.

U.S. Appl. No. 13/576,432, Final Rejection dated Aug. 11, 2014, pp. 1-12 and attachments.

U.S. Appl. No. 13/876,019, Non-Final Rejection dated Aug. 4, 2014, pp. 1-9 and attachments.

U.S. Appl. No. 13/876,019, Rejection Rejection dated Dec. 15, 2014, pp. 1-11 and attachments.

U.S. Appl. No. 13/355,283, Non-Final Rejection dated Sep. 18, 2014, pp. 1-14 and attachments.

Canadian Intellectual Property Office, Office Action for CA Appl. No. 2,812,944 dated Jan. 23, 2015 (4 pages).

3GPP 23.829 V1.1.0 Technical Report 3rd Generation Partnership Project; Technical Specification Group Services and System Aspects; Local IP Access and Selected IP Traffic Offload (Release 10) (May 2010) (44 pages).

3GPP TS 23.401 V9.5.0 3rd Generation Partnership Project; Technical Specification Group Services and System Aspects; General Packet Radio Service (GPRS) enhancements for Evolved Universal Terrestrial Radio Access Network (E-UTRAN) access (Release 9) (Jun. 2010) (259 pages).

3GPP TS 23.003 V11.0.0; 3rd Generation Partnership Project; Technical Specification Group Core Network and Terminals; Numbering, Addressing and Identification; Release 11; Dec. 2011; 81 pages.

3GPP TS 23.060 V11.0.0; 3rd Generation Partnership Project; Technical Specification Group Services and System Aspects; General Packet Radio Service (GPRS); Service Description; Stage 2; Release 11; Dec. 2011; 326 pages.

3GPP TS 23.203 V11.4.0; 3rd Generation Partnership Project; Technical Specification Group Services and System Aspects; Policy and Charging Control Architecture; Release 11; Dec. 2011; 167 pages.

3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.

3GPP TS 23.401 V11.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 11; Dec. 2011; 287 pages.

3GPP TR 23.829 V10.0.1; 3rd Generation Partnership Project; Technical Specification Group Services and System Aspects; Local IP Access and Selected IP Traffic Offload (LIPA-SIPTO); Release 10; Oct. 2011; 43 pages.

3GPP TR 23.830 V9.0.0; 3rd Generation Partnership Project; Technical Specification Group Services and System Aspects; Architecture Aspects of Home NodeB and Home eNodeB; Release 9; Sep. 2009; 55 pages.

3GPP TS 29.274 V11.1.0; 3rd Generation Partnership Project; Technical Specification Group Core Network and Terminals; 3GPP Evolved Packet System (EPS); Evolved General Packet Radio Service (GPRS); Tunnelling Protocol for Control Plane (GTPv2-C); Stage 3; Release 11; Dec. 2011; 202 pages.

(56) References Cited

OTHER PUBLICATIONS

3GPP TS 32.251 V11.1.0; 3rd Generation Partnership Project; Technical Specification Group Services and System Aspects; Telecommunication Management; Charging Management; Packet Switched (PS) Domain Charging; Release 11; Dec. 2011; 82 pages.
3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2011; 194 pages.
3GPP TSG-SA WG1 Meeting #49; "SIPTO Requirements Common for Macro Network and H(e)NB Subsystems"; S1-100321; Beijing, China; Nov. 16-20, 2009; 3 pages.
3GPP TSG-SA WG1 Meeting #49; "Mobility for Local IP Access (LIPA)"; S1-100316; San Francisco, USA; Feb. 22-26, 2010; 2 pages.
3GPP TSG SA WG2 Meeting #75; "LIPA and SIPTO Node Functions"; S2-096050; Kyoto, Japan; Aug. 31-Sep. 4, 2009; 8 pages.
3GPP TSG SA WG2 Meeting #75; "Terminology Updated to Agreed Text in TR 23.8xy"; S2-096006; Kyoto, Japan; Aug. 31-Sep. 4, 2009; 5 pages.
3GPP TSG SA WG2 Meeting #75; "Architectural Requirements of Internet Offload"; S2-095900; Kyoto, Japan; Aug. 31-Sep. 4, 2009; 3 pages.
3GPP TS 36.413 V9.3.0; 3rd Generation Partnership Project; Technical Specification Group Radio Access Network; Evolved Universal Terrestrial Radio Access Network (E-UTRAN); S1 Application Protocol (S1AP); Release 9; Jun. 2010; 242 pages.
3GPP TS 23.272 V10.0.0; 3rd Generation Partnership Project; Technical Specification Group Servicse and System Aspects; Circuit Switched (CS) fallback in Evolved Packet System (EPS); Stage 2; Release 10; Jun. 2010; 74 pages.
3GPP TSG SA WG2 Meeting #80; "LIPA deactivation"; S2-104303; Brundstad, Norway; Aug. 30-Sep. 3, 2010; 16 pages.
3GPP TSG SA WG2 Meeting #80, "Addition of correlation identifier for optimised routing in LIPA"; S2-104314, Brunstad, Norway; Aug. 30-Sep. 3, 2010; 4 pages.
3GPP TSG SA WG2 Meeting #80, "The PDN disconnection during inter-RAT HO procedure"; 52-104064, Brunstad, Norway; Aug. 30-Sep. 3, 2010; 40 pages.
3GPP TSG A WG2 Meeting #79; "Introduction of SIPTO in EPS (extended version)"; 52-102291, Kyoto, Japan; May 10-14, 2010; 14 pages.
3GPP TSG SA WG2 Meeting #76; "Discussion of LIPA_SIPTO Solution"; TD S2-096637, Cabo, Mexico; Nov. 16-20, 2009; 6 pages.
3GPP TSG SA WG2 Meeting #77; "Proposed solution of architecture variant 1"; TD S2-100007, Shenzhen, China; Jan. 18-22, 2010; 6 pages.
3GPP TSG SA WG2 Meeting #80, "LIPA deactivation"; S2-104399, Brunstad, Norway; Aug. 30-Sep. 3, 2010; 22 pages.
3GPP TSG SA WG2 Meeting #79; "Fix LIPA open issues"; TD 52-102386, Kyoto, Japan; May 10-14, 2010; 8 pages.
3GPP TSG SA WG2 Meeting #78; "Further analysis for LIPA/ SIPTO solution for H(e)NB using a local PDN connection in Solution 1"; TD S2-101737, San Francisco, California, Feb. 22-26, 2010; 16 pages.
3GPP TSG SA WG2 Meeting #80; "LIPA deactivation"; S2-104400, Brunstad, Norway, Aug. 30-Sep. 3, 2010; 16 pages.
3GPP TSG SA WG2 Meeting #80; "LIPA permissions and CSG information for LIPA-able APNs in the HSS"; S2-104392, Brunstad Norway, Aug. 30-Sep. 3, 2010; 8 pages.
U.S. Appl. No. 13/576,432, Non-Final Office Action dated Feb. 24, 2014, pp. 1-10 and attachments.
U.S. Appl. No. 13/355,283, Non-Final Office Action dated Jan. 31, 2014, pp. 1-10 and attachments.
Korean Intellectual Property Office, International Search Report for PCT/US2012/022082 dated Jul. 30, 2012 (3 pages).
Korean Intellectual Property Office, Written Opinion for PCT/US2012/022082 dated Jul. 30, 2012 (4 pages).
The International Bureau of WIPO, International Preliminary Report on Patentability for PCT/U52012/022082 dated Jul. 23, 2013 (5 pages).
European Patent Office, International Search Report and Written Opinion of PCT/US2011/053505 dated Jan. 26, 2012 (16 pages).
The International Bureau of WIPO, International Preliminary Report on Patentability for PCT/US2011/053505 dated Apr. 2, 2013 (10 pages).
European Patent Office, International Search Report and Written Opinion for PCT/US2011/053512 dated Feb. 3, 2012 (20 pages).
The International Bureau of WIPO, International Preliminary Report on Patentability for PCT/US2011/053512 dated Apr. 2, 2013 (13 pages).
European Patent Office, International Search Report and Written Opinion for PCT/US2011/053525 dated Feb. 2, 2012 (33 pages).
The International Bureau of WIPO, International Preliminary Report on Patentability for PCT/US2011/053525 dated Apr. 2, 2013 (17 pages).
3GPP TS 23.401 V10.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 10; Jun. 2010; 261 pages.
European Patent Office, International Search Report for PCT/US2011/053520 dated Dec. 20, 2011 (2 pages).
3GPP TSG SA WG2 Meeting #80, 52-103361, Change Request 23.401 CR 1647, Version 10.0.0, LIPA deactivation dated Aug. 30-Sep. 3, 2010 (10 pages).
3GPP TSG SA WG2 Meeting #80, S2-103362, Change Request 23.060 CR 1124, Version 10.0.0, LIPA deactivation dated Aug. 30-Sep. 3, 2010 (14 pages).
U.S. Appl. No. 13/246,573, Non-Final Office Action dated Dec. 10, 2013, pp. 1-11 and attachments.
U.S. Appl. No. 13/246,573, Final Rejection dated Jun. 12, 2014, pp. 1-16 and attachments.
3GPP TS 23.401 V10.2.0, 3rd Generation Partnership Project; Technical Specification Group Services and System Aspects; General Packet Radio Service (GPRS) enhancements for Evolved Universal Terrestrial Radio Access Network (E-UTRAN) access (Release 10) Dec. 2010 (25 pages).
3GPP TS 29,274 V10.1.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10) (Dec. 2010) (6 pages).
U.S. Appl. No. 13/355,283, Final Rejection dated May 21, 2014, pp. 1-12 and attachments.
3GPP TS 23.401 V10.2.1, 3rd Generation Partnership Project; Technical Specification Group Services and System Aspects; General Packet Radio Service (GPRS) enhancements for Evolved Universal Terrestrial Radio Access Network (E-UTRAN) access (Release 10) Jan. 2011 (276 pages).
U.S. Appl. No. 15/565,800, Notice of Allowance dated Mar. 15, 2017 (18 pages).
U.S. Appl. No. 15/565,800, Final Rejection dated Dec. 19, 2016, pp. 1-24 and attachments.
U.S. Appl. No. 15/565,800, Non-Final Rejection dated Jul. 15, 2016, pp. 1-22 and attachments.

* cited by examiner

Figure 6.3-1: CS Call Request in E-UTRAN, Call in GERAN/UTRAN without PS HO

Figure 7.4-1: CS Page in E-UTRAN, Call in GERAN/UTRAN without PS HO

Figure 6.3-1: CS Call Request in E-UTRAN, Call in GERAN/UTRAN without PS HO

METHOD AND APPARATUS FOR RELEASING CONNECTION WITH LOCAL GW WHEN UE MOVES OUT OF THE RESIDENTIAL/ENTERPRISE NETWORK COVERAGE

CROSS-REFERENCE TO RELATED APPLICATIONS

This is a continuation of U.S. application Ser. No. 13/825,996, filed Mar. 26, 2013, which is a national stage application under 35 U.S.C. § 371 of PCT/US2011/053505, filed Sep. 27, 2011, which claims the benefit of U.S. Application No. 61/387,297, filed Sep. 28, 2010, all applications hereby incorporated by reference.

FIELD OF THE INVENTION

The present disclosure is directed in general to communications systems and methods for operating same. In one aspect, the present disclosure relates to the methods, systems and devices for managing local IP access (LIPA) connection releases resulting from mobility of a user equipment.

DESCRIPTION OF THE RELATED ART

Within the 3rd Generation Partnership Project (3GPP), standards are being developed for the interface between the mobile core network and a femtocell which is a small cellular base station, typically designed for use in a home or small business. Home NodeB (HNB), Home eNB (HeNB) and femto cell are concepts introduced for Universal Mobile Telecommunications System (UMTS) and Long Term Evolution (LTE) evolved UMTS Terrestrial Radio Access Network (E-UTRAN) to improve indoor and micro-cell coverage as well as to leverage wireline backhaul to the "home." A femtocell is widely used outside of 3GPP to mean any cell with a very small coverage, and typically installed in a private premises (either private or corporate or residential/enterprise). The Home NodeB (HNB), Home eNB (HeNB) and femto cell can have a residential or enterprise IP network. The terms HeNB/HNB are used in 3GPP with specific meanings, i.e. that the cell is a closed subscriber group (CSG) or hybrid cell. A CSG identifies subscribers of an operator who are permitted to access one or more cells of the public land mobile network (PLMN) but which have restricted access. A H(e)NB subsystem supports Local IP Access in order to provide access for IP-capable user equipment (UE) devices connected via a H(e)NB subsystem (i.e. using H(e)NB radio access) to other IP capable entities in the same residential IP network or enterprise IP network. The term macrocell, while not having significance in 3GPP specifications, is widely used to mean a cell other than a CSG cell.

One aspect of HeNB/HNB functionality is the ability to restrict access to particular users. For example, access may be restricted to employees of the company on whose site the HeNB is deployed, to customers of a particular coffee shop chain, or (in the case of HeNBs deployed in private homes) to individuals. To achieve this functionality, 3GPP has defined the concept of the Closed Subscriber Group (CSG). The CSG cell is one which indicates that it is a CSG cell (by means of 1 bit broadcast in the system information) and broadcasts a CSG ID (also in system information). A cell can only indicate one (or none) CSG IDs, however multiple cells may share a CSG ID. A UE device may be subscribed to multiple CSGs. The UE may for example may be a mobile terminal such as, but not limited to a cellular telephone, a personal data assistant (PDA), or a wirelessly enabled computer. A subscription may be temporary in nature (e.g., a coffee shop allows a customer one hour's access to its CSG).

3GPP standards are also being developed for the concept of selected IP traffic offloading (SIPTO) which allows internet traffic to flow from the femtocell directly to the internet, bypassing the operator's core network. SIPTO is used to offload selected types of IP traffic (e.g. internet traffic) towards a defined IP network close to the UE's point of attachment to the access network. SIPTO is applicable to traffic offload for the macro-cellular access network and for the femto cell subsystem. SIPTO PDN Connectivity indicates a PDP Context or PDN Connection that allows offload of selected types of IP traffic (e.g. internet traffic) towards a defined IP network close to the UE's point of attachment to the access network. SIPTO is applicable to traffic offload for the macro-cellular access network and for the femto cell subsystem.

In addition, standards are being developed for local IP Access (LIPA) which allows an IP-capable UE connected via a femto cell direct access to other IP-capable devices in the local residential/corporate IP network. LIPA PDN Connectivity indicates a PDP Context (in the case of a GERAN or UTRAN femto cell connected to a GPRS core network) or a PDN Connection (in the case of an E-UTRAN femto cell connected to a GPRS core network) that gives access to services located in the local residential/corporate IP network of the femto cell subsystem.

In connection with these developing standards, the following abbreviations and meanings have been developed.

The Connectivity Type indicates the type of connectivity provided for a packet data protocol (PDP) Context or PDN Connection, and applies to both connectivity established in a macro cell (in which case it can be either remote connectivity—i.e., with a GGSN/PDN GW located in the operator core network—or SIPTO connectivity or remote IP access (RIPA) connectivity) and to connectivity established in a H(e)NB (in which case it can be either SIPTO connectivity or LIPA connectivity).

A Closed Subscriber Group (CSG) identifies subscribers of an operator who are permitted to access one or more cells of the PLMN but which have restricted access (CSG cells).

A CSG Cell is a cell that is part of the public land mobile network (PLMN) broadcasting a specific CSG identity, and that is accessible by the members of the closed subscriber group for that CSG identity. All the CSG cells sharing the same identity are identifiable as a single group for the purposes of mobility management and charging. A CSG Cell is considered to be synonymous of HNB and HeNB.

An Allowed CSG List is a list stored in the network and the UE containing all the CSG identity information of the CSGs to which the subscriber belongs.

A CSG Owner is the owner of one or more H(e)NBs that have been configured as a CSG cell(s) for a particular CSG. A CSG owner can, under the H(e)NB operator's supervision, add, remove and view the list of CSG members.

Local IP Access (LIPA) provides access for IP-capable UEs connected via a H(e)NB (i.e. using H(e)NB radio access) to other IP capable entities in the same residential/enterprise IP network. Traffic for Local IP Access is expected to not traverse the mobile operator's network except H(e)NB.

A LIPA PDN Connection/PDP Context is a PDN Connection or PDP Context that gives access to the UE to services located in the local residential/corporate IP network. The PDN GW/GGSN (or Local GW) is selected in such a way to provide this type of connectivity. Alternatively, a LIPA PDN Connection/PDP context is defined as a PDN Connection/PDP context that provides access for IP capable UEs connected via a H(e)NB (i.e. using H(e)NB radio access) to other IP capable entities in the same residential/enterprise IP network. Alternatively, a LIPA PDN connection or LIPA PDP context is a PDN Connection that the MME authorizes for connectivity to a PDN GW for a UE connected to a HeNB based on a request from the UE for LIPA connectivity and based on the CSG ID of the HeNB. Alternatively, a LIPA PDN connection or LIPA PDP context is a PDN Connection which was activated by the UE requesting LIPA connectivity type "LIPA" and the MME informing the UE of the connectivity type provided.

LIPA PDN Continuity refers to the UE having a LIPA PDN Connection/PDP Context while camping or connected in a H(e)NB that maintains the connection when moving to another H(e)NB or to a macro cell.

An evolved packet core (EPC) functionality (e.g., SGSN, MME, S-GW, PDN GW, GGSN, etc.) is LIPA-aware and/or SIPTO-aware and/or SIPTO-local-aware if the functionality determines that a given PDN connection or PDP context is a LIPA/SIPTO/SIPTO-local PDN connection or PDP context. Alternatively, the functionality is LIPA-aware and/or SIPTO-aware and/or SIPTO-local-aware if it is configured to manage network contexts (e.g. PDN connection/PDP context descriptors and related signaling) for LIPA/SIPTO/SIPTO-local connections.

Network address translator (NAT) is a translator that modifies network address information in datagram (IP) packet headers while in transit across a traffic routing device for the purpose of remapping one IP address space into another.

A Packet Data Network (PDN) is a network providing data services, such as the Internet, Intranet and ATM networks.

A PDN Connection is a connection to a specific PDN identified by a specific APN.

Remote Connectivity refers to a PDP Context or PDN Connection for which the GGSN or the PDN GW, respectively, are selected in the PLMN core network according to current selection mechanisms. Remote Connectivity does not include providing SIPTO or LIPA connectivity, but could be providing RIPA connectivity.

Selected IP Traffic Offload (SIPTO) operations offload selected types of IP traffic (e.g., internet traffic) towards an IP network close to the UE's point of attachment to the access network. SIPTO is applicable to traffic offload for the macro-cellular access network and for the H(e)NB subsystem.

SIPTO PDN Connection/PDP Context refers to a PDN Connection/PDP Context for which the breakout point (e.g., PDN GW or GGSN) is close to the UE's point of attachment to the access network.

SIPTO Local refers to the offload of selected types of IP traffic (e.g., internet traffic) at the H(e)NB towards the Internet.

SIPTO Local PDN Connection/PDP Context is a PDN Connection/PDP Context for which the breakout point is the H(e)NB the UE is connected to and provides access to the Internet.

Home Node B (HNB) refers to customer-premises equipment that connects a 3GPP UE over UTRAN wireless air interface to a mobile operator's network, e.g., using broadband IP backhaul.

Home Evolved Node B (HeNB) refers to a customer-premises equipment that connects a 3GPP UE over E-UTRAN wireless air interface to a mobile operator's network, e.g., using broadband IP backhaul.

A H(e)NB Gateway is a mobile network operator's equipment (usually physically located on mobile operator premises) through which the H(e)NB gets access to mobile operator's core network. For HeNBs, the HeNB Gateway is optional.

A Default PDN Connection is the connection to the PDN that the operator has set as default for the UE (for a PDP Connection in EPS or a PDP Context in GPRS) (provisioned in the subscriber profile). The UE may not know the APN for the Default PDN even after the UE attaches to the network and obtains connectivity to the default PDN.

The network architecture model for the support of CSG Cells is described in 3GPP TR 23.830 (Architecture aspects of Home NodeB and Home eNodeB) and depicted with reference to FIG. 1 which shows an architecture model for a Home NodeB access network 100. As depicted, the network 100 includes one or more CSG-capable UEs 170 in communication with a HNB 110 over reference point Uu 175. The UEs 170 may, for example, be a mobile terminal such as, but not limited to, a cellular telephone, a personal data assistant (PDA), or a wirelessly enabled computer. The HNB 110 is in communication with a HNB gateway (HNB GW) 120 over reference point Iuh 115. The HNB GW 120 is in communication with mobile switching center/visitor location center (MSC/VLR) 130 over reference point Iu-CS 124. The HNB GW 120 is also in communication with serving GPRS Support Node (SGSN) 140 over reference point Iu-PS 126. A CSG List Server (CSG List Srv) 150 and home location register/home subscriber server (HLR/HSS) 160 are part of a home public land mobile network (HPLMN) 190. Networks that are not the HPLMN 190 on which the UE may operate are a visited public land mobile network (VPLMN) 180. The MSC/VLR 130 and the SGSN 140 are each in communication with the HLR/HSS 160 over reference points D 135 and GRs6d 145, respectively. One of the CSG enabled UEs 170 is in communication with the CSG List Srv 150 over reference point C1 185. A more detailed description of the elements and communication reference points of FIG. 1 are provided hereinbelow.

HNB 110: The HNB 110 provides the RAN connectivity using the Iuh 115 interface, supports the NodeB and most of the radio network controller (RNC) functions and also HNB authentication, HNB-GW discovery, HNB registration and UE registration over Iuh 115. The HNB 110 secures the communication to/from the SeGW.

HNB GW 120: The HNB GW 120 serves the purpose of a RNC presenting itself to the core network (CN) as a concentrator of HNB connections, i.e. the HNB GW 120 provides concentration function for the control plane and provides concentration function for the user plane. The HNB GW 120 supports Non Access Stratum (NAS) Node Selection Function (NNSF).

Uu 175: Standard Uu interface between the UE 170 and the HNB 110.

Iuh 115: Interface between the HNB 110 and HNB GW 120. For the control plane, Iuh 115 uses HNBAP protocol to support HNB registration, UE registration and error handling functions. For the user plane, Iuh support user plane transport bearer handling.

Iu-CS 124: Standard Iu-CS interface between the HNB GW 120 and the circuit switched (CS) core network.

Iu-PS 126: Standard Iu-PS interface between the HNB GW 120 and the packet switched (PS) core network.

D 135: Standard D interface between mobile switching center/visitor location center (MSC/VLR) 130 and home location register/home subscriber server (HLR/HSS) 160.

Gr/S6d 145: Standard Gr interface between serving GPRS Support Node (SGSN) 140 and HLR/HSS 160.

C1 185: Optional interface between the CSG List Server (CSG List Srv) 150 and CSG-capable UEs 170. Over-the-air (OTA) signaling is used to update the allowed CSG list on a UE 170 with a Release 8 (Rel-8) Universal Subscriber Identity Module (USIM). In some embodiments, Open Mobile Alliance (OMA) Device Management (DM) is used to update the Allowed CSG list on the UE 170 with a pre-Rel-8 USIM.

UEs that are capable of supporting Rel-8 functionality of the 3GPP standard may support CSG functionality and maintain a list of allowed CSG identities. This list can be empty in case the UE does not belong to any CSG.

Each cell of a HeNB may belong to, at maximum, one CSG. It is possible for cells of a HeNB to belong to different CSGs and hence have different CSG IDs.

The Allowed CSG List is provided as part of the CSG subscriber's subscription data to the MME.

The Allowed CSG List can be updated in the UE according to the result of the attach procedure, the Tracking Area Update (TAU) procedure, service request and detach procedures or by application level mechanisms such as OMA DM procedures.

The MME performs access control for the UEs accessing through CSG cells during attach, combined attach, detach, service request and TAU procedures.

The UE is notified of the cause of rejection by the network if the UE is not allowed to access a CSG cell.

When a CSG ID which is not included in the UE's Allowed CSG List is manually selected by the user, a TAU procedure via the selected CSG cell may be triggered immediately by the UE to allow MME to perform CSG access control.

There is no restriction on Tracking Area Identity (TAI) assignment for E-UTRAN CSG cells. As a result, it is possible that a normal cell (non-CSG cell) and a CSG cell can share the same TAI or have different TAIs. In addition, it is possible that CSG cells with different CSG ID can share the same TAI or have different TAIs. It is also possible that CSG cells with the same CSG ID can share the same TAI or have different TAIs.

The concept of TAI list applies also for CSG cells. The TAI list may include TAIs related to CSG cells and TAIs related to non-CSG cells. The UE does not differentiate these TAIs in the TAI list.

For the case of HeNB GW deployment, TAIs supported in the HeNB GW are the aggregation of TAIs supported by the CSG cells under this HeNB GW.

Several architectures for HeNB CSG Cells will now be described with reference to FIGS. 2-4. Starting with FIG. 2, there is depicted an architecture model for a HeNB access network 200 which includes a dedicated HeNB GW. In the depicted network 200, a single UE 270 is in communication with a HeNB 210 over reference point LTE-Uu 275. The HeNB 210 is also in communication with a HeNB gateway (HeNB GW) 220 over reference point S1 215. The HeNB GW 220 is in communication with mobility management entity (MME) 230 over reference point S1-MME 224, and is also in communication with serving gateway (S-GW) 240 over reference point S1-U 226. A CSG List Server (CSG List Srv) 250 and home subscriber server (HSS) 260 are part of a home public land mobile network (HPLMN) 290. Networks that are not the HPLMN 290 on which the UE may operate are a visited public land mobile network (VPLMN) 280. The MME 230 is in communication with the HSS 260 over reference point S6a 235. The S-GW 240 is in communication with the MME 230 over reference point S11 245. The UE 270 is in communication with the CSG List Srv 250 over reference point C1 285. A more detailed description of the elements and communication reference points of FIG. 2 are provided below.

HeNB 210: The functions supported by the HeNB 210 may be the same as those supported by an eNB (with the possible exception of Non Access stratum (NAS) node selection function (NNSF)) and the procedures run between a HeNB and the evolved packet core (EPC) may be the same as those between an eNB and the EPC. The HeNB 210 secures the communication to/from the SeGW 240.

HeNB GW 220: HeNB GW 220 serves as a concentrator for the control plane (C-Plane), specifically the S1-MME interface 224. The HeNB GW may optionally terminate the user plane towards the HeNB 210 and towards the S-GW 240, and provide a relay function for relaying User Plane data between the HeNB 210 and the S-GW 240. In some embodiments, the HeNB GW 220 supports NNSF.

S-GW 240: The Security Gateway 240 is a logical function that may be implemented either as a separate physical entity or co-located with an existing entity. The S-GW 240 secures the communication from/to the HeNB 210.

LTE-Uu 275: Standard LTE-Uu interface between the UE 270 and the HeNB 210.

S1-MME 224: The S1-MME 224 interface is defined between HeNB 210 and MME 230 if no HeNB GW 220 is used. If HeNB GW 220 is present, as in FIG. 2, the HeNB GW 220 may use an S1-MME interface towards both HeNB (S1 215) and MME (S1-MME 224).

S1-U 226: The S1-U data plane is defined between the HeNB 210, HeNB GW 220 and the Serving Gateway (S-GW) 240, depending upon the arrangement of network elements. The S1-U 226 interface from the HeNB 210 may be terminated at the HeNB GW 220, or a direct logical U-Plane connection between HeNB and S-GW may be used.

S11 245: Standard interface between MME 230 and S-GW 240.

S6a 235: Standard interface between MME 230 and HSS 260.

C1 285: Optional interface between the CSG List Srv 250 and CSG-capable UEs 270. OTA is used to update the allowed CSG list on a UE 270 with a Rel-8 USIM. OMA DM is used to update the Allowed CSG list on a UE with a pre-Rel-8 USIM.

With reference to FIG. 3, there is depicted an architecture model for a HeNB access network 300 which does not include a dedicated HeNB GW. In the depicted network 300, a single UE 370 is in communication with a HeNB 310 over reference point LTE-Uu 375. The HeNB 310 is in communication with a S-GW 340 over reference point S1-U 326, and is also in communication with MME 330 over reference point S1-MME 324. A CSG List Srv 350 and HSS 360 are part of a HPLMN 390. Networks that are not the HPLMN 390 on which the UE may operate are a VPLMN 380. The MME 330 is in communication with the HSS 360 over reference point S6a 335. The S-GW 340 is in communication with the MME 330 over reference point S11 345. The UE 370 is in communication with the CSG List Srv 350 over reference point C1 385.

With reference to FIG. 4, there is depicted an architecture model for a HeNB access network 400 which includes a HeNB GW for the C-Plane. In the depicted network 400, a single UE 470 is in communication with a HeNB 410 over reference point LTE-Uu 475. The HeNB 410 is in communication with a S-GW 440 over reference point S1-U 426, and is also in communication with a HeNB-GW 420 over reference point S1-MME 422. The HeNB-GW 420 is in communication with MME 430 over reference point S1-MME 424. A CSG List Srv 450 and HSS 460 are part of a HPLMN 490. Networks that are not the HPLMN 490 on which the UE may operate are a VPLMN 480. The MME 430 is in communication with the HSS 460 over reference point S6a 435. The S-GW 440 is in communication with the MME 430 over reference point S11 445. The UE 470 is in communication with the CSG List Srv 450 over reference point C1 485.

Traditionally, the UE connects to services through a remote connection using a PDP Context towards a GGSN in the core network in the case of 2G/3G, and a PDN Connection to a PGW in the Evolved packet system (EPS). As will be appreciated, PDN connection procedures are described in 3GPP TS 23.401 ("General Packet Radio Service (GPRS) enhancements for Evolved Universal Terrestrial Radio Access Network (E-UTRAN) access") and 3GPP TS 24.301 ("Non-Access-Stratum (NAS) protocol for Evolved Packet System (EPS)"). Additional signal flow information relating to PDN connectivity setup and handover procedures is described in U.S. patent application Ser. No. 12/685,651 (filed Jan. 11, 2010) and U.S. patent application Ser. No. 12/685,662 (filed Jan. 11, 2010) which are each incorporated herein by reference as is fully set forth herein.

As explained above, 3GPP is introducing the concepts of local IP access (LIPA) and selective IP traffic offloading (SIPTO) to supplement the traditional way for connecting a UE to services through a remote connection (PDP Context towards a GGSN in the core network in the case of 2G/3G, and a PDN Connection to a PGW in the Evolved packet system (EPS). With LIPA and SIPTO connections, the UE is connected to a HNB/HeNB located in a home or corporate environment to obtain local connectivity, i.e. connectivity through the IP network local to the HNB (i.e. the (residential or enterprise) IP network in the HNB "home" premises). An example of this scenario is when a given application in the UE needs to print on a local printer, or an application needs to download an updated music playlist from a local media server. Several architectures for providing LIPA and SIPTO connections over HNB/HeNB cells will now be described with reference to FIGS. 5 and 6, where the difference between LIPA connectivity and normal connectivity is also highlighted.

With reference to FIG. 5, there is illustrated a schematic diagram of an example logical architecture network 1000 for use in a HNB cell illustrating Local IP connectivity. The depicted network 1000 is substantially the same as FIG. 1 with the addition of a Gateway GPRS Support Node (GGSN) 196 connected to the SGSN 140, a PDN 198 connected to the GGSN 196, and a home network 104 that has an illustrated coverage area defined by the circle shape. LIPA PDN connectivity is illustrated from the UE 170 through the HNB 110 to the local service 106 via dotted line 108. Normal PDN connectivity via the core network (HNB GW 120, SGSN 140 and GGSN 196) is illustrated from the UE 170 to the PDN 198 via dashed line 105.

In the HNB scenarios, a UE 170 determines whether it has access to a given HNB 110 thanks to the UE 170 having knowledge of its belonging to a specific Closed Subscriber Group (CSG). The operator/owner of an HNB 110 creates list of CSGs and provisions the UEs 170, 172 with CSG lists so that the UE 170, 172 determines which HNBs it can connect to. Therefore, a UE 170, 172 that is moving in macro-coverage (i.e. in cellular cells not belonging to a CSG/HNB) may come across a CSG/HNB cell 104. The UE 170, 172 would use the CSG information to decide whether to attempt connection to such HNB 110 or not. CSG information is typically configured in the UE 170, 172 by the operator and can dynamically be modified, e.g. using OMA-DM (Device Management). USIM information to support LIPA is also foreseen. Some of this information may be managed by the H(e)NB hosting party too.

With reference to FIG. 6, there is illustrated a schematic diagram of the example logical architecture network 1100 for use in a HeNB cell illustrating Local IP connectivity. The depicted network 1100 is substantially the same as FIG. 2 with the addition of a PGW 296 connected to the S-GW 240, a PDN 298 connected to the PGW 296, and a home network 204 that has an illustrated coverage area defined by a circle shape. LIPA PDN connectivity is illustrated from the UE 270 through the HeNB 210 to the local service 206 via dotted line 208. Normal PDN connectivity via the core network (HeBN 210, HeNB GW 220, S-GW 240 and PGW 296) is illustrated from the UE 270 to the PDN 298 via dashed line 205. In the HeNB scenarios, a UE 270 also determines its access rights to the HeNB network 204 using the CSG list provided by the HeNB 210.

As will be appreciated, the relevant 3GPP specifications in this area include 3GPP TR 23.829 entitled "Local IP Access & Selected IP Traffic Offload" (which describes the mechanisms for IP traffic offloading) and 3GPP S2-096006 entitled "Terminology update to agreed text in TR 23.8xy" (which introduced LIPA and SIPTO functionalities and architectural aspects). In addition, 3GPP S2-096050 entitled "LIPA and SIPTO node functions" and 3GPP S2-096013 entitled "Internet offload for macro network" set forth the architectural principles for selected embodiments of the disclosure relating to Local IP Access and Selected IP Traffic Offload based on traffic breakout performed within H(e)NB using a local PDN connection, as well as Local IP Access and Selected IP Traffic Offload at H(e)NB by NAT. 3GPP S2-095900 entitled "Architectural Requirements of Internet Offload" introduced the architectural requirement that traffic offload can be performed without user interaction, and that the impact on the existing network entities and procedures by introducing traffic offload be minimized.

In addition to the foregoing, 3GPP S2-096013 entitled "Internet offload for macro network" introduced an additional SIPTO solution which supports SIPTO for UMTS macros and for HNB subsystems. The additional SIPTO solution is depicted in the schematic diagram of FIG. 7 which shows an example logical architecture showing a Traffic Offload Function (TOF) 1208 deployed at Iu-PS. In the depicted architecture, the TOF 1208 is located at Iu-PS and provides standard Iu-PS interface to the RNC 1206 and the SGSN 1210. Selected IP Traffic Offload is enabled by NAT and SPI/DPI based on operator policies at different levels (e.g. per user, per APN, per service type, per IP address, etc). The policies may be configured via e.g. OAM. One PDN connection or PDP context for both offload traffic and non-offload traffic is supported, while also allowing use of different PDN connections or PDP contexts for offload traffic and non-offload traffic (e.g. by selecting the traffic based on APN). The TOF 1208 includes a number of functions. First, the TOF 1208 inspects both NAS and RANAP messages to get subscriber information and establish local UE context. The TOF 1208 also decides the offload policy to be applied based on above information (e.g., during attach and PDP context activation procedures). In addition, TOF 1208 drags the uplink traffic out from the GTP-U tunnel and performs NAT to offload the traffic if offload policy is matched. TOF 1208 may also perform reverse NAT to the received downlink offload traffic and inserts it back to the right GTP-U tunnel.

A local gateway-based architecture solution is also introduced at 3GPP S2-096015 entitled "Local GW Based Architecture" which supports Local IP Access for H(e)NB subsystem, Selected IP Traffic Offload for H(e)NB subsystem, and Selected IP Traffic Offload for macro network. The solution applies to both types of approaches: with separate APNs for SIPTO and non-SIPTO traffic, and also with common APN(s) for SIPTO and non-SIPTO traffic. The local gateway solution is depicted in the schematic diagram of FIG. 8 which shows an example logical architecture for a proposed extension of non-roaming architecture for 3GPP accesses for SIPTO and LIPA. In the depicted architecture, a Local Gateway (L-GW) 1306 is co-located with the (H)eNB 1304. Between L-GW 1306 and PDN GW 1310, a Local-GW Extension Tunnel 1326 is configured. The L-GW 1306 performs gateway and routing to/from external PDN (e.g. internet, enterprise or home NW) that is equivalent to SGi. In addition, the L-GW 1306 performs tunneling of IP packets through the extension tunnel 1326 to/from PDN GW 1310 (e.g., based on GTP, PMIP, IP in IP or other). The L-GW 1306 also performs IP address handling (either IP address allocation and conveyance to PDN GW, or alternatively reception of IP address from PDN GW and NATing), as well as coordination with the (H)eNB 1304 on usage of local breakout (trigger eNB for local traffic handling). The L-GW 1306 also implements a decision function on the usage of local breakout for uplink traffic (optionally it can be part of the eNB). As will be appreciated, the L-GW 1306 is not a PDN GW shifted to eNB/E-UTRAN, but encompasses only minimal functionality.

With the L-GW 1306, the functionality of the PDN GW 1310 is enhanced by establishing the extension tunnel 1326 upon PDN connection establishment for APNs matching the criteria for local traffic. In addition, the PDN GW 1310 forwards traffic through extension tunnel 1326 and to/from S5/S8 tunnel, and performs IP address handling (either obtain of IP address from L-GW, or alternatively conveyance to L-GW).

At the (H)eNB 1304, there is provided UE access state information for the cell(s) served by the (H)eNB 1304 to the L-GW 1306. In addition, the (H)eNB 1304 implements a decision function on usage of local breakout for uplink traffic (based on APN). With the enhanced architecture shown in FIG. 8, mobility between 3GPP and non-3GPP accesses can be managed since the PDN GW 1310 is always in the path when the UE 1302 leaves the (H)eNB 1304, meaning that the mobility support function of handover towards non-3GPP accesses can be handled by the PDN GW 1310 as usual. As a result, such functionality does not need to be provided as part of the L-GW 1305 or within the (H)eNB 1304. In addition, it is possible to achieve dynamic control for LIPA/SIPTO handling in the PDN-GW 1310 which is switched on only after the extension tunnel 1326 is set up.

Accordingly, a need exists for improved method, system and device for managing LIPA connection releases to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
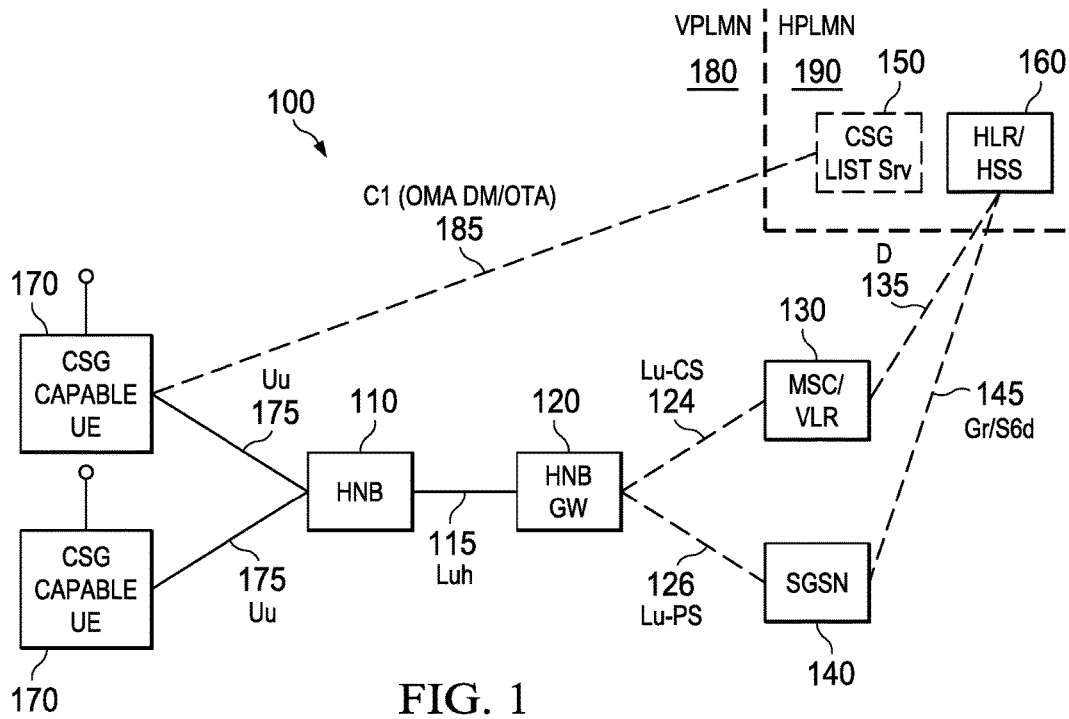
FIG. 1 is a schematic diagram of an example logical architecture for use in a HNB cell.
Figure 2:
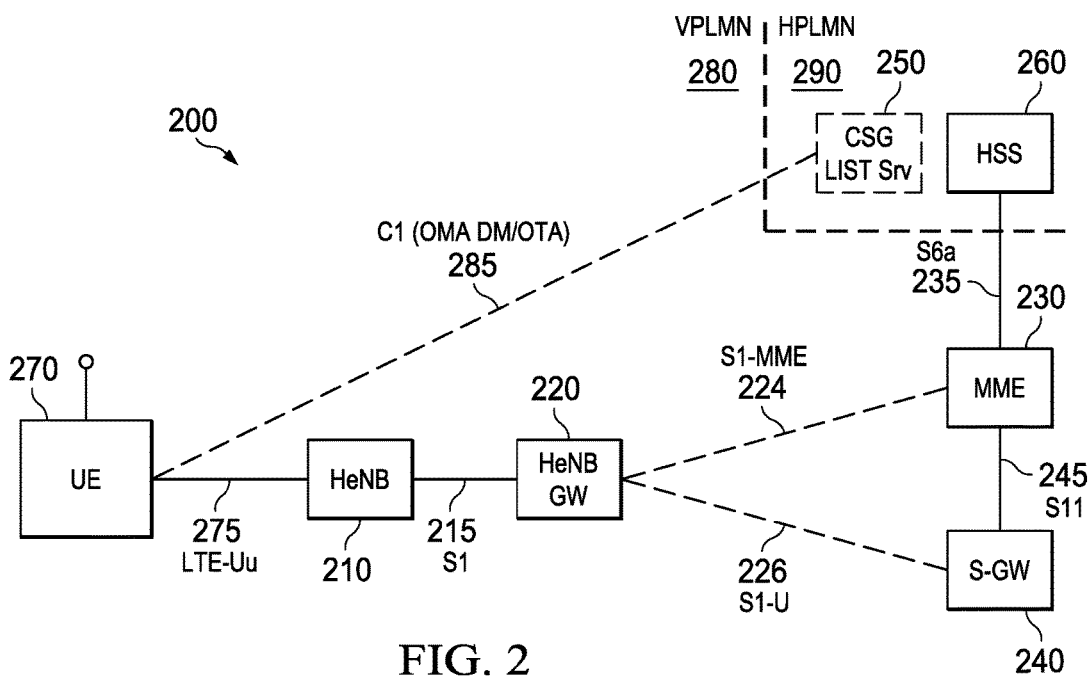
FIG. 2 is a schematic diagram of an example logical architecture for use in a HeNB cell in which the network includes a dedicated HeNB GW.
Figure 3:
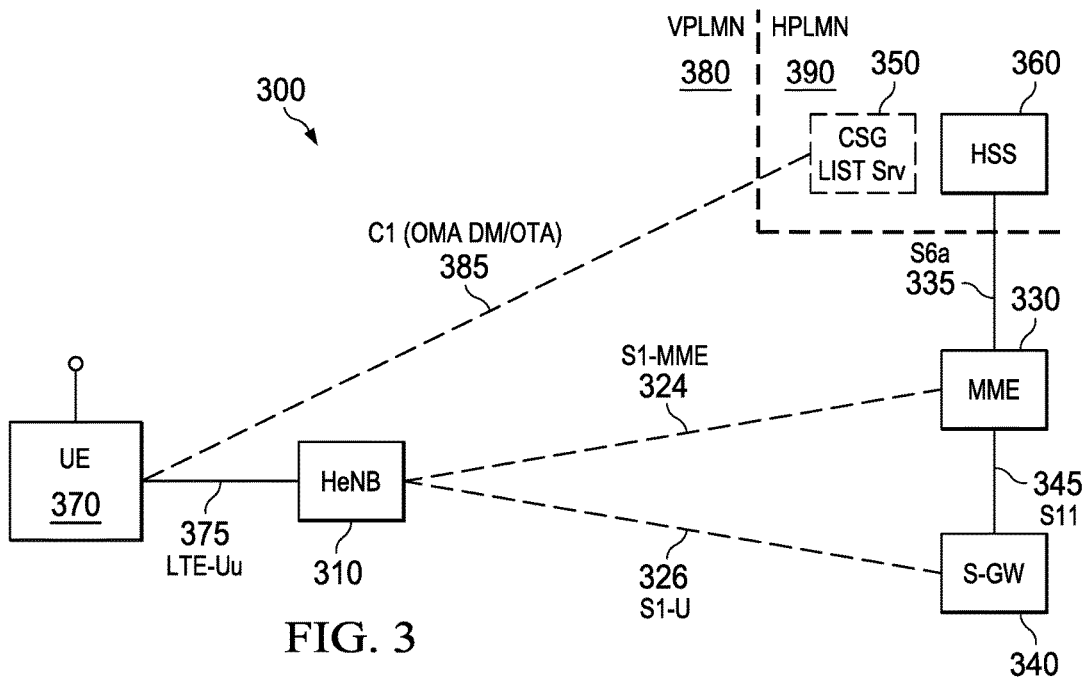
FIG. 3 is a schematic diagram of another example logical architecture for use in a HeNB cell in which the network does not include a dedicated HeNB GW.
Figure 4:
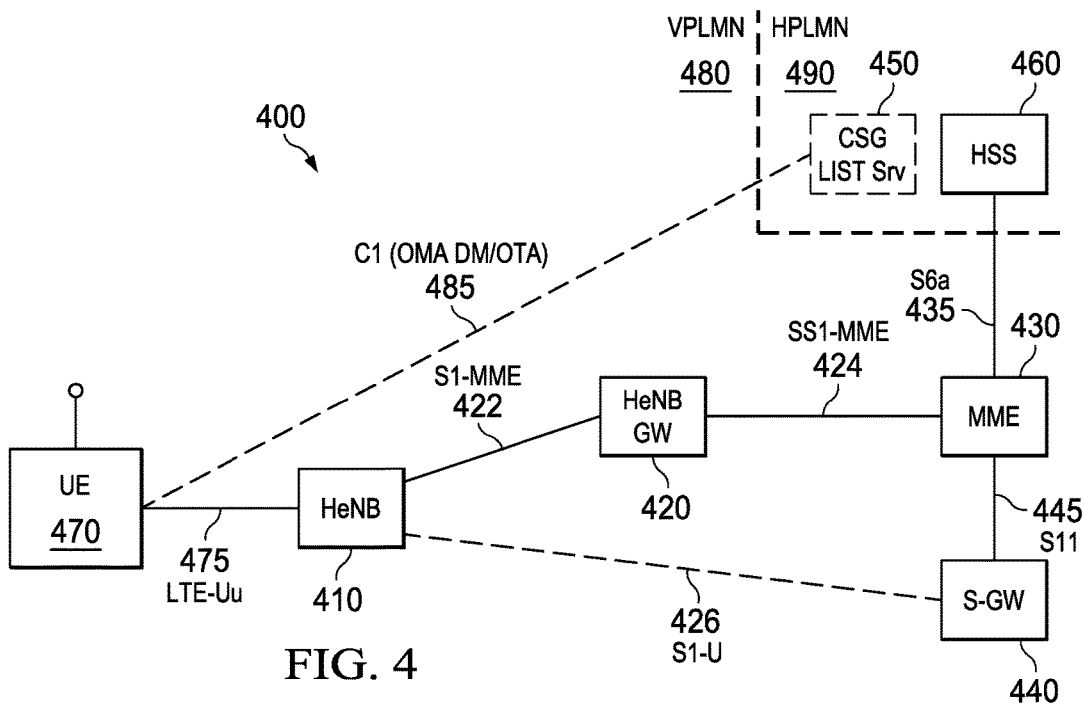
FIG. 4 is a schematic diagram of a further example logical architecture for use in a HeNB cell in which the network includes a HeNB GW for the C-Plane.
Figure 5:
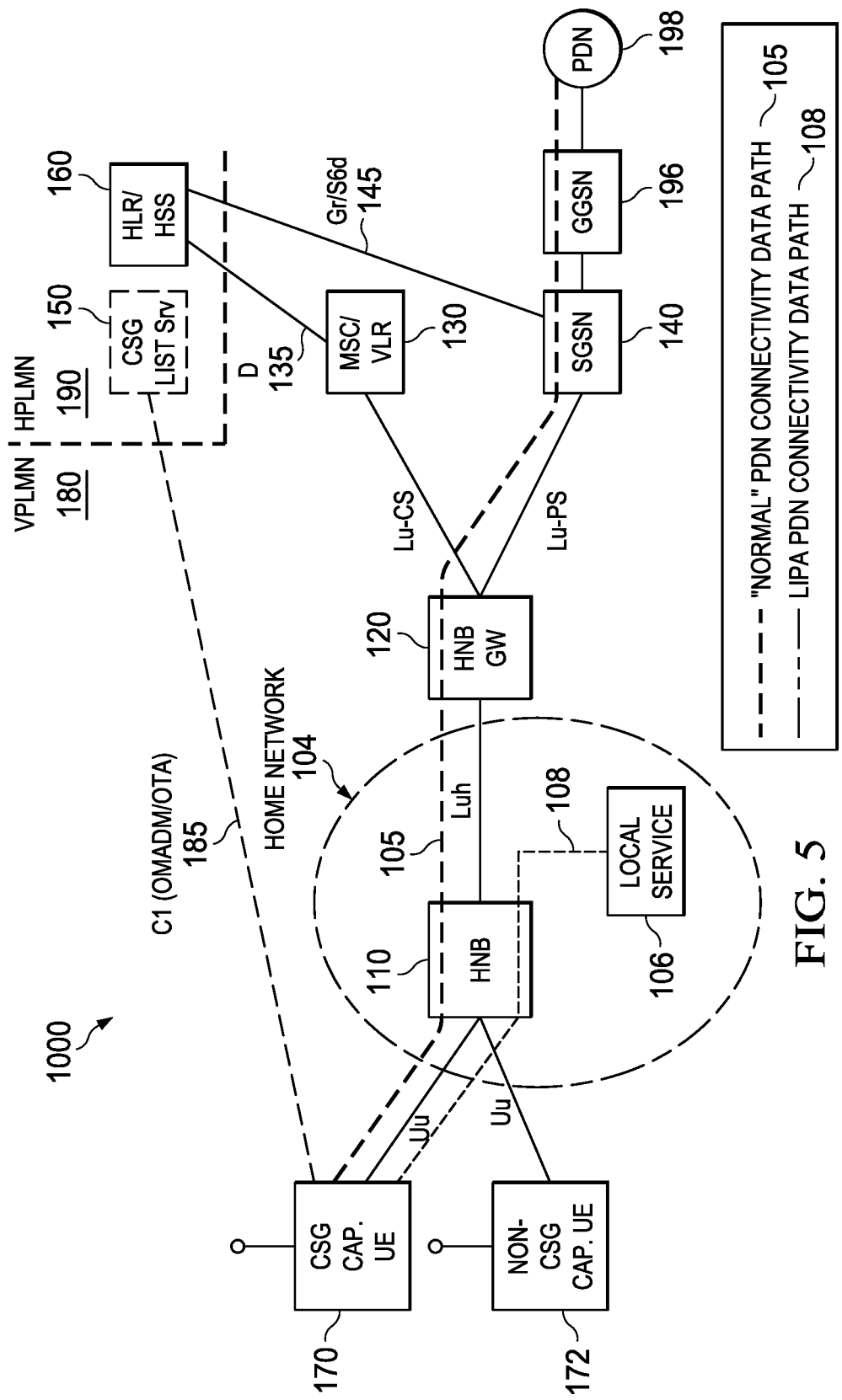
FIG. 5 is a schematic diagram of an example logical architecture for use in a HNB cell illustrating Local IP connectivity.

A method, system and device are provided for managing LIPA and/or SIPTO connection releases when UE moves out of residential/enterprise network coverage in case service continuity is not supported for the LIPA/SIPTO PDN connection(s). In selected embodiments where a UE has only one PDN connection which is LIPA PDN connection, automatically releasing it when the UE leaves the residential/enterprise network coverage will cause the UE to be detached from the network as the UE does not have a PDN connection. To address problems caused by not providing service continuity for LIPA/SIPTO PDN connection(s), the PDN connection/PDP context created in the HeNB/HNB by the MME/SGSN includes context information related to the UE indicating whether such connection is a LIPA PDN connection PDN connection or not. In addition, each UE may be configured to reconnect (or not reconnect) to the PDN corresponding to a certain APN or service if the PDN connection was disconnected by the network due to mobility from a H(e)NB (where the UE was connected in LIPA to such PDN) to a target cell (where LIPA continuity is not provided). In selected embodiments, the UE can be configured to contain (1) an indication of whether any PDN that was disconnected due to lack of LIPA service continuity needs to be reconnected, (2) a list of APNs for which the PDN needs to be reconnected if the PDN that was disconnected due to lack of LIPA service continuity, (3) an indication of availability of LIPA service continuity, (4) a list of indicators for PDN connection with certain characteristics, (5) an indication of whether disconnecting non-LIPA is allowed if emergency call with insufficient credentials is not allowed, and/or (6) an indication of whether a UE retains at least two PDN connections with one of the PDN connections being to either a particular APN or to a default APN.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present disclosure will now be described in detail below with reference to the figures.

Ongoing 3GPP discussions have addressed the treatment of LIPA/SIPTO PDN connection releases associated with UE mobility. In these discussions, there is currently a preference to not provide service continuity for a LIPA PDN connection if the UE moves out of the coverage of the residential/enterprise network, and instead to release the LIPA PDN connection. This preference for releasing connections is based on a number of factors. First, there is a concern that lawful Interception will be applied to local IP resource access if the UE resides in macro (e)NB's coverage and service continuity is maintained. Also, it will be difficult to establish charging schemes which change as the UE moves from H(e)NB to macro (e)NB. There may also be authentication complications involved with maintaining service continuity. Based on these discussions, Release 10 of 3GPP S1-100316 entitled "Mobility for Local IP Access (LIPA)" and of 3GPP S1-100321 entitled "SIPTO requirements common for macro network and H(e)NB subsystems" specifies that mobility of a LIPA connection to macro network is not supported, whereas mobility of the LIPA connection between H(e)NBs in the same residential/enterprise network is supported/required. In addition, Release 10 of 3GPP S1-100321 entitled "SIPTO requirements common for macro network and H(e)NB subsystems" specifies that mobility of a SIPTO connection within the macro network shall be supported, and mobility from H(e)NB to macro and between H(e)NB may be supported.

In view of the preference against maintaining service continuity for LIPA connections when the UE leaves the residential/enterprise network coverage, there are a number of different problems created resulting in unwanted UE disconnections. As explained more fully below, these release problems have multiple dimensions, including problems with PS services when there is UE mobility in connected mode, problems triggered by CSFB procedures when there is UE mobility in connected mode, and problems with or without ISR when there is UE mobility in idle mode. In discussing these problems, consideration should be given to LIPA mechanisms which also work for pre-Release 10 UEs (i.e., UEs that are not aware of LIPA connectivity, such as occurs when the network provides LIPA connectivity to the UE based on subscription profile or network decision, without the UE being aware of such decision). For such UEs, NAS signaling and mechanism cannot be modified in order to resolve the identified problems.

Figure 9:
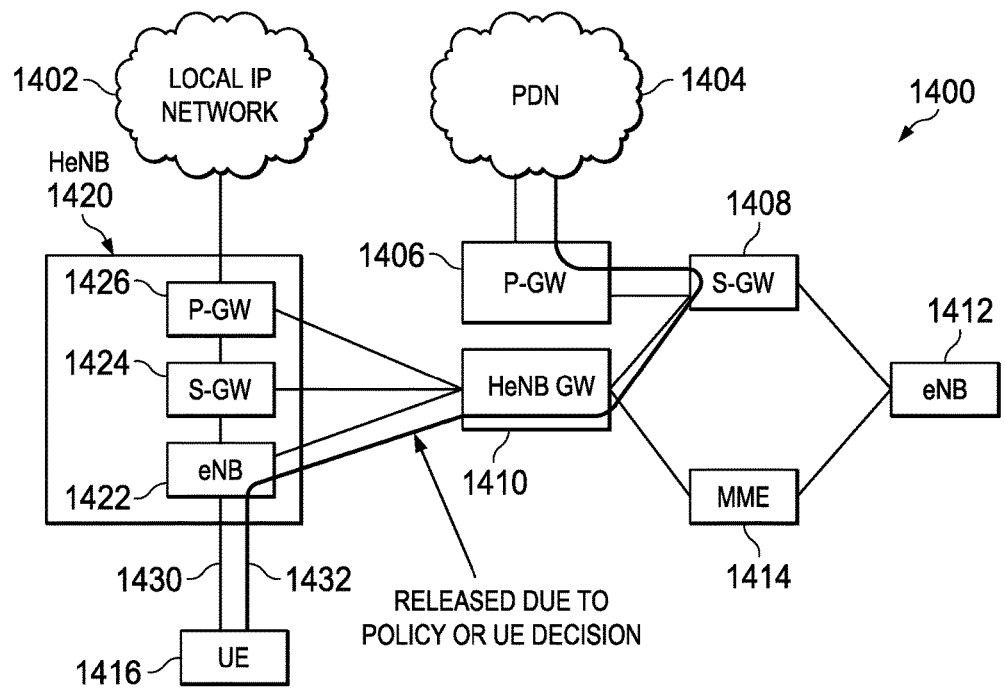
FIG. 9 is a schematic diagram of traffic flows in an HeNB subsystem in which the UE has at least a LIPA PDN connection.
Figure 10:
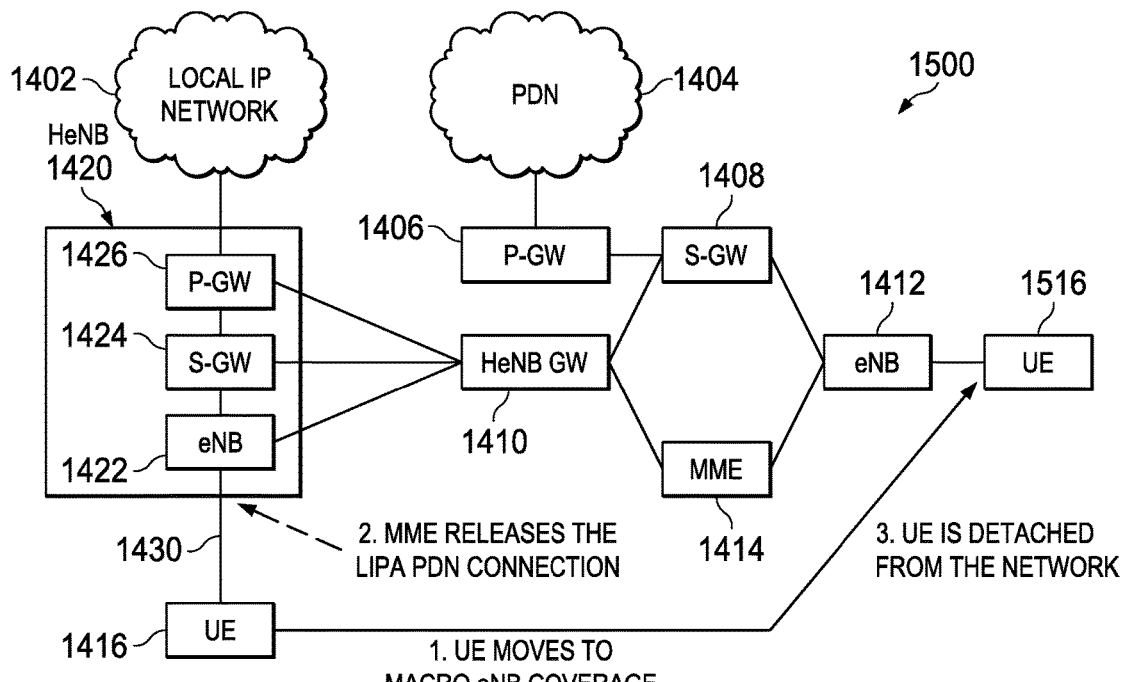
FIG. 10 is a schematic diagram of traffic flows in an HeNB subsystem in which the UE moves outside of HeBN coverage.

For purposes of illustrating the UE disconnect problem, reference is now made to FIGS. 9-10 which schematically illustrate the release of a LIPA PDN connection as the UE moves outside the HeNb enterprise network coverage, where the term "PDN connection" refers both to a PDN Connection involving a HeNB and a PDP Context involving a HNB unless explicitly indicated. In particular, FIG. 9 is a schematic diagram of traffic flows in an HeNB subsystem 1400 in which the UE 1416 has a LIPA/SIPTO PDN connection 1430 and a core network (CN) PDN connection 1432. With the LIPA/SIPTO PDN connection 1430 established, user plane traffic for LIPA and SIPTO does not go through the core network connection 1432. Instead, the traffic goes from UE 1416 through the Local eNB 1422, Local S-GW 1424, and Local P-GW 1426, which are illustrated to all be collocated in HeNB 1420, as indicated with line 1430. If the UE 1416 has an additional, non-LIPA, non-SIPTO PDN connection, the traffic goes through the HeNB-GW 1410, S-GW 1408, and P-GW 1406 to the core PDN 1404 as indicated with line 1432. Since the second PDN connection 1432 can be released at any time (e.g., due to pre-defined policy or UE configuration), there are times when the UE 1416 has only one PDN connection when connected to the H(e)NB 1420, and such PDN connection is a LIPA PDN connection 1430.

To illustrate the UE disconnect problem, reference is now made to FIG. 10 which depicts a schematic diagram of traffic flows in an HeNB subsystem 1500 in which the UE 1416 moves outside of HeBN coverage when it has only a LIPA PDN connection. In this case, the reference to moving "outside the H(e)NB" indicates both case of the UE moving from a H(e)NB cell to macro cell coverage, and the case of the UE moving between H(e)NB cells for which LIPA PDN continuity is not supported (e.g. H(e)NBs with different CSGs). It may be that LIPA PDN continuity is not supported between any H(e)NB cell. Thus, FIG. 10 illustrates that the UE 1416 moves towards a second position 1516 where there is macro coverage, though the UE 1416 could also move to another H(e)NB for which LIPA PDN continuity is not supported. As soon as the MME 1414 detects that the UE is not connected to the H(e)NB 1420 (e.g. the UE has moved to a different cell where LIPA continuity is not supported), the MME 1414 releases the LIPA PDN connection 1430 since there is no requirement of maintaining LIPA PDN connectivity. As a result, there is no PDN connection for the UE 1516. As described more fully below, the MME 1414 can detect that the UE 1516 is out of coverage of the H(e)NB 1420 based on a variety of detection mechanisms, such as when the UE 1516 performs a Tracking Area Update (TAU) or Routing Area Update (RAU) from a different cell, or when the UE 1516 responds to paging from a different cell, etc.

In E-UTRAN, a UE has to maintain at least one PDN connection for the UE to be considered attached to the network. If there is no PDN connection, the UE is detached from the network. FIG. 10 shows how the disconnect problem arises when a UE 1416 has only a single, active LIPA PDN connection 1430, and the MME 1414 releases the LIPA PDN connection 1430 upon detecting that the UE 1416 has moved to a new position which is not connected to the H(e)NB 1420 anymore. When detachment occurs, the UE 1516 may not know why it is being detached and why the LIPA PDN connection 1430 is being released, and is then forced to re-attach to the network. This issue applies both for NAS idle mode mobility and NAS connected mode mobility. As will be appreciated, while the foregoing discussion refers to LIPA PDN connections, the same challenges apply to a LIPA PDP Context (in case of HNB) or the SIPTO Local connectivity, unless explicitly indicated. And though not explicitly shown, it will also be appreciated that similar problems arise when UE mobility is from the H(e)NB 1420 towards GERAN/UTRAN (i.e. involving a SGSN), in which case the active PDP context (corresponding to the LIPA connection) needs to be deactivated, even if the UE does not need to be detached.

In this framework, a number of problem cases associated with LIPA connection releases are identified and discussed in relation to FIG. 10 more fully below. In addition, solutions for managing the various connection release problems are identified and discussed as set forth below.

Mobility In Connected Mode There a number of problem cases that arise in the case of an active handover where the UE has NAS connected mode mobility.

In an example problem case, a connected mode UE 1416 has a LIPA PDN connection or SIPTO connectivity/SIPTO PDN connection 1430. As the connected mode UE 1416 moves out of the HeNB coverage 1420 (which is directly connected to the residential/enterprise network 1402) to a second position 1516 at a target E-UTRAN cell (e.g., eNB cell 1412 or another HeNB cell for which LIPA continuity is not supported), the source HeNB 1420 makes a decision to handover (HO) the UE to the target cell 1412 based on the measurement reports from the UE 1516. The HeNB 1420 sends a HO REQUIRED message to the MME 1414. As the HO REQUIRED message contains a Target ID, the MME 1414 determines that LIPA/SIPTO service shall not be continued at the target cell 1412 (e.g. based on the fact that the target cell is a macro cell or a H(e)NB in a different CSG). Based on this determination, the MME 1414 releases the LIPA/SIPTO PDN connection 1430, but the existing specifications do not specify how the MME 1414 handles the LIPA/SIPTO PDN connection release.

In another problem case, a connected mode UE 1416 is handed over from HeNB 1420 to a GERAN/UTRAN cell (not shown) for which LIPA PDN continuity shall not be supported. An example would occur when a UE 1416 having only a LIPA PDN connection 1430 performs an IRAT HO towards GERAN/UTRAN where LIPA continuity is not supported. In this case, the UE may become detached from the network or without PDP contexts if the LIPA PDN connection is released, but the existing specifications do not specify how to handle the IRAT HO. Also, if the UE 1416 has other PDN connections in addition to the LIPA PDN connection 1430 in the source cell, the LIPA PDN connection 1430 needs to be disconnected during this IRAT HO. The context information between network (SGSN) and UE containing information on the active PDN connections/PDP contexts might be out of synch for a while until a new RAU is performed by the UE and the context is synchronized between the UE and the SGSN. In cases where the context is out of synch, the UE incorrectly considers the PDP context corresponding to the LIPA connection still active.

In another problem case, a connected mode UE 1416 moves from HNB cell or coverage (not shown) to a target (e.g. GERAN/UTRAN) cell for which LIPA PDN continuity is not provided. An example would occur when UE is in HNB coverage and it has LIPA/SIPTO PDP context. If service continuity is not supported, the PDP context will be released when the SGSN detect that the UE moved out of HNB's coverage. However, the context information between network (SGSN) and UE containing information on the active PDN connections/PDP contexts might be out of synch for a while until a new RAU is performed and the context is synchronized between the UE and the SGSN. Due to the out-of-sync context, the UE in the meanwhile considers the PDP context corresponding to the LIPA connection still active.

Mobility for NAS-Idle UE There a number of problem cases that arise when the LIPA connection is disconnected during idle mode mobility and the UE enters NAS connected mode after performing idle mobility outside the H(e)NB.

In a first problem case, the UE 1416 moves from a HeNB cell coverage 1420 to a second position 1516 at a target cell 1412 (e.g., an eNB or an HeNB cell) for which continuity shall not be provided. After moving to the target cell, the UE 1516 may perform a SERVICE REQUEST in a target (e.g., an E-UTRA) cell which is not directly connected to the residential/enterprise network. On receiving SERVICE REQUEST (SR) from the UE via the target cell, the MME 1414 determines it cannot service the SR and needs to release the LIPA PDN connectivity 1430. The MME 1414 releases the LIPA PDN connectivity 1430 by rejecting the service request and disconnecting the LIPA PDN connectivity if the UE has other active PDN connections. On the other hand, if the UE has only LIPA PDN connection before it enters ECM-IDLE mode, a release of the LIPA PDN connection results in UE not having any active PDN connections left, resulting in the UE being detached from the network by the MME without the UE being correctly informed since the current specifications do not require that the MME indicate why the UE is being detached.

In another problem case, the UE 1416 moves from a HeNB 1420 to GERAN/UTRAN (not shown). In this case, the IDLE mode UE performs Tracking Area Update (TAU) in an E-UTRAN cell where LIPA service continuity is not provided. In particular, the UE will perform TAU in IDLE mode when (1) the UE enters into a new Tracking Area (TA) that is not in the list of TAIs that the UE obtained from the MME at the last registration (attach or TAU); and (2) the periodic TA update timer has expired. If the target cell is not directly connected to the residential/enterprise network when the UE performs the TAU, the MME needs to disconnect the active LIPA PDN connection, but the current specifications do not specify how the MME behaves in the presence of LIPA connections since the MME needs to release such PDN connections.

In another problem case, the UE moves from a HNB to GERAN/UTRAN. In this case, the IDLE mode UE (which has at least one LIPA PDN connection through HeNB) performs a Routing Area Update. In particular, the UE performs RAU when the UE enters into a new Routing Area (RA), and when the RAU timer expires. The new SGSN sends a CONTEXT REQUEST message to the old MME during the RAU, and the MME responds with a CONTEXT RESPONSE message. Upon determining that the UE has moved to a cell for which LIPA PDN continuity cannot be supported, the network disconnects the LIPA connection, but the current specifications do not specify whether the MME or SGSN shall trigger the disconnection and how.

Delay In Discovery Loss of Connectivity in Active Idle MobilityThere are a number of problem cases that arise from idle mode mobility when there is a delay in discovering that connectivity has been lost, with or without Idle mode Signaling Reduction (ISR).

In an example problem case, the UE 1416 moves between a HeNB 1420 and an eNB 1412, or between a HNB and macro GERAN/UTRAN, or between HeNBs (respectively HNBs) belonging to different CSGs and for which LIPA continuity shall not be provided. If the UE moves in idle mode within the Routing Area (RA)/Tracking Area (TA), the UE does not perform NAS signaling to register its location with the network. If there is a significant delay before the UE performs any NAS signaling or the UE transmits data, the UE does not realize it has lost connectivity, which can be a problem, such as for push services when the data to be delivered to the UE cannot be delivered.

In another problem case, the UE moves from a HeNB to a GERAN/UTRAN cell where ISR is active. When idle mobility is performed by the UE from the H(e)NB to a cell for which LIPA PDN connectivity shall not be supported and ISR is active and the UE moves within the ISR area, the UE does not perform NAS signaling to register its location with the network, and therefore it may be a long time before the UE performs any NAS signaling (unless it needs to transmit data) and before the UE realizes it has lost connectivity. Such loss of connectivity can be a problem for push services since the data to be delivered to the UE cannot be delivered. In addition, if the UE was using a push-service that used the LIPA PDN connection or was using the default bearer of the LIPA PDN connection to transport the data to the UE, the UE will not be able to receive any pushed data until it realizes it has been disconnected and until it has performed recovery action, such as re-attaching. Since a RAU (that will synchronize the UE and the SGSN contexts) or keep alive mechanisms of the push-service may happen long after idle mode mobility, the UE will not receive any data pushed from the push-service, whereas if the UE had been informed of the disconnection of the LIPA PDN, it could have reconnected to the push service as appropriate from the target cell with a new PDP context.

Delay In Discovery Loss of Connectivity in Active Mode MobilityThere a number of problem cases that arise from active mode mobility when there is a delay in discovering that connectivity has been lost.

In an example problem case, the UE in connected mode moves from HeNB to GERAN/UTRAN when ISR is active, resulting in a delay in discovery of loss of connectivity. This problem exists if a UE that performed the inter-RAT HO and finds itself without RABs for a given PDP context is allowed to still consider the PDP context active. When handover is performed by a UE that is active for a non-LIPA PDN from the H(e)NB cell coverage to a target (e.g., GERAN/UTRAN) cell wherein LIPA PDN connectivity is not supported, the PDP context corresponding to the LIPA PDN connection is disconnected. When ISR is active, the UE will not perform the RAU at the end of the handover if the handover is towards a RA in the ISR area. However, unless the UE is informed immediately, the UE may believe the PDP context corresponding to the LIPA PDN is still connected since, even if there are no RABs active for such connection, the UE still believes the PDP context is active. If the UE was using some push-service over the LIPA PDN connection, the UE will not be able to receive any pushed data until it realizes it has been disconnected. Also, since a RAU (that will synchronize the UE and the SGSN contexts) or keep alive mechanisms of the push-service may happen after a long-while from the handover, the UE will lose any data pushed from the push-service, whereas if the UE had been informed of the disconnection of the LIPA PDN, it could have reconnected to the push service as appropriate from the target cell with a new PDP context.

In another problem case, the UE in connected mode moves from HNB cell coverage to macro (e.g. GERAN/UTRAN) cell coverage, resulting in delay in discovery of loss of connectivity. If the UE performs handover from HNB to a target GERAN/UTRAN cell wherein LIPA PDN connectivity is not supported, the PDP context is disconnected. However, the UE may not perform a RAU as part of the handover, in which case the UE and the SGSN are not synchronized with respect to the active PDP context information.

Delay In Disconnection For Idle Mode MobilityThere is a timing-related problem which is orthogonal to the other problem cases, and the solution may benefit both idle mode mobility and active mode mobility. In this case, when the UE 1416 moves outside the coverage of the H(e)NB 1420, the LIPA connection is released upon detection, and then re-established when the UE 1416 moves back within the coverage of the H(e)NB 1420. However, there may be situations where the UE 1416 may return to the H(e)NB 1420 soon, or may keep moving back and forth between the H(e)NB 1420 and the macro coverage. In these scenarios, the LIPA connection will be established and released repeatedly, resulting in significant signaling overhead. As a result, it may be desirable to delay the release of the LIPA connection when the UE 1416 moves outside the coverage of the H(e)NB 1420 in order to optimize the scenario where the UE 1416 returns to the H(e)NB 1420 relatively quickly.

Handover to GERAN/UTRAN triggered by Circuit Switched FallbackThere a number of problem cases that arise when a UE connected to a HeNB can be combined attached for CSFB services, such as when handover to GERAN/UTRAN is triggered by CSFB.

In an example problem case, the UE can have a LIPA PDN connection and zero or more non-LIPA PDN connections through the core network. When the CSFB is triggered for Mobile Originated (MO) or Mobile Terminated (MT) services, a PS HO of the data bearers may be triggered by the HeNB and is allowable by the network because the target cell supports DTM and the PS HO as part of the CSFB procedure. In this case, the network hands over the non-LIPA PDN connections and disconnects the LIPA PDN connections or, if there are only LIPA PDN connections, the MME rejects the PS HO. If the MME rejects the PS HO, CSFB for either MO or MT will consequently fail. In case the PS HO is possible, but the UE or network fails to support DTM, then upon initiating conditions, the GERAN PS bearers will be suspended. If the target cell is a GERAN cell and DTM is not supported in the target cell, the UE will suspend the PS bearers (including the ones corresponding to the LIPA PDN connection). Once the CS service that triggered the CS fallback is terminated, the UE may move back to E-UTRAN and resume the PS bearers, or may stay in GERAN and resume the PS bearers. If the UE moves back to the original H(e)NB, then the LIPA PDN connection can be resumed based on current CSFB and EPS mechanisms. For example, when the UE performs NAS signaling towards the MME (e.g., with a Service Request or TAU), the MME resumes the suspended bearers.

In another problem case, the UE can have a LIPA PDN connection and zero or more non-LIPA PDN connections through the core network. When the CSFB is triggered for MO or MT services, a PS HO of the data bearers may not be performed. If the PS HO is not performed as part of the fallback procedure and the UE has suspended the PS bearers, and if the UE moves back to E-UTRAN, then the UE performs NAS signaling (e.g., Service Request or TAU) to the MME. The UE might move back to a target E-UTRAN cell which is different from the original HeNB cell. Such target E-UTRAN cell can be a macro cell or a HeNB with a different CSG ID. Assuming that service continuity (i.e., mobility) for a LIPA PDN connection is not allowed between the original HeNB (i.e., where the LIPA PDN connection was created) and the target HeNB, then the MME ensures that the LIPA PDN connection is disconnected. Also, if the target E-UTRAN cell is a macro cell, then the MME ensures that the LIPA PDN connection is disconnected.

Maintaining LIPA PDN Connectivity In Future NetworksIn post release 10 networks, LIPA continuity will be enabled, so there will be problems associated with maintaining LIP PDN connectivity. In such future cases, a UE will need to know whether it is connecting to a network that supports LIPA continuity or not. Therefore, a UE cannot know whether, upon moving outside the coverage of a H(e)NB, session continuity is provided or not.

In view of the foregoing problem cases associated with LIPA connection releases, there are described and disclosed herein a number of solutions that may be applied to manage the identified connection release problems. For example, MME-initiated PDN connection release procedures may be combined with handover procedures for releasing a PDN connection when the UE moves outside the coverage of the H(e)NB in most cases (and similarly the SGSN-initiated PDP context deactivation procedure). However, there are other solutions disclosed hereinbelow wherein, upon creation of a PDN connection/PDP context in a HeNB/HNB, the MME/SGSN stores in the context information related to the UE an indication of whether such connection is a LIPA PDN connection PDN connection or not. In addition, the solutions include configuring the UE (e.g. by the operator or the user) on whether to reconnect the PDN corresponding to a certain APN or service if, due to mobility from a H(e)NB where the UE was connected in LIPA to such PDN to a target cell for which LIPA continuity is not provided, such PDN connection was disconnected by the network. Alternatively, the UE may be configured to not reconnect the PDN that was disconnected due to UE mobility.

DESCRIPTION OF EMBODIMENTS

In selected embodiments, the operator configures the UE using an OMA DM management object (MO) to contain an indication of whether any PDN that was disconnected due to lack of LIPA service continuity needs to be reconnected. The UE may also be configured to contain a list of APNs for which the PDN needs to be reconnected if the PDN that was disconnected due to lack of LIPA service continuity. In other embodiments, the UE is configure to contain an indication of availability of LIPA service continuity (i.e., only between CSG cells for which the UE is a member of the CSG or if not roaming or if mobility to macro occurs or if mobility to macro occurs+open CSG cells occurs). By default, this indication can be set to some value, e.g. to no LIPA service continuity available. The UE may also be configured to contain a list of indicators for a PDN connection with certain characteristics (i.e., an indication the PDN connection can be used for IMS or an indication requesting to receive P-CSCFs in the response message from the network). A configured UE may also contain an indication of whether disconnecting non-LIPA is allowed if emergency call with insufficient credentials is not allowed, and/or an indication of whether a UE retains at least two PDN connections where one of the PDN connections is to either a particular APN or to a default APN (known to terminate by a non PGW) when not in PS mode 2 of operations.

In selected embodiments, when the UE activates a LIPA PDN connection, the MME stores the pair of CSG ID and the APN for the LIPA PDN connection where a LIPA PDN connection is activated at the CSG ID cell. In other embodiments, when the UE activates a LIPA PDP context, the SGSN stores the pair of CSG ID and the APN for the LIPA PDP context where the LIPA PDP context is activated at the CSG ID cell. In some embodiments, the UE activating a LIPA PDN connection or the UE activating a LIPA PDP context includes the UE sending a PDN connection request to the MME or the MME receiving a PDN connection request from the UE or the UE sending an attach request to the MME or the MME receiving an attach request from the UE or the UE sending a PDP context request to the SGSN or the SGSN receiving a PDP context request from the UE.

As used herein, a LIPA PDN connection is a PDN Connection that the MME authorizes for connectivity to a PDN GW for a UE connected to a HeNB based on a request from the UE for LIPA connectivity and based on the CSG ID of the HeNB. Alternatively, a LIPA PDN Connection is a PDN Connection which was activated by the UE requesting LIPA connectivity type "LIPA" and the MME informing the UE of the connectivity type provided.

In this solution, the TAU procedure is always initiated by the UE and is used for a number of purposes, including synchronizing the UE EPS bearer context with the MME EPS bearer context for UE mobility where the source cell is a CSG cell and the target cell is not a CSG cell, when the UE has at least one LIPA PDN connection. The TAU procedure is also used to synchronize the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection.

Embodiments

UE shall not initiate PDN Disconnect RequestIn accordance with selected embodiments, a solution for managing LIPA connection releases is to ensure that the UE always maintains at least one PDN connection through the core network if the LIPA service continuity is not supported. In selected embodiments of this solution, a UE is configured so that, if the UE has a LIPA PDN connection, the UE shall not initiate PDN DISCONNECT REQUEST/DEACTIVATE PDP CONTEXT REQUEST if (1) LIPA service continuity is not supported for the UE, and (2) the disconnection results in one or more active LIPA PDN connections only.

As will be appreciated, this solution may be implemented in any Release 10 UE to handle the scenarios of a Release 10 UE being connected to a Release 10 network. If the UE connects to a Release 11 network that supports LIPA continuity, the UE can have LIPA continuity. The solution is not applicable for pre-Release 10 UEs, and does not apply to scenarios in which the UE is provided (e.g. per operator decision) only with LIPA connectivity.

Embodiments

Detach the UE during handoverIn accordance with selected embodiments, another solution addresses the case of connected mode mobility from HeNB to macro E-UTRAN or another HeNB for which LIPA continuity is not supported. In this solution, the MME implicitly deactivates the LIPA PDN connection during the handover between a HeNB and a target E-UTRAN cell when LIPA continuity shall not be supported. Alternatively, the MME explicitly deactivates the LIPA PDN connection after the handover is performed. In this solution, the UE detects that it has lost LIPA PDN connection since the RABs for that PDN will not be present in the target cell.

The applied assumptions in this example are that (1) Service Continuity for the LIPA is not supported, (2) UE is in ECM-CONNECTED mode, (3) HO should be performed due to the UE's mobility, (4) Target cell belongs to a macro eNB or another HeNB that is not connected to the residential/enterprise network (other CSG), (5) MME relocation is not involved, and (6) UE has at least two PDN connections: one is LIPA PDN connection another is a PDN connection through core network.

The disclosed solutions in these embodiments provide a way to handle 51 based HO procedure between HeNB and the target E-UTRAN cell when the UE has at least one LIPA/SIPTO PDN connection and additional PDN connections going through the core network. If MME relocation is needed for the HO, MME relocation happens right after step 16-1 (described in FIG. 11), and it does not affect the rest of the procedure.

Implicit Deactivation of the LIPA PDN Connection During the Handover

In a first embodiment described with reference to the signal flow diagram in FIG. 11 where the UE 1602 has one of the PDN connections that is a LIPA/local SIPTO connection, the MME 1608 performs the handover, but the MME 1608 does not allow the allocation of RABs for the LIPA PDN connection in the target cell. The MME 1608 does not perform any explicit NAS signaling to the UE 1602 to deactivate the LIPA PDN connection. After the handover, the UE 1602 automatically releases the LIPA PDN connection since no RABs have been allocated for it. For Rel.10 UEs and subsequent releases, the UE detects that the PDN connection for which no RABs have been allocated is the LIPA connection and decides whether to request a new PDN for that APN based on policies or configuration information, such as may be provided by the operator or the user.

In operation, when the HeNB 1604 triggers the handover to a target cell by sending the handover request to the MME 1608 which includes the information on the target cell, the MME 1608 determines that there is an active PDN connection that is a LIPA PDN connection based on the UE context information in the MME (including subscription information with LIPA indications, current CSG, current status of LIPA connections, etc.) and the information on the target cell (e.g. technology type, CSG ID). In addition, the MME 1608 determines that LIPA PDN continuity cannot be supported towards the target cell. To implicitly deactivate the connection, the MME 1608 does not request the allocation of RABs for the LIPA PDN connection in the target cell during the handover preparation. In this way, the UE 1602 performs the handover and detects that no radio bearers have been allocated in the target cell for the LIPA PDN connection. In this way, the UE 1602 determines that the LIPA PDN connection has been released. In addition, the UE 1602 determines whether the PDN connection needs to be reactivated in the target cell based on configuration information or operator policies or user policies.

Figure 11:
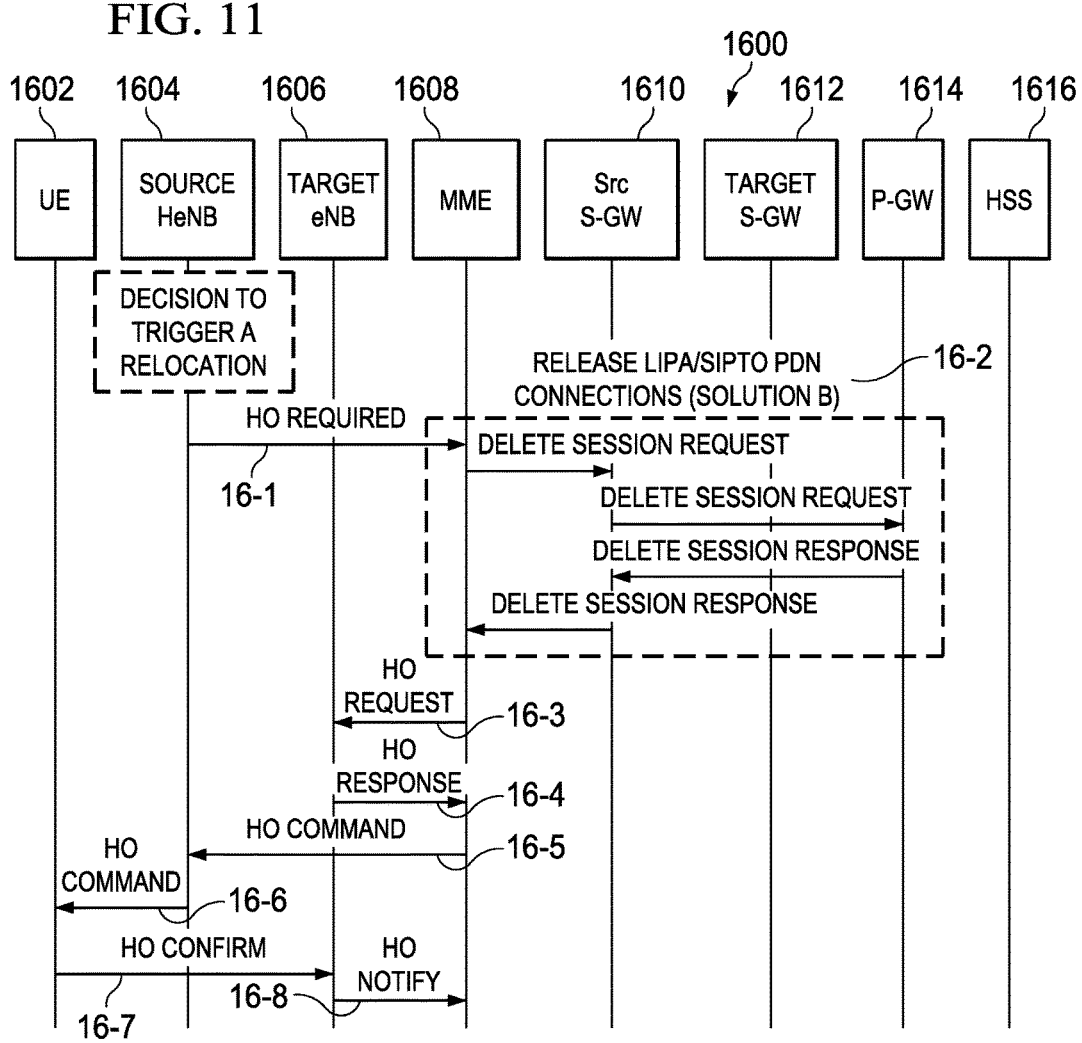
FIG. 11 is a signal flow diagram illustrating a LIPA/SIPTO PDN disconnect procedure during handover from an HeNB to a target E-UTRAN cell when the UE has at least one LIPA/SIPTO PDN connection and additional PDN connections going through the core network.
Figure 8:
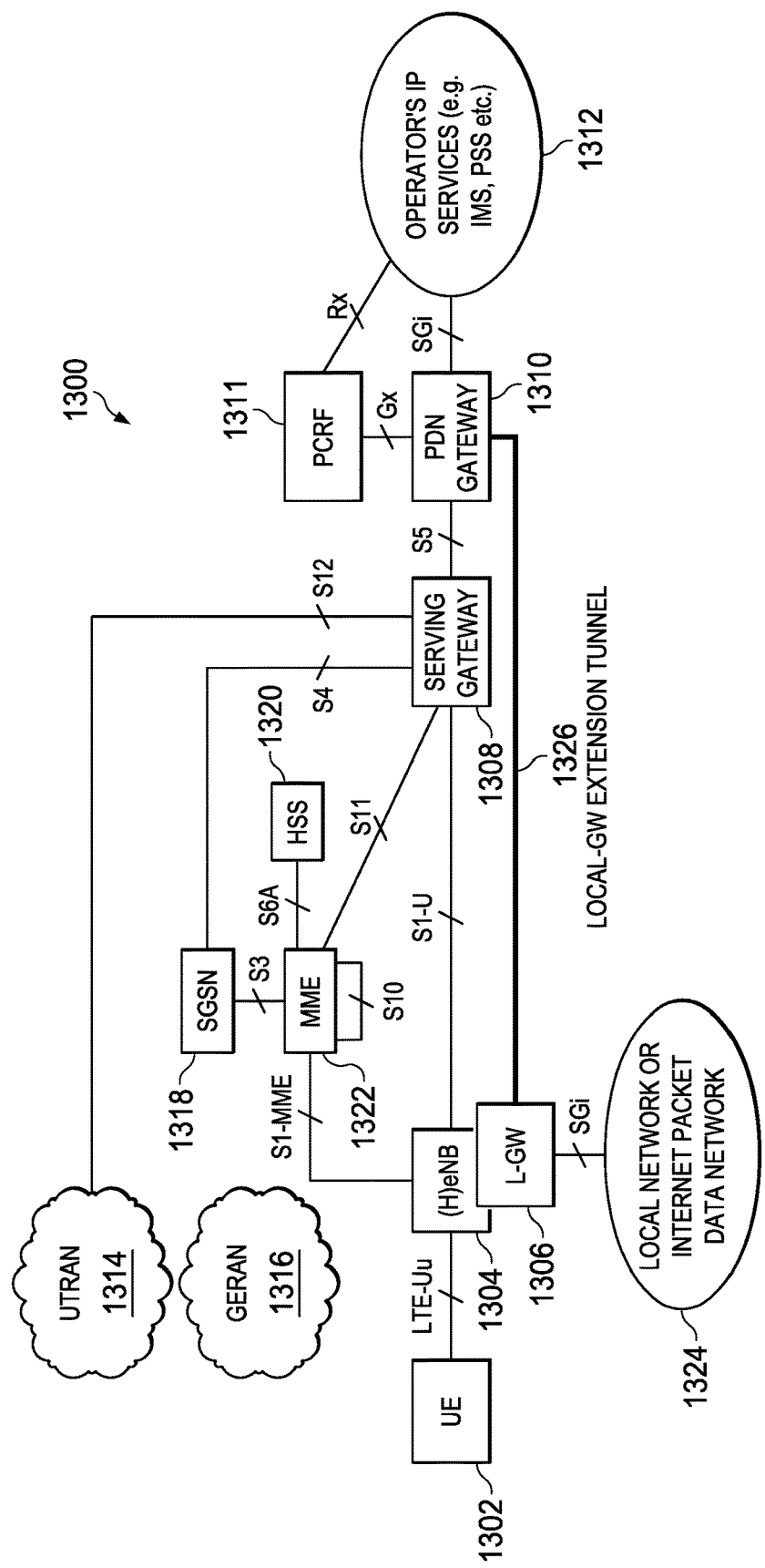
FIG. 8 is a schematic diagram of an example logical architecture for a proposed extension of non-roaming architecture for 3GPP accesses for SIPTO and LIPA.

In the depicted signal flow 1600 shown in FIG. 11, the first or source HeNB 1604 sends Handover Required (Direct Forwarding Path Availability, Source to Target transparent container, target eNB Identity, target TAI, S1AP Cause) to the MME 1608 at signal flow 16-1. At signal flow 16-2, MME 1608 determines that service continuity is not supported for the LIPA/SIPTO PDN connection, and the MME 1608 initiates PDN disconnection procedure for all the LIPA/SIPTO PDN connections.

At signal flow 16-3, the MME 1608 sends a Handover Request (EPS Bearers to Setup, AMBR, S1AP Cause, Source to Target transparent container, Handover Restriction List) message to the target eNB 1606. This message does not contain the EPS bearers belonging to the released LIPA/SIPTO PDN connections. This message creates the UE context in the target eNB 1606, including information about the bearers, and the security context. For each EPS Bearer, the Bearers to Setup includes Serving GW address and uplink TEID for user plane, and EPS Bearer QoS. In reply, the target eNB 1606 sends a Handover Request Acknowledge (EPS Bearer Setup list, EPS Bearers failed to setup list Target to Source transparent container) message to the MME 1608 at signal flow 16-4. The EPS Bearer Setup list includes a list of addresses and TEIDs allocated at the target eNB for downlink traffic on S1-U reference point (one TEID per bearer) and addresses and TEIDs for receiving forwarded data if necessary.

At signal flow 16-5, the MME 1608 sends a Handover Command (Target to Source transparent container, Bearers subject to forwarding, Bearers to Release) message to the HeNB 1604. The Bearers subject to forwarding includes list of addresses and TEIDs allocated for forwarding. The Bearers to Release includes the list of bearers to be released.

At signal flow 16-6, the HeNB 1604 constructs and sends the Handover Command to the UE 1602 using the Target to Source transparent container. Upon reception of this message, the UE 1602 will remove any EPS bearers for which it did not receive the corresponding EPS radio bearers in the target cell. After the UE 1602 has successfully synchronized to the target cell, it sends a Handover Confirm message to the target eNB 1606 at signal flow 16-7. Downlink packets forwarded from the HeNB 1604 can be sent to the UE 1602. Also, uplink packets can be sent from the UE 1602, which are forwarded to the target Serving GW 1612 and on to the PDN GW 1614. Finally, the Target eNB 1606 sends a Handover Notify (TAI+ECGI) message to the MME 1608 at signal flow 16-8.

Explicit Deactivation of the LIPA PDN Connection after the Handover

In a second embodiment described with reference to the signal flow diagram in FIG. 11 where the UE 1602 has a LIPA connection, the MME 1608 performs the regular handover, but deactivates the LIPA PDN connection by triggering an MME-initiated PDN disconnection with an indication identifying the LIPA PDN, where the indication may also provide a specific reason/cause. The MME 1608 may do so during the handover or after the handover is performed. If no specific cause is provided, the Rel. 10+UE detects that this is the LIPA connection and requests a new PDN for that APN, either automatically or based on policies. If a specific cause is given, the UE reacts based on policies.

In operation, when the HeNB 1604 triggers the handover to a target cell by sending the handover request to the MME 1608 which includes the information on the target cell, the MME 1608 determines that there is an active PDN connection that is a LIPA PDN connection based on the UE context information in the MME (including subscription information with LIPA indications, current CSG, current status of LIPA connections, etc.) and the information on the target cell (e.g. technology type, CSG ID). In addition, the MME 1608 determines that LIPA PDN continuity cannot be supported towards the target cell. To explicitly deactivate the connection, the MME 1608 triggers the handover and, upon handover completion, the MME 1608 deactivates the LIPA PDN connections by triggering an MME-initiated PDN disconnection. The MME 1608 may include a specific reason/cause for the de-activation.

Embodiments

Reject handoverIn accordance with selected embodiments, another solution is described with reference to FIG. 12, and addresses the case of connected mode mobility from HeNB to macro E-UTRAN or another HeNB for which LIPA continuity is not supported. In this solution, instead of proceeding with HO procedure, the MME 1708 rejects the HO request from the first or source HeNB 1704, releases the PDN connections, and sends a DETACH REQUEST message to UE 1702 based on the awareness that all the active PDN connections are connections for which service continuity is not provided and the information on the target cell (e.g. technology type, CSG ID). As a result, the UE 1702 may re-attach. With the solution, the MME 1708 is aware of the presence of the LIPA PDN connection when performing the handover.

The applied assumptions in this case are that (1) all the PDN connections that UE has active are LIPA or SIPTO PDN connections, (2) Service Continuity for the LIPA is not supported, (3) UE is in ECM-CONNECTED mode, (4) HO should be performed due to the UE's mobility, (5) Target cell belongs to a macro eNB or another HeNB that is not connected to the residential/enterprise network (other CSG), and (6) MME relocation is not involved.

In the disclosed embodiments, the release of LIPA/SIPTO PDN connections in case of handover is managed, but instead of proceeding with HO procedure, the MME rejects the HO request from the source HeNB, releases the PDN connections, and sends a DETACH REQUEST message to the UE, all based on the awareness that all the active PDN connections are connections for which service continuity is not provided and the information on the target cell (e.g. technology type, CSG ID). As a result, the UE may re-attach to the HeNB or the eNB. As will be appreciated, these solutions apply to the case where the MME receives the HO REQUIRED message from HeNB and discovers therefrom that LIPA/SIPTO service continuity is not provided at the target cell (that can be GERAN/UTRAN) and the UE has only LIPA PDN connection(s). As the cause for the IRAT HO was UE's mobility, the UE may re-attach to a 2G/3G network as E-UTRAN may not be available.

Selected embodiments are described with reference to the signal flow diagram in FIG. 12 where the UE 1702 has a LIPA/local SIPTO PDN connection. When the HeNB 1704 triggers the handover to a target cell by sending the handover request to the MME 1708 which includes the information on the target cell, the MME 1708 determines that the active PDN connection are LIPA PDN connections based on the UE context information in the MME. The MME 1708 determines that LIPA PDN continuity cannot be supported towards the target cell based on the UE context information in the MME (including subscription information with LIPA indications, current CSG, current status of LIPA connections, etc.) and the information on the target cell (e.g. technology type, CSG ID). In addition, the MME 1708 rejects the handover request and sends a DETACH REQUEST to the UE 1702 indicating "re-attach required." Upon receiving the DETACH REQUEST indicating "re-attach required," the UE 1702 that is connected to a HeNB 1702 and has at least one active PDN connection that is a LIPA PDN connection determines whether the cell selected to perform the attach is the H(e)B that the UE was connected to when receiving the DETACH REQUEST. If the cell is not a HeNB (i.e., a CSG cell) or the cell belongs to a different CSG, the UE determines, based on configuration information or operator policies or user policies, whether the PDN connections that were active as LIPA PDN connections in the HeNB need to be reactivated in the target cell upon or after the attach.

Figure 12:
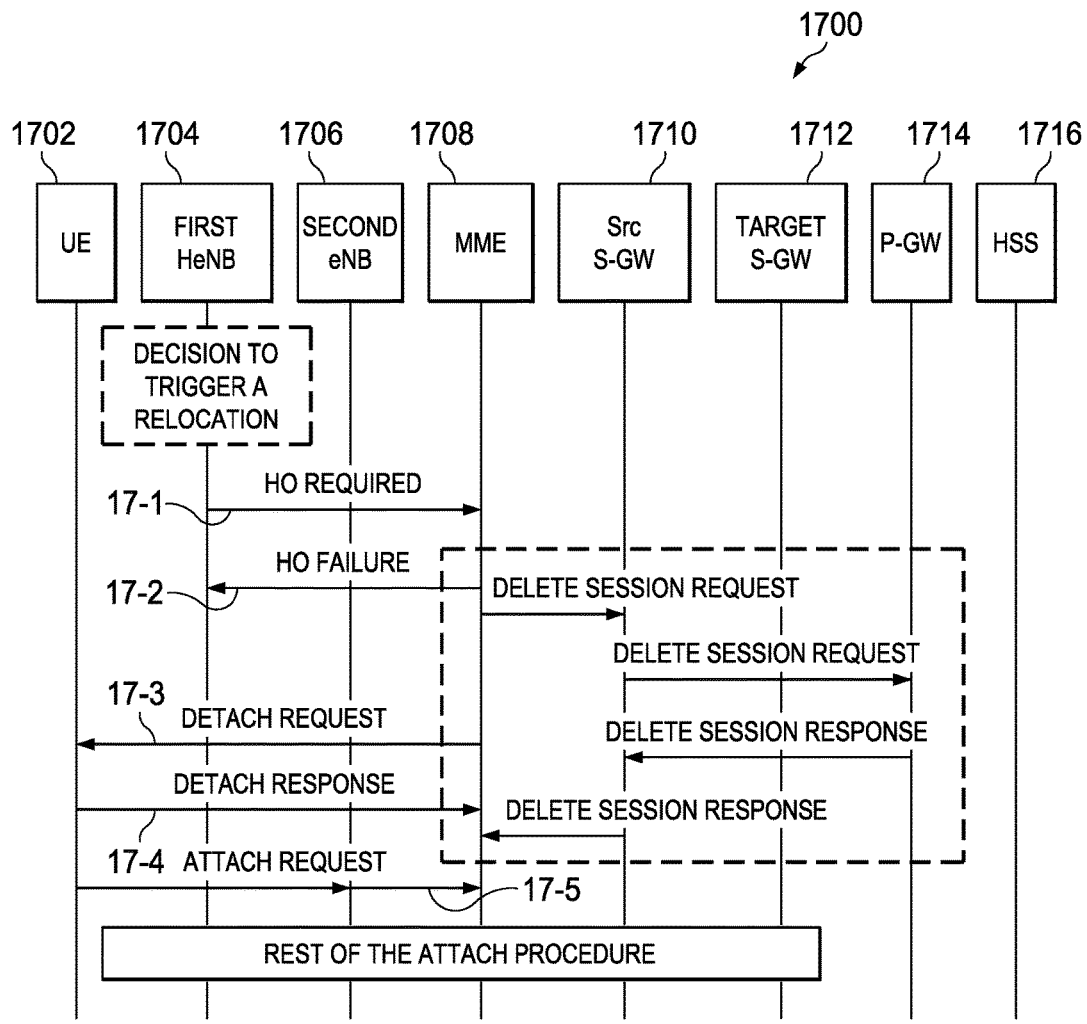
FIG. 12 is a signal flow diagram illustrating a LIPA/SIPTO PDN disconnect procedure for implicitly detaching the UE upon receiving a handover request at the MME which releases the PDN connections and sends a Detach Request message to UE.

In the depicted signal flow 1700 shown in FIG. 12, the first or source HeNB 1704 sends Handover Required (Direct Forwarding Path Availability, Source to Target transparent container, target eNB Identity, target TAI, S1AP Cause) to the MME 1708 at signal flow 17-1. At signal flow 17-2, MME 1708 becomes aware that the active connections are PDN connections for which continuity is not allowed towards the target cell and sends HO Failure message to eNB 1702. In addition, the MME 1708 initiates the LIPA PDN release procedure by sending DELETE SESSION REQUEST to the S-GW 1710. At signal flow 17-3, the MME 1708 sends a DETACH REQUEST message to the UE 1702 with detach type "re-attach required." At signal flow 17-3, the UE 1702 responds with a DETACH RESPONSE message to the MME 1708. At signal flow 17-4, the UE 1702 send an ATTACH REQUEST message to the MME 1708 after establishing RRC connection to the second or target eNB 1706 through Random access procedure. The rest of the attach procedure is performed thereafter.

Embodiments

Perform handover but omit LIPA PDN Connection informationIn accordance with selected embodiments, another solution addresses the case of connected mode mobility from HeNB to GERAN/UTRAN. In this solution, the MME responds to the received HO REQUIRED message from HeNB by performing the handover as per current solutions. However, when the MME sends a Forward Relocation Request to the target SGSN, the MME omits the information regarding LIPA/SIPTO PDN connection(s) so that the target SGSN does not create a PDP context for the corresponding LIPA PDN connection. In an example embodiment, if the source MME/SGSN has one or more EPS PDN connection IEs regarding LIPA, and the source MME/SGSN learns, based on operator configuration, that the target SGSN/MME is not aware of LIPA, the source MME/SGSN omits the EPS PDN connection IE regarding LIPA from the Forward Relocation Request message.

The applied assumptions in this case are that (1) UE has at least one PDN connection going through the core network and one or more LIPA PDN connections, (2) Inter RAT HO occurs due to mobility, and (3) Service Continuity for the LIPA/SIPTO is not supported.

In this solution, when the MME receives the HO REQUIRED message from HeNB, the MME is aware that LIPA/SIPTO service continuity is not supported in the target (GERAN/UTRAN) cell based on the cell information obtained from the HeNB and on the UE context information in the MME (including subscription information with LIPA indications, current CSG, current status of LIPA connections, etc.) and the information on the target cell (e.g. technology type, CSG ID). With this knowledge, the MME performs the handover as per current solutions, but when the MME sends a Forward Relocation Request to the target SGSN, the MME omits the information regarding LIPA/SIPTO PDN connection(s), so that the target SGSN does not create a PDP context for the corresponding LIPA PDN connection. At the end of HO procedure, UE performs RAU with target SGSN, which synchronizes the context information between the UE and SGSN. The source MME cleans up the LIPA/SIPTO PDN connection on L-GW (LS-GW and LP-GW).

In operation, the HeNB triggers the handover to a target cell and sends the handover request to the MME, including the information on the target cell. In response, the MME determines that there is an active PDN connection which is a LIPA PDN connection based on the UE context information in the MME (including subscription information with LIPA indications, current CSG, current status of LIPA connections, etc.) and the information on the target cell (e.g. technology type, CSG ID). In addition, the MME determines that LIPA PDN continuity cannot be supported towards the target cell based on the UE context information in the MME (including subscription information with LIPA indications, current CSG, current status of LIPA connections, etc.) and the information on the target cell (e.g. technology type, CSG ID). As a result, the MME omits the information regarding the LIPA PDN connections in the Forward Relocation Request sent to the target SGSN so that PDP Contexts for such connections are not created. When the UE performs handover and the RAU and detects that no PDP contexts have been created in the target cell for the LIPA PDN connections, the UE determines (e.g., based on configuration information or operator policies or user policies) whether the PDN connection needs to be reactivated in the target cell.

Embodiments

Mobility between a HNB and GERAN/UTRAN or different CSGIn accordance with selected embodiments, another solution addresses the case of connected mode mobility between a HNB and macro GERAN/UTRAN or a different CSG for which LIPA continuity is not provided. In this solution, the SGSN determines during the handover preparation that the UE is moving to a cell for which LIPA continuity cannot be provided, and upon completion of the handover, the SGSN initiates PDP context deactivation procedure for LIPA/SIPTO PDP context(s) possibly providing an explicit cause indicating that the deactivation is due to LIPA continuity not being supported.

The applied assumptions in this case are that (1) LIPA/SIPTO service continuity is not supported, (2) UE has at least one LIPA/SIPTO PDP context, and (3) UE is in CONNECTED mode. Also, in 2G/3G networks, it is understood that releasing a Radio Access Bearer (RAB) does not mean that the corresponding PDP context is released.

In this solution, if the handover does not include a change of SGSN, then the handover is performed regularly. In addition, the SGSN determines during the handover preparation that the UE is moving to a cell for which LIPA continuity cannot be provided, and upon completion of the handover, the SGSN initiates PDP context deactivation procedure for LIPA/SIPTO PDP context(s) possibly providing an explicit cause indicating that the deactivation is due to LIPA continuity not being supported.

On the other hand, if the handover involves a change of SGSN and the target SGSN is LIPA-aware, then the source SGSN provides the complete user context to the target SGSN. In addition, the source or target SGSN determines that the UE is moving to a cell for which LIPA continuity cannot be provided, and upon completion of the handover, the target SGSN initiates PDP context deactivation procedure for LIPA/SIPTO PDP context(s), possibly providing an explicit cause indicating that the deactivation is due to LIPA continuity not being supported in order for the UE to not try again.

In operation, the EPS bearer context deactivation is initiated by the MME/network. In particular, if a NAS signaling connection exists when the MME initiates the EPS bearer context deactivation procedure, the MME initiates the EPS bearer context deactivation procedure by sending a DEACTIVATE EPS BEARER CONTEXT REQUEST message to the UE and enters the state BEARER CONTEXT INACTIVE PENDING. The DEACTIVATE EPS BEARER CONTEXT REQUEST message contains an ESM cause typically indicating one of the following causes: (1) operator determined barring, (2) regular deactivation, (3) network failure, (4) reactivation requested, (5) APN restriction value incompatible with active EPS bearer context, or (6) LIPA connectivity is not supported in the current cell. This last EMM cause is sent to the UE if MME detects that the UE handed over towards a cell which does not support LIPA. If the deactivation is triggered by a UE initiated bearer resource modification procedure or UE requested PDN disconnect procedure, the DEACTIVATE EPS BEARER CONTEXT REQUEST message contains the procedure transaction identity (PTI) value received by the MME in the BEARER RESOURCE MODIFICATION REQUEST or PDN DISCONNECT REQUEST respectively. If the UE receives the DEACTIVATE EPS BEARER CONTEXT REQUEST which includes ESM cause "LIPA connectivity is not supported in the current cell," the UE does not try to reactivate the EPS bearer context for that LIPA APN until it moves to another cell, and does not try to activate any other EPS bearer context for a LIPA APN.

In this case, it will be appreciated that pre-Rel. 10 UEs are not configured to understand when a cause is provided to indicate that the deactivation is due to LIPA continuity not being supported. Also, pre-Rel. 9 UEs will establish the PDP context again.

Embodiments

Idle mode mobility In accordance with selected embodiments, another solution addresses the cases of idle mode mobility from a HeNB to a eNB or to a HeNB in a different CSG, and mobility from a HNB to macro coverage or to a HNB in a different CSG. This solution uses the UE's Access Stratum (AS)—also known at the NAS layer as lower layer—to detect if the UE has left a specific CSG coverage, including the UE leaving a cell with a CSG ID, and informs the NAS of such event. In response, the NAS can take a variety of actions described below with reference to managing the release of a LIPA PDN connection. If the UE has at least one PDN connection that is not a LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell or does not have a CSG ID, the UE sends a Tracking Area Update request or a PDN Disconnect Request for each LIPA PDN connection if the UE is camping or connected to E-UTRAN, or sends a Routing Area Update request or a PDP context disconnection request for each LIPA PDP context or LIPA PDN connection if the UE is camping or connected to GERAN or UTRAN. In this solution, the UE performs a Tracking Area Update procedure or a Combined Tracking Area Update procedure to synchronize the UE EPS bearer context with the MME EPS bearer context for UE mobility where the source cell is a CSG cell and the target cell is not a CSG cell, when the UE has at least one LIPA PDN connection. By performing a Tracking Area Update procedure or a Combined Tracking Area Update procedure, the UE synchronizes the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection. In this solution, the UE performs a Routing Area Update procedure to synchronize the UE context with the SGSN context in for UE mobility where the source cell is a CSG cell and the target cell is not a CSG cell, when the UE has at least one LIPA PDN connection. As will be appreciated, the solution does not work with pre-Rel. 10 UEs.

In selected embodiments, the UE determines that LIPA continuity is allowed or not allowed in a target cell based on the CSG ID of the source cell and the target cell being a non-CSG cell or not having a CSG ID.

Access Stratum Notification

For example, in an access stratum notification embodiment, an NAS idle UE moves outside the H(e)NB, at which point the AS in the UE makes the NAS in the UE aware of the fact the UE has moved outside the previous H(e)NB. Such AS notification can occur when the UE has moved to macro coverage—either E-UTRAN or GERAN/UTRAN—or to a different CSG or to a cell with a different CSG ID. In response to the AS notification, the UE NAS triggers appropriate NAS signaling, such as a TAU or LIPA/SIPTO PDN disconnection procedure for E-UTRAN, or RAU or PDP context disconnection in UTRAN.

In selected embodiments, the UE in state EMM-REGISTERED initiates the tracking area updating procedure by sending a TRACKING AREA UPDATE REQUEST message to the MME when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell. If the MME receives a TRACKING AREA UPDATE REQUEST from a UE in a cell that is not a CSG cell, and the MME determines that the UE has only LIPA PDN connections, then the MME rejects the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE deletes the list of equivalent PLMNs and deactivate all the EPS bearer contexts locally, if any, and enters the state EMM-DEREGISTERED.NORMAL-SERVICE. The UE then performs a new attach procedure. As will be appreciated, the conditions described above are equivalent to the conditions in which the UE receives an indication from the lower layers that the UE has performed a handover from a CSG cell to a target cell with a different CSG identity, or to a cell that is not a CSG cell.

In other embodiments, the UE operating in CS/PS mode 1 or CS/PS mode 2, in state EMM-REGISTERED, initiates the combined tracking area updating procedure when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

In another embodiment, in order to request PDN disconnection from a PDN, the UE sends a PDN DISCONNECT REQUEST message to the MME. If the UE has at least one PDN connection that is not a LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, the UE sends a PDN Disconnect Request for each LIPA PDN connection.

The UE NAS issues appropriate signaling if the UE is moving from a HeNB to E-UTRAN/UTRAN/GERAN macro coverage, or from a HNB to UTRAN/GERAN macro coverage, or from a H(e)NB in a CSG to an H(e)B in another CSG, based on the CSG ID of the new cell or based on the new cell being a non-CSG cell or not having a CSG ID. In this embodiment, the NAS signaling can be (1) a TAU procedure, (2) a PDN disconnection procedure if the UE has at least two PDN connections and at least one PDN connection is a LIPA PDN connection, or (3) a detach procedure if the UE has only LIPA PDN connections followed by an attach procedure. With this approach, the UE becomes aware as soon as leaving the H(e)NB that the LIPA connectivity is lost.

AS Notification with Idle Timer

In an AS notification with idle timer embodiment, when the UE enters EMM-IDLE mode, the UE NAS starts a timer LIPA_IDLE_MODE (a.k.a. the LIPA_CONNECTIVITY timer). The UE NAS and also stores the identity of the current CSG cell when entering NAS idle mode in the H(e)NB if the UE has at least one active LIPA connection. The AS in the UE notifies the NAS in the UE that the UE has moved outside the previous H(e)NB (e.g., when the UE moves to macro coverage—either E-UTRAN or GERAN/UTRAN—or to a different CSG).

If the NAS is notified by the AS before the LIPA_IDLE_MODE timer has expired, the UE stores the notification from the AS and does not perform any NAS signaling at that time. However, upon timer expiration, the NAS performs either a TAU or LIPA/SIPTO PDN disconnection procedure for E-UTRAN, or RAU/PDP context disconnection in UTRAN if the UE is moving from a HeNB to E-UTRAN/UTRAN/GERAN macro coverage, or from a HNB to UTRAN/GERAN macro coverage, or from a H(e)NB in a CSG to an H(e)B in another CSG, based on the CSG ID of the new cell.

In selected embodiments, the UE in state EMM-REGISTERED initiates the tracking area updating procedure by sending a TRACKING AREA UPDATE REQUEST message to the MME when the timer LIPA_CONNECTIVITY timer expires and the UE has received an indication from the lower layers that the UE has moved to a target CSG cell and the UE determines that the target CSG cell has a CSG identity that is different from the CSG identity stored when the UE entered the EMM-IDLE mode, or to a cell that is not a CSG cell. If the MME receives a TRACKING AREA UPDATE REQUEST from a UE in a cell that is not a CSG cell, and the MME determines that the UE has only LIPA PDN connections, then the MME rejects the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE deletes the list of equivalent PLMNs and deactivate all the EPS bearer contexts locally, if any, and enters the state EMM-DEREGISTERED.NORMAL-SERVICE.

In other embodiments, the UE operating in CS/PS mode 1 or CS/PS mode 2, in state EMM-REGISTERED, initiates the combined tracking area updating procedure when the LIPA_CONNECTIVITY timer expires and the UE has received an indication from the lower layers that the UE has moved to a target CSG cell and the UE determines that the target CSG cell with has a CSG identity that is different from the CSG identity stored when the UE entered the EMM-IDLE mode, or to a cell that is not a CSG cell.

In other embodiments, in order to request PDN disconnection from a PDN, the UE sends a PDN DISCONNECT REQUEST message to the MME which includes the EPS bearer identity of the default bearer associated with the PDN to disconnect from as the linked EPS bearer identity in the PDN DISCONNECT REQUEST message. If the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell and the timer LIPA_CONNECTIVITY has expired, the UE shall send a PDN Disconnect Request for each LIPA PDN connection.

On the other hand, if the NAS is notified by the AS after the LIPA_IDLE_MODE timer has expired, the NAS triggers appropriate NAS signaling (either a TAU or LIPA/SIPTO PDN disconnection procedure for E-UTRAN, or RAU/PDP context disconnection in UTRAN) if the UE is moving from a HeNB to E-UTRAN/UTRAN/GERAN macro coverage, or from a HNB to UTRAN/GERAN macro coverage, or from a H(e)NB in a CSG to an H(e)B in another CSG, based on the CSG ID of the new cell. In this embodiment, the NAS signaling can be (1) a TAU procedure, (2) a PDN disconnection procedure if the UE has at least two PDN connections and at least one PDN connection is a LIPA PDN connection, or (3) a detach procedure if the UE has only LIPA PDN connections followed by an attach procedure.

AS Notification with Out-of-Coverage Timer

In an AS notification with out-of-coverage timer embodiment, the UE AS notifies the UE NAS when the UE has moved outside the previous H(e)NB (e.g., when the UE moves to macro coverage—either E-UTRAN or GERAN/UTRAN—or to a different CSG) by providing an indication to the upper layers. The notified UE NAS stores the CSG ID of the previous H(e)NB and starts a new timer LIPA OUT OF COVERAGE. If the UE moves to an H(e)NB, the UE AS notifies the UE NAS that the UE has moved to the coverage of the new H(e)NB and provides the CSG ID of the target H(e)NB to the UE NAS. If the CSG ID is the same as the one stored by the UE NAS and the indication reaches the UE NAS before the LIPA OUT OF COVERAGE timer expires, the UE NAS resets the LIPA OUT OF COVERAGE timer. However, if the LIPA OUT OF COVERAGE timer expires, the NAS triggers appropriate NAS signaling (either a TAU or LIPA/SIPTO PDN disconnection procedure for E-UTRAN, or RAU/PDP context disconnection in UTRAN). In this embodiment, the NAS signaling can be (1) a TAU procedure, (2) A PDN disconnection procedure if the UE has at least two PDN connections and at least one PDN connection is a LIPA PDN connection, or (3) a detach procedure if the UE has only LIPA PDN connections followed by an attach procedure.

Embodiments

Delay in UE discovery of lost connectivityIn accordance with selected embodiments, another solution addresses the cases of idle mode mobility, and delay in UE discovery of lost connectivity due to idle mode mobility between H(e)NB and macro coverage or other H(e)NB for which continuity shall not be provided. In this solution, when the UE receives SGSN/MME paging and the UE replies to the paging from a cell for which LIPA continuity is not supported, the SGSN/MME releases the LIPA PDN connections. This may result in the UE being detached if the LIPA PDN connection (s) being disconnected by the MME are the only PDN connections active.

In operation, a UE is paged by the SGSN or MME. If the UE replies to the paging from a cell for which LIPA continuity is not supported, the SGSN/MME releases the LIPA PDN connections. The SGSN/MME determines that LIPA continuity is not supported based on the information of the cell the UE is answering the paging from (e.g. RAT type, CSG ID) and the UE context in the SGSN/MME. This may result in the UE being detached if the LIPA PDN connection (s) being disconnected by the MME are the only PDN connections active. In selected embodiments, the SGSN/MME disconnects the LIPA connections only if the downlink data that triggered the paging corresponds to (one of) the LIPA PDN connections. In other embodiments, the SGSN/MME disconnects the LIPA connections independently of what PDN connection the downlink belongs to based on the fact that the UE responds to the paging from a cell for which LIPA PDN connection continuity shall not be supported.

Embodiments

Connected mode mobilityIn accordance with selected embodiments, another solution addresses the cases of connected mode mobility from HeNB to GERAN/UTRAN with ISR active, and from HNB to GERAN/UTRAN. The solution uses the Access Stratum (AS) of the UE to detect if the UE has left a specific CSG coverage before the UE performs any NAS signaling, and informs the NAS of such event. In response, the NAS can take a variety of actions described below with reference to managing the release of a LIPA PDN connection. This could include deactivation of ISR in certain scenarios.

In selected embodiments, the UE determines that LIPA continuity is provided or not provided in a target cell based on the CSG ID of the source cell being different from the CSG ID of the target cell, or the target cell being a non-CSG cell or not having a CSG ID, or the UE moving to a different CSG cell with the same CSG ID of the source cell.

UE-Based for HNB to Macro GERAN/UTRAN, ISR-Enabled

In a UE-based embodiment for HNB to macro GERAN/UTRAN, ISR-enabled, the Idle mode Signaling Reduction (ISR) is enabled when LIPA PDN connections are present to address the cases of connected mode mobility from HeNB source cell to a GERAN/UTRAN target cell, and the case of CS Fallback with PS HO. To this end, the solution takes advantage of the fact that the AS and NAS in the UE know that there is an intersystem change (i.e., that the UE has performed a handover between a source cell of a first radio technology to a target cell of a different type of technology).

In operation, the AS in a UE makes the UE NAS aware of the inter-system change. If the UE determines that LIPA continuity is allowed, the UE does not do anything. However, if the UE determines that LIPA continuity is not allowed (or does not know whether LIPA continuity is allowed) and that at least one of the PDN connections active in the HeNB before the handover is a LIPA connection, then the UE triggers appropriate NAS signaling (either a TAU or LIPA/SIPTO PDN disconnection procedure for E-UTRAN, or RAU/PDP context disconnection in UTRAN).

In selected embodiments, the UE in state EMM-REGISTERED initiates the tracking area updating procedure by sending a TRACKING AREA UPDATE REQUEST message to the MME when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell. However, if the MME receives a TRACKING AREA UPDATE REQUEST from a UE in a cell that is not a CSG cell, and the MME determines that the UE has only LIPA PDN connections, then the MME shall reject the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE shall delete the list of equivalent PLMNs and deactivate all the EPS bearer contexts locally, if any, and shall enter the state EMM-DEREGISTERED.NORMAL-SERVICE.

In other embodiments, the UE operating in CS/PS mode 1 or CS/PS mode 2, in state EMM-REGISTERED, shall initiate the combined tracking area updating procedure when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

The UE may establish one or more PDP contexts corresponding to the one or more APNs corresponding to the one or more LIPA PDN connections based on configuration information or operator policies or user policies.

UE-Based for HNB to Macro GERAN/UTRAN with Delayed Disconnection, ISR-Enabled

In a UE-based embodiment for HNB to macro GERAN/UTRAN with delayed disconnection, ISR-enabled, a timer is added to address the problem of hysteresis and delay in disconnecting the LIPA connection. In operation, the AS in the UE notifies the UE NAS of an inter-system change. Once notified, the NAS stores the CSG ID of the HeNB. If at least one of the PDN connections active in the HeNB before the handover is a LIPA connection, then the UE NAS starts a new timer LIPA_ACTIVE_MODE if it receives indication from the lower layers that the UE has performed a handover from a CSG cell to a target cell with a different CSG identity, or to a cell that is not a CSG cell. If there is no traffic to be transmitted over the LIPA PDN connections, the UE does not deactivate the LIPA PDP contexts, even if LIPA PDN connectivity is not supported in the current cell. If the LIPA-ACTIVE_MODE timer is active or running and the UE has traffic to be transmitted over one of the LIPA PDN contexts, then the UE triggers appropriate NAS signaling (either a TAU or LIPA/SIPTO PDN disconnection procedure for E-UTRAN, or RAU/PDP context disconnection in UTRAN).

In other embodiments, the UE starts a timer LIPA_Connectivity if it receives indication from the lower layers that the UE has performed a handover from a CSG cell to a target cell with a different CSG identity, or to a cell that is not a CSG cell.

In selected embodiments, the UE in state EMM-REGISTERED initiates the tracking area updating procedure by sending a TRACKING AREA UPDATE REQUEST message to the MME when the timer LIPA_CONNECTIVITY timer is running or has not expired and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection. However, if the MME receives a TRACKING AREA UPDATE REQUEST from a UE in a cell that is not a CSG cell, and the MME determines that the UE has only LIPA PDN connections, then the MME shall reject the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE shall delete the list of equivalent PLMNs and deactivate all the EPS bearer contexts locally, if any, and shall enter the state EMM-DEREGISTERED.NORMAL-SERVICE.

In other embodiments, the UE operating in CS/PS mode 1 or CS/PS mode 2, in state EMM-REGISTERED, shall initiate the combined tracking area updating procedure when the timer LIPA_CONNECTIVITY timer is running or has not expired or the timer LIPA-ACTIVE_MODE is running or has not expired and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection.

In other embodiments, in order to request PDN disconnection from a PDN, the UE shall send a PDN DISCONNECT REQUEST message to the MME which includes the EPS bearer identity of the default bearer associated with the PDN to disconnect from as the linked EPS bearer identity in the PDN DISCONNECT REQUEST message. If the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell and the timer LIPA_CONNECTIVITY has expired or the timer LIPA-ACTIVE_MODE has expired, and the UE has uplink user data to send over a LIPA PDN connection, the UE shall send a PDN Disconnect Request for each LIPA PDN connection.

When the LIPA_ACTIVE_MODE timer expires or the LIPA_CONNECTIVITY timer expires, the UE does nothing if the UE is connected to a HeNB or HNB with a CSG ID that matches the stored CSG ID. However, if the UE is connected to a HeNB with a CSG ID different than the stored CSG ID when the LIPA_ACTIVE_MODE timer expires or the LIPA_CONNECTIVITY timer expires, then the UE does not do anything if the UE determines that LIPA continuity is allowed. Conversely, if the LIPA_ACTIVE_MODE timer expires or the LIPA_CONNECTIVITY timer expires and the UE determines that LIPA continuity is not allowed or the UE does not know whether LIPA continuity is allowed, then the UE triggers appropriate NAS signaling (either a TAU or LIPA/SIPTO PDN disconnection procedure for E-UTRAN, or RAU/PDP context disconnection in UTRAN). The UE may establish one or more PDP contexts corresponding to the one or more APNs corresponding to the one or more LIPA PDN connections based on configuration information or operator policies or user policies.

Upon receipt of the HANDOVER COMMAND message, the UE initiates the release of link layer connections, disconnects the physical channels (including the packet resources, if in class A mode of operation), commands the switching to the assigned channels, and initiates the establishment of lower layer connections (this includes the activation of the channels, their connection and the establishment of the data links). The UE also provides an indication to the upper layer if the handover is from a CSG cell to another CSG cell or from a CSG cell to a cell that is not a CSG cell. If the target cell is a CSG cell, the mobile station shall provide to the upper layer the CSG ID of the target cell. Alternatively, if the current cell is a CSG cell, the UE provides an indication to the upper layer, and if the target cell is a CSG cell, the mobile station shall provide to the upper layer the CSG ID of the target cell. Alternatively, if the source cell is a CSG cell, the UE provides an indication to the upper layer, and if the target cell is a CSG cell, the UE provides to the upper layer the CSG ID of the target cell.

UE-Based for HNB to Macro GERAN/UTRAN

In a UE-based embodiment for HNB to macro GERAN/UTRAN, Idle mode Signaling Reduction (ISR) is enabled when LIPA PDN connections are present to address the cases of active mode mobility from HeNB to a GERAN/UTRAN macro coverage. In operation, the AS in the UE makes the UE NAS aware of the change from a CSG cell to macro coverage. If the UE determines that at least one of the PDP contexts active when connected over the HNB is a LIPA connection and that LIPA continuity is allowed, the UE does not do anything. However, if the UE determines that at least one of the PDP contexts active when connected over the HNB is a LIPA connection and that LIPA continuity is not allowed (or the UE does not know whether LIPA continuity is allowed), then the UE triggers appropriate NAS signaling (either a TAU or LIPA/SIPTO PDN disconnection procedure for E-UTRAN, or RAU/PDP context disconnection in UTRAN) and disconnects the corresponding PDP contexts. The UE may reconnect the PDP context to the APN corresponding to the LIPA PDN connection based on configuration information or operator policies or user policies UE-Based for HNB to Macro GERAN/UTRAN with Delayed Disconnection In a UE-based embodiment for HNB to macro GERAN/UTRAN with delayed disconnection, a timer is added to address the problems of hysteresis and delay in disconnecting the LIPA connection. In operation, the AS in the UE makes the UE NAS aware of the change from a CSG cell to macro coverage. In response, the NAS stores the CSG ID of the HNB. If at least one of the PDP contexts active in the HNB before the handover is a LIPA connection, then the UE NAS starts a new timer LIPA_ACTIVE_MODE and does not deactivate any PDP contexts even if LIPA PDN connectivity is not supported in the current cell. When the LIPA_ACTIVE_MODE timer expires and the UE is connected to a HNB with a CSG ID that matches the stored CSG ID, then the UE does nothing. However, if the UE is connected to a HNB with a CSG ID different than the stored CSG ID when the LIPA_ACTIVE_MODE timer expires and the UE determines that LIPA continuity is allowed, then the UE does not do anything. Alternatively, if the UE is connected to a HNB with a CSG ID different than the stored CSG ID when the LIPA_ACTIVE_MODE timer expires and the UE determines that LIPA continuity is not allowed (does not know whether LIPA continuity is allowed), then the UE disconnects the corresponding PDP contexts. The UE may reconnect the PDP context to the APN corresponding to the LIPA PDN connection based on configuration information or operator policies or user policies.

Deactivation of ISR

In an ISR deactivation embodiment, the case of idle mode mobility between a HeNB and an eNB, mobility between a HNB and macro GERAN/UTRAN, and mobility between HeNBs (respectively HNBs) belonging to different CSGs and for which LIPA continuity shall not be provided is addressed by ensuring that ISR is not enabled in the presence of LIPA connectivity. In operation, a UE that attaches to E-UTRAN in a HeNB/CSG cell and that is connected with a LIPA PDN connection shall locally deactivate ISR. Similarly, if a UE is attached to E-UTRAN and activates a LIPA PDN connection while connected to a HeNB, the UE shall locally deactivate ISR. Finally, if the MME serves a UE attached to E-UTRAN in a HeNB/CSG cell, and the MME receives a request for a LIPA PDN connection or for a PDN connection to be subjected to SIPTO, then the MME shall not indicate to the UE that ISR is to be activated.

Embodiments

Figure 13:
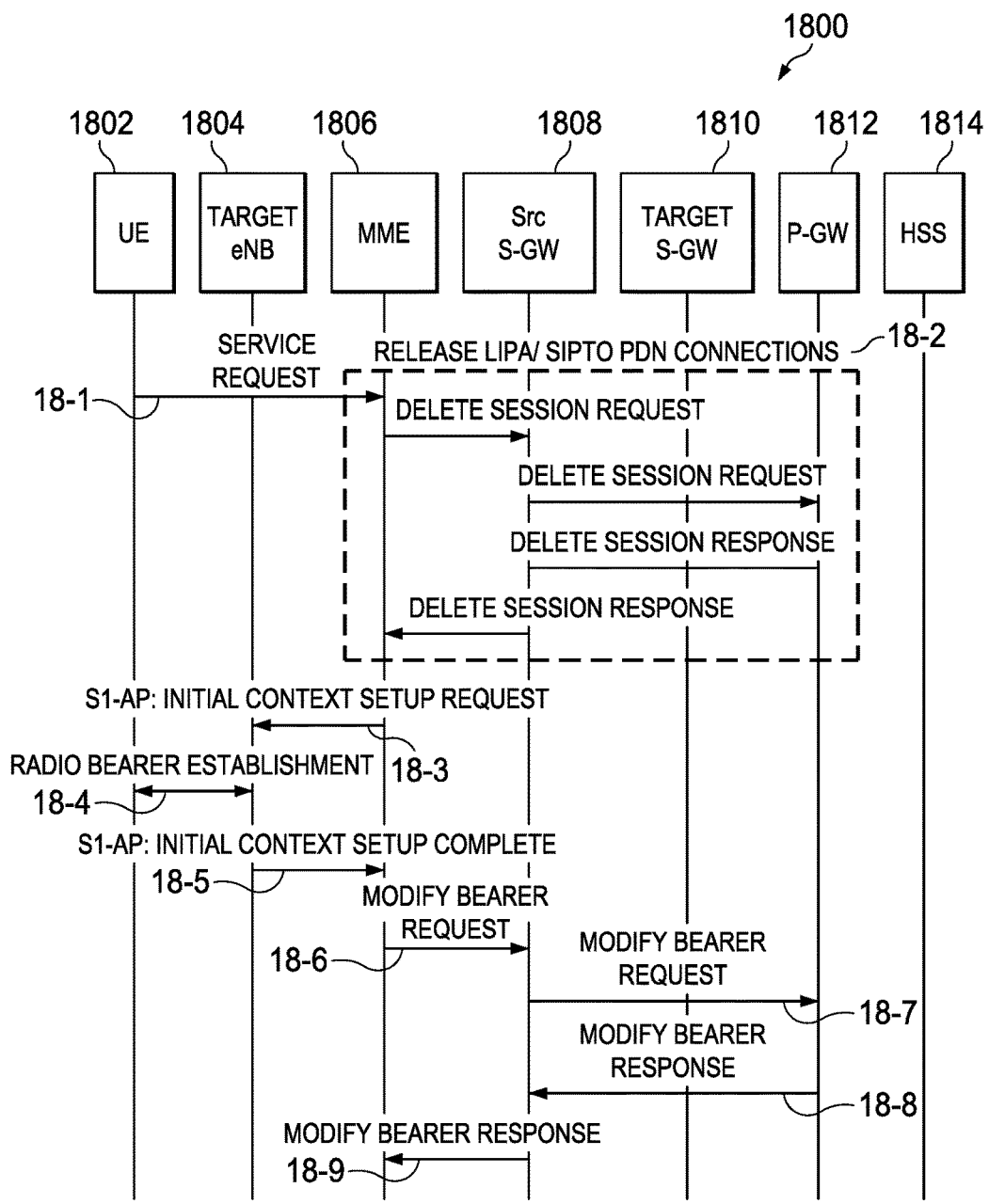
FIG. 13 is a signal flow diagram illustrating a LIPA/SIPTO PDN disconnect procedure implemented as part of a service request procedure where the MME provides bearers for all EPS bears excluding the LIPA/SIPTO bearers.

MME releases LIPA/SIPTO PDN connections before sending Initial Context Setup Request messageIn accordance with selected embodiments, another solution is described with reference to FIG. 13, and addresses the case of NAS idle mode mobility where the UE enters NAS connected mode after performing idle mobility outside the H(e)NB. In this solution, if a UE 1802 sends a Service Request (SR) to the MME 1806 from a cell for which LIPA/SIPTO service continuity is not provided for a LIPA PDN connection previously established in a HeNB, the MME 1806 releases LIPA/SIPTO PDN connections before sending an Initial Context Setup Request message to the target eNB 1804.

The applied assumptions in this case are that (1) the UE had a PDN connection that goes through the core network as well as LIPA PDN connection before it enters into IDLE mode, (2) Service Continuity for the LIPA and SIPTO local is not supported, (3) the UE is in ECM-IDLE mode before the UE sends SERVICE REQUEST, and (4) MME relocation is not involved.

In operation, a UE 1802 sends a Service Request (signal flow 18-1) to the MME 1806 from a cell which does not provide LIPA/SIPTO service continuity for a previously established LIPA PDN connection in a HeNB. Upon receiving SR from the UE 1802, MME 1806 discovers that the UE 1802 is connected to a cell to which LIPA/SIPTO service continuity is not provided. Before the MME 1806 sends an Initial Context Setup Request message to the target eNB 1804 (signal flow 18-3), the service request is treated at the MME 1806 (signal flow 18-2) by providing bearers for all the EPS bearers excluding the LIPA bearers if there are PDN connections that are not LIPA PDN connections. The rest of procedure (signal flows 18-4 through 18-9) follows UE-initiated Service Request procedures.

Embodiments

Figure 14:
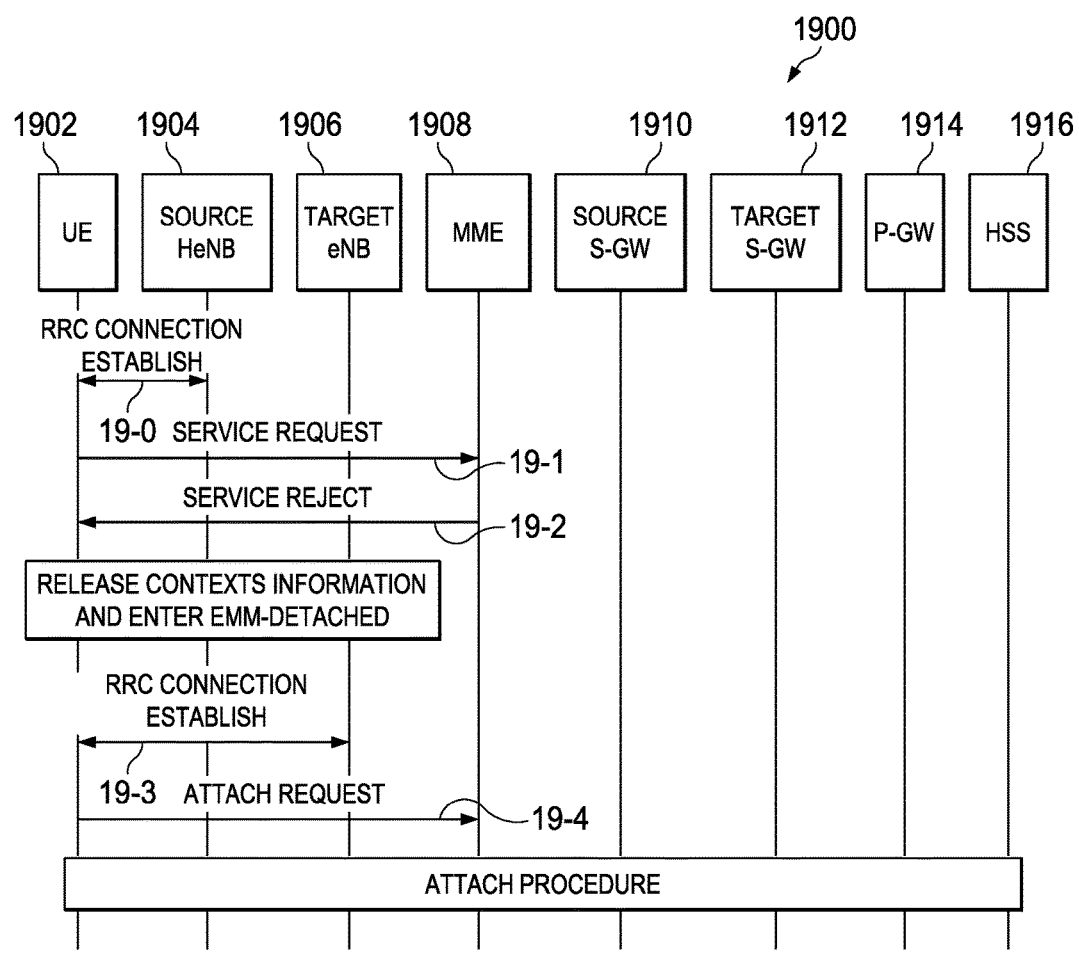
FIG. 14 is a signal flow diagram illustrating a LIPA/SIPTO PDN disconnect procedure where the UE re-attaches to the network after the MME rejects the UE's service request.

MME sends SERVICE REJECT message with cause indicatorIn accordance with selected embodiments, another solution is described with reference to FIG. 14, and addresses the case of NAS idle mode mobility where the UE enters NAS connected mode after performing idle mobility outside the HeNB. In this solution, if a UE 1902 sends a Service Request (SR) to the MME 1906 from a cell for which LIPA/SIPTO service continuity is not provided for a LIPA PDN connection previously established in a first or source HeNB 1904, and the UE 1902 has only LIPA PDN connections, then the MME 1908 sends SERVICE REJECT message which specifies an "Implicitly Detached" cause (since releasing LIPA PDN connection results in UE being detached from the network).

The applied assumptions in this case are that (1) the UE had only LIPA PDN connections before it enters into IDLE mode, (2) Service Continuity for the LIPA and SIPTO local is not supported, (3) the UE is in ECM-IDLE mode before the UE sends SERVICE REQUEST, and (4) MME relocation is not involved.

In operation, a UE 1902 sends a Service Request to the MME 1908 (signal flow 19-1) from a cell for which LIPA/SIPTO service continuity is not provided for a LIPA PDN connection previously established in a HeNB. Upon receiving the SR from the UE 1902, MME 1908 discovers that the UE is connected to a cell which is not directly connected to the residential/enterprise network. Based on this, the MME sends SERVICE REJECT message (signal flow 19-2) with a specified cause "Implicitly Detached" (since releasing LIPA PDN connection results in UE being detached from the network). In response, the UE 1902 releases all the bearer contexts and resets its EMM status to EMM-DETACHED and re-attach to the network by sending out ATTACH REQUEST to the MME 1908 (signal flow 19-4). The UE 1902 may or may not attempt to reconnect to the APNs corresponding to the previous LIPA PDN connections by requesting for LIPA connectivity for such APNs.

Alternatively, the MME 1908 can send a new reject cause "implicitly detached—LIPA not allowed." In response, the UE 1902 releases all the bearer contexts, resets its EMM status to EMM-DETACHED, and re-attaches to the network by sending out an ATTACH REQUEST message to the MME 1908 after establishing RRC connection 19-3 to the second or target eNB 1906. The UE 1902 will not try to reconnect to the APNs corresponding to the previous LIPA PDN connections by requesting for LIPA connectivity for such APNs.

Embodiments

Figure 15:
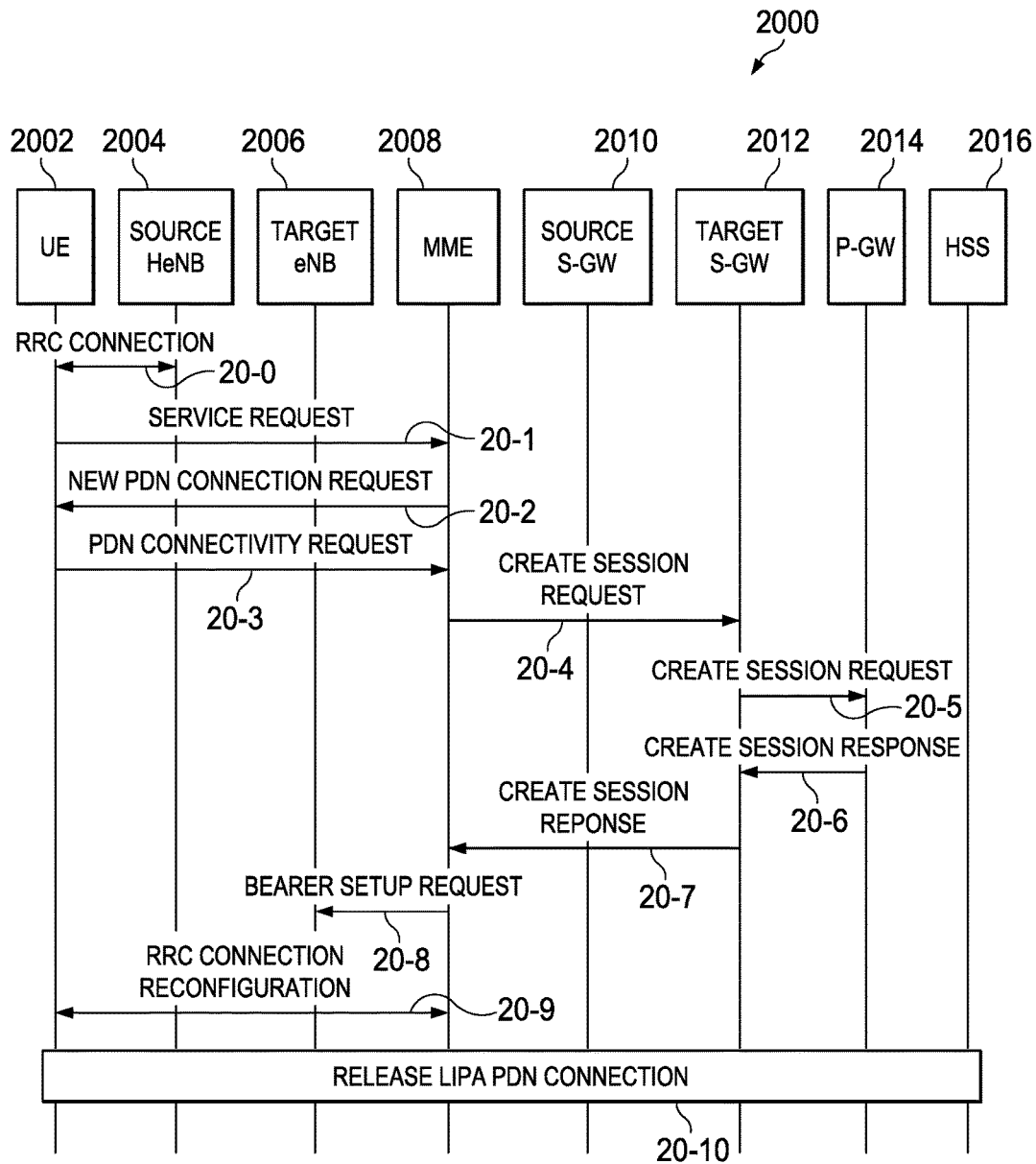
FIG. 15 is a signal flow diagram illustrating a LIPA/SIPTO PDN disconnect procedure where a new PDN connection is triggered in response to the UE's service request.

LIPA PDN Connection establishmentIn accordance with selected embodiments, another solution is described with reference to FIG. 15, and addresses the case of NAS idle mode mobility where the UE enters NAS connected mode after performing idle mobility outside the HeNB. In this solution, a LIPA PDN connection is a PDN Connection that the MME authorizes for connectivity to a PDN GW for a UE connected to a HeNB based on a request from the UE for LIPA connectivity and based on the CSG ID of the HeNB. Alternatively, a LIPA PDN Connection is a PDN Connection which was activated by the UE requesting LIPA connectivity type "LIPA" and the MME informing the UE of the connectivity type provided. Alternatively, a LIPA PDN Connection is a PDN Connection or PDP Context that gives access to the UE to services located in the local residential/corporate IP network.

In this solution, if a UE 2002 sends a Service Request to the MME 2008 from a cell for which LIPA/SIPTO service continuity is not provided for a LIPA PDN connection previously established in a HeNB, and the UE 2002 has only LIPA PDN connections, then the MME 2008 orders the UE 2002 to initiate another PDN connection by sending a NEW PDN CONNECTION REQUEST message. This is based on the idea of introducing a new NAS message. Thus, if the network/MME receives a SERVICE REQUEST from a UE in a cell that is not a CSG cell or a CSG cell with a CSG identity different from the CSG identity of the cell where the UE activated the LIPA PDN connection, then the network/MME returns a SERVICE REJECT message. Alternatively, if the network receives a SERVICE REQUEST from a UE in a cell that is not a CSG cell or a CSG cell with a CSG identity different from the CSG identity of the cell where the MME received the ACTIVATE PDP CONTEXT REQUEST from the UE for the LIPA PDP contexts, then the network returns a SERVICE REJECT message.

The applied assumptions in this case are that (1) the UE had only LIPA PDN connections before it enters into IDLE mode, (2) Service Continuity for the LIPA and SIPTO local is not supported, (3) UE is in ECM-IDLE mode before the UE sends SERVICE REQUEST, and (4) MME relocation is not involved.

In operation, a UE 2002 sends a Service Request to the MME 2008 (signal flow 20-1), either on arrival of UL packet or as a response to a paging message. At signal flow 20-2, the MME 2008 sends either a NEW PDN CONNECTION REQUEST message to the UE 2002 (this message implies that the existing PDN connection, which is LIPA PDN connection, is not available to use), or a SERVICE REJECT message with a new cause "New PDN connection is required." (It will be noted that the NEW PDN CONNECTION REQUEST message has not been defined, so this solution does not work with pre-Rel. 10 UEs.) At signal flow 20-3, the UE 2002 responds to the message by locally releasing the existing LIPA PDN connections and initiating a PDN connection establishment procedure by sending a PDN Connectivity Request to MME (signal flow 20-3). If all the active PDP contexts are LIPA PDP contexts, then the UE may use an APN in the attach procedure that is different from the APNs corresponding to the active LIPA PDP contexts. For the new PDN connection, APN will be selected based on the UE's local policy.

When sending the NEW PDN CONNECTION REQUEST message, the MME 2008 can use a notification procedure to inform the UE 2002 about events which are relevant for the upper layer which is using an EPS bearer context or has requested a procedure transaction. If the UE 2002 indicates that it supports the notification procedure, the network may initiate the procedure at any time while a PDN connection exists or a procedure transaction is ongoing. For example, MME 2008 can initiate the notification procedure by sending a NOTIFICATION message to the UE 2002. When the UE 2002 receives the NOTIFICATION message, the ESM protocol entity in the UE 2002 provides the notification indicator to the upper layer having one of two values. The first value can be used to signify that a handover is cancelled and that session re-establishment be performed. The second value can be used to signify that no active PDN connection is available and that a PDN connection needs to be re-established.

In selected embodiments, the MME sends a SERVICE REJECT message and indicates that a new PDN connection is needed if the MME received a SERVICE REQUEST from a UE in cell that is not a CSG cell and the UE has at east one LIPA PDN connection. In other embodiments, the MME sends a SERVICE REJECT message and indicates that a new PDN connection is needed if the MME received a SERVICE REQUEST from a UE in a CSG cell with a CSG identity different from the CSG identity of the cell where the UE activated the PDN connection or PDN connections. In response, the UE performs a UE-requested PDN connectivity procedure. In the case of a UE that has only LIPA PDN connections and receives a message from the MME that a new PDN connection is needed, the UE may use an APN in the UE requested PDN connectivity procedure that is different from the APNs corresponding to the LIPA PDN connections.

In other embodiments, the MME sends a SERVICE REJECT message and indicates that "No PDP Context Activated" if the MME/network receives a SERVICE REQUEST from a UE in a cell that is not a CSG cell and the MME determines that the UE has at least one LIPA PDP context, or if the MME/network receives a SERVICE REQUEST from a UE in a CSG cell with a CSG identity different from the CSG identity of the cell where the UE activated the LIPA PDP context or PDP contexts. In response, the UE deactivates locally all active PDP and MBMS contexts, and enters the state GMM-REGISTERED. NORMAL-SERVICE. The UE may also activate PDP context(s) to replace any previously active PDP contexts, and may also perform the procedures needed in order to activate any previously active multicast service(s). If the UE has only LIPA PDP contexts when the MME/network indicates that "No PDP Context Activated" and if the UE activates PDP context(s) to replace any previously active PDP contexts, the UE should not request a LIPA PDP context in the ACTIVATE PDP CONTEXT REQUEST. If a specific APN is used for LIPA, the UE should use an APN in the ACTIVATE PDP CONTEXT REQUEST message that is different from the APNs corresponding to the LIPA PDP contexts.

In other embodiments, the MME sends a SERVICE REJECT message and indicates Implicitly Detached if the network received a SERVICE REQUEST from a UE in a CSG cell with a CSG identity different from the CSG identity of the cell where the UE activated the LIPA PDP context or PDP contexts, or if the MME received the SERVICE REQUEST from a UE in a CSG cell with a CSG identity different from the CSG identity of the cell where the UE activated the LIPA PDN connection or LIPA PDN connections, or if the UE sends a SERVICE REQUEST from a cell that is not a CSG cell and the UE has at east one LIPA PDN connection. In response, the UE deletes the list of equivalent PLMNs and enters the state EMM-DEREGISTERED.NORMAL-SERVICE. The UE deletes any mapped EPS security context or partial native EPS security context, and then performs a new attach procedure. If the UE has only LIPA PDN connections when the UE receives an "Implicitly Detached" message, the UE may use an APN in the attach procedure that is different from the APNs corresponding to the LIPA PDN connections. If A/Gb mode or Iu mode is supported by the UE, the UE also handles the GMM state for the case when the combined routing area updating procedure is rejected with the GMM cause with the same value. As will be appreciated, a UE in CS/PS mode 1 or CS/PS mode 2 of operation is still IMSI attached for non-EPS services.

If connectivity with the requested PDN is accepted, the MME 2008 stores the CSG identity of the cell where the MME 2008 received the PDN CONNECTIVITY REQUEST message from the UE 2002. Similarly, if the MME 2008 accepts the requested PDP context in a CSG cell, the MME 2008 stores the CSG identity of the cell where the UE activated the PDP context. At signal flows 20-4 through 20-0, PDN connection establishment procedure is performed as indicated. On completion of PDN connection establishment procedure, MME 2008 initiates LIPA PDN connection release procedure (signal flow 20-10).

Embodiments

UE is RRC connected by only signaling bearers are createdIn accordance with selected embodiments, another solution is described which addresses the cases of NAS idle mode mobility where the UE moves from a HeNB to GERAN/UTRAN. In this solution, a UE sends a TAU request to the MME from a cell for which LIPA/SIPTO service continuity is not provided for a LIPA PDN connection previously established in a HeNB. Upon receiving the TAU request message from the UE, the MME either performs the TAU procedure without releasing the LIPA PDN connections in case the UE goes back to the HeNB, or it releases them (which may include rejecting the TAU and order the UE to disconnect and re-attach). In selected embodiments, if the MME determines that the UE has at least one PDN connection that is not a LIPA PDN connection and at least one LIPA PDN connection, and the MME has received a TRACKING AREA UPDATE REQUEST message from the UE in a cell that is not a CSG cell or a CSG cell with a different CSG identity than the previous CSG cell or in a cell that is not a CSG cell, and if the MME determines that the UE is RRC connected but only signaling bearers are created during the tracking are update procedure, the MME accepts the tracking area update request.

The applied assumptions in this case are that (1) Service Continuity for the LIPA is not supported, (2) UE had at least one LIPA connection before it enters into IDLE mode, (3) UE is in ECM-IDLE mode before the UE initiates TAU, (4) UE is connected to a cell where LIPA/SIPTO service continuity is not provided when the UE initiates TAU procedure, AND (5) TAU is initiated either because TAU timer expires or because the UE enters into a new TA while the UE is in IDLE mode.

TAU Update without PDN Release

In selected embodiments for providing a TAU update without PDN release, the UE is in RRC connected mode and ECM idle mode when sending the TAU. In this case, only radio signaling bearers are created, and the MME performs TAU update without releasing any PDN connection since the UE is in IDLE mode since the UE may go back to the HeNB's coverage before it changes into CONNECTED mode. In this embodiment, disconnection of the PDN is delayed. The MME decision may depends on several factors such as time duration that UE has been in IDLE mode, if the UE stays in the same TA that the HeNB belongs, etc.

MME Releases PDN Connections

In selected embodiments where the MME releases PDN connections, the MME releases LIPA/SIPTO PDN connection(s) as the UE is currently connected to a cell where LIPA/SIPTO service continuity is not provided. In this case, if the MME decision to release LIPA/SIPTO PDN connections results in no remaining PDN connection for the UE, the MME will reject the TAU Request with cause "No EPS bearer context activated." If so, the UE will release its context information and re-attach to the network, which involves new PDN connection establishment.

In accordance with selected embodiments, another solution is described which addresses the case of NAS idle mode mobility where the UE moves from a HNB to GERAN/UTRAN. In this solution, a UE sends a RAU request to a new SGSN. In reply, if the SGSN has no context information for the UE, the SGSN sends a Context Request message to the old MME or the old SGSN. The old MME or the old SGSN responds with a Context Response message and decides whether or not to convey the information regarding the LIPA PDN connection or LIPA PDP context based on an algorithm defined in the details below.

The applied assumptions in this case are that (1) Service Continuity for the LIPA PDN connection is not supported, and (2) UE had at least one PDN connection which is LIPA PDN connection before it enters into IDLE mode.

In operation, the new SGSN responds to an RAU request from a UE by sending a Context Request message to the old SGSN or old MME. The old SGSN/MME responds with a Context Response message. In the Context Response message, the MME/SGSN UE EPS PDN Connections IE contains detailed information regarding the active PDN connections and their corresponding EPS bearers for the UE. The MME/SGSN may or may not include the context information corresponding to the LIPA PDN connections/PDP contexts. The MME decision of whether to convey the context information of the LIPA PDN connection is as follows. If either LIPA service continuity is supported or the MME determines that the new SGSN is capable of handling LIPA services (i.e., the SGSN is Rel.10 or later Release), then the MME conveys LIPA PDN context information. Otherwise, the MME does not convey LIPA PDN context information. If the MME or the old SGSN does not convey LIPA PDN connection or LIPA PDP context information to the new SGSN, the new SGSN initiates the PDP context disconnection procedure for the LIPA PDP contexts in order to keep state information synchronized.

If the SGSN determines that the UE has at least one PDP context that is not a LIPA PDP context and that the UE has at least one LIPA PDP context, and the SGSN has received a ROUTING AREA UPDATE REQUEST message from the UE in a cell that is not a CSG cell or a CSG cell with a different CSG identity than the CSG cell where the LIPA PDP contexts were activated, and if the UE is RRC connected but only signaling bearers are created during the tracking are update procedure, then the SGSN accepts the routing area update request.

Embodiments

Selected CSFB with PS HO Another solution is described that addresses the case of handovers to GERAN/UTRAN that are triggered by CS Fallback with PS HO. In this network-based solution, the MME performs the handover preparation and execution during the CSFB procedure only for the non-LIPA PDN connections.

In operation, if the UE has one or more active PDN connections in addition to one or more LIPA PDN connections, then pursuant to triggering the PS HO to GERAN/UTRAN during the CSFB procedure, the MME performs handover preparation and execution only for the non-LIPA PDN connections and the MME requests RAB allocation in the target system only for the non-LIPA connections or for all the PDN connections excluding the LIPA PDN connection or by not requesting RAB allocation in the target system for LIPA PDN connections. After the UE is redirected to GERAN/UTRAN, the MME releases the LIPA PDN connections. In another embodiment, pursuant to triggering the handover the MME starts a timer T_O. The MME releases the LIPA PDN connections when the timer T_O expires and the UE has not performed the CSFB procedures for returning to E-UTRAN.

Embodiments

CSFB with no PS HO for GERAN with no DTM target cell and UE resumes PS traffic in E-UTRAN In accordance with selected embodiments, additional solutions are provided to address the case of CSFB with no PS HO where the UE resumes PS traffic in HeNB, and addresses the hysteresis with delay disconnection of LIPA connections. In this network-based solution, the MME disconnects the LIPA PDN connections after the CS service has terminated only if the UE returns to E-UTRAN, to a macro target cell, or a different HeNB for which LIPA PDN continuity shall not be supported. In these embodiments, there is no DTM target cell and the UE resume PS traffic in E-UTRAN.

In a first embodiment, the solution applies to a UE that performs CSFB procedures and moves to a target GERAN network or cell that does not support dual transfer mode (DTM), or to a UE that does not support DTM. In this case, the MME disconnects the LIPA PDN connections only if the UE performs the CSFB procedures for returning to E-UTRAN and returns to a E-UTRAN cell that is not a CSG cell or to a E-UTRAN CSG cell for which LIPA PDN continuity is not supported (such as a E-UTRAN CSG cell with a CSG ID different from the CSG cell where the LIPA PDN connections were created). In this solution, pursuant to the UE triggering CSFB procedures and the PS Handover not being supported or the target network or target cell being a GERAN network or cell that does not support DTM or the UE not supporting DTM, the MME stores the CSG ID of the E-UTRAN cell where the UE triggers the CSFB procedure. The MME maintains such information until the UE returns to E-UTRAN or the UE resumes the PS bearers in GERAN/UTRAN.

On the other hand, if the UE sends NAS signaling to the MME in order to resume the service in E-UTRAN according to current CSFB procedures, then the MME verifies if the UE is resuming the services from a cell with the same CSG ID that the MME stored upon the UE executing the fallback procedure. If services are being resumed from a cell with a different CSG ID or services are resumed from a non-CSG cell or a cell without a CSG ID, then the MME disconnects the LIPA PDN connections. Otherwise, the MME does nothing.

In another embodiment, the MME starts a timer T when the UE suspends the bearer during the fallback procedure. Pursuant to the timer T expiring, if the UE has not performed the CSFB procedures for returning to E-UTRAN or the PS bearers are still suspended, then the MME disconnects the LIPA PDN connections.

In this solution, pursuant to the UE triggering CSFB procedures and the PS Handover not being supported or the target network or target cell being a GERAN network or cell that does not support DTM or the UE not supporting DTM, the MME starts a timer T-P2 and the MME stores the CSG ID of the E-UTRAN cell where the UE triggers the CSFB procedure. The MME maintains the CSG ID information until the UE returns to E-UTRAN or the UE resumes the PS bearers in GERAN/UTRAN. Pursuant to the timer T_P2 expiring, if the UE has not performed the CSFB procedures for returning to E-UTRAN or the PS bearers are still suspended, then the MME disconnects the LIPA PDN connections. In addition, if the UE sends NAS signaling to the MME in order to resume the service in E-UTRAN according to current CSFB procedures before the timer T_P2 expires, then the MME resets the time and the MME verifies if the UE is resuming the services from a cell with the same CSG ID that the MME stored upon the UE executing the fallback procedure. If services are being resumed from a cell with a different CSG ID or services are resumed from a non-CSG cell or a cell without a CSG ID, then the MME disconnects the LIPA PDN connections. Otherwise, the MME does nothing.

Embodiments

CSFB with no PS HO and UE resumes PS traffic in GERAN/UTRANIn accordance with selected embodiments, additional solutions are provided to address the case of handovers to GERAN/UTRAN triggered by CS Fallback without PS HO where the UE resumes PS traffic in GERAN/UTRAN. In this solution, the UE performs NAS signaling over GERAN/UTRAN to resume the suspended PS bearers.

In operation, the MME responds to the received CONTEXT REQUEST message from the new SGSN by sending a CONTEXT RESPONSE message. When the MME sends CONTEXT RESPONSE to the target SGSN, the MME omits the information regarding LIPA/SIPTO PDN connection(s) so that the target SGSN does not create a PDP context for the corresponding LIPA PDN connection. However, the solution is triggered by the UE performing NAS signaling over GERAN/UTRAN to resume the suspended PS bearers.

Embodiments

Figure 16:
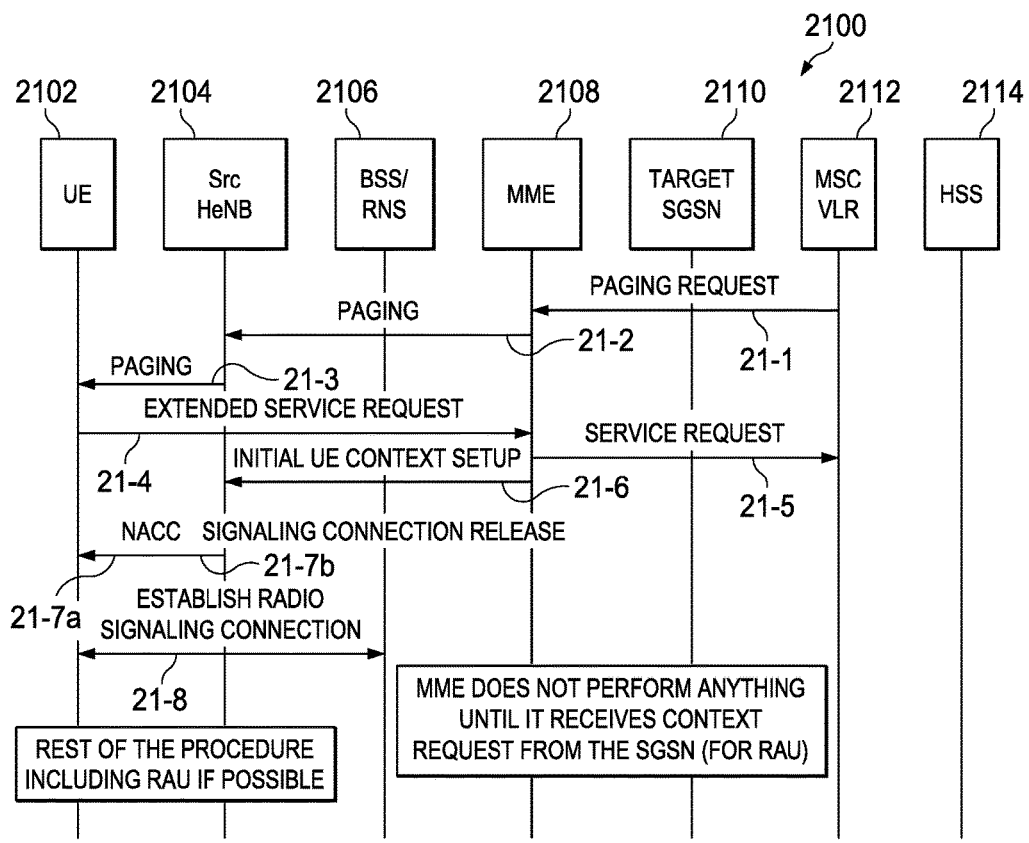
FIG. 16 is a signal flow diagram illustrating a LIPA/SIPTO PDN disconnect procedure where a circuit switched fall back (CSFB) call causes the MME to send an Initial UE Context Setup message with zero active PDN connections to implicitly detach the UE from the network.

Handover to GERAN/UTRAN triggered by CS FallbackIn accordance with selected embodiments, additional solutions are described with reference to FIG. 16, and address the case of handovers to GERAN/UTRAN triggered by CS Fallback when there is no PS HO and there is a mobile terminated call. In operation, a UE 2102 that has only LIPA PDN connections active triggers the PS HO to GERAN/UTRAN during the CSFB procedure. In response, the MME 2108 decides that no PS HO shall be performed for the PS bearers, based on the fact that the target cell is GERAN/UTRAN and that the UE has only LIPA PDN connections. After the UE 2102 is redirected to GERAN/UTRAN, the MME 2108 keeps the UE context information until UE performs RAU.

As described below, a second example embodiment differs from the first one in terms of when the MME initiated the cell reselection procedure. The second example embodiment covers in addition the general case of inter-RAT handover.

In a selected embodiment, the UE 2102 has only LIPA/SIPTO PDN connections. When the HO from the HeNB 2104 to GERAN/UTRAN is triggered due to CSFB, Initial UE Context Setup Request from MME 2108 to HeNB 2104 indicates that the PS HO is not available. HeNB 2104 informs the UE 2102 to move into the target GERAN/UTRAN cell, either by using Network Assisted Cell Change or by triggering RRC signaling connection release with redirection to GERAN/UTRAN.

At signal flow 21-1, the MME 2108 receives a Paging Request (IMSI, VLR TMSI, Location Information) message from the MSC 2112 over a SGs interface. The MME 2108 then pages the UE in all the TAs.

At signal flow 21-2, the MME 2108 sends a Paging message to each eNodeB. The Paging message includes a suitable UE Identity (i.e. S-TMSI or IMSI) and a CN Domain Indicator that indicates which domain (CS or PS) initiated the paging message. In this case it shall be set to "CS" by the MME.

At signal flow 21-3, the radio resource part of the paging procedure takes place whereby the eNodeB 2104 sends the paging message to the UE 2102. The message contains a suitable UE Identity (i.e. S-TMSI or IMSI) and a CN Domain indicator.

At signal flow 21-4, the UE 2102 establishes an RRC connection and sends an Extended Service Request (CS Fallback Indicator) to MME 2108. The UE 2102 indicates its S-TMSI in the RRC signaling. The Extended Service Request message is encapsulated in RRC and S1-AP messages. The CS Fallback Indicator indicates to the MME that CS Fallback for this UE should be performed. In case of Mobile Originated (MO) CSFB, signal flow 21-1 through 21-3 are not performed.

At signal flow 21-5, the MME 2108 sends the SGs Service Request message to the MSC 2112 containing an indication that the UE 2102 was in idle mode (and hence, for example, that the UE has not received any Calling Line Identification information). Receipt of the SGs Service Request message stops the MSC 2112 from retransmitting the SGs interface Paging message.

At signal flow 21-6, the MME 2108 sends S1-AP: Initial UE Context Setup (UE capabilities, CS Fallback Indicator and other parameters) to notify eNodeB to move the UE 2102 to UTRAN/GERAN. The MME 2108 determines that PS HO cannot be performed based on the fact that the UE has only LIPA PDN connections and the LIPA service continuity is not supported and indicates in this message that PS HO is not available for the UE 2102. The eNB shall reply with S1-AP: Initial UE Context Setup Response message (not shown). As HeNB 2104 determines that PS HO is not available, the HeNB 2104 performs either signal flow 21-7a or 21-7b instead of sending HO REQUIRED message to the MME 2108.

In signal flow 21-7a, if the target cell is GERAN, the HeNB 2104 can trigger an inter-RAT cell change order (optionally with Network Assisted Cell Change (NACC)) to a GERAN neighbor cell by sending an RRC message to the UE 2102. The inter-RAT cell change order may contain a CS Fallback Indicator which indicates to UE 2102 that the cell change order is triggered due to a CS fallback request.

In signal flow 21-7b, the HeNB 2104 can trigger RRC connection release with redirection to GERAN or UTRAN instead of PS HO or NACC. If the UE 2102 and network support "RRC connection release with redirection and Multi Cell System Information to GERAN/UTRAN", the HeNB 2104 can trigger RRC connection release with redirection to GERAN or UTRAN and include one or more physical cell identities and their associated System Information.

At signal flow 21-8, the UE establishes the RRC connection and then performs the rest of procedure for CSFB which may include RAU. As it is possible that the target SGSN 2110 sends CONTEXT REQUEST message to the source MME 2108 as a part of RAU procedure, the MME 2108 does not release the context information of the UE 2102 until it receives the CONTEXT REQUEST message. On receiving the CONTEXT REQUEST message, the MME 2108 returns CONTEXT RESPONSE with zero active PDN connections and implicitly detaches the UE 2102 from the network.

Figure 17:
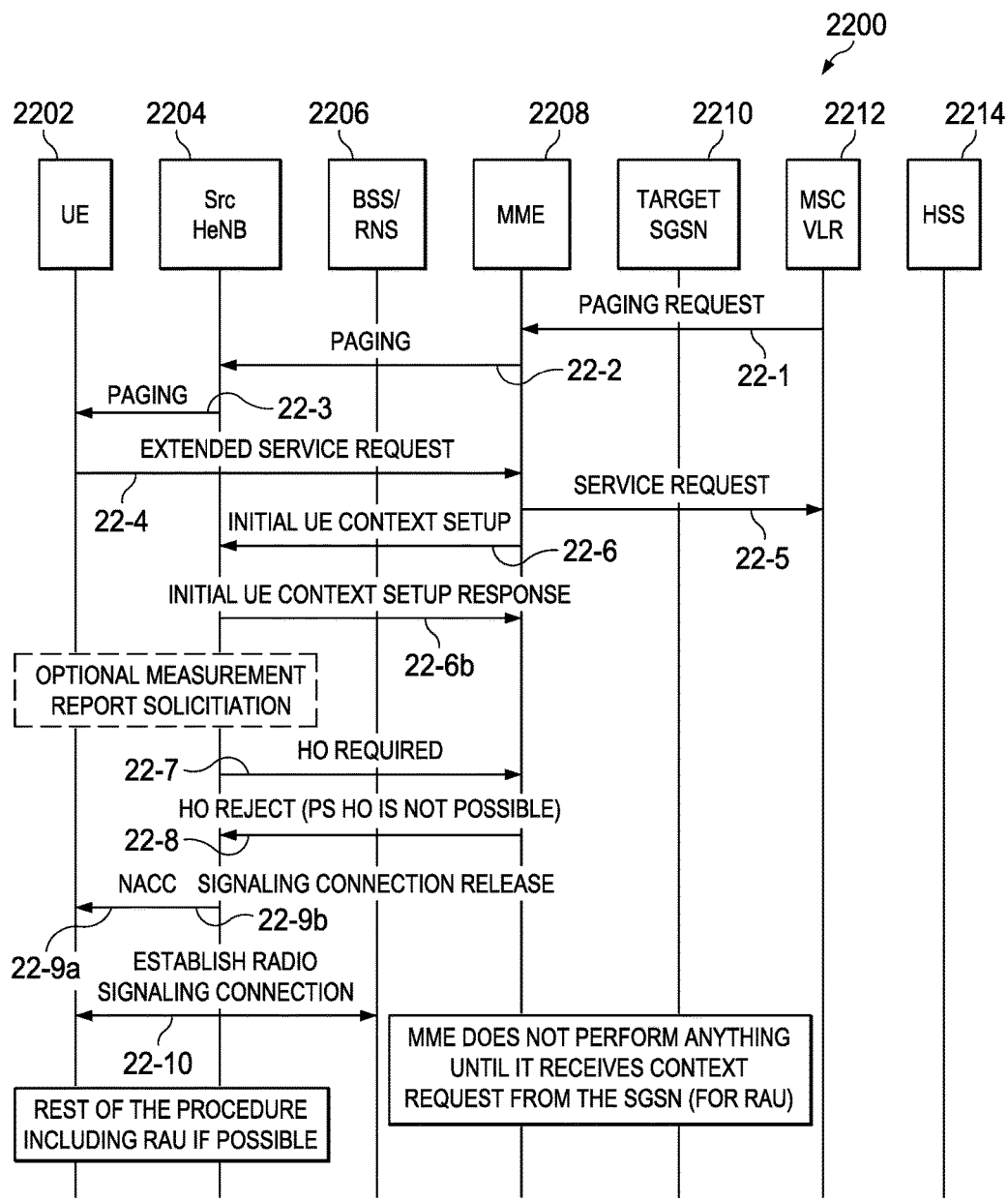
FIG. 17 is a signal flow diagram illustrating a LIPA/SIPTO PDN disconnect procedure where a circuit switched fall back (CSFB) call causes the MME to send an HO Reject message indicating that the PS HO is not possible to implicitly detach the UE from the network.

In accordance with selected embodiments, additional solutions are described with reference to FIG. 17 for the case where the UE 2202 has only LIPA/SIPTO PDN connections. In this procedure signal flows 22-1 through 22-6 in FIG. 17 are similar to signal flows 21-1 through 21-6 in FIG. 16. However, instead of receiving the information that PS HO is not available for the UE in the Initial UE Context Setup message, this information (that PS HO is not available for the UE) is delivered to the HeNB 2204 on the HO PREPARATION FAILURE message (at signal flow 22-8) after sending the HO REQUIRED to the MME 2208 (at signal flow 22-7). The cause value of the HO PREPARATION FAILURE message will be "PS HO Not Available." Though this solution may include one more message handshake rounds, this solution can be reused for the case of IRAT HO due to UE's mobility.

In accordance with selected embodiments, additional solutions are described for the case of a UE/mobile originating or UE/mobile terminating CSFB call procedure when PS HO is not supported and where the UE has only LIPA PDN connections. This procedure is illustrated with reference to the signal flow for a CS Call Request in E-UTRAN or Call in GERAN/UTRAN without PS HO depicted in Figure 6.3-1 of 3GPP TS 23.272. According to this solution, the UE receives as signal 3b an RRC connection release from the eNodeB with redirection to GERAN or UTRAN if the HeNB determines that the UE only has LIPA PDN connections based on the existence of a Correlation Identifier (ID). In this solution, if the PDN connection is established for LIPA, the S1 control message signal 1b from the MME to the HeNB includes a Correlation ID per EPS bearer for enabling the direct user plane path between the HeNB and the L-GW. In Release 10 of the 3GPP specification, the Correlation ID is set equal to the user plane PDN GW TEID (GTP-based S5) or GRE key (PMIP-based S5). Thus, the detecting by the HeNB of the Correlation ID in the S1 control message from the MME indicates that the corresponding EPS bearer is for LIPA.

Embodiments

Subscription ProfileIn accordance with selected embodiments, additional solutions are provided which address the cases where the UE has the ability to know whether there is session continuity for LIPA PDN connections. In these solutions, the UE is provided an indication of the support for LIPA continuity by the SGSN MME during attach/PDN connection activation, and the SGSN/MME decides whether to maintain the connection automatically or based on the subscription profile (such as on a per-APNs basis).

In this solution if the service continuity support information is present for an APN and indicates that service continuity shall be supported, then the MME or SGSN shall allow the service continuity when the UE moves between a H(e)NB cell or a CSG cell and a macro cell or a cell that is not a CSG cell. If the service continuity support information indicates that service continuity shall not be supported, then the MME or SGSN shall not allow the service continuity. If the service continuity support information for is not present, the MME or SGSN shall allow the service continuity when the UE moves towards any cell.

As described below, there are three components to the disclosed solution.

First, the subscription profiles include an indication of support for LIPA continuity, wherein the HPLMN indicates to the VPLMN which APNs support session continuity.

Second, the MME verifies upon attach and PDN connection establishment whether the PDN connection to a certain APN can support LIPA continuity. In addition, the SGSN verifies upon PDP context creation whether the PDN connection to a certain APN can support LIPA continuity. The verification by the MME/SGSN is performed as follows. If the UE subscription profile contains a CSG Service Continuity, and if the CSG ID of the current H(e)NB is in the list of CSG IDs in the CSG Service Continuity, LIPA service continuity is allowed for all APNs in the current H(e)NB. However, if the CSG ID of the current H(e)NB is not in the list of CSG IDs in the CSG Service Continuity, or if the UE subscription profile does not contain a CSG Service Continuity, then the MME checks the Service Continuity Support field in the subscription information for the current APN (for which the connectivity is being requested). If the field indicates it is supported, or if the filed contains a list of the CSG IDs and the CSG ID of the current cell is among those, then LIPA service continuity is supported Third, the SGSN/MME indicates to the UE whether LIPA is continuity is provided. For example, the SGSN indicates to the UE whether LIPA continuity for a PDP context upon PDP context activation based on the conditions above. In addition or in the alternative, the MME indicates to the UE whether LIPA continuity for a PDN connection upon PDN connection activation based on the conditions above. In addition or in the alternative, the MME indicates to the UE whether LIPA continuity for any PDN connection upon attach based on the conditions above. In addition or in the alternative, the MME indicates to the UE whether LIPA continuity for the one or more PDN connections upon the UE performing a tracking area update or combined tracking area update based on the conditions above.

In support of the disclosed solution, a service continuity support parameter indicates if service continuity for LIPA PDN connections is supported upon idle mode or connected mode mobility between cells for the corresponding to a PDN connection requested by the UE with a LIPA APN or with a request for connectivity type "LIPA." If LIPA connectivity is prohibited on that PDN, the value will be always true. Service continuity support can be scalar binary or two dimensional binary flags to indicate in-bound service continuity and out-bound service continuity. If in-bound service continuity flag is "true," service continuity will be provided when the UE moves into H(e)NB sub-system. If out-bound service continuity flag is "true," service continuity will be provided when the UE moves out of H(e)NB sub-system. The indicator can also contain a list of CSG IDs in which service continuity is supported for the APN. Service continuity support is permanent data and is conditionally stored in the HSS, MME and SGSN. In addition, the service continuity support parameter may be included as data used for PS Network Access Mode (GPRS), as well as other appropriate tables, such as Table 5.2 (Overview of data used for PS Network Access Mode (GPRS)) and Table 5.2A-1: (Overview of data used for PS Network Access Mode (EPS 3GPP access)) in 3GPP TS 23.008 ("Organization of Subscriber Data"), and Table 7.3.1/1 (S6a/S6d and S13/S13' specific Diameter AVPs) in 3GPP TS 29.272 ("Evolved Packet System (EPS); Mobility Management Entity (MME) and Serving GPRS Support Node (SGSN) related interfaces based on Diameter protocol").

In selected embodiments, the service continuity support AVP is of type Grouped, and contains two service continuity flag AVPs, where the first flag is the inbound service continuity support flag and the second flag is the out-bound service continuity support flag. The AVP format in this case is as follows:
  Service continuity support::=<AVP header: 1613 10415>
  [Service continuity flag]
  [Service continuity flag]

In other embodiments, the service continuity flag AVP is of type unsigned32, and indicates if service continuity in one direction for the connection is supported when the UE moves between a H(e)NB cell and a macro cell or a H(e)NB cell that belongs to different Residential/Enterprise network. In this case, the following service continuity flag values are defined: (1) Service continuity is not supported (0), and (2) Service continuity is supported (1).

PDN Address

The purpose of the PDN address information element is to assign an IPv4 address to the UE associated with a packet data network and to provide the UE with an interface identifier to be used to build the IPv6 link local address. The PDN address information element is coded as shown in Tables 3 and 4 below.

TABLE 3

PDN address information element

| 8 | 7 | 6 | 5 | 4 | 3 | 2 | 1 | |
|---|---|---|---|---|---|---|---|---|
| PDN address IEI | | | | | | | | octet 1 |
| Length of PDN address contents | | | | | | | | octet 2 |
| 0 | 0 | 0 spare | Service Continuity Flag | | PDN type value | | | octet 3 |
| PDN address information | | | | | | | | octet 4 |
| | | | | | | | | octet 15 |

As shown above in Table 3, the PDN address is a type 4 information element with minimum length of 7 octets and a maximum length of 15 octets.

TABLE 4

PDN address information element

PDN type value (octet 3)

| Bits | | | |
|---|---|---|---|
| 3 | 2 | 1 | |
| 0 | 0 | 1 | IPv4 |
| 0 | 1 | 0 | IPv6 |
| 0 | 1 | 1 | IPv4v6 |

All other values are reserved.
Bit 4 to 8 of octet 3 are spare and shall be coded as zero.
PDN address information (octet 4 to 15)
If PDN type value indicates IPv4, the PDN address information in octet 4 to octet 7 contains an IPv4 address. Bit 8 of octet 4 represents the most significant bit of the IPv4 address and bit 1 of octet 7 the least significant bit.
If PDN type value indicates IPv6, the PDN address information in octet 4 to octet 11 contains an IPv6 interface identifier. Bit 8 of octet 4 represents the most significant bit of the IPv6 interface identifier and bit 1 of octet 11 the least significant bit.
If PDN type value indicates IPv4v6, the PDN address information in octet 4 to octet 15 contains an IPv6 interface identifier and an IPv4 address. Bit 8 of octet 4 represents the most significant bit of the IPv6 interface identifier and bit 1 of octet 11 the least significant bit. Bit 8 of octet 12 represents the most significant bit of the IPv4 address and bit 1 of octet 15 the least significant bit.
If PDN type value indicates IPv4 or IPv4v6 and DHCPv4 is to be used to allocate the IPv4 address, the IPv4 address shall be coded as 0.0.0.0.

Figure 18:
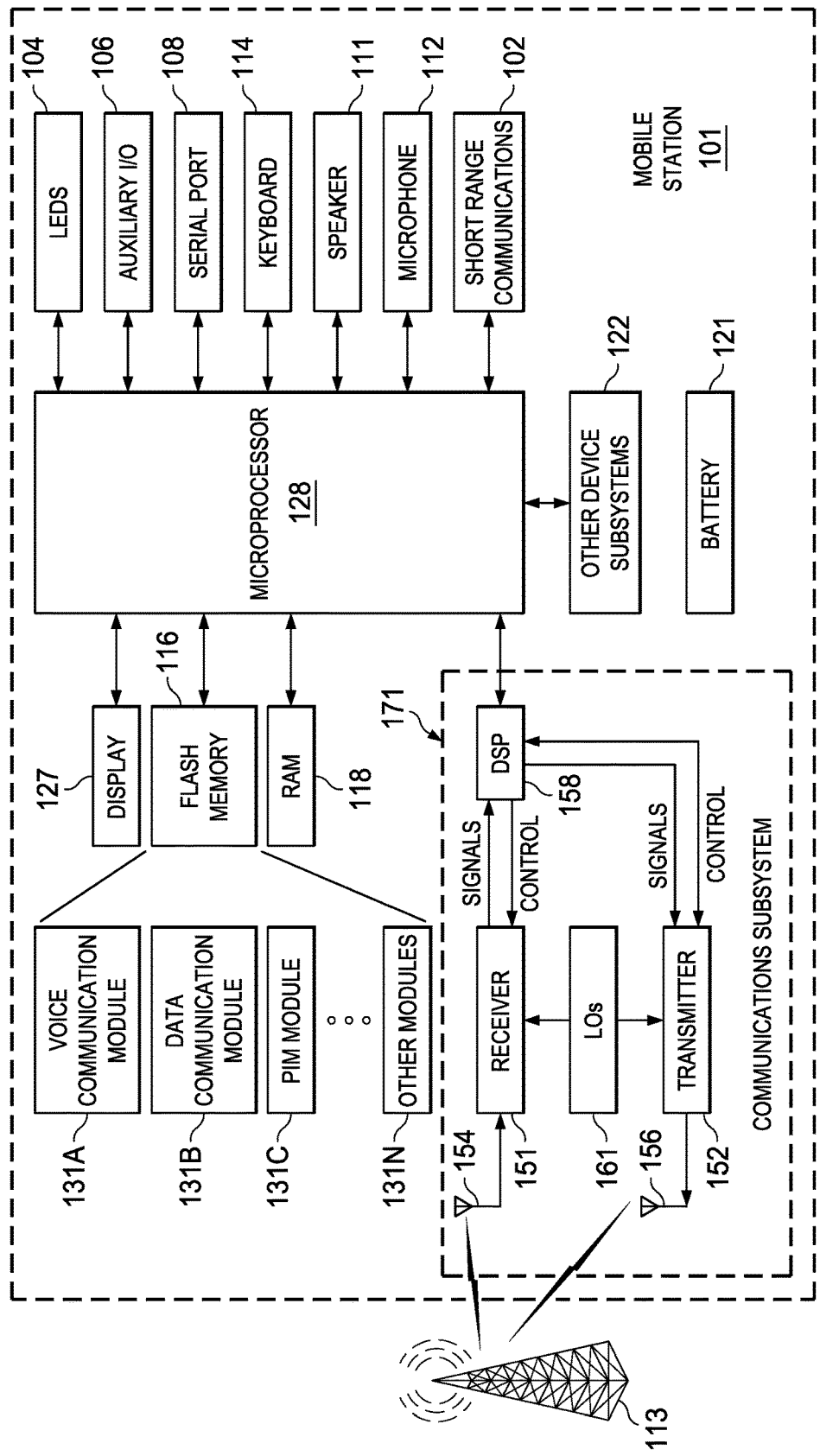
FIG. 18 is a schematic block diagram illustrating exemplary components of a mobile wireless communications device which may be used with selected embodiments of the present disclosure.

Referring now to FIG. 18, there is shown a schematic block diagram illustrating exemplary components of a mobile wireless communications device 101 which may be used with selected embodiments of the present disclosure. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 127. The microprocessor 128 controls operation of the display 127, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 171; a short-range communications subsystem 102; the keyboard 114 and the display 127, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 122. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 131A and a data communications module 131B, may be installed on the wireless device 101 during manufacture. In addition, a personal information manager (PIM) application module 131C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 113. In some embodiments, the data items managed by the PIM application are seamlessly integrated, synchronized and updated via the wireless network 113 with the device user's corresponding data items stored or associated with a host computer system. As well, additional software modules, illustrated as another software module 131N, may be installed during manufacture.

Communication functions, including data and voice communications, are performed through the communication subsystem 171, and possibly through the short-range communications subsystem 102. The communication subsystem 171 includes a receiver 151, a transmitter 152 and one or more antennas, illustrated as a receive antenna 154 and a transmit antenna 156. In addition, the communication subsystem 171 includes a processing module, such as a digital signal processor (DSP) 158, and local oscillators (LOs) 161. In some embodiments, the communication subsystem 171 includes a separate antenna arrangement (similar to the antennas 154 and 156) and RF processing chip/block (similar to the Receiver 151, LOs 161 and Transmitter 152) for each RAT, although a common baseband signal processor (similar to DSP 158) may be used for baseband processing for multiple RATs. The specific design and implementation of the communication subsystem 171 is dependent upon the communication network in which the wireless device 101 is intended to operate. For example, the communication subsystem 171 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1x and 1xEV-DO. The communication subsystem 171 may also be designed to operate with an 802.11 Wi-Fi network or an 802.16 WiMAX network or both. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 151, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 151 and the transmitter 152. For example, gains applied to communication signals in the receiver 151 and the transmitter 152 may be adaptively controlled through automatic gain control algorithms implemented in the DSP 158.

In a data communication mode, a received signal, such as a text message or web page download, is processed by the communication subsystem 171 and is input to the microprocessor 128. The received signal is then further processed by the microprocessor 128 for an output to the display 127, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 171.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 127 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Although the described exemplary embodiments disclosed herein are described with reference to selected communication systems, the present disclosure is not necessarily limited to the example embodiments which illustrate inventive aspects of the present disclosure that are applicable to a wide variety of network connectivity arrangements. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

- Change for one embodiment for 3GPP TS 29.274

================Begin of Change=====================================

3 DEFINITIONS, SYMBOLS AND ABBREVIATIONS

3.1 Definitions

For the purposes of the present document, the terms and definitions given in TR 21.905 [1] and the following apply. A term defined in the present document takes precedence over the definition of the same term, if any, in TR 21.905 [1].

GTP-PDU: GTP Protocol Data Unit is either a GTP-C Message or a GTP-U Message. GTP-U Message may be either a signalling message across the user plane tunnel, or a G-PDU (see clause 6).

- Signalling Message: any GTP-PDU (GTP-C or GTP-U) except the G-PDU.
- G-PDU: GTP user plane message, which carries the original packet (payload). G-PDU consists of GTP-U header and a T-PDU.
- T-PDU: original packet, for example an IP datagram, from an UE or a network node in an external packet data network. A T-PDU is the payload that is tunnelled in the GTP-U tunnel.
- GTP-C Message: GTP control plane message type of a GTP-PDU. GTP-C message consists of GTP-C header, which is followed by zero or more information elements.
- GTP-U Message: GTP user plane message. The user plane messages are used to carry user data packets, and also signalling messages e.g. for path management and error indication. Therefore, GTP-U message consists of GTP-U header, which is followed by either a T-PDU, or zero or more information elements.

GTP Tunnel: A GTP tunnel is a communication tunnel between two GTP nodes (see subclause 4.1 "GTP Tunnel").

Tunnel Endpoint: A tunnel endpoint is identified with a TEID, an IP address and a UDP port number (see subclause 4.1 "GTP Tunnel").

Tunnel Endpoint Identifier (TEID): unambiguously identifies a tunnel endpoint in scope of a path (see subclause 4.1 "GTP Tunnel").

3.2 Symbols

For the purposes of the present document, the following symbols apply:

S1-U         Interface between SGW and eNodeB
X2           Interface between eNodeBs

3.3 Abbreviations

For the purposes of the present document, the abbreviations given in TR 21.905 [1] and the following apply. An abbreviation defined in the present document takes precedence over the definition of the same abbreviation, if any, in TR 21.905 [1].

| | |
|---|---|
| AMBR | Aggregate Maximum Bit Rate |
| APN | Access Point Name |
| APN-NI | Access Point Name Network Identifier |
| APN-OI | Access Point Name Operator Identifier |
| EBI | EPS Bearer ID |
| eNodeB | Evolved Node B |
| EPC | Evolved Packet Core |
| EPS | Evolved Packet System |
| F-TEID | Fully Qualified Tunnel Endpoint Identifier |
| G-PDU | GTP-U non-signalling PDU |
| GPRS | General Packet Radio Service |
| GTP | GPRS Tunnelling Protocol |
| GTP-PDU | GTP-C PDU or GTP-U PDU |
| GTPv2-C | GTP version 2, control plane |
| GTPv2-U | GTP version 2, user plane |
| IMSI | International Mobile Subscriber Identity |
| IP | Internet Protocol |
| LBI | Linked Bearer identity |
| L1 | Layer 1 |
| L2 | Layer 2 |
| MBMS | Multimedia Broadcast/Multicast Service |
| MEI | Mobile Equipment Identity |
| MSISDN | Mobile Subscriber ISDN Number |
| PAA | PDN Address Allocation |
| PCO | Protocol Configuration Options |
| PDU | Protocol Data Unit |
| PDN | Packet Data Network or Public Data Network |
| PGW | PDN Gateway |
| PTI | Procedure Transaction Id |
| QoS | Quality of Service |
| RAT | Radio Access Type |
| RIM | RAN Information Management |
| SGW | Serving Gateway |
| TEID | Tunnel Endpoint Identifier |
| TEID-C | Tunnel Endpoint Identifier, control plane |
| TEID-U | Tunnel Endpoint Identifier, user plane |
| TFT | Traffic Flow Template |
| TLIV | Type Length Instance Value |
| UDP | User Datagram Protocol |
| ULI | User Location Information |

LIPA    Local IP Access

===================End of Change=======================================

===============Begin of Change=========================================

7.3.1 Forward Relocation Request

A Forward Relocation Request message shall be sent from the source MME to the target MME over S10 interface as part of S1-based handover relocation procedure from the source MME to the target SGSN, or from the source SGSN to the target MME over S3 interface as part of Inter RAT handover and combined hard handover and SRNS relocation procedures, or from source SGSN to the target SGSN over S16 interface as part of SRNS Relocation and PS handover procedures. If the source MME/SGSN has one or more EPS PDN connection IEs, presented in Table 7.3.1-2, regarding LIPA, and the source MME/SGSN learns based on operator configuration that the target SGSN/MME is not aware of LIPA, the source MME/SGSN shall omit the EPS PDN connection IE regarding LIPA from the Forward Relocation Request message.

A Forward Relocation Request message shall also be sent from the source MME to the target SGSN over S3 interface as part of SRVCC from E-UTRAN to UTRAN or GERAN with DTM HO support procedures and from source SGSN to the target SGSN over S16 interface as part of SRVCC from UTRAN (HSPA) to UTRAN or GERAN with DTM HO support.

Forward Relocation procedure across S10 interface (when $K_{ASME}$ is taken into use) shall be performed according to the Rules on Concurrent Running of Security Procedures, which are specified in 3GPP TS 33.401 [12].

Table 7.3.1-1 specifies the presence requirements and conditions of the IEs in the message.

Table 7.3.1-1: Information Elements in a Forward Relocation Request

| Information elements | P | Condition / Comment | IE Type | Ins. |
|---|---|---|---|---|
| IMSI | C | The IMSI shall be included in the message except for the case:<br>- If the UE is emergency attached and the UE is UICCless.<br><br>The IMSI shall be included in the message but not used as an identifier<br>- if UE is emergency attached but IMSI is not authenticated. | IMSI | 0 |
| Sender's F-TEID for Control Plane | M | This IE specifies the address and the TEID for control plane message which is chosen by the source MME/SGSN.<br>This information shall be used by the target MME/SGSN to the source MME/SGSN when sending Forward Relocation Response message, Forward Access Context Acknowledge message and Forward Relocation Complete Notification message. | F-TEID | 0 |
| MME/SGSN UE EPS PDN Connections | M | Several IEs with this type and instance values shall be included as necessary to represent a list of PDN Connections | PDN Connection | 0 |
| SGW S11/S4 IP Address and TEID for Control Plane | M | | F-TEID | 1 |
| SGW node name | C | This IE shall be included if the source MME or SGSN has the source SGW FQDN. | FQDN | 0 |
| MME/SGSN UE MM Context | M | | MM Context | 0 |
| Indication Flags | C | This IE shall be included if any of the flags are set to 1.<br>- Direct Forwarding Indication: This flag shall be set to 1 if direct forwarding is supported in the S1 based handover procedure. This flag shall not be set to 1 if the message is used for other handover procedures.<br><br>- Idle mode Signalling Reduction Supported Indication flag: This flag shall be set to 1 if the source MME/SGSN is capable to establish ISR for the UE.<br><br>- Unauthenticated IMSI: This flag shall be set to 1 if the IMSI present in the message is not authenticated and is for an emergency attached UE.<br><br>- Change Reporting support indication flag: This flag shall be set to 1 if the Source S4-SGSN/MME supports Location Change Reporting mechanism. | Indication | 0 |
| E-UTRAN Transparent Container | C | This IE shall be included if the message is used for UTRAN/GERAN to E-UTRAN inter RAT handover procedure, intra RAT handover procedure and 3G SGSN to MME combined hard handover and SRNS relocation procedure. | F-Container | 0 |
| UTRAN Transparent Container | C | This IE shall be included if the message is used for PS handover to UTRAN Iu mode procedures, SRNS relocation procedure and E-TURAN to UTRAN inter RAT handover procedure. | F-Container | 1 |

| | | | | |
|---|---|---|---|---|
| Target Identification | C | This IE shall be included if the message is used for SRNS relocation procedure and handover to UTRAN/E-UTRAN procedures. | Target Identification | 0 |
| HRPD access node S101 IP address | C | This IE shall be included only if the HRPD pre registration was performed at the source MME | IP-Address | 0 |
| 1xIWS S102 IP address | C | This IE shall be included only if the 1xRTT CS fallback pre registration was performed at the source MME | IP-Address | 1 |
| RAN Cause | C | This IE is the information from the source eNodeB, the source MME shall include this IE in the message. Refer to the 3GPP TS 29.010 [42] for the mapping of cause values between eNodeB cause and RANAP cause. | F-Cause | 0 |
| RANAP Cause | C | This IE is the information from the source RNC, the source SGSN shall include this IE in the message. Refer to the 3GPP TS 29.010 [42] for the mapping of cause values between eNodeB cause and RANAP cause. | F-Cause | 1 |
| BSS Container | C | This IE shall be included if the message is used for PS handover to GERAN A/Gb mode and E-UTRAN to GERAN A/Gb mode inter RAT handover procedure. | F-Container | 2 |
| Source Identification | C | This IE shall be included on the S16 interface if the message is used for PS handover from GERAN/UTRAN to GERAN A/Gb mode. | Source Identification | 0 |
| BSSGP Cause | C | This IE is the information from source BSS, the source SGSN shall include this IE in the message. | F-Cause | 2 |
| Selected PLMN ID | C | The old MME/SGSN shall include this IE if the selected PLMN identity is available. The Selected PLMN ID IE indicates the core network operator selected for the UE in a shared network. | Selected PLMN ID | 0 |
| Recovery | C | If contacting the peer for the first time | Recovery | 0 |
| Trace Information | C | This IE shall be included when session trace is active for this IMSI/IMEI. | Trace Information | 0 |
| Subscribed RFSP Index | CO | This IE shall be included during inter-MME/SGSN mobility procedures, if the source MME/SGSN receives it from an HSS. | RFSP Index | 0 |
| RFSP Index in Use | CO | This IE shall be included only during inter-MME/SGSN mobility procedures, if the source MME/SGSN supports the feature. | RFSP Index | 1 |
| CSG ID | CO | This IE shall be included if the source MME/SGSN receives it from the source eNodeB/RNC | CSG ID | 0 |
| CSG Membership Indication | CO | This IE shall be included if the source MME/SGSN when the CSG access mode received from the source eNodeB/RNC indicates the target cell is a hybrid cell | CMI | 0 |
| Private Extension | O | | Private Extension | VS |

The PDN Connection grouped IE shall be coded as depicted in Table 7.3.1-2.

Table 7.3.1-2: MME/SGSN UE EPS PDN Connections within Forward Relocation Request

| Octet 1 | | PDN Connection IE Type = 109 (decimal) | | |
|---|---|---|---|---|
| Octets 2 and 3 | | Length = n | | |
| Octet 4 | | Spare and Instance fields | | |
| Information elements | P | Condition / Comment | IE Type | Ins. |
| APN | M | | APN | 0 |
| APN Restriction | C | This IE denotes the restriction on the combination of types of APN for the APN associated with this EPS bearer Context. The target MME or SGSN determines the Maximum APN Restriction using the APN Restriction. If available, the source MME/S4SGSN shall include this IE. | APN Restriction | 0 |
| Selection Mode | CO | When available, this IE shall be included by the source MME/S4-SGSN | Selection Mode | 0 |
| IPv4 Address | C | This IE shall not be included if no IPv4 Address is assigned. | IP Address | 0 |
| IPv6 Address | C | This IE shall not be included if no IPv6 Address is assigned. | IP Address | 1 |
| Linked EPS Bearer ID | M | This IE identifies the default bearer of the PDN Connection. | EBI | 0 |
| PGW S5/S8 IP Address for Control Plane or PMIP | M | This IE shall include the TEID in the GTP based S5/S8 case and the GRE key in the PMIP based S5/S8 case. | F-TEID | 0 |
| PGW node name | C | This IE shall be included if the source MME or SGSN has the PGW FQDN. | FQDN | 0 |
| Bearer Contexts | C | Several IEs with this type and instance values may be included as necessary to represent a list of Bearers. | Bearer Context | 0 |
| Aggregate Maximum Bit Rate (APN-AMBR) | M | | AMBR | 0 |
| Charging characteristics | C | This IE shall be present if charging characteristics was supplied by the HSS to the MME/SGSN as a part of subscription information. | Charging characteristics | 0 |
| Change Reporting Action | C | This IE shall be included whenever available at the source MME/SGSN. | Change Reporting Action | 0 |
| CSG Information Reporting Action | CO | This IE shall be included whenever available at the source MME/SGSN. | CSG Information Reporting Action | 0 |

The Bearer Context grouped IE shall be coded as depicted in Table 7.3.1-3.

Table 7.3.1-3: Bearer Context within MME/SGSN UE EPS PDN Connections within Forward Relocation Request

| Octet 1 | Bearer Context IE Type = 93 (decimal) | | | |
|---|---|---|---|---|
| Octets 2 and 3 | Length = n | | | |
| Octet 4 | Spare and Instance fields | | | |
| Information elements | P | Condition / Comment | IE Type | Ins. |
| EPS Bearer ID | M | | EBI | 0 |
| TFT | C | This IE shall be present if a TFT is defined for this bearer. | Bearer TFT | 0 |
| SGW S1/S4/S12 IP Address and TEID for user plane | M | | F-TEID | 0 |
| PGW S5/S8 IP Address and TEID for user plane | C | This IE shall be present for GTP based S5/S8 | F-TEID | 1 |
| Bearer Level QoS | M | | Bearer Level QoS | 0 |
| BSS Container | CO | The MME/S4 SGSN shall include the Packet Flow ID, Radio Priority, SAPI, PS Handover XID parameters in the TAU/RAU/Handover procedure, if available. | F-Container | 0 |
| Transaction Identifier | C | This IE shall be sent over S3/S10/S16 if the UE supports A/Gb and/or Iu mode. | TI | 0 |
| Bearer Flags | O | Applicable flags are:<br><br>- VB (Voice Bearer) indicator is set to indicate a voice bearer for PS-to-CS SRVCC handover | Bearer Flags | 0 |

==================End of Change=========================================

- Change for one embodiment for 3GPP TS 24.301

================Begin of Change=========================================

3.1 Definitions

For the purposes of the present document, the terms and definitions given in
3GPP TR 21.905 [1] and the following apply. A term defined in the present document takes precedence over the definition of the same term, if any, in 3GPP TR 21.905 [1].

1x CS fallback capable UE: A UE that uses a CS infrastructure for a voice call and other CS-domain services by falling back to cdma2000® 1x access network if the UE is served by E-UTRAN when a CS service is requested.

Aggregate maximum bit rate: The maximum bit rate that limits the aggregate bit rate of a set of non-GBR bearers of a UE. Definition derived from 3GPP TS 23.401 [10].

Attached for emergency bearer services: A UE is attached for emergency bearer services if it has only a PDN connection for emergency bearer services established.

CS fallback capable UE: A UE that uses a CS infrastructure for a voice call and other CS-domain services by falling back to A/Gb or Iu mode if the UE is served by E-UTRAN when a CS service is requested.

CSG cell: A CSG cell in which only members of the CSG can get normal service. Depending on local regulation, the CSG cell can provide emergency bearer services also to subscribers who are not member of the CSG. Definition derived from 3GPP TS 23.401 [10].

CSG ID: A CSG ID is a unique identifier within the scope of one PLMN defined in 3GPP TS 23.003 [2] which identifies a Closed Subscriber Group (CSG) in the PLMN associated with a cell or group of cells to which access is restricted to members of the CSG.

CSG selection: A UE supporting CSG selection selects CSG cell either automatically based on the list of allowed CSG identities or manually based on user selection of CSG on indication of list of available CSGs. Definition derived from 3GPP TS 23.122 [6].

Dedicated bearer: An EPS bearer that is associated with uplink packet filters in the UE and downlink packet filters in the PDN GW where the filters only match certain packets. Definition derived from 3GPP TS 23.401 [10].

Default bearer: An EPS bearer that gets established with every new PDN connection. Its context remains established throughout the lifetime of that PDN connection. A default EPS bearer is a non-GBR bearer. Definition derived from 3GPP TS 23.401 [10].

Emergency EPS bearer context: a default EPS bearer context which was activated with request type "emergency", or any dedicated EPS bearer context associated to this default EPS bearer context.

EMM context: An EMM context is established in the UE and the MME when an attach procedure is successfully completed.

EMM-CONNECTED mode: A UE is in EMM-CONNECTED mode when a NAS signalling connection between UE and network is established. The term EMM-CONNECTED mode used in the present document corresponds to the term ECM-CONNECTED state used in 3GPP TS 23.401 [10].

EMM-IDLE mode: A UE is in EMM-IDLE mode when no NAS signalling connection between UE and network exists. The term EMM-IDLE mode used in the present document corresponds to the term ECM-IDLE state used in 3GPP TS 23.401 [10].

EPS security context: In the present specification, EPS security context is used as a synonym for EPS NAS security context specified in 3GPP TS 33.401 [19].

EPS services: Within the context of this specification, EPS services is used as a synonym for GPRS services in 3GPP TS 24.008 [13].

Evolved packet core network: the successor to the 3GPP Release 7 packet-switched core network, developed by 3GPP within the framework of the 3GPP System Architecture Evolution (SAE).

Evolved packet system: The evolved packet system (EPS) or evolved 3GPP packet-switched domain consists of the evolved packet core network and the evolved universal terrestrial radio access network. Definition derived from 3GPP TS 23.401 [10].

GBR bearer: An EPS bearer that uses dedicated network resources related to a guaranteed bit rate (GBR) value, which are permanently allocated at EPS bearer establishment/modification. Definition derived from 3GPP TS 23.401 [10].

Initial NAS message: A NAS message is considered as an initial NAS message, if this NAS message can trigger the establishment of a NAS signalling connection. For instance, the ATTACH REQUEST message is an initial NAS message.

IPv4v6 capability: capability of the IP stack associated with a UE to support a dual stack configuration with both an IPv4 address and an IPv6 address allocated.

Kilobit: 1000 bits.

Last Visited Registered TAI: A TAI which is contained in the TAI list that the UE registered to the network and which identifies the tracking area last visited by the UE.

Linked Bearer Identity: This identity indicates to which default bearer the additional bearer resource is linked.

Mapped EPS security context: a mapped security context to be used in EPS. Definition derived from 3GPP TS 33.401 [19].

Megabit: 1,000,000 bits.

Message header: a standard L3 message header as defined in 3GPP TS 24.007 [12].

MME area: An area containing tracking areas served by an MME.

NAS signalling connection: is a peer to peer S1 mode connection between UE and MME. A NAS signalling connection consists of the concatenation of an RRC connection via the "LTE-Uu" interface and an S1AP connection via the S1 interface. Additionally, for the purpose of optimized handover or idle mode mobility from cdma2000® HRPD access to E-UTRAN (see 3GPP TS 23.402 [11]), the NAS signalling connection can consist of a concatenation of an S101-AP connection and a signalling tunnel over a cdma2000® HRPD access network.

> NOTE: cdma2000® is a registered trademark of the Telecommunications Industry Association (TIA-USA).

NAS signalling connection recovery: is a mechanism initiated by the NAS to restore the NAS signalling connection on indication of "RRC connection failure" by the lower layers.

Non-access stratum protocols: The protocols between UE and MSC or SGSN that are not terminated in the UTRAN, and the protocols between UE and MME that are not terminated in the E-UTRAN. Definition derived from 3GPP TS 21.905 [1].

Non-emergency EPS bearer context: any EPS bearer context which is not an emergency EPS bearer context.

Non-EPS services: services provided by CS domain. Within the context of this specification, non-EPS services is used as a synonym for non-GPRS services in 3GPP TS 24.008 [13]. A UE which camps on E-UTRAN can attach to both EPS services and non-EPS services.

Non-GBR bearer: An EPS bearer that uses network resources that are not related to a guaranteed bit rate (GBR) value. Definition derived from 3GPP TS 23.401 [10].

PDN address: an IP address assigned to the UE by the Packet Data Network Gateway (PDN GW).

PDN connection for emergency bearer services: a PDN connection for which the default EPS bearer context or default PDP context was activated with request type "emergency".

Plain NAS message: a NAS message with a header including neither a message authentication code nor a sequence number.

Procedure Transaction Identity: An identity which is dynamically allocated by the UE for the UE requested ESM procedures. The procedure transaction identity is released when the procedure is completed.

RAT-related TMSI: When the UE is camping on an E-UTRAN cell, the RAT-related TMSI is the GUTI; when it is camping on a GERAN or UTRAN cell, the RAT-related TMSI is the P-TMSI.

Registered PLMN: The PLMN on which the UE is registered. The identity of the registered PLMN is provided to the UE within the GUTI.

The label (S1 mode only) indicates that this subclause or paragraph applies only to a system which operates in S1 mode, i.e. with a functional division that is in accordance with the use of an S1 interface between the radio access network and the core network. In a multi-access system this case is determined by the current serving radio access network.

S101 mode: applies to a system that operates with a functional division that is in accordance with the use of an S101 interface. For the definition of the S101 reference point, see 3GPP TS 23.402 [11].

"SMS only": A subset of non-EPS services which includes only Short Message Service. A UE camping on E-UTRAN can attach to both EPS services and "SMS only".

TAI list: A list of TAIs that identify the tracking areas that the UE can enter without performing a tracking area updating procedure. The TAIs in a TAI list assigned by an MME to a UE pertain to the same MME area.

Traffic flow aggregate: A temporary aggregate of packet filters that are included in a UE requested bearer resource allocation procedure or a UE requested bearer resource modification procedure and that is inserted into a traffic flow template (TFT) for an EPS bearer context by the network once the UE requested bearer resource allocation procedure or UE requested bearer resource modification procedure is completed.

UE's availability for terminating voice calls in the IMS: the indication of this availability or non-availability is provided by the upper layers of the UE as specified in 3GPP TS 24.229 [13D] in the annex relevant to the IP-Connectivity Access Network in use. If availability is indicated, the UE uses the IM CN Subsystem and can terminate SIP sessions including an audio component with codecs suited for voice.

UE's usage setting: This is a UE setting that indicates whether the UE has preference for voice services over data services or vice-versa. If a UE has preference for voice services, then the UE's usage setting is "voice centric". If a UE has preference for data services, then the UE's usage setting is "data centric". A UE whose setting is "data centric" may still require access to voice services. A UE whose setting is "voice centric" may still require access to data services. This definition is derived from 3GPP TS 23.221 [8A] and it applies to voice capable UEs.

For the purposes of the present document, the following terms and definitions given in 3GPP TS 23.401 [10] apply:

MME pool area
    PDN connection

For the purposes of the present document, the following terms and definitions given in 3GPP TS 23.272 [9] apply:

CS fallback
SMS over SGs

For the purposes of the present document, the following terms and definitions given in 3GPP TS 24.008 [13] apply:

A/Gb mode
Access domain selection
Default PDP context
Iu mode
TFT

For the purposes of the present document, the following terms and definitions given in 3GPP TS 33.102 [18] apply:

UMTS security context

For the purposes of the present document, the following terms and definitions given in 3GPP TS 33.401 [19] apply:

Current EPS security context
Full native EPS security context
$K_{ASME}$
$K'_{ASME}$
Mapped security context
Native EPS security context
Non-current EPS security context
Partial native EPS security context

For the purposes of the present document, the following terms and definitions given in 3GPP TR 23.829 [xx] apply:

Local IP Access

==================End of Change=========================================

==========Begin of Change======================================

*6.4.4EPS bearer context deactivation procedure*

6.4.4.1 General

The purpose of the EPS bearer context deactivation procedure is to deactivate an EPS bearer context or disconnect from a PDN by deactivating all EPS bearer contexts to the PDN. The EPS bearer context deactivation procedure is initiated by the network, and it may be triggered by the UE by means of the UE requested bearer resource modification procedure or UE requested PDN disconnect procedure.

If a UE is receiving emergency bearer services from a CSG cell, and the CSG subscription expires or is removed, the MME shall deactivate all non-emergency EPS bearers if any. The MME shall not deactivate the emergency EPS bearers.

If a detach is requested by the HSS for a UE that has bearers for emergency services, the MME shall send a DEACTIVATE EPS BEARER CONTEXT REQUEST message to the UE for all bearers that are not allocated for emergency services.

6.4.4.2 EPS bearer context deactivation initiated by the network

Figure 6:
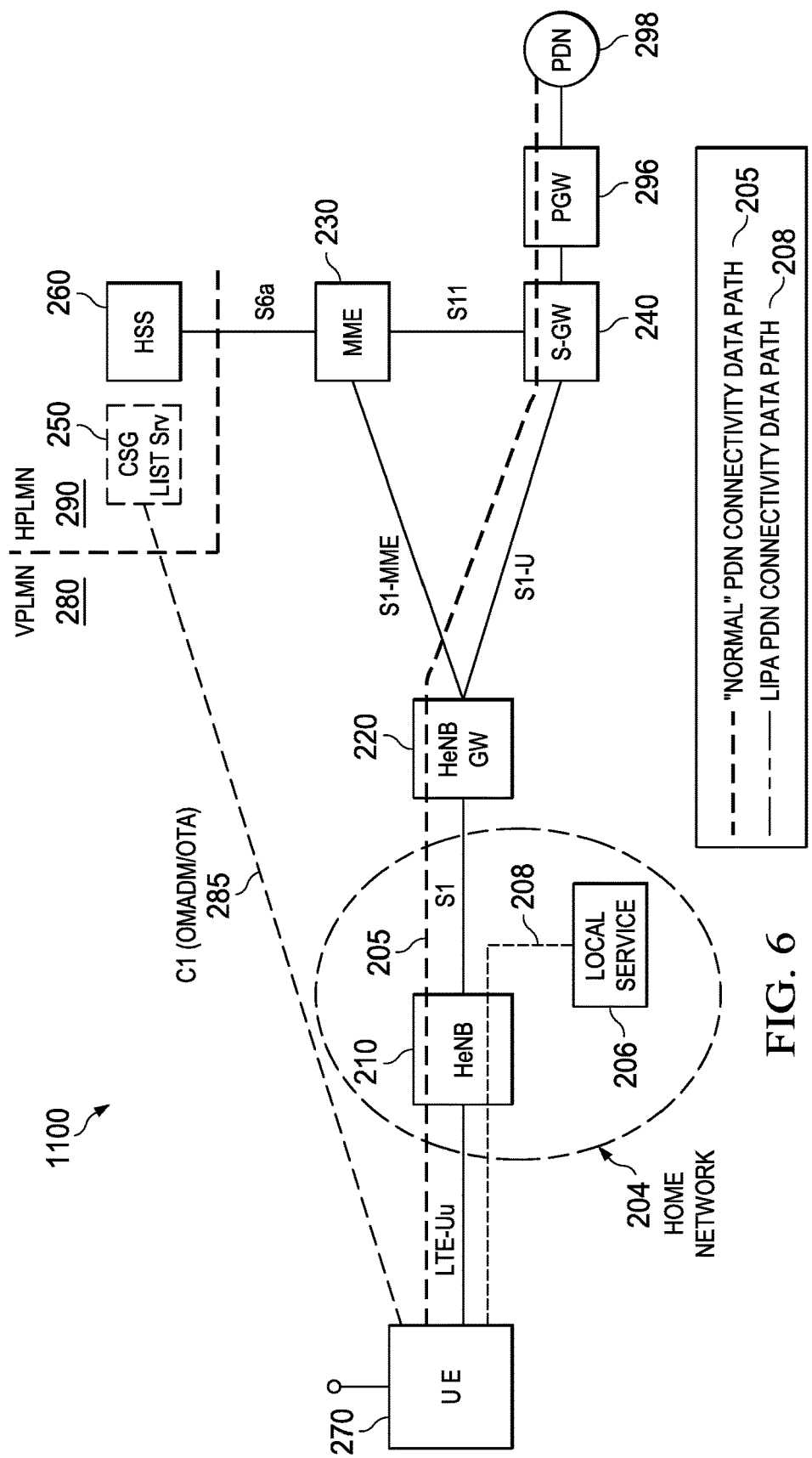
FIG. 6 is a schematic diagram of the example logical architecture for use in a HeNB cell illustrating Local IP connectivity.
Figure 7:
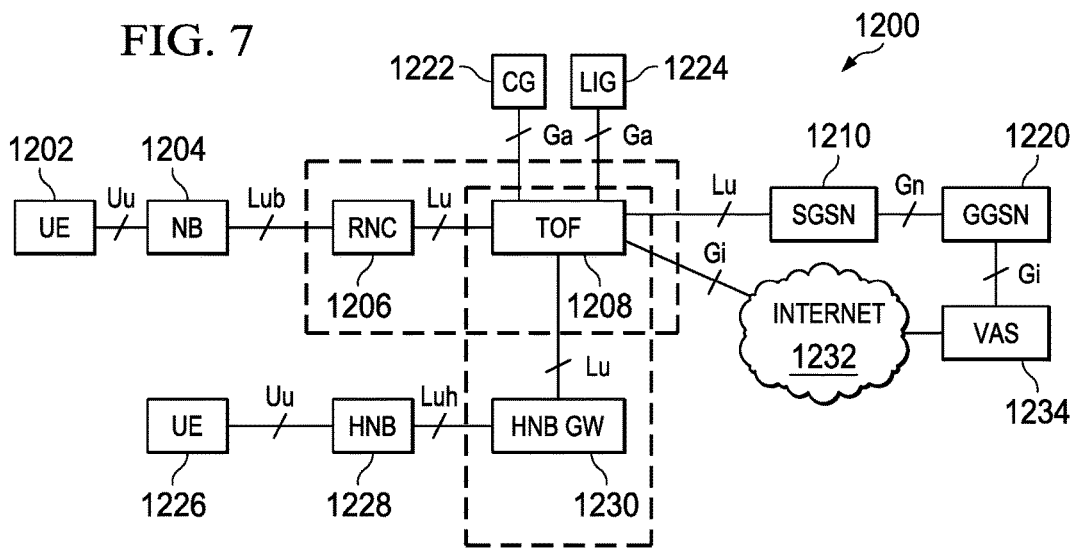
FIG. 7 is a schematic diagram of an example logical architecture for deploying Selected IP Traffic Offload at Iu-PS.

If a NAS signalling connection exists when the MME initiates the EPS bearer context deactivation procedure, the MME shall initiate the EPS bearer context deactivation procedure by sending a DEACTIVATE EPS BEARER CONTEXT REQUEST message to the UE, start the timer T3495, and enter the state BEARER CONTEXT INACTIVE PENDING (see example in figure 6.4.4.2.1). The DEACTIVATE EPS BEARER CONTEXT REQUEST message contains an ESM cause typically indicating one of the following:

8: operator determined barring;

36:regular deactivation;

38:network failure;

39:reactivation requested; or

112:APN restriction value incompatible with active EPS bearer context.

xxx:LIPA connectivity is not supported in the current cell

If the deactivation is triggered by a UE initiated bearer resource modification procedure or UE requested PDN disconnect procedure, the DEACTIVATE EPS BEARER CONTEXT REQUEST message shall contain the procedure transaction identity (PTI) value received by the MME in the BEARER RESOURCE MODIFICATION REQUEST or PDN DISCONNECT REQUEST respectively.

When the MME wants to deactivate all EPS bearer contexts to a PDN and thus disconnect the UE from the PDN, the MME shall include the EPS bearer identity of the default bearer associated to the PDN in the DEACTIVATE EPS BEARER CONTEXT REQUEST message.

If no NAS signalling connection exists when the MME initiates the EPS bearer context deactivation, the ESM entity in the MME shall locally deactivate the EPS bearer context towards the UE without any peer-to-peer ESM signalling between the MME and the UE.

> NOTE: The EPS bearer context state(s) can be synchronized between the UE and the MME at the next EMM-IDLE to EMM-CONNECTED transition, e.g. during a service request or tracking area updating procedure.

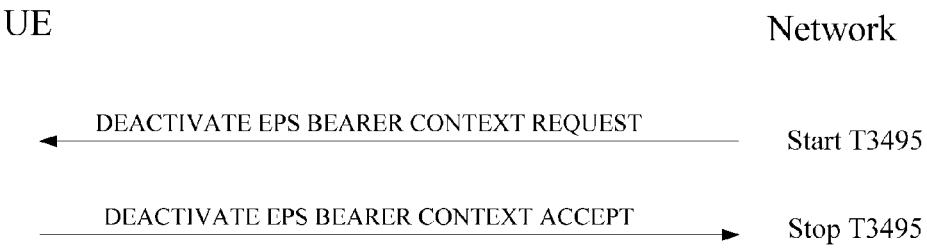

Figure 6.4.4.2.1: EPS bearer context deactivation procedure

6.4.4.3 EPS bearer context deactivation accepted by the UE

Upon receipt of the DEACTIVATE EPS BEARER CONTEXT REQUEST message, the UE shall delete the EPS bearer context identified by the EPS bearer identity. After deactivating the identified EPS bearer context, the UE shall respond to the MME with the DEACTIVATE EPS BEARER CONTEXT ACCEPT.

If the EPS bearer identity indicated in the DEACTIVATE EPS BEARER CONTEXT REQUEST is that of the default bearer to a PDN, the UE shall delete all EPS bearer contexts associated to the PDN. After deactivating all EPS bearer contexts, the UE shall respond to the MME with the DEACTIVATE EPS BEARER CONTEXT ACCEPT.

Upon sending the DEACTIVATE EPS BEARER CONTEXT ACCEPT message, the UE shall enter the state BEARER CONTEXT INACTIVE. If due to the EPS bearer context deactivation only the PDN connection for emergency bearer services remains established, the UE shall consider itself attached for emergency bearer services only.

If the DEACTIVATE EPS BEARER CONTEXT REQUEST includes ESM cause #39 "reactivation requested", the UE should reactivate the EPS bearer context, if it was a default EPS bearer context. Additionally, the UE should re-initiate the request(s) for dedicated bearer resources that have been activated on request of the UE and released as a result of this EPS bearer context deactivation procedure.

> NOTE 1: User interaction is necessary in some cases when the UE cannot re-activate the EPS bearer context(s) automatically.
>
> NOTE 2: The UE behaviour is not specified for the case where the DEACTIVATE EPS BEARER CONTEXT REQUEST includes ESM cause #39 "reactivation requested" and the deactivated EPS bearer context was a dedicated EPS bearer context.

If the UE receives the DEACTIVATE EPS BEARER CONTEXT REQUEST which includes ESM cause #xxx "LIPA connectivity is not supported in the current cell", the UE shall not try to reactivate the EPS bearer context for that LIPA APN until it moves to another cell. If the UE receives the DEACTIVATE EPS BEARER CONTEXT REQUEST which includes ESM cause #xxx "LIPA connectivity is not supported in the current cell", the UE shall not try to activate any other EPS bearer context for a LIPA APN.

If the DEACTIVATE EPS BEARER CONTEXT REQUEST message contains a PTI value other than "no procedure transaction identity assigned" and "reserved" (see 3GPP TS 24.007 [12]), the UE uses the PTI to identify the UE requested bearer resource modification procedure or UE requested PDN disconnect procedure to which the EPS bearer context deactivation is related (see subclause 6.5.4).

If the DEACTIVATE EPS BEARER CONTEXT REQUEST message contains a PTI value other than "no procedure transaction identity assigned" and "reserved" (see 3GPP TS 24.007 [12]), the UE shall release the traffic flow aggregate description associated to the PTI value provided.

Upon receipt of the DEACTIVATE EPS BEARER CONTEXT ACCEPT message, the MME shall enter the state BEARER CONTEXT INACTIVE and stop the timer T3495.

6.4.4.4 Abnormal cases in the UE

Apart from the case described in subclause 6.3.3, no abnormal cases have been identified.

6.4.4.5 Abnormal cases on the network side

The following abnormal cases can be identified:

a) Expiry of timer T3495:

On the first expiry of the timer T3495, the MME shall resend the DEACTIVATE EPS BEARER CONTEXT REQUEST and shall reset and restart timer T3495. This retransmission is repeated four times, i.e. on the fifth expiry of timer T3495, the MME shall abort the procedure and deactivate the EPS bearer context locally without any peer-to-peer ESM signalling between the MME and the UE.

b) Collision of UE requested PDN disconnect procedure and EPS bearer context deactivation:

When the MME receives a PDN DISCONNECT REQUEST message during the EPS bearer context deactivation procedure, and the EPS bearer indicated in the DEACTIVATE EPS BEARER CONTEXT REQUEST message is a dedicated EPS bearer belonging to the PDN connection the UE wants to disconnect, the MME shall proceed with both procedures. If the EPS bearer indicated in the DEACTIVATE EPS BEARER CONTEXT REQUEST message is the default EPS bearer, the MME shall proceed with the EPS bearer context deactivation procedure.

6.4.4.6 Local EPS bearer context deactivation without ESM signalling

The UE and the MME deactivate EPS bearer contexts locally without peer-to-peer ESM signalling in the following cases:

1) during the service request procedure, if the E-UTRAN fails to establish the user plane radio bearers for one or more EPS bearer contexts e.g. due to radio access control;

2) during the tracking area updating procedure with "active" flag, or without "active" flag but the network established the user plane radio bearers due to downlink pending data, if the E-UTRAN fails to establish the user plane radio bearers due to lower layer failure for one or more but not all EPS bearer contexts indicated active by both UE and network;

NOTE 1: The synchronisation of the EPS bearers indicated in EPS bearer context status information element in TRACKING AREA UPDATE ACCEPT message is not applicable in item 2.

3) during handover, if the target E-UTRAN cannot establish all the user plane radio bearers for the UE; or 4) if the E-UTRAN releases one or more user plane bearers of the UE due to E-UTRAN specific reasons.

For those cases, based on the indication from the lower layers, the UE and the MME shall locally deactivate the EPS bearer contexts for which no user plane radio bearers are set up.

NOTE 2: The lower layers in the UE provide the user plane radio bearer context status to the ESM sublayer when a change in the user plane radio bearers is detected by the lower layers including establishment and release of user plane radio bearers for the UE in connected mode. This does not apply to the release of the RRC connection due to an S1-release procedure or due to radio link failure.

When the user plane radio bearer for a default EPS bearer context is not established during the service request procedure or tracking area updating procedure with "active" flag, the UE shall locally deactivate all EPS bearer contexts associated to the PDN connection with the default EPS bearer context. The MME shall locally deactivate all EPS bearer contexts associated to the PDN connection with the default EPS bearer context without peer-to-peer ESM signalling to the UE.

If due to any of the cases described above the UE locally deactivates all EPS bearer contexts, the UE shall perform a local detach, enter state EMM-DEREGISTERED and initiate an attach procedure.

The MME shall deactivate the GBR EPS bearer contexts locally without peer-to-peer ESM signalling, when the E-UTRAN requests the MME to release the S1AP connection due to radio link failure.

NOTE 3: The UE and the MME will synchronize the EPS bearer contexts subsequently during the next service request procedure, tracking area update procedure or routing area update procedure.

If due to any of the cases described above the network locally deactivates all EPS bearer contexts, the MME shall perform a local detach and enter state EMM-DEREGISTERED.

For EPS bearer context deactivation procedure initiated by the network, if no NAS signalling connection exists, the MME locally deactivates the EPS bearer context(s) without peer-to-peer ESM signalling, except when the MME disconnects the UE from the last PDN to which it is connected. In the latter case, the MME initiates a network initiated detach procedure.

================End of Change=======================================

================Begin of Change=====================================

*Annex A (informative):*
*Cause values for EPS mobility management*

A.1 CAUSES RELATED TO UE IDENTIFICATION

Cause #2 – IMSI unknown in HSS

> This EMM cause is sent to the UE if the UE is not known (registered) in the HSS. This EMM cause does not affect operation of the EPS service, although is may be used by an EMM procedure.

Cause #3 – Illegal UE

> This EMM cause is sent to the UE when the network refuses service to the UE either because an identity of the UE is not acceptable to the network or because the UE does not pass the authentication check, i.e. the RES received from the UE is different from that generated by the network.

Cause #6 – Illegal ME

> This EMM cause is sent to the UE if the ME used is not acceptable to the network, e.g. blacklisted.

Cause #9 – UE identity cannot be derived by the network.

> This EMM cause is sent to the UE when the network cannot derive the UE's identity from the GUTI/S-TMSI/P-TMSI and RAI e.g. no matching identity/context in the network or failure to validate the UE's identity due to integrity check failure of the received message.

Cause #10 – Implicitly detached

> This EMM cause is sent to the UE either if the network has implicitly detached the UE, e.g. some while after the Mobile reachable timer has expired, or if the EMM context data related to the subscription does not exist in the MME e.g. because of a MME restart.

A.2 CAUSE RELATED TO SUBSCRIPTION OPTIONS

Cause #5 – IMEI not accepted

> This cause is sent to the UE if the network does not accept an attach procedure for emergency bearer services using an IMEI.

Cause #7 – EPS services not allowed

> This EMM cause is sent to the UE when it is not allowed to operate EPS services.

Cause #8 – EPS services and non-EPS services not allowed

> This EMM cause is sent to the UE when it is not allowed to operate either EPS or non-EPS services.

Cause #11 – PLMN not allowed

This EMM cause is sent to the UE if it requests attach or tracking area updating in a PLMN where the UE, by subscription or due to operator determined barring, is not allowed to operate.

Cause #12 – Tracking area not allowed

This EMM cause is sent to the UE if it requests tracking area updating in a tracking area where the HPLMN determines that the UE, by subscription, is not allowed to operate.

NOTE 1: If EMM cause #12 is sent to a roaming subscriber the subscriber is denied service even if other PLMNs are available on which registration was possible.

Cause #13 – Roaming not allowed in this tracking area

This EMM cause is sent to an UE which requests tracking area updating in a tracking area of a PLMN which by subscription offers roaming to that UE but not in that tracking area.

Cause #14 – EPS services not allowed in this PLMN

This EMM cause is sent to the UE which requests EPS service in a PLMN which does not offer roaming for EPS services to that UE.

NOTE 2: Since only one list of forbidden PLMNs for packet services is maintained in the UE, then the "forbidden PLMNs for GPRS service" is the maintained list and the forbidden PLMNs for EPS service is equivalent to it.

Cause #15 – No suitable cells in tracking area

This EMM cause is sent to the UE if it requests tracking area updating in a tracking area where the UE, by subscription, is not allowed to operate, but when it should find another allowed tracking area in the same PLMN.

NOTE 3: Cause #15 and cause #12 differ in the fact that cause #12 does not trigger the UE to search for another allowed tracking area on the same PLMN.

Cause #25 – Not authorized for this CSG

This EMM cause is sent to the UE if it requests access in a CSG cell with CSG ID where the UE either has no subscriptionto operate or the UE's subscription has expired and it should find another cell in the same PLMN.

Cause #40 – No EPS bearer context activated

This EMM cause is sent to the UE, if during a tracking area updating procedure the MME detects that there is no active EPS bearer context in the network.

Cause #xxx – LIPA connectivity is not supported in the current cell

This EMM cause is sent to the UE if MME detects that the UE handed over towards a cell which does not support LIPA.

A.3 CAUSES RELATED TO PLMN SPECIFIC NETWORK FAILURES AND CONGESTION/AUTHENTICATION FAILURES

Cause #16 – MSC temporarily not reachable

This EMM cause is sent to the UE if it requests a combined EPS attach or tracking area updating in a PLMN where the MSC is temporarily not reachable via the EPS part of the network.

Cause #17 – Network failure

This EMM cause is sent to the UE if the MME cannot service an UE generated request because of PLMN failures.

Cause #18 – CS domain not available

This EMM cause is sent to the UE if the MME cannot service an UE generated request because of no availability of CS domain.

Cause #19 – ESM failure

This EMM cause is sent to the UE when there is a failure in the ESM message contained in the EMM message.

Cause #20 – MAC failure

This EMM cause is sent to the network if the USIM detects that the MAC in the AUTHENTICATION REQUEST message is not fresh (see 3GPP TS 33.401 [19]).

Cause #21 – Synch failure

This EMM cause is sent to the network if the USIM detects that the SQN in the AUTHENTICATION REQUEST message is out of range (see 3GPP TS 33.401 [19]).

Cause #22 – Congestion

This EMM cause is sent to the UE because of congestion in the network (e.g. no channel, facility busy/congested etc.).

Cause #23 – UE security capabilities mismatch

This EMM cause is sent to the network if the UE detects that the UE security capability does not match the one sent back by the network.

Cause #24 – Security mode rejected, unspecified

This EMM cause is sent to the network if the security mode command is rejected by the UE if the UE detects that the nonce$_{UE}$ does not match the one sent back by the network or for unspecified reasons.

Cause #26 – Non-EPS authentication unacceptable

This EMM cause is sent to the network in S1 mode if the "separation bit" in the AMF field of AUTN is set to 0 in the AUTHENTICATION REQUEST message (see 3GPP TS 33.401 [19]).

Cause #39 – CS domain temporarily not available

This EMM cause is sent to the UE when the CS fallback or 1xCS fallback request cannot be served temporarily due to O&M reasons.

A.4 CAUSES RELATED TO NATURE OF REQUEST

NOTE: This subclause has no entries in this version of the specification

A.5 CAUSES RELATED TO INVALID MESSAGES

Cause value #95 – Semantically incorrect message.

See 3GPP TS 24.008 [13], annex H, subclause H.5.5.

Cause value #96 – Invalid mandatory information.

See 3GPP TS 24.008 [13], annex H, subclause H.6.1.

Cause value #97 – Message type non-existent or not implemented.

See 3GPP TS 24.008 [13], annex H, subclause H.6.2.

Cause value #98 – Message type not compatible with protocol state.

See 3GPP TS 24.008 [13], annex H, subclause H.6.3.

Cause value #99 – Information element non-existent or not implemented.

See 3GPP TS 24.008 [13], annex H, subclause H.6.4.

Cause value #100 – Conditional IE error.

See 3GPP TS 24.008 [13], annex H, subclause H.6.5.

Cause value #101 – Message not compatible with protocol state.

See 3GPP TS 24.008 [13], annex H, subclause H.6.6.

Cause value #111 – Protocol error, unspecified.

See 3GPP TS 24.008 [13], annex H, subclause H.6.8.

=================End of Change=========================================

- Change for one embodiment for 3GPP TS 24.301

================Begin of Change=====================================

* * * First change * * *

DEFINITIONS AND ABBREVIATIONS

3.1 Definitions

For the purposes of the present document, the terms and definitions given in 3GPP TR 21.905 [1] and the following apply. A term defined in the present document takes precedence over the definition of the same term, if any, in 3GPP TR 21.905 [1].

1x CS fallback capable UE: A UE that uses a CS infrastructure for a voice call and other CS-domain services by falling back to cdma2000® 1x access network if the UE is served by E-UTRAN when a CS service is requested.

Aggregate maximum bit rate: The maximum bit rate that limits the aggregate bit rate of a set of non-GBR bearers of a UE. Definition derived from 3GPP TS 23.401 [10].

Attached for emergency bearer services: A UE is attached for emergency bearer services if it has only a PDN connection for emergency bearer services established.

CS fallback capable UE: A UE that uses a CS infrastructure for a voice call and other CS-domain services by falling back to A/Gb or Iu mode if the UE is served by E-UTRAN when a CS service is requested.

CSG cell: A CSG cell in which only members of the CSG can get normal service. Depending on local regulation, the CSG cell can provide emergency bearer services also to subscribers who are not member of the CSG. Definition derived from 3GPP TS 23.401 [10].

CSG ID: A CSG ID is a unique identifier within the scope of one PLMN defined in 3GPP TS 23.003 [2] which identifies a Closed Subscriber Group (CSG) in the PLMN associated with a cell or group of cells to which access is restricted to members of the CSG.

CSG selection: A UE supporting CSG selection selects CSG cell either automatically based on the list of allowed CSG identities or manually based on user selection of CSG on indication of list of available CSGs. Definition derived from 3GPP TS 23.122 [6].

Dedicated bearer: An EPS bearer that is associated with uplink packet filters in the UE and downlink packet filters in the PDN GW where the filters only match certain packets. Definition derived from 3GPP TS 23.401 [10].

Default bearer: An EPS bearer that gets established with every new PDN connection. Its context remains established throughout the lifetime of that PDN connection. A default EPS bearer is a non-GBR bearer. Definition derived from 3GPP TS 23.401 [10].

Emergency EPS bearer context: a default EPS bearer context which was activated with request type "emergency", or any dedicated EPS bearer context associated to this default EPS bearer context.

EMM context: An EMM context is established in the UE and the MME when an attach procedure is successfully completed.

EMM-CONNECTED mode: A UE is in EMM-CONNECTED mode when a NAS signalling connection between UE and network is established. The term EMM-CONNECTED mode used in the present document corresponds to the term ECM-CONNECTED state used in 3GPP TS 23.401 [10].

EMM-IDLE mode: A UE is in EMM-IDLE mode when no NAS signalling connection between UE and network exists. The term EMM-IDLE mode used in the present document corresponds to the term ECM-IDLE state used in 3GPP TS 23.401 [10].

EPS security context: In the present specification, EPS security context is used as a synonym for EPS NAS security context specified in 3GPP TS 33.401 [19].

EPS services: Within the context of this specification, EPS services is used as a synonym for GPRS services in 3GPP TS 24.008 [13].

Evolved packet core network: the successor to the 3GPP Release 7 packet-switched core network, developed by 3GPP within the framework of the 3GPP System Architecture Evolution (SAE).

Evolved packet system: The evolved packet system (EPS) or evolved 3GPP packet-switched domain consists of the evolved packet core network and the evolved universal terrestrial radio access network. Definition derived from 3GPP TS 23.401 [10].

GBR bearer: An EPS bearer that uses dedicated network resources related to a guaranteed bit rate (GBR) value, which are permanently allocated at EPS bearer establishment/modification. Definition derived from 3GPP TS 23.401 [10].

Initial NAS message: A NAS message is considered as an initial NAS message, if this NAS message can trigger the establishment of a NAS signalling connection. For instance, the ATTACH REQUEST message is an initial NAS message.

IPv4v6 capability: capability of the IP stack associated with a UE to support a dual stack configuration with both an IPv4 address and an IPv6 address allocated.

Kilobit: 1000 bits.

Last Visited Registered TAI: A TAI which is contained in the TAI list that the UE registered to the network and which identifies the tracking area last visited by the UE.

Linked Bearer Identity: This identity indicates to which default bearer the additional bearer resource is linked.

LIPA PDN connection: a PDN Connection that the MME authorizes for connectivity to a PDN GW for a UE connected to a HeNB based on a request from the UE for LIPA connectivity and based on the CSG ID of the HeNB.

{alternative definition}

LIPA PDN Connection: a PDN Connection which was activated by the UE requesting LIPA connectivity type "LIPA" and the MME informing the UE of the connectivity type provided.

* * * End of first change * * *

* * * Next change * * *

*UE behaviour in state EMM-REGISTERED*

5.2.3.1 General

The state EMM-REGISTERED is entered at the UE, when:

- the attach or combined attach procedure is performed by the UE (see subclause 5.5.1).

In state EMM-REGISTERED, the UE shall behave according to the substate as explained in subclause 5.2.3.2.

{Authors' note: this change relates to concept H2}

The UE shall start the timer LIPA_Connectivity if it receives indication from the lower layers that the UE has performed an handover from a CSG cell to:

- a target cell with a different CSG identity, or
- to a cell that is not a CSG cell.

* * * End of next change * * *

* Next change *

5.3.1.2 Release of the NAS signalling connection

The signalling procedure for the release of the NAS signalling connection is initiated by the network.

In S1 mode, when the RRC connection has been released, the UE shall enter EMM-IDLE mode and consider the NAS signalling connection released.

When the UE enters EMM-IDLE mode, the UE shall store the current native EPS security context as specified in annex C and mark it as valid.

{authors comment: for embodiment F with timer (F.2)}

When the UE enters EMM-IDLE mode, if the UE has at least one LIPA PDN connection, then the UE shall start the timer LIPA_ CONNECTIVITY.

When the UE enters EMM-IDLE mode, if the UE has at least one LIPA PDN connection, then the UE shall store the identity of the current CSG cell.

...

* End of next change *

* Next change *

*5.5.3 Tracking area updating procedure (S1 mode only)*

5.5.3.1 General

The tracking area updating procedure is always initiated by the UE and is used for the following purposes:

- normal tracking area updating to update the registration of the actual tracking area of a UE in the network;
- combined tracking area updating to update the registration of the actual tracking area for a UE in CS/PS mode 1 or CS/PS mode 2 of operation;
- periodic tracking area updating to periodically notify the availability of the UE to the network;
- IMSI attach for non-EPS services when the UE is attached for EPS services. This procedure is used by a UE in CS/PS mode 1 or CS/PS mode 2 of operation;
- in various cases of inter-system change from Iu mode to S1 mode or from A/Gb mode to S1 mode (for details see subclauses 5.5.3.2.2 and subclause 5.5.3.3.2);
- S101 mode to S1 mode inter-system change;
- MME load balancing;
- to update certain UE specific parameters in the network (for details see subclauses 5.5.3.2.2 and subclause 5.5.3.3.2);
- recovery from certain error cases (for details see subclauses 5.5.3.2.2 and subclause 5.5.3.3.2);
- to indicate that the UE enters S1 mode after CS fallback or 1xCS fallback;
- to indicate to the network that the UE has selected a CSG cell whose CSG identity is not included in the UE's Allowed CSG list or in the UE's Operator CSG list; and
- to indicate to the network that the UE's availability for terminating voice calls in the IMS has changed to "available"
- to synchronize the UE EPS bearer context with the MME EPS bearer context for UE mobility where the source cell is a CSG cell and the target cell is not a CSG cell, when the UE has at least one LIPA PDN connection.
- to synchronize the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection.

* * * End of next change * * *

> * Next change *

5.5.3.2 Normal and periodic tracking area updating procedure

*5.5.3.2.1 General*

The periodic tracking area updating procedure is controlled in the UE by timer T3412. When timer T3412 expires, the periodic tracking area updating procedure is started. Start and reset of timer T3412 is described in subclause 5.3.5.

*5.5.3.2.2 Normal and periodic tracking area updating procedure initiation*

The UE in state EMM-REGISTERED shall initiate the tracking area updating procedure by sending a TRACKING AREA UPDATE REQUEST message to the MME, a) when the UE detects entering a tracking area that is not in the list of tracking areas that the UE previously registered in the MME;

b) when the periodic tracking area updating timer T3412 expires;

c) when the UE enters EMM-REGISTERED.NORMAL-SERVICE and the UE's TIN indicates "P-TMSI";

d) when the UE performs an inter-system change from S101 mode to S1 mode and has no user data pending;

e) when the UE receives an indication from the lower layers that the RRC connection was released with cause "load balancing TAU required";

f) when the UE deactivated EPS bearer context(s) locally while in EMM-REGISTERED.NO-CELL-AVAILABLE, and then returns to EMM-REGISTERED.NORMAL-SERVICE;

g) when the UE changes the UE network capability information or the MS network capability information or both;

h) when the UE changes the UE specific DRX parameter;

i) when the UE receives an indication of "RRC Connection failure" from the lower layers and has no signalling or user uplink data pending (i.e when the lower layer requests NAS signalling connection recovery);

j) when the UE enters S1 mode after 1xCS fallback;

k) when due to manual CSG selection the UE has selected a CSG cell whose CSG identity is not included in the UE's Allowed CSG list or in the UE's Operator CSG list;

l) when the UE reselects an E-UTRAN cell while it was in GPRS READY state or PMM-CONNECTED mode;

m) when the UE supports SRVCC to GERAN or UTRAN and changes the mobile station classmark 2 or the supported codecs, or the UE supports SRVCC to GERAN and changes the mobile station classmark 3;

n) when the UE changes the radio capability for GERAN or cdma2000® or both;

o) when the UE's usage setting or the voice domain preference for E-UTRAN change in the UE; or p) when the UE's availability for terminating voice calls in the IMS changes from "not available" to "available" and the TIN indicates "RAT-related TMSI" and the voice domain preference as defined in 3GPP TS 24.167 [13B] is not "CS voice only" and the UE is configured with "Mobility Management for IMS Voice Termination" enabled as defined in 3GPP TS 24.167 [13B].

{authors comment: for embodiments F1 and H1} q) when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

{authors comment: for embodiment F with timer (F.2)} q) when the timer LIPA_CONNECTIVITY timer expires and the UE has received an indication from the lower layers that the UE has moved to a target CSG cell and the UE determines that the target CSG cell has a CSG identity that is different from the CSG identity stored when the UE entered the EMM-IDLE mode, or to a cell that is not a CSG cell.

{ authors comment: for embodiment in active mode H2} q) when the timer LIPA_CONNECTIVITY timer is running and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection.

Note: the conditions described above are equivalent to the conditions in which the UE receives an indication from the lower layers that the UE has performed an handover from a CSG cell to a target cell with a different CSG identity, or to a cell that is not a CSG cell.

NOTE 1: Whether the "Mobility Management for IMS Voice Termination" setting is stored in the IMS management object as defined in 3GPP TS 24.167 [13B] or in the UE is an implementation option. If this setting is missing, then "Mobility Management for IMS Voice Termination" is disabled.

```
* * * End of next change * * *
```

> * * * Next change * * *

5.5.3.2.5 Normal and periodic tracking area updating procedure not accepted by the network If the tracking area updating cannot be accepted by the network, the MME sends a TRACKING AREA UPDATE REJECT message to the UE including an appropriate EMM cause value.

If the MME receives a TRACKING AREA UPDATE REQUEST from a UE in a cell that is not a CSG cell, and the MME determines that the UE has only LIPA PDN connections, then the MME shall reject the tracking area updating procedure.

Upon receiving the TRACKING AREA UPDATE REJECT message, the UE shall stop timer T3430, stop any transmission of user data, and take the following actions depending on the EMM cause value received.

3 (Illegal UE); or

6 (Illegal ME);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall delete the list of equivalent PLMNs and shall enter the state EMM-DEREGISTERED.

> If A/Gb mode or Iu mode is supported by the UE, the UE shall handle the GMM parameters GMM state, GPRS update status, P-TMSI, P-TMSI signature, RAI and GPRS ciphering key sequence number and the MM parameters update status, TMSI, LAI and ciphering key sequence number as specified in 3GPP TS 24.008 [13] for the case when the normal routing area updating procedure is rejected with the GMM cause with the same value. The USIM shall be considered as invalid also for non-EPS services until switching off or the UICC containing the USIM is removed.

NOTE: The possibility to configure a UE so that the radio transceiver for a specific radio access technology is not active, although it is implemented in the UE, is out of scope of the present specification.

7 (EPS services not allowed);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall delete the list of equivalent PLMNs and shall enter the state EMM-DEREGISTERED.

If A/Gb mode or Iu mode is supported by the UE, the UE shall handle the GMM parameters GMM state, GPRS update status, P-TMSI, P-TMSI signature, RAI and GPRS ciphering key sequence number as specified in 3GPP TS 24.008 [13] for the case when the normal routing area updating procedure is rejected with the GMM cause with the same value.

9 (UE identity cannot be derived by the network);

The UE shall set the EPS update status to EU2 NOT UPDATED (and shall store it according to subclause 5.1.3.3) and shall delete any GUTI, last visited registered TAI, TAI list and eKSI. The UE shall delete the list of equivalent PLMNs and shall enter the state EMM-DEREGISTERED.

Subsequently, the UE shall automatically initiate the attach procedure.

If A/Gb mode or Iu mode is supported by the UE, the UE shall handle the GMM parameters GMM state, GPRS update status, P-TMSI, P-TMSI signature, RAI and GPRS ciphering key sequence number as specified in 3GPP TS 24.008 [13] for the case when the normal routing area updating procedure is rejected with the GMM cause with the same value.

10(Implicitly detached);

The UE shall delete the list of equivalent PLMNs and shall enter the state EMM-DEREGISTERED.NORMAL-SERVICE. The UE shall delete any mapped EPS security context or partial native EPS security context. The UE shall then perform a new attach procedure. If the UE has only LIPA PDN connections when the MME provides cause #10 in a TRACKING AREA UPDATE REJECT, the UE may use an APN in the attach procedure that is different from the APNs corresponding to the LIPA PDN connections.

If A/Gb mode or Iu mode is supported by the UE, the UE shall handle the GMM state as specified in 3GPP TS 24.008 [13] for the case when the normal routing area updating procedure is rejected with the GMM cause with the same value.

The MME shall sends a TRACKING AREA UPDATE REJECT and indicate Implicitly detached if the MME received the TRACKING AREA UPDATE REQUEST from a UE in a cell that is not a CSG cell and the MME determines that the UE has only LIPA PDN connections.

...

{authors' comment: alternative embodiment}

40(No EPS bearer context activated);

The UE shall delete the list of equivalent PLMNs and deactivate all the EPS bearer contexts locally, if any, and shall enter the state EMM-DEREGISTERED.NORMAL-SERVICE. The UE shall then perform a new attach procedure.

The MME shall sends a TRACKING AREA UPDATE REJECT and indicate No EPS bearer context activated if the MME received the TRACKING AREA UPDATE REQUEST from a UE in a cell that is not a CSG cell and the MME determines that the UE has only LIPA PDN connections.

\*\*\* End of next change \*\*\*

\*\*\* Next change \*\*\*

5.5.3.3 Combined tracking area updating procedure

*5.5.3.3.1 General*

Within a combined tracking area updating procedure the messages TRACKING AREA UPDATE ACCEPT and TRACKING AREA UPDATE COMPLETE carry information for the tracking area updating and the location area updating.

The combined tracking area updating procedure follows the normal tracking area updating procedure described in subclause 5.5.3.2.

*5.5.3.3.2 Combined tracking area updating procedure initiation*

The UE operating in CS/PS mode 1 or CS/PS mode 2, in state EMM-REGISTERED, shall initiate the combined tracking area updating procedure:

a) when the UE that is attached for both EPS and non-EPS services detects entering a tracking area that is not in the list of tracking areas that the UE previously registered in the MME;

b) when the UE that is attached for EPS services wants to perform an attach for non-EPS services. In this case the EPS update type IE shall be set to "combined TA/LA updating with IMSI attach";

c) when the UE performs an intersystem change from A/Gb mode to S1 mode and the EPS services were previously suspended in A/Gb mode;

d) when the UE performs an intersystem change from A/Gb or Iu mode to S1 mode and the UE previously performed a location area update procedure or a combined routing area update procedure in A/Gb or Iu mode, in order to re-establish the SGs association. In this case the EPS update type IE shall be set to "combined TA/LA updating with IMSI attach";

e) when the UE enters EMM-REGISTERED.NORMAL-SERVICE and the UE's TIN indicates "P-TMSI";

f) when the UE receives an indication from the lower layers that the RRC connection was released with cause "load balancing TAU required";

g) when the UE deactivated EPS bearer context(s) locally while in EMM-REGISTERED.NO-CELL-AVAILABLE, and then returns to EMM-REGISTERED.NORMAL-SERVICE;

h) when the UE changes the UE network capability information or the MS network capability information or both;

i) when the UE changes the UE specific DRX parameter;

j) when the UE receives an indication of "RRC Connection failure" from the lower layers and has no signalling or user uplink data pending (i.e when the lower layer requests NAS signalling connection recovery);

k) when due to manual CSG selection the UE has selected a CSG cell whose CSG identity is not included in the UE's Allowed CSG list or in the UE's Operator CSG list;

l) when the UE reselects an E-UTRAN cell while it was in GPRS READY state or PMM-CONNECTED mode;

m) when the UE supports SRVCC to GERAN or UTRAN and changes the mobile station classmark 2 or the supported codecs, or the UE supports SRVCC to GERAN and changes the mobile station classmark 3;

n) when the UE changes the radio capability for GERAN or cdma2000® or both;

o) when the UE's usage setting or the voice domain preference for E-UTRAN change in the UE; or p) when the UE's availability for terminating voice calls in the IMS changes from "not available" to "available" and the TIN indicates "RAT-related TMSI" and the UE is configured with "Mobility Management for IMS Voice Termination" enabled as defined in 3GPP TS 24.167 [13B].

{authors comment: for embodiments F1 and H1} q) when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

{authors comment: for embodiment F with timer (F.2)} q) when the timer LIPA_CONNECTIVITY timer expires and the UE has received an indication from the lower layers that the UE has moved to a target CSG cell and the UE determines that the target CSG cell has a CSG identity that is different from the CSG identity stored when the UE entered the EMM-IDLE mode, or to a cell that is not a CSG cell.

{ authors comment: for embodiment in active mode H2} q)when the timer LIPA_CONNECTIVITY timer is running and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection.

Note: the conditions described above are equivalent to the conditions in which the UE receives an indication from the lower layers that the UE has performed an handover from a CSG cell to a target cell with a different CSG identity, or to a cell that is not a CSG cell.

NOTE: Whether the "Mobility Management for IMS Voice Termination" setting is stored in the IMS management object as defined in 3GPP TS 24.167 [13B] or in the UE is an implementation option. If this setting is missing, then "Mobility Management for IMS Voice Termination" is disabled.

* * * End of next change * * *

* * * Next change * * *

5.5.3.3.5 Combined tracking area updating procedure not accepted by the network If the combined tracking area updating cannot be accepted by the network, the MME shall send a TRACKING AREA UPDATE REJECT message to the UE including an appropriate EMM cause value.

If the MME receives a TRACKING AREA UPDATE REQUEST from a UE in a cell that is not a CSG cell, and the MME determines that the UE has only LIPA PDN connections, then the MME shall reject the tracking area updating procedure.

Upon receiving the TRACKING AREA UPDATE REJECT message, the UE shall stop timer T3430, stop any transmission of user data, enter state MM IDLE, and take the following actions depending on the EMM cause value received.

3 (Illegal UE);

6 (Illegal ME); or

8 (EPS services and non-EPS services not allowed);

> The UE shall set the EPS update status to EU3 ROAMING NOT ALLOWED (and shall store it according to subclause 5.1.3.3) and shall delete any GUTI, last visited registered TAI, TAI Listand eKSI.
>
> The UE shall consider the USIM as invalid for EPS and non-EPS services until switching off or the UICC containing the USIM is removed. Additionally, the UE shall delete the list of equivalent PLMNs and shall enter the state EMM-DEREGISTERED.
>
> If A/Gb mode or Iu mode is supported by the UE, the UE shall handle the MM parameters update status, TMSI, LAI and ciphering key sequence number, and the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.

7 (EPS services not allowed);

> The UE shall set the EPS update status to EU3 ROAMING NOT ALLOWED (and shall store it according to subclause 5.1.3.3) and shall delete any GUTI, last visited registered TAI, TAI List and eKSI. The UE shall consider then USIM as invalid for EPS services until switching off or the UICC containing the USIM is removed. The UE shall delete the list of equivalent PLMNs and shall enter the state EMM-DEREGISTERED.
>
> A UE in CS/PS mode 1 or CS/PS mode 2 of operation is still IMSI attached for non-EPS services. The UE shall set the update status to U2 NOT UPDATED, shall select GERAN or UTRAN radio access technology and proceed with appropriate MM specific procedure according to the MM service state. The UE shall not reselect E-UTRAN radio access technology until switching off or the UICC containing the USIM is removed.

NOTE: Some interaction is required with the access stratum to disable E-UTRAN cell reselection.

> If A/Gb mode or Iu mode is supported by the UE, the UE shall in addition handle the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.

9 (UE identity cannot be derived by the network);

> The UE shall set the EPS update status to EU2 NOT UPDATED (and shall store it according to subclause 5.1.3.3) and shall delete any GUTI, last visited registered TAI, TAI List and eKSI. The UE shall delete the list of equivalent PLMNs and enter the state EMM-DEREGISTERED.
>
> Subsequently, the UE shall automatically initiate the attach procedure.
>
> If A/Gb mode or Iu mode is supported by the UE, the UE shall in addition handle the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.
>
> A UE in CS/PS mode 1 or CS/PS mode 2 of operation is still IMSI attached for non-EPS services.

10(Implicitly detached);

> The UE shall delete the list of equivalent PLMNs and shall enter the state EMM-DEREGISTERED.NORMAL-SERVICE. The UE shall delete any mapped EPS security context or partial native EPS security context. The UE shall then perform a new attach procedure. If the UE has only LIPA PDN connections when the MME provides cause #10 in a TRACKING AREA UPDATE REJECT, the UE may use an APN in the attach procedure that is different from the APNs corresponding to the LIPA PDN connections.

If A/Gb mode or Iu mode is supported by the UE, the UE shall in addition handle the GMM state as specified in 3GPP TS 24.008 [13] for the case when the combined routing area updating procedure is rejected with the GMM cause with the same value.

A UE in CS/PS mode 1 or CS/PS mode 2 of operation is still IMSI attached for non-EPS services.

The MME shall sends a TRACKING AREA UPDATE REJECT and indicate Implicitly detached if the MME received the TRACKING AREA UPDATE REQUEST from a UE in a cell that is not a CSG cell and the MME determines that the UE has only LIPA PDN connections.

{authors' comment: alternative embodiment}

40(No EPS bearer context activated);

The UE shall delete the list of equivalent PLMNs and deactivate all the EPS bearer contexts locally, if any, and shall enter the state EMM-DEREGISTERED.NORMAL-SERVICE. The UE shall then perform a new attach procedure.

The MME shall sends a TRACKING AREA UPDATE REJECT and indicate No EPS bearer context activated if the MME received the TRACKING AREA UPDATE REQUEST from a UE in a cell that is not a CSG cell and the MME determines that the UE has only LIPA PDN connections.

\* \* \* End of next change \* \* \*

\* \* \* Next change \* \* \*

*6.5.2 UE requested PDN disconnect procedure*

6.5.2.1 General

The purpose of the UE requested PDN disconnection procedure is for a UE to request disconnection from one PDN. The UE can initiate this procedure to disconnect from any PDN as long as it is connected to at least one other PDN. With this procedure, all EPS bearer contexts established towards this PDN, including the default EPS bearer context, are released.

6.5.2.2 UE requested PDN disconnection procedure initiation

In order to request PDN disconnection from a PDN, the UE shall send a PDN DISCONNECT REQUEST message to the MME, start the timer T3492 and enter the state PROCEDURE TRANSACTION PENDING (see example in figure 6.5.2.2.1). The PDN DISCONNECT REQUEST message shall include the EPS bearer identity of the default bearer associated with the PDN to disconnect from as the linked EPS bearer identity in the PDN DISCONNECT REQUEST message.

If the UE has at least one PDN connection that is not a LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, the UE shall send a PDN Disconnect Request for each LIPA PDN connection.

{authors comment: for embodiment F with timer (F.2)}

If the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell and the timer LIPA_ CONNECTIVITY has expired, the UE shall send a PDN Disconnect Request for each LIPA PDN connection { authors comment: for embodiment in active mode H2}

If the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell and the timer LIPA_ CONNECTIVITY has expired, and the UE has uplink user data to send over a LIPA PDN connection, the UE shall send a PDN Disconnect Request for each LIPA PDN connection.

* * * End of next change * * *

=================End of Change=========================================

- Change for one embodiment for 3GPP TS 44.018

=================Begin of Change========================================

*3.4.4 Handover procedure*

In dedicated mode, dual transfer mode or group transmit mode, an intercell or intracell change of channel(s) can be requested by the network RR sublayer. This change may be performed through the handover procedure. In case of intercell change in dual transfer mode, the DTM handover procedure can be used to change one dedicated channel together with one or more packet data channels (see sub-clause 3.7).

The network RR sublayer shall not request an intercell or intracell change of channel when a mobile station has temporarily entered the dedicated mode on a SDCCH, in order to initiate a priority uplink request.

For a talker in group transmit mode, the network RR sublayer shall delay the allocation of resources for handover of the talker to the voice group call channel of the target cell if the uplink of the target cell has already been granted to a subscriber with priority (this collision case may occur if the network supports uplink access option (i) as defined in 3GPP TS 43.068). If the allocation of the uplink to the new subscriber is confirmed, the network shall cancel the handover resource request and release the current talker. If the request for the uplink is rejected, the network proceeds with the handover of the current talker. Alternatively instead of delaying the handover, it may be continued to a different cell if possible.

> NOTE: The decision to do a handover and the choice of the new cell is out of the scope of this technical specification.

The purpose of the handover procedure is to completely modify the channels allocated to the mobile station e.g. when the cell is changed. A change in the channel configuration nature is possible. This procedure is used only while in dedicated mode, dual transfer mode or group transmit mode.

The handover procedure shall not be used for changing between dependent configurations (see sub-clause 3.4.3).

The handover procedure includes:

- The suspension of normal operation except for RR management (layer 3).
- The disconnection of the main signalling link, and of the other links via local end release (layer 2), and the disconnection of the TCH(s) if any.
- The abortion of the packet resources (see 3GPP TS 44.060), if in class A mode of operation.
- The disconnection and the deactivation of previously assigned channels and their release (layer 1).
- The activation of the new channels, and their connection if applicable.
- The triggering of the establishment of data link connection for SAPI = 0 on the new channels.

The handover procedure is always initiated by the network.

3.4.4.1 Handover initiation

The network initiates the handover procedure by sending a HANDOVER COMMAND message to the mobile station on the main DCCH. It then starts timer T3103.

If the HANDOVER COMMAND message refers to a cell to which the mobile station is not synchronised to, this shall not be considered as an error (see 3GPP TS 45.008).

NOTE: The network should take into account limitations of certain mobile stations to understand formats used in the Frequency List IE, Frequency Short List IE, and Cell Channel Description IE used in the HANDOVER COMMAND message, see sub-clause 10.5.2.13, sub-clause 10.5.2.14, and sub-clause 10.5.2.1b.

When sending this message on the network side, and when receiving it on the mobile station side, all transmission of signalling layer messages except for those RR messages needed for this procedure and for abnormal cases, is suspended until resuming is indicated. These RR messages can be deduced from sub-clauses 3.4.3 and 8.5.1 "Radio Resource management".

Upon receipt of the HANDOVER COMMAND message, the mobile station initiates, as described in sub-clause 3.1.4, the release of link layer connections, disconnects the physical channels (including the packet resources, if in class A mode of operation), commands the switching to the assigned channels and initiates the establishment of lower layer connections (this includes the activation of the channels, their connection and the establishment of the data links). The mobile station shall provide indication to the upper layer if the handover is from a CSG cell to another CSG cell or from a CSG cell to a cell that is not a CSG cell. If the target cell is a CSG cell, the mobile station shall provide to the upper layer the CSG ID of the target cell.

Alternatively:

If the current cell is a CSG cell, the mobile station shall provide indication to the upper layer. If the target cell is a CSG cell, the mobile station shall provide to the upper layer the CSG ID of the target cell.Alternatively:

If the source cell is a CSG cell, the mobile station shall provide indication to the upper layer. If the target cell is a CSG cell, the mobile station shall provide to the upper layer the CSG ID of the target cell.The HANDOVER COMMAND message contains:

- The characteristics of the new channels, including for the multislot configuration and the TCH/H + TCH/H + ACCHs configuration the exact ACCHs to be used. The message may also contain definitions of the channel mode to be applied for one or several channel sets. If a previously undefined channel set is defined by the HANDOVER COMMAND message, a definition of the channel mode for the new channel set shall be included in the message.

- The characteristics of the new cell that are necessary to successfully communicate (e.g. frequency list in the case of slow frequency hopping), including the data that allows the mobile station to use the pre-knowledge about synchronization it acquires by the measurement process (i.e. BSIC + BCCH frequency).

- A power command (cf. 3GPP TS 45.008). The power level defined in this power command shall be used by the mobile station for the initial power on the new channel(s). It shall not affect the power used on the old channel(s).

- An indication of the physical channel establishment procedure to be used.

- A handover reference, used as specified in the following sub-clause. The choice of the handover reference by the network is out of the scope of this specification and left to the manufacturers.

- Optionally a timing advance to be used on the new cell.

- Optionally a cipher mode setting. In that case, this ciphering mode has to be applied on the new channel. If no such information is present, the ciphering mode is the same as on the previous channel. In either case the ciphering key shall not be changed as long as the key length remains unchanged. However, in case of a switch between ciphering algorithms requiring different key lengths, i.e. 64 or 128 bits, a change from the 64 bit key to the 128 bit key or vice versa must be performed. In the case of GERAN A/Gb mode to GERAN A/Gb mode handover, the HANDOVER COMMAND message shall not contain a cipher mode setting IE that indicates "start ciphering" unless a CIPHERING MODE COMMAND message has been transmitted previously in this instance of the dedicated mode or ciphering has been started earlier in UTRAN: if such a HANDOVER COMMAND message is received it shall be regarded as erroneous, a HANDOVER FAILURE message with cause "Protocol error unspecified" shall be returned immediately, and no further action taken. In the case of UTRAN to GERAN A/Gb mode handover or GERAN Iu mode to GERAN A/Gb mode handover or E-UTRAN to GERAN A/Gb mode SRVCC handover (see 3GPP TS 23.216 [94], 3GPP TS 29.280 [95]), the HANDOVER COMMAND message, which is sent transparently via RNC/BSC/eNB from BSS to the mobile station, shall always contain the cipher mode setting IE to indicate the ciphering mode to be used in GERAN A/Gb mode. The cipher mode setting IE shall not indicate "start ciphering" unless ciphering was activated before the handover. If ciphering was not activated before and a HANDOVER COMMAND message with a cipher mode setting IE indicating "start ciphering" is received it shall be regarded as erroneous, a HANDOVER FAILURE message with cause "Protocol error unspecified" shall be returned immediately, and no further action taken. In the case of CDMA2000 to GERAN A/Gb mode handover, the HANDOVER COMMAND message, which is sent transparently via RNC from BSS to the mobile station, shall always contain the cipher mode setting IE.

- Optionally, in a voice group call, a VGCS target mode information element defining which RR mode is to be used on the new channel (i.e. dedicated mode or group transmit mode). If this information element is not present, the mode shall be assumed to be the same as on the previous channel. When the RR mode on the new channel is group transmit mode, the VGCS target mode information element shall also indicate the group cipher key number for the group cipher key to be used on the new channel or if the new channel is non ciphered. Additionally, when the RR mode is group transmit mode and the group cipher key number is non zero, then the VGCS Ciphering Parameters information element shall contain the CELL_GLOBAL_COUNT and optionally contain the VSTK_RAND, the target cell identity, the cell's location area. If the VGCS target mode information element is not present, the ciphering mode and ciphering key shall be assumed to be the same as on the previous channel. If any of the following parameters are not included in the VGCS Ciphering Parameters information element, the parameter shall be assumed to be the same as on the previous channel: VSTK_RAND, the target cell identity, or the cell's location area. The network shall include the VSTK_RAND (within the VGCS Ciphering Parameters IE) if the group call is ciphered, the new RR mode is group transmit mode and the old RR mode is dedicated mode or is not known. Mobile stations not supporting VGCS talking shall ignore the HANDOVER COMMAND message if the VGCS target mode information element or VGCS Ciphering Parameters information element is included in the message and shall send an RR STATUS message to the network with cause #96. If the HANDOVER COMMAND message contains a cipher mode setting information element together with either a VGCS target mode information element indicating a RR mode of group transmit mode, or a VGCS Ciphering Parameters information element, , then a mobile station supporting VGCS talking shall regard the message as erroneous, an HANDOVER FAILURE message with cause "Protocol error unspecified" shall be returned immediately, and no further action taken.

- Optionally, in a voice group call, if the RR mode of the new channel is dedicated mode, a cipher mode setting IE. In that case, this ciphering mode shall be applied on the new channel. If no such information is present, the ciphering mode is the same as on the previous channel, provided that the previous channel was also a dedicated channel. If no such information is present and the previous channel had RR mode group transmit mode, the new ciphering mode is "no ciphering". In either case the ciphering key to be used on the dedicated channel is the individual GSM ciphering key. The HANDOVER COMMAND message shall not contain a cipher mode setting IE that indicates "start ciphering", unless a CIPHERING MODE COMMAND message has been transmitted earlier in the RR connection or a group cipher key number different from zero has been transmitted for this voice group call. If a HANDOVER COMMAND message is received that contains a cipher mode setting IE indicating "start ciphering" and the mobile station has received neither a CIPHERING MODE COMMAND message earlier in the RR connection nor a group cipher key number different from zero for this voice group call, via any channel, then the HANDOVER COMMAND message shall be considered as erroneous, the mobile station shall send an HANDOVER FAILURE with cause "Protocol error unspecified", and no further action taken.

- Optionally, when the channel mode indicates that a multi-rate speech codec must be applied, the MultiRateconfiguration to be used in the new cell. The MultiRate Configuration IE defines the set of codec mode and related information to use after the handover. When accessing the new channel, the mobile station shall use for the Initial Codec Mode the mode specified in the MultiRate Configuration IE, if present, or apply by default the implicit rule defined in 3GPP TS 45.009.

- Optionally, if the network supports dedicated mode MBMS notification and the mobile previously completed the service information sending to the network, an indication of whether the service information sending should be completed on the main DCCH of the new cell.

In addition, a HANDOVER COMMAND message may indicate a frequency change in progress, with a starting time and possibly alternative channel descriptions.

In the case of the reception of a HANDOVER COMMAND message which contains only the description of a channel to be used after the starting time, the mobile station shall wait up to the starting time before accessing the channel. If the starting time has already elapsed, the mobile shall access the channel as an immediate reaction to the reception of the message (see 3GPP TS 45.010 for the timing constraints).

In the case of a handover towards a GERAN cell to which the mobile station is not synchronised to and in the case of an intersystem handover to GERAN, at the reception of a HANDOVER COMMAND message which contains only the description of a channel to be used after the starting time, the mobile station shall wait up to the starting time before accessing the new channel. If the starting time has already elapsed, the mobile shall access the new channel as an immediate reaction to the reception of the message (see 3GPP TS 45.010 for the timing constraints). Between the reception of the HANDOVER COMMAND and the starting time there is no requirement for the mobile station to receive or transmit on the old channel.

NOTE: This case may result to a long interruption and should not be used.

If the message contains both the description of a channel to be used after the indicated time and of a channel to be used before, the mobile station accesses a channel as an immediate reaction to the reception of the message. If the moment the mobile station is ready to access is before the indicated time, the mobile station accesses the channels described for before the starting time. The mobile station then changes to the channel described for after the starting time at the indicated time. New parameters can be frequency list, MAIO and HSN. Other parameters describing the allocated channels must be identical to the parameters described for before the starting time. If the moment the mobile station is ready to access is after the starting time, the mobile station accesses the channel described for after the starting time.

In the case of a handover from a GERAN cell, if the channel mode indicates that a multi-rate speech codec must be applied, and the MultiRateConfiguration IE is not included in the HANDOVER COMMAND message, then the mobile station shall use on the new channel the AMR configuration it was using on the old channel when it received the HANDOVER COMMAND message. The MultiRate Configuration IE shall be included in the case of full rate channel to half rate channel handover or in the case of a change of multi-rate speech version.. If not included in thosecases, the mobile station shall behave as if the MultiRate Configuration IE was inconsistent (see sub-clause 3.4.4.4).

In the case of an intersystem handover to GERAN, if the channel mode indicates that a multi-rate speech codec must be applied, the MultiRateConfiguration IE shall be included in the HANDOVER COMMAND message. If not included the mobile station shall treat the HANDOVER COMMAND message as invalid and shall perform the corresponding RRC error handling, see 3GPP TS 25.331.

In the case of a VGCS talker that is handed over to a ciphered VGCS group channel the MS shall calculate the voice group ciphering keys from the following parameters, as described in 3GPP TS 43.020:

- VSTK_RAND;
- CGI(as supplied in the Handover Command);
- CELL_GLOBAL_COUNT (value of parameter in the target cell, as supplied in the Handover Command);
- Group Cipher Key Number (value obtained via the Handover Command);
- B22_COUNT - Bit 22 of COUNT ( as defined in 3GPP TS 43.020).

The HANDOVER COMMAND message shall provide the VGCS talker with the above parameters if the values have changed on handover or if the MS was not using VGCS/VBS ciphering prior to handover.

When the VGCS talker is handed over to a channel that is ciphered with VGCS ciphering, the talker adjust and maintain the CELL_GLOBAL_COUNT provided in the HANDOVER COMMAND message as described in sub-clause 3.3.3.1. Also, this talker shall fetch from the USIM the identity of its ciphering algorithm to use on the new resource, as described in 3GPP TS 43.020.

In the case of a VGCS talker that is handover a dedicated channel, the setting of the Cipher Mode IE in the HANDOVER COMMAND message shall indicate if the dedicated resource is ciphered. If the new resource is ciphered then the MS shall assume the following:

- the Cipher Mode Setting IE shall indicate the identity of the ciphering algorithm to use on the dedicated channel;. If this information is not present the MS shall use the algorithm that was last used when on a ciphered dedicated channel;

- the ciphering key sequence number shall be the same value as when the MS was last used on a ciphered dedicated channel.

==================End of Change=========================================

- Change for one embodiment for 3GPP TS 29.274

=================Begin of Change=========================================

*7.3.6 Context Response*

A Context Response message shall be sent as a response to a previous Context Request message during TAU/RAU procedure.

Possible Cause values are:

- "Request Accepted"
- "IMSI not known"
- "System failure"
- "Mandatory IE incorrect"
- "Conditional IE missing".
- "Invalid message format"
- "P-TMSI Signature mismatch"
- "User authentication failed"

If the source MME/SGSN has one or more PDN connection IE, presented in Table 7.3.6-2, regarding LIPA and the source MME/SGSN learns based on operator configuration that the target MME/SGSN is not aware of LIPA PDN connection, the source MME/SGSN shall omit the PDN connection IE regarding LIPA from the Context Response message.

Table 7.3.6-1 specifies the presence requirements and conditions of the IEs in the message.

Table 7.3.6-1: Information Elements in a Context Response

| Information elements | P | Condition / Comment | IE Type | Ins. |
|---|---|---|---|---|
| Cause | M | | Cause | 0 |
| IMSI | C | The IMSI shall be included in the message except for the case:<br>- If the UE is emergency attached and the UE is UICCless.<br><br>The IMSI shall be included in the message but not used as an identifier<br>- if UE is emergency attached but IMSI is not authenticated. | IMSI | 0 |
| MME/SGSN UE MM Context | C | This IE shall be included if the Cause IE has the value " Request Accepted ". | MM Context | 0 |
| MME/SGSN UE EPS PDN Connections | C | This IE shall be included if there is at least a PDN connection for this UE on the sending MME/SGSN. Several IEs with this type and instance values shall be included as necessary to represent a list of PDN Connections. | PDN Connection | 0 |
| Sender F-TEID for Control Plane | C | This IE specifies the address and the TEID for control plane message which is chosen by the old MME/SGSN. | F-TEID | 0 |
| SGW S11/S4 IP Address and TEID for Control Plane | C | This IE shall be included if a SGW is being used by the old MME/SGSN. | F-TEID | 1 |
| SGW node name | C | This IE shall be included if the source MME or SGSN has the source SGW FQDN. This IE identifies the SGW that was used by the old MME/SGSN. | FQDN | 0 |
| Indication Flags | C | This IE shall be included if any of the flags are set to 1.<br><br>Idle mode Signalling Reduction Supported Indication:<br>- This flag shall be set to 1 if the Cause IE value indicates "Request accepted" and the old system has the ISR capability.<br><br>Unauthenticated IMSI:<br>- This flag shall be set to 1 if the IMSI present in the message is not authenticated and is for an emergency attached UE.<br><br>Change Reporting support indication flag:<br>- This flag shall be set to 1 if the Source S4-SGSN/MME supports Location Change Reporting mechanism. | Indication | 0 |
| Trace Information | C | This IE shall be included when session trace is active for this IMSI/IMEI. | Trace Information | 0 |
| HRPD access node S101 IP address | C | This IE shall be included only if the HRPD pre registration was performed at the old MME | IP-Address | 0 |
| 1xIWS S102 IP address | C | This IE shall be included only if the 1xRTT CS fallback pre registration was performed at the old MME | IP-Address | 1 |
| Subscribed RFSP Index | CO | This IE shall be included only during inter-MME/SGSN mobility procedures, if the source MME/SGSN receives it from an HSS. | RFSP Index | 0 |
| RFSP Index in Use | CO | This IE shall be included only during inter-MME/SGSN mobility procedures, if the source MME/SGSN supports the feature. | RFSP Index | 1 |
| Private Extension | O | | Private Extension | VS |

Table 7.3.6-2: MME/SGSN UE EPS PDN Connections within Context Response

| Octet 1 | | | | |
|---|---|---|---|---|
| Octet 1 | PDN Connection IE Type = 109 (decimal) | | | |
| Octets 2 and 3 | Length = n | | | |
| Octet 4 | Spare and Instance fields | | | |
| Information elements | P | Condition / Comment | IE Type | Ins. |
| APN | M | | APN | 0 |
| APN Restriction | C | This IE denotes the restriction on the combination of types of APN for the APN associated with this EPS bearer Context. The target MME or SGSN determines the Maximum APN Restriction using the APN Restriction. If available, the source MME/S4 SGSN shall include this IE. | APN Restriction | 0 |
| Selection Mode | CO | When available, this IE shall be included by the source MME/S4-SGSN | Selection Mode | 0 |
| IPv4 Address | C | This IE shall not be included if no IPv4 Address is assigned. | IP Address | 0 |
| IPv6 Address | C | This IE shall not be included if no IPv6 Address is assigned. | IP Address | 1 |
| Linked EPS Bearer ID | M | This IE identifies the default bearer of the PDN Connection. | EBI | 0 |
| PGW S5/S8 IP Address for Control Plane or PMIP | M | This IE shall include the TEID in the GTP based S5/S8 case and the GRE key in the PMIP based S5/S8 case. | F-TEID | 0 |
| PGW node name | C | This IE shall be included if the source MME or SGSN has the PGW FQDN. | FQDN | 0 |
| Bearer Contexts | M | Several IEs with this type and instance values may be included as necessary to represent a list of Bearers. | Bearer Context | 0 |
| Aggregate Maximum Bit Rate (APN-AMBR) | M | | AMBR | 0 |
| Charging characteristics | C | This IE shall be present if charging characteristics was supplied by the HSS to the MME/SGSN as a part of subscription information. | Charging characteristics | 0 |
| Change Reporting Action | C | This IE shall be included whenever available at the source MME/SGSN. | Change Reporting Action | 0 |
| CSG Information Reporting Action | CO | This IE shall be included whenever available at the source MME/SGSN. | CSG Information Reporting Action | 0 |

The Bearer Context shall be coded as depicted in Table 7.3.6-3.

Table 7.3.6-3: Bearer Context within MME/SGSN UE EPS PDN Connections within Context Response

| Octet 1 | Bearer Context IE Type = 93 | | | |
|---|---|---|---|---|
| Octets 2 and 3 | Length = n | | | |
| Octet 4 | Sparae and Instance fields | | | |
| Information elements | P | Condition / Comment | IE Type | Ins. |
| EPS Bearer ID | M | | EBI | 0 |
| TFT | C | This IE shall be present if a TFT is defined for this bearer. | Bearer TFT | 0 |
| SGW S1/S4/S12 IP Address and TEID for user plane | M | | F-TEID | 0 |
| PGW S5/S8 IP Address and TEID for user plane | C | This IE shall only be included for GTP based S5/S8. | F-TEID | 1 |
| Bearer Level QoS | M | | Bearer Level QoS | 0 |
| BSS Container | CO | The MME/S4 SGSN shall include the Packet Flow ID, Radio Priority, SAPI, PS Handover XID parameters in the TAU/RAU/Handover procedure, if available. | F-Container | 0 |
| Transaction Identifier | C | This IE shall be sent over S3/S10/S16 if the UE supports A/Gb and/or Iu mode. | TI | 0 |

==================End of Change=======================================

- Change for one embodiment for 3GPP TS 24.301

==================Begin of Change======================================

DEFINITIONS AND ABBREVIATIONS

3.1 Definitions

For the purposes of the present document, the terms and definitions given in 3GPP TR 21.905 [1] and the following apply. A term defined in the present document takes precedence over the definition of the same term, if any, in 3GPP TR 21.905 [1].

1x CS fallback capable UE: A UE that uses a CS infrastructure for a voice call and other CS-domain services by falling back to cdma2000® 1x access network if the UE is served by E-UTRAN when a CS service is requested.

Aggregate maximum bit rate: The maximum bit rate that limits the aggregate bit rate of a set of non-GBR bearers of a UE. Definition derived from 3GPP TS 23.401 [10].

Attached for emergency bearer services: A UE is attached for emergency bearer services if it has only a PDN connection for emergency bearer services established.

CS fallback capable UE: A UE that uses a CS infrastructure for a voice call and other CS-domain services by falling back to A/Gb or Iu mode if the UE is served by E-UTRAN when a CS service is requested.

CSG cell: A CSG cell in which only members of the CSG can get normal service. Depending on local regulation, the CSG cell can provide emergency bearer services also to subscribers who are not member of the CSG. Definition derived from 3GPP TS 23.401 [10].

CSG ID: A CSG ID is a unique identifier within the scope of one PLMN defined in 3GPP TS 23.003 [2] which identifies a Closed Subscriber Group (CSG) in the PLMN associated with a cell or group of cells to which access is restricted to members of the CSG.

CSG selection: A UE supporting CSG selection selects CSG cell either automatically based on the list of allowed CSG identities or manually based on user selection of CSG on indication of list of available CSGs. Definition derived from 3GPP TS 23.122 [6].

Dedicated bearer: An EPS bearer that is associated with uplink packet filters in the UE and downlink packet filters in the PDN GW where the filters only match certain packets. Definition derived from 3GPP TS 23.401 [10].

Default bearer: An EPS bearer that gets established with every new PDN connection. Its context remains established throughout the lifetime of that PDN connection. A default EPS bearer is a non-GBR bearer. Definition derived from 3GPP TS 23.401 [10].

Emergency EPS bearer context: a default EPS bearer context which was activated with request type "emergency", or any dedicated EPS bearer context associated to this default EPS bearer context.

EMM context: An EMM context is established in the UE and the MME when an attach procedure is successfully completed.

EMM-CONNECTED mode: A UE is in EMM-CONNECTED mode when a NAS signalling connection between UE and network is established. The term EMM-CONNECTED mode used in the present document corresponds to the term ECM-CONNECTED state used in 3GPP TS 23.401 [10].

EMM-IDLE mode: A UE is in EMM-IDLE mode when no NAS signalling connection between UE and network exists. The term EMM-IDLE mode used in the present document corresponds to the term ECM-IDLE state used in 3GPP TS 23.401 [10].

EPS security context: In the present specification, EPS security context is used as a synonym for EPS NAS security context specified in 3GPP TS 33.401 [19].

EPS services: Within the context of this specification, EPS services is used as a synonym for GPRS services in 3GPP TS 24.008 [13].

Evolved packet core network: the successor to the 3GPP Release 7 packet-switched core network, developed by 3GPP within the framework of the 3GPP System Architecture Evolution (SAE).

Evolved packet system: The evolved packet system (EPS) or evolved 3GPP packet-switched domain consists of the evolved packet core network and the evolved universal terrestrial radio access network. Definition derived from 3GPP TS 23.401 [10].

GBR bearer: An EPS bearer that uses dedicated network resources related to a guaranteed bit rate (GBR) value, which are permanently allocated at EPS bearer establishment/modification. Definition derived from 3GPP TS 23.401 [10].

Initial NAS message: A NAS message is considered as an initial NAS message, if this NAS message can trigger the establishment of a NAS signalling connection. For instance, the ATTACH REQUEST message is an initial NAS message.

IPv4v6 capability: capability of the IP stack associated with a UE to support a dual stack configuration with both an IPv4 address and an IPv6 address allocated.

Kilobit: 1000 bits.

Last Visited Registered TAI: A TAI which is contained in the TAI list that the UE registered to the network and which identifies the tracking area last visited by the UE.

Linked Bearer Identity: This identity indicates to which default bearer the additional bearer resource is linked.

LIPA PDN connection: a PDN Connection that the MME authorizes for connectivity to a PDN GW for a UE connected to a HeNB based on a request from the UE for LIPA connectivity and based on the CSG ID of the HeNB.

{alternative definition}

LIPA PDN Connection: a PDN Connection which was activated by the UE requesting LIPA connectivity type "LIPA" and the MME informing the UE of the connectivity type provided.

---

\* \* \* End of first change \* \* \*

---

\* \* \* Next change \* \* \*

---

5.6.1.5 Service request procedure not accepted by the network

If the service request cannot be accepted, the network shall return a SERVICE REJECT message to the UE including an appropriate EMM cause value. When the EMM cause value is #39 "CS domain temporarily not available", the MME shall include a value for timer T3442 in the SERVICE REJECT message.

If the MME receives a SERVICE REQUEST from UE in a cell that is not a CSG cell or a CSG cell with a CSG identity different from the CSG identity of the cell where the UE activated the PDN connection, then the MME shall return a SERVICE REJECT.

On receipt of the SERVICE REJECT message, the UE shall stop timer T3417 and take the following actions depending on the received EMM cause value.

3 (Illegal UE); or

6 (Illegal ME);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall enter the state EMM-DEREGISTERED.
>
> If A/Gb mode or Iu mode is supported by the UE, the UE shall handle the GMM parameters GMM state, GPRS update status, P-TMSI, P-TMSI signature, RAI and GPRS ciphering key sequence number and the MM parameters update status, TMSI, LAI and ciphering key sequence number as specified in 3GPP TS 24.008 [13] for the case when the service request procedure is rejected with the GMM cause with the same value. The USIM shall be considered as invalid also for non-EPS services until switching off or the UICC containing the USIM is removed.
>
> NOTE 1: The possibility to configure a UE so that the radio transceiver for a specific radio access technology is not active, although it is implemented in the UE, is out of scope of the present specification.

7 (EPS services not allowed);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall enter the state EMM-DEREGISTERED.
>
> A UE operating in CS/PS mode 1 or CS/PS mode 2 of operation is still IMSI attached for non-EPS services. The UE shall set the update status to U2 NOT UPDATED, shall select GERAN or UTRAN radio access technology and proceed with appropriate MM specific procedure according to the MM service state. The UE shall not reselect E-UTRAN radio access technology until switching off or the UICC containing the USIM is removed.
>
> NOTE 2: Some interaction is required with the access stratum to disable E-UTRAN cell reselection.
>
> If A/Gb mode or Iu mode is supported by the UE, the UE shall handle the GMM parameters GMM state, GPRS update status, P-TMSI, P-TMSI signature, RAI and GPRS ciphering key sequence number as specified in 3GPP TS 24.008 [13] for the case when the service request procedure is rejected with the GMM cause with the same value.

{Authors' note: first embodiment of concept L, new cause}

X (new PDN connection required)

> The UE shall perform a UE requested PDN connectivity procedure. If the UE has only LIPA PDN connections and receives cause #X from the MME, the UE may use an APN in the UE requested PDN connectivity procedure that is different from the APNs corresponding to the LIPA PDN connections.

The MME shall send a SERVICE REJECT and indicate new PDN connection required if the MME received a SERVICE REQUEST from a UE in cell that is not a CSG cell and the UE has at east one LIPA PDN connection. The MME shall send a SERVICE REJECT and indicate new PDN connection required if MME received a SERVICE REQUEST from a UE in a CSG cell with a CSG identity different from the CSG identity of the cell where the UE activated the PDN connection or PDN connections,

{Authors' note: first embodiment of concept L, re-use of implicit detach}

10(Implicitly detached);

The UE shall delete the list of equivalent PLMNs and shall enter the state EMM-DEREGISTERED.NORMAL-SERVICE. The UE shall delete any mapped EPS security context or partial native EPS security context. The UE shall then perform a new attach procedure. If the UE has only LIPA PDN connections when the UE receives cause #10, the UE may use an APN in the attach procedure that is different from the APNs corresponding to the LIPA PDN connections.

If A/Gb mode or Iu mode is supported by the UE, the UE shall in addition handle the GMM state as specified in 3GPP TS 24.008 [13] for the case when the combined routing area updating procedure is rejected with the GMM cause with the same value.

A UE in CS/PS mode 1 or CS/PS mode 2 of operation is still IMSI attached for non-EPS services.

The MME shall send a SERVICE REJECT and indicate Implicitly Detached if the UE sends a SERVICE REQUEST from a cell that is not a CSG cell and the UE has at east one LIPA PDN connection.

The MME shall send a SERVICE REJECT and indicate Implicitly Detached if the MME received the SERVICE REQUEST from a UE in a CSG cell with a CSG identity different from the CSG identity of the cell where the UE activated the LIPA PDN connection or LIPA PDN connections.

\* \* \* End of next change \* \* \*

6.5.1.3 UE requested PDN connectivity procedure accepted by the network

Upon receipt of the PDN CONNECTIVITY REQUEST message, the MME checks whether the ESM information transfer flag is included. If the flag is included the MME waits for completion of the ESM information request procedure before proceeding with the PDN connectivity procedure. The MME then checks if connectivity with the requested PDN can be established. If no requested APN is included in the PDN CONNECTIVITY REQUEST message or the ESM INFORMATION RESPONSE message and the request type is different from "emergency", the MME shall use the default APN as the requested APN. If the request type is "emergency", the MME shall use the APN configured for emergency bearer services or select the statically configured PDN GW for unauthenticated UEs, if applicable.

If connectivity with the requested PDN is accepted by the network, the MME shall initiate the default EPS bearer context activation procedure (see subclause 6.4.1).

If connectivity with the requested PDN is accepted, but with a restriction of IP version (i.e. both an IPv4 address and an IPv6 prefix is requested, but only one particular IP version, or only single IP version bearers are supported/allowed by the network), ESM cause #50 "PDN type IPv4 only allowed", #51 "PDN type IPv6 only allowed", or #52 "single address bearers only allowed", respectively, shall be included in the ACTIVATE DEFAULT EPS BEARER CONTEXT REQUEST message.

If connectivity with the requested PDN is accepted, the MME shall store the CSG identity of the cell where the MME received the MME received the PDN CONNECTIVITY REQUEST message from the UE.

Upon receipt of the message ACTIVATE DEFAULT EPS BEARER CONTEXT REQUEST message, the UE shall stop timer T3482 and enter the state PROCEDURE TRANSACTION INACTIVE. The UE should ensure that the procedure transaction identity (PTI) assigned to this procedure is not released immediately. The way to achieve this is implementation dependent. While the PTI value is not released, the UE regards any received ACTIVATE DEFAULT EPS BEARER CONTEXT REQUEST message with the same PTI value as a network retransmission (see subclause 7.3.1).

...

===============End of Change=====================================

- Change for one embodiment for 3GPP TS 24.008

===============Begin of Change====================================

* * * First change * * *

2.1.2 Vocabulary

For the purposes of the present document, the following terms and definitions apply:

...

<u>LIPA PDN Connection: a PDN Connection or PDP Context that gives access to the UE to services located in the local residential/corporate IP network.</u>

* * * End of first change * * *

* * * Next change * * *

4.7.13.4 Service request procedure not accepted by the network

If the Service request cannot be accepted, the network returns a SERVICE REJECT message to the mobile station. An MS that receives a SERVICE REJECT message stops timer T3317.

If the network receives a SERVICE REQUEST from an MS in a cell that is not a CSG cell or a CSG cell with a CSG identity different from the CSG identity of the cell where the MS activated the LIPA PDP contexts, then the networkshall return a SERVICE REJECT.

If the network receives a SERVICE REQUEST from an MS in a cell that is not a CSG cell or a CSG cell with a CSG identity different from the CSG identity of the cell where the MME recived the ACTIVATE PDP CONTEXT REQUEST from the MS for the LIPA PDP contexts, then the networkshall return a SERVICE REJECT.

The MS shall then take different actions depending on the received reject cause value:

...

10(Implicitly detached);

- The MS shall change to state GMM-DEREGISTERED.NORMAL-SERVICE. The MS shall then perform a new attach procedure. The MS should also activate PDP context(s) to replace any previously active PDP contexts. The MS should also perform the procedures needed in order to activate any previously active multicast service(s). Upon receiving a cause #10, if all the PDP contexts are for LIPA services, then the MS may use an APN in the attach procedure that is different from the APNs corresponding to the LIPA PDP contexts.

If S1 mode is supported in the MS, the MS shall handle the EMM state as specified in 3GPP TS 24.301 [120] for the case when the the service request procedure is rejected with the EMM cause with the same value.

The network shall send a SERVICE REJECT and indicate Implicitly Detached if the network received a SERVICE REQUEST from the UE in a cell that is not a CSG cell and the MS has at east one LIPA PDP context.

The network shall send a SERVICE REJECT and indicate Implicitly Detached if the network received a SERVICE REQUEST from a UE in a CSG cell with a CSG identity different from the CSG identity of the cell where the MS activated the LIPA PDP context or PDP contexts.

NOTE 1: In some cases, user interaction may be required and then the MS cannot activate the PDP and MBMS context(s) automatically.

...

40(No PDP context activated)

- The MS shall deactivate locally all active PDP and MBMS contexts and the MS shall enter the state GMM-REGISTERED.NORMAL-SERVICE. The MS may also activate PDP context(s) to replace any previously active PDP contexts. The MS may also perform the procedures needed in order to activate any previously active multicast service(s). If the MS has only LIPA PDP contexts when the network provides cause #40, if the MS activate PDP context(s) to replace any previously active PDP contexts, it should not request for a LIPA PDP context in the ACTIVATE PDP CONTEXT REQUEST. If a specific APN is used for LIPA, the UE should use an APN in the attach ACTIVATE PDP CONTEXT REQUEST that is different from the APNs corresponding to the LIPA PDP contexts The network shall send a SERVICE REJECT and indicate No PDP context activated if the network receives a SERVICE REQUEST from a UE in a cell that is not a CSG cell and the MME determines that the MS has at east one LIPA PDP context.

The network shall send a SERVICE REJECT and indicate No PDP context activated if the network receives a SERVICE REQUEST from a UE in a CSG cell with a CSG identity different from the CSG identity of the cell where the MS activated the LIPA PDP context or PDP contexts ---
* End of next change *
---

---
* Next change *
---

6.1.3.1.1  Successful PDP context activation initiated by the mobile station

In order to request a PDP context activation, the MS sends an ACTIVATE PDP CONTEXT REQUEST message to the network, enters the state PDP-ACTIVE-PENDING and starts timer T3380. The message contains the selected NSAPI, PDP type, requested QoS and, if the MS requests a static address, the PDP address. The MS shall ensure that the selected NSAPI is not currently being used by another Session Management entity in the MS. The MS may indicate the support of Network Requested Bearer Control procedures in the protocol configuration options information element. The MS supporting S1 mode shall include interactive or background traffic class in the QoS requested. The MS not supporting S1 mode should include interactive or background traffic class in the QoS requested.The network shall ignore the requested QoS and apply the subscribed QoS profile (see 3GPP TS 23.060 [74]).

The MS shall set the request type to "initial request" when the MS is establishing connectivity to an additional PDN for the first time, i.e. when it is an initial attach to that PDN. The MS shall set the request type to "handover" when the connectivity to a PDN is established upon handover from a non-3GPP access network and the MS was connected to that PDN before the handover to the 3GPP access network. If the MS is establishing connectivity for emergency bearer services it shall set the request type to "emergency" and not include an APN in the ACTIVATE PDP CONTEXT REQUEST message.

Upon receipt of the ACTIVATE PDP CONTEXT REQUEST message with request type set to "emergency" the network shall use the APN or the GGSN/PDN GW configured for emergency bearer services.

Upon receipt of an ACTIVATE PDP CONTEXT REQUEST message with a PDP type number "IPv4v6 address" in the Requested PDP address information element, the network shall on sending the ACTIVATE PDP CONTEXT ACCEPT message:

- include the SM cause information element with cause #50 ("PDP type IPv4 only allowed"), if the requested PDN connectivity is accepted with the restriction that only PDP type IPv4 is allowed; or

- include the SM cause information element with cause #51 ("PDP type IPv6 only allowed"), if the requested PDN connectivity is accepted with the restriction that only PDP type IPv6 is allowed; or

- include the SM cause information element with cause #52 ("single address bearers only allowed"), if the requested PDN connectivity is accepted with the restriction that only single IP version bearers are allowed.

Upon receipt of an ACTIVATE PDP CONTEXT REQUEST message, the network selects a radio priority level based on the QoS negotiated and may reply with an ACTIVATE PDP CONTEXT ACCEPT message.

If the network accepts the requested PDP context in a CSG cell, the network shall store the CSG identity of the cell where the MS activated the PDP context.

Upon receipt of the message ACTIVATE PDP CONTEXT ACCEPT the MS shall stop timer T3380, shall enter the state PDP-ACTIVE. If the protocol configuration options information element is present, the network may indicate the Bearer Control Mode that shall be used. If the protocol configuration options information element is not present, the MS shall apply Bearer Control Mode 'MS only' for all active PDP contexts sharing the same PDP Address and APN. If the offered QoS parameters received from the network differ from the QoS requested by the MS, the MS shall either accept the negotiated QoS or initiate the PDP context deactivation procedure. If the Request type information element is not present, the network shall assume that the request type is "initial request".

> NOTE 1: If the MS requested a value for a QoS parameter that is not within the range specified by 3GPP TS 23.107, the network should negotiate the parameter to a value that lies within the specified range.

In A/Gb mode, the MS shall initiate establishment of the logical link for the LLC SAPI indicated by the network with the offered QoS and selected radio priority level if no logical link has been already established for that SAPI. If the offered QoS parameters received from the network differ from the QoS requested by the MS, the MS shall either accept the negotiated QoS or initiate the PDP context deactivation procedure. If the LLC SAPI indicated by the network can not be supported by the MS, the MS shall initiate the PDP context deactivation procedure.

In Iu mode, both the network and the MS shall store the LLC SAPI and the radio priority in the PDP context. If a Iu mode to A/Gb mode system change is performed, the new SGSN shall initiate establishment of the logical link using the negotiated QoS profile, the negotiated LLC SAPI, and selected radio priority level stored in the PDP context as in a A/Gb mode to A/Gb mode Routing Area Update.

An MS, which is capable of operating in both A/Gb mode and Iu mode, shall use a valid LLC SAPI, while an MS which is capable of operating only in Iu mode shall indicate the LLC SAPI value as "LLC SAPI not assigned" in order to avoid unnecessary value range checking and any other possible confusion in the network. When the MS uses a valid LLC SAPI, the network shall return a valid LLC SAPI. The network shall return the "LLC SAPI not assigned" value only when the MS uses the "LLC SAPI not assigned" value.

NOTE 2: The radio priority level and the LLC SAPI parameters, though not used in Iu mode, shall be included in the messages, in order to support handover between Iu mode and A/Gb mode networks.

===============End of Change=========================================

- Change for one embodiment for 3GPP TS 24.301

================Begin of Change=======================================

5.5.3.2.4 Normal and periodic tracking area updating procedure accepted by the network If the tracking area update request has been accepted by the network, the MME shall send a TRACKING AREA UPDATE ACCEPT message to the UE. If the MME assigns a new GUTI for the UE, a GUTI shall be included in the TRACKING AREA UPDATE ACCEPT message. In this case, the MME shall start timer T3450 and enter state EMM-COMMON-PROCEDURE-INITIATED as described in subclause 5.4.1. The MME may include a new TAI list for the UE in the TRACKING AREA UPDATE ACCEPT message.

If the MME determines that the UE has at least one PDN connection that is not a LIPA PDN connection and at least one LIPA PDN connection, and the MME has received a TRACKING AREA UPDATE REQUEST message from the UE in a cell that is not a CSG cell or a CSG cell with a different CSG identity than the previous CSG cell or in a cell that is not a CSG cell, and if the MME determines that the UE is RRC connected but only signalling bearers are created during the tracking are update procedure, the MME shall accept the tracking area update request.

If the UE has included the UE network capability IE or the MS network capability IE or both in the TRACKING AREA UPDATE REQUEST message, the MME shall store all octets received from the UE, up to the maximum length defined for the respective information element.

NOTE 1: This information is forwarded to the new MME during inter-MME handover or to the new SGSN during inter-system handover to A/Gb mode or Iu mode.

If a UE radio capability information update needed IE is included in the TRACKING AREA UPDATE REQUEST message, the MME shall delete the stored UE radio capability information, if any.

If the UE specific DRX parameter was included in the DRX Parameter IE in the TRACKING AREA UPDATE REQUEST message, the network shall replace any stored UE specific DRX parameter with the received parameter and use it for the downlink transfer of signalling and user data.

If an EPS bearer context status IE is included in the TRACKING AREA UPDATE REQUEST message, the MME shall deactivate all those EPS bearer contexts locally (without peer-to-peer signalling between the MME and the UE) which are active on the network side, but are indicated by the UE as being inactive. If a default EPS bearer context is marked as inactive in the EPS bearer context status IE included in the TRACKING AREA UPDATE REQUEST message, and this default bearer is not associated with the last PDN of the user in the MME, the MME shall locally deactivate all EPS bearer contexts associated to the PDN connection with the default EPS bearer context without peer-to-peer ESM signalling to the UE.

If the EPS bearer context status IE is included in the TRACKING AREA UPDATE REQUEST, the MME shall include an EPS bearer context status IE in the TRACKING AREA UPDATE ACCEPT message, indicating which EPS bearer contexts are active in the MME.

If the EPS update type IE included in the TRACKING AREA UPDATE REQUEST message indicates "periodic updating", and the UE was previously successfully attached for EPS and non-EPS services, subject to operator policies the MME should allocate a TAI list that does not span more than one location area.

Also during the tracking area updating procedure without "active" flag, if the MME has deactivated EPS bearer context(s) locally for any reason, the MME shall inform the UE of the deactivated EPS bearer context(s) by including the EPS bearer context status IE in the TRACKING AREA UPDATE ACCEPT message.

If due to regional subscription restrictions or access restrictions the UE is not allowed to access the TA, but it has a PDN connection for emergency bearer services established, the MME may accept the TRACKING AREA UPDATE REQUEST message and deactivate all non-emergency EPS bearer contexts by initiating an EPS bearer context deactivation procedure when the TAU is initiated in EMM-CONNECTED mode. When the TAU is initiated in EMM-IDLE mode, the MME locally deactivates all non-emergency EPS bearer contexts and informs the UE via the EPS bearer context status IE in the TRACKING AREA UPDATE ACCEPT message. The MME shall not deactivate the emergency EPS bearer contexts. The network shall consider the UE to be attached for emergency bearer services only and shall indicate in the EPS update result IE in the TRACKING AREA UPDATE ACCEPT message that ISR is not activated.

For a shared network, the TAIs included in the TAI list can contain different PLMN identities. The MME indicates the selected core network operator PLMN identity to the UE in the GUTI (see 3GPP TS 23.251 [8B]).

If the "active" flag is included in the TRACKING AREA UPDATE REQUEST message, the MME shall re-establish the radio and S1 bearers for all active EPS bearer contexts.

Upon receiving a TRACKING AREA UPDATE ACCEPT message, the UE shall stop timer T3430, reset the tracking area updating attempt counter, enter state EMM-REGISTERED and set the EPS update status to EU1 UPDATED. If the message contains a GUTI, the UE shall use this GUTI as new temporary identity for EPS services and shall store the new GUTI. If no GUTI was included by the MME in the TRACKING AREA UPDATE ACCEPT message, the old GUTI shall be used. If the UE receives a new TAI list in the TRACKING AREA UPDATE ACCEPT message, the UE shall consider the new TAI list as valid and the old TAI list as invalid; otherwise, the UE shall consider the old TAI list as valid.

If the UE had initiated the tracking area updating procedure in EMM-IDLE mode to perform an inter-system change from A/Gb mode or Iu mode to S1 mode and the nonce$_{UE}$ was included in the TRACKING AREA UPDATE REQUEST message, the UE shall delete the nonce$_{UE}$ upon receipt of the TRACKING AREA UPDATE ACCEPT message.

If the UE had initiated the tracking area updating proceduredue to a change in UE network capability or change in DRX parameters or both, the UE shall locally deactivate ISR by setting TIN value to "GUTI".

If an EPS bearer context status IE is included in the TRACKING AREA UPDATE ACCEPT message, the UE shall deactivate all those EPS bearers contexts locally (without peer-to-peer signalling between the UE and the MME) which are active in the UE, but are indicated by the MME as being inactive. If a default EPS bearer context is marked as inactive in the EPS bearer context status IE included in the TRACKING AREA UPDATE ACCEPT message, and this default bearer is not associated with the last PDN in the UE, the UE shall locally deactivate all EPS bearer contexts associated to the PDN connection with the default EPS bearer context without peer-to-peer ESM signalling to the MME. If only the PDN connection for emergency bearer services remains established, the UE shall consider itself attached for emergency bearer services only.

The MME may also include of list of equivalent PLMNs in the TRACKING AREA UPDATE ACCEPT message. Each entry in the list contains a PLMN code (MCC+MNC). The UE shall store the list as provided by the network, and if there is no PDN connection for emergency bearer services established, the UE shall remove from the list any PLMN code that is already in the list of forbidden PLMNs. In addition, the UE shall add to the stored list the PLMN code of the registered PLMN that sent the list. The UE shall replace the stored list on each receipt of the TRACKING AREA UPDATE ACCEPT message. If the TRACKING AREA UPDATE ACCEPT message does not contain a list, then the UE shall delete the stored list.

The network may also indicate in the EPS update result IE in the TRACKING AREA UPDATE ACCEPT message that ISR is active. If the UE is attached for emergency bearer services, the network shall indicate in the EPS update result IE in the TRACKING AREA UPDATE ACCEPT message that ISR is not activated. If the TRACKING AREA UPDATE ACCEPT message contains:

i) no indication that ISR is activated, the UE shall set the TIN to "GUTI";

ii) an indication that ISR is activated, the UE shall regard a previously assigned P-TMSI and RAI as valid and registered with the network. If the TIN currently indicates "P-TMSI", the UE shall set the TIN to "RAT-related TMSI".

The network informs the UE about the support of specific features, such as IMS voice over PS session, location services (EPC-LCS, CS-LCS) or emergency bearer services, in the EPS network feature support information element. In a UE with IMS voice over PS capability, the IMS voice over PS session indicator and the emergency bearer services indicator shall be provided to the upper layers. The upper layers take the IMS voice over PS session indicator into account as specified in 3GPP TS 23.221 [8A], subclause 7.2a, when selecting the access domain for voice sessions or calls. When initiating an emergency call, the upper layers also take the emergency bearer services indicator into account for the access domain selection. In a UE with LCS capability, location services indicators (EPC-LCS, CS-LCS) shall be provided to the upper layers. When MO-LR procedure is triggered by the UE's application, those indicators are taken into account as specified in 3GPP TS 24.171 [13C].

The UE shall deactivate ISR by setting the TIN to "GUTI" if:

- the "IMS voice over PS session indicator" received for S1 mode is not equal to the "IMS voice over PS session indicator" received for Iu mode (see 3GPP TS 24.008 [13]);

- the voice domain preference as defined in 3GPP TS 24.167 [13B] is not "CS voice only";

- the upper layers have indicated that the UE is available for terminating voice calls in the IMS; and

- the UE is configured with "Mobility Management for IMS Voice Termination" enabled as defined in 3GPP TS 24.167 [13B].

NOTE 2: Whether the "Mobility Management for IMS Voice Termination" setting is stored in the IMS management object as defined in 3GPP TS 24.167 [13B] or in the UE is an implementation option. If this setting is missing, then "Mobility Management for IMS Voice Termination" is disabled.

If the UE has initiated the tracking area updating procedure due to manual CSG selection and receives a TRACKING AREA UPDATE ACCEPT message, and the UE sent the TRACKING AREA UPDATE REQUEST message in a CSG cell, the UE shall check if the CSG ID of the cell where the UE has sent the TRACKING AREA UPDATE REQUEST message is contained in the Allowed CSG list. If not, the UE shall add that CSD ID to the Allowed CSG list.

If the TRACKING AREA UPDATE ACCEPT message contained a GUTI, the UE shall return a TRACKING AREA UPDATE COMPLETE message to the MME to acknowledge the received GUTI.

Upon receiving a TRACKING AREA UPDATE COMPLETE message, the MME shall stop timer T3450, and shall consider the GUTI sent in the TRACKING AREA UPDATE ACCEPT message as valid.

For inter-system change from A/Gb mode to S1 mode or Iu mode to S1 mode in EMM-IDLE mode, if the UE has included an eKSI in the NAS Key Set Identifier IE indicating a current EPS security context in the TRACKING AREA UPDATE REQUEST message by which the TRACKING AREA UPDATE REQUEST message is integrity protected, the MME shall take one of the following actions:

- if the MME retrieves the current EPS security context as indicated by the eKSI and GUTI sent by the UE, the MME shall integrity check the TRACKING AREA UPDATE REQUEST message using the current EPS security context and integrity protect the TRACKING AREA UPDATE ACCEPT message using the current EPS security context; or
- if the MME cannot retrieve the current EPS security context as indicated by the eKSI and GUTI sent by the UE, and if the UE has included a valid GPRS ciphering key sequence number, the MME shall create a new mapped EPS security context as specified in 3GPP TS 33.401 [19], and then perform a security mode control procedure to indicate the use of the new mapped EPS security context to the UE (see subclause 5.4.3.2).

NOTE 3: This does not preclude the option for the MME to perform an EPS authentication procedure and create a new native EPS security context.

For inter-system change from A/Gb mode to S1 mode or Iu mode to S1 mode in EMM-IDLE mode, if the UE has not included a valid eKSI in the NAS Key Set Identifier IE and has included a valid GPRS ciphering key sequence number in the TRACKING AREA UPDATE REQUEST message, the MME shall create a new mapped EPS security context as specified in 3GPP TS 33.401 [19], and then perform a security mode control procedure to indicate the use of the new mapped EPS security context to the UE (see subclause 5.4.3.2).

NOTE 4: This does not preclude the option for the MME to perform an EPS authentication procedure and create a new native EPS security context.

For inter-system change from A/Gb mode to S1 mode or Iu mode to S1 mode in EMM-CONNECTED mode, the MME shall integrity check TRACKING AREA UPDATE REQUEST message using the current $K'_{ASME}$ as derived when triggering the handover to E-UTRAN (see subclause 4.4.2.1). The MME shall verify the received UE security capabilities in the TRACKING AREA UPDATE REQUEST message. The MME shall then take one of the following actions:

- if the TRACKING AREA UPDATE REQUEST does not contain a valid $KSI_{ASME}$ in the Non-current native NAS key set identifier IE, the MME shall remove the non-current native EPS security context, if any, for any GUTI for this UE. The MME shall then integrity protect and cipher the TRACKING AREA UPDATE ACCEPT message using the security context based on $K'_{ASME}$ and take the mapped EPS security context into use; or

- if the TRACKING AREA UPDATE REQUEST contains a valid $KSI_{ASME}$ in the Non-current native NAS key set identifier IE, the MME may initiate a security mode control procedure to take the corresponding native EPS security context into use.

================End of Change======================================

- Change for one embodiment for 3GPP TS 24.008

================Begin of Change======================================

*4.7.5.1.3 Normal and periodic routing area updating procedure accepted by the network*

If the routing area updating request has been accepted by the network, a ROUTING AREA UPDATE ACCEPT message shall be sent to the MS. The network may assign a new P-TMSI and/or a new P-TMSI signature for the MS. If a new P-TMSI and/or P-TMSI signature have been assigned to the MS, it/they shall be included in the ROUTING AREA UPDATE ACCEPT message together with the routing area identification.In a shared network the network shall indicate the PLMN identity of the CN operator that has accepted the routing area updating request in the RAI contained in the ROUTING AREA UPDATE ACCEPT message (see 3GPP TS 23.251 [109]).

If the network determines that the MS has at least one PDP context that is not a LIPA PDP context and at least a LIPA PDP context, and the network has received a ROUTING AREA UPDATE REQUEST message from the MS in a cell that is not a CSG cell or a CSG cell with a different CSG identity than the previous CSG cell or in a cell that is not a CSG cell, and if the MS is RRC connected but only signalling bearers are created during the tracking are update procedure, the network shall accept the routing area update request.

If a new DRX parameter was included in the ROUTING AREA UPDATE REQUEST message, the network shall store the new DRX parameter and use it for the downlink transfer of signalling and user data.

If the MS has indicated in the ROUTING AREA UPDATE REQUEST message that it supports PS inter-RAT handover from GERAN to UTRAN Iu mode, the network may include in the ROUTING AREA UPDATE ACCEPT message a request to provide the Inter RAT information container.

If the MS has indicated in the ROUTING AREA UPDATE REQUEST message that it supports PS inter-RAT HO from GERAN to E-UTRAN, the network may include in the ROUTING AREA UPDATE ACCEPT message a request to provide the E-UTRAN inter RAT information container.

If the MS has included the MS network capability IE or the UE network capability IE or both in the ROUTING AREA UPDATE REQUEST message, the network shall store all octets received from the MS, up to the maximum length defined for the respective information element. In case the UE network capability IE indicated new information to the network, the MS shall set the TIN to "P-TMSI".

NOTE 1: This information is forwarded to the new SGSN during inter-SGSN handover or to the new MME during intersystem handover to S1 mode.

In A/Gb mode the Cell Notification information element shall be included in the ROUTING AREA UPDATE ACCEPT message in order to indicate the ability of the network to support the Cell Notification.

The network shall change to state GMM-COMMON-PROCEDURE-INITIATED and shall start the supervision timer T3350 as described in subclause 4.7.6.

If the LAI or PLMN identity contained in the ROUTING AREA UPDATE ACCEPT message is a member of any of the "forbidden" lists and there is no PDN connection for emergency bearer services in the MS then any such entry shall be deleted.

In Iu mode, the network should prolong the PS signalling connection if the mobile station has indicated a follow-on request pending in ROUTING AREA UPDATE REQUEST. The network may also prolong the PS signalling connection without any indication from the mobile terminal.

If the PDP context status information element is included in ROUTING AREA UPDATE REQUEST message, then the network shall deactivate all those PDP contexts locally (without peer to peer signalling between the MS and the network), which are not in SM state PDP-INACTIVE on network side but are indicated by the MS as being in state PDP-INACTIVE.

If the MBMS context status information element is included in the ROUTING AREA UPDATE REQUEST message, then the network shall deactivate all those MBMS contexts locally (without peer to peer signalling between the MS and network) which are not in SM state PDP-INACTIVE on the network side, but are indicated by the MS as being in state PDP-INACTIVE. If no MBMS context status information element is included, then the network shall deactivate all MBMS contexts locally which are not in SM state PDP-INACTIVE on the network side.

If due to regional subscription restrictions or access restrictions the MS is not allowed to access the routing area, but the MS has a PDN connection for emergency bearer services established, the network may accept the ROUTING AREA UPDATE REQUEST message and deactivate all non-emergency PDP contexts by initiating an PDP context deactivation procedure when the RAU is initiated in PMM-CONNECTED mode. When the RAU is initiated in PMM-IDLE mode, the network locally deactivates all non-emergency PDP contexts and informs the MS via the PDP context status IE in the ROUTING AREA UPDATE ACCEPT message. The network shall not deactivate the PDP contexts for emergency bearer services. The network shall consider the MS to be attached for emergency bearer services only.

Upon receipt of a ROUTING AREA UPDATE ACCEPT message, the MS stores the received routing area identification, stops timer T3330, shall reset the routing area updating attempt counter and sets the GPRS update status to GU1 UPDATED. If the message contains a P-TMSI, the MS shall use this P-TMSI as new temporary identity for GPRS services and shall store the new P-TMSI. If no P-TMSI was included by the network in the ROUTING AREA UPDATING ACCEPT message, the old P-TMSI shall be kept. Furthermore, the MS shall store the P-TMSI signature if received in the ROUTING AREA UPDATING ACCEPT message. If no P-TMSI signature was included in the message, the old P-TMSI signature, if available, shall be deleted.

If the ROUTING AREA UPDATE REQUEST message was used to update the network with a new DRX parameter IE, the MS shall start using the new DRX parameter upon receipt of the ROUTING AREA UPDATE ACCEPT message and shall set the TIN to "P-TMSI".

If the PDP context status information element is included in ROUTING AREA UPDATE ACCEPT message, then the MS shall deactivate all those PDP contexts locally (without peer to peer signalling between the MS and network), which are not in SM state PDP-INACTIVE in the MS but are indicated by the network as being in state PDP-INACTIVE. If only the PDN connection for emergency bearer services remains established, the MS shall consider itself attached for emergency bearer services only.

If the MBMS context status information element is included in the ROUTING AREA UPDATE ACCEPT message, then the MS shall deactivate all those MBMS contexts locally (without peer to peer signalling between the MS and network) which are not in SM state PDP-INACTIVE in the MS, but are indicated by the network as being in state PDP-INACTIVE. If no MBMS context status information element is included, then the MS shall deactivate all those MBMS contexts locally which are not in SM state PDP-INACTIVE in the MS.

In A/Gb mode, if the ROUTING AREA UPDATE ACCEPT message contains the Cell Notification information element, then the MS shall start to use the LLC NULL frame to perform cell updates.

If the MS has initiated the routing area updating procedure due to manual CSG selection and receives a ROUTING AREA UPDATE ACCEPT message, and the MS sent the ROUTING AREA UPDATE REQUEST message in a CSG cell, the MS shall check if the CSG ID of the cell is contained in the Allowed CSG list. If not, the MS shall add that CSG ID to the Allowed CSG list.

The network may also send a list of "equivalent PLMNs" in the ROUTING AREA UPDATE ACCEPT message. Each entry of the list contains a PLMN code (MCC+MNC). The mobile station shall store the list, as provided by the network, and if there is no PDN connection for emergency bearers established, the mobile station shall remove from the list of "equivalent PLMNs" any PLMN code that is already in the "forbidden PLMN" list In addition the mobile station shall add to the stored list the PLMN code of the registered PLMN that sent the list. All PLMNs in the stored list shall be regarded as equivalent to each other for PLMN selection, cell selection/re-selection and handover. The stored list in the mobile station shall be replaced on each occurrence of the ROUTING AREA UPDATE ACCEPT message. If no list is contained in the message, then the stored list in the mobile station shall be deleted. The list shall be stored in the mobile station while switched off so that it can be used for PLMN selection after switch on.

A ROUTING AREA UPDATE COMPLETE message shall be returned to the network if the ROUTING AREA UPDATE ACCEPT message contained any of:

- a P-TMSI;
- Receive N-PDU Numbers (see 3GPP TS 44.065 [78] and 3GPP TS 25.322 [19b]); or
- a request for the provision of Inter RAT handover information or E-UTRAN inter RAT handover information or both.

If Receive N-PDU Numbers were included, the Receive N-PDU Numbers values valid in the MS, shall be included in the ROUTING AREA UPDATE COMPLETE message.

If the network has requested the provision of Inter RAT handover information or E-UTRAN inter RAT handover information or both, the MS shall return a ROUTING AREA UPDATE COMPLETE message including the Inter RAT handover information IE or E-UTRAN inter RAT handover information IE or both to the network.

NOTE 2: In Iu mode, after a routing area updating procedure, the mobile station can initiate Service Request procedure to request the resource reservation for the active PDP contexts if the resources have been released by the network or send upper layer message (e.g. ACTIVATE PDP CONTEXT REQUEST) to the network via the existing PS signalling connection.

In Iu mode, if the network wishes to prolong the PS signalling connection (for example, if the mobile station has indicated "follow-on request pending" in ROUTING AREA UPDATE REQUEST message) the network shall indicate the "follow-on proceed" in the ROUTING AREA UPDATE ACCEPT message. If the network wishes to release the PS signalling connection, the network shall indicate "no follow-on proceed" in the ROUTING AREA UPDATE ACCEPT message.

After that in Iu mode, the mobile station shall act according to the follow-on proceed flag included in the Update result information element in the ROUTING AREA UPDATE ACCEPT message (see subclause 4.7.13).

The network may also send a list of local emergency numbers in the ROUTING AREA UPDATE ACCEPT, by including the Emergency Number List IE. The mobile equipment shall store the list, as provided by the network, except that any emergency number that is already stored in the SIM/USIM shall be removed from the list before it is stored by the mobile equipment. If there are no emergency numbers stored on the SIM/USIM, then before storing the received list the mobile equipment shall remove from it any emergency number stored permanently in the ME for use in this case (see 3GPP TS 22.101 [8]). The list stored in the mobile equipment shall be replaced on each receipt of a new Emergency Number List IE.

The emergency number(s) received in the Emergency Number List IE are valid only in networks with the same MCC as in the cell on which this IE is received. If no list is contained in the ROUTING AREA UPDATE ACCEPT message, then the stored list in the mobile equipment shall be kept, except if the mobile equipment has successfully registered to a PLMN with an MCC different from that of the last registered PLMN.

The mobile equipment shall use the stored list of emergency numbers received from the network in addition to the emergency numbers stored on the SIM/USIM or ME to detect that the number dialled is an emergency number.

NOTE 3: The mobile equipment may use the emergency numbers list to assist the end user in determining whether the dialled number is intended for an emergency service or for another destination, e.g. a local directory service. The possible interactions with the end user are implementation specific.

The list of emergency numbers shall be deleted at switch off and removal of the SIM/USIM. The mobile equipment shall be able to store up to ten local emergency numbers received from the network.

In order to indicate to the MS that the GUTI and TAI list assigned to the MS remain registered with the network and are valid in the MS, the network shall indicate in the Update result IE in the ROUTING AREA UPDATE ACCEPT message that ISR is activated.

If the MS is attached for emergency bearer services or if the network has deactivated all non-emergency PDP contexts, the network shall indicate in the update result IE in the ROUTING AREA UPDATE ACCEPT message that ISR is not activated.

If the ROUTING AREA UPDATE ACCEPT message contains i) no indication that ISR is activated, an MS supporting S1 mode shall set the TIN to "P-TMSI"; or ii) an indication that ISR is activated, the MS shall regard the available GUTI and TAI list as valid and registered with the network. If the TIN currently indicates "GUTI", the MS shall set the TIN to "RAT-related TMSI".

The MS shall deactivate ISR by setting the TIN to "P-TMSI" if:

- the "IMS voice over PS session indicator" received for Iu mode is not equal to the "IMS voice over PS session indicator" received for S1 mode (see 3GPP TS 24.301 [120]);

- the voice domain preference for UTRAN as defined in 3GPP TS 24.167 [134] is not "CS voice only";

- the upper layers have indicated that the MS is available for terminating voice calls in the IMS (see 3GPP TS 24.301 [120], subclause 3.1); and

- the MS is configured with "Mobility Management for IMS Voice Termination" enabled as defined in 3GPP TS 24.167 [134].

NOTE 4: Whether the "Mobility Management for IMS Voice Termination" setting is stored in the IMS management object as defined in 3GPP TS 24.167 [134] or in the MS is an implementation option. If this setting is missing, then "Mobility Management for IMS Voice Termination" is disabled.

==================End of Change======================================

- Change for one embodiment for 3GPP TS 23.272

================Begin of Change====================================

3.1 Definitions

For the purposes of the present document, the terms and definitions given in TR 21.905 [1] apply. A term defined in the present document takes precedence over the definition of the same term, if any, in TR 21.905 [1].

1xCS: The 3GPP2 legacy circuit Switched signalling system as defined in 3GPP2 X.S0042-0 [22].

CSMT: A flag in LA update request message used in CS fallback for MT call to avoid missing paging in roaming retry.

For the purposes of the present document, the following terms and definitions given in 3GPP TR 23.829 [xx] apply:

Local IP Access

LIPA Service Continuity

================End of Change====================================

==============Begin of Change====================================

6.3 Mobile Originating call in Active Mode – No PS HO support

Figure 19:
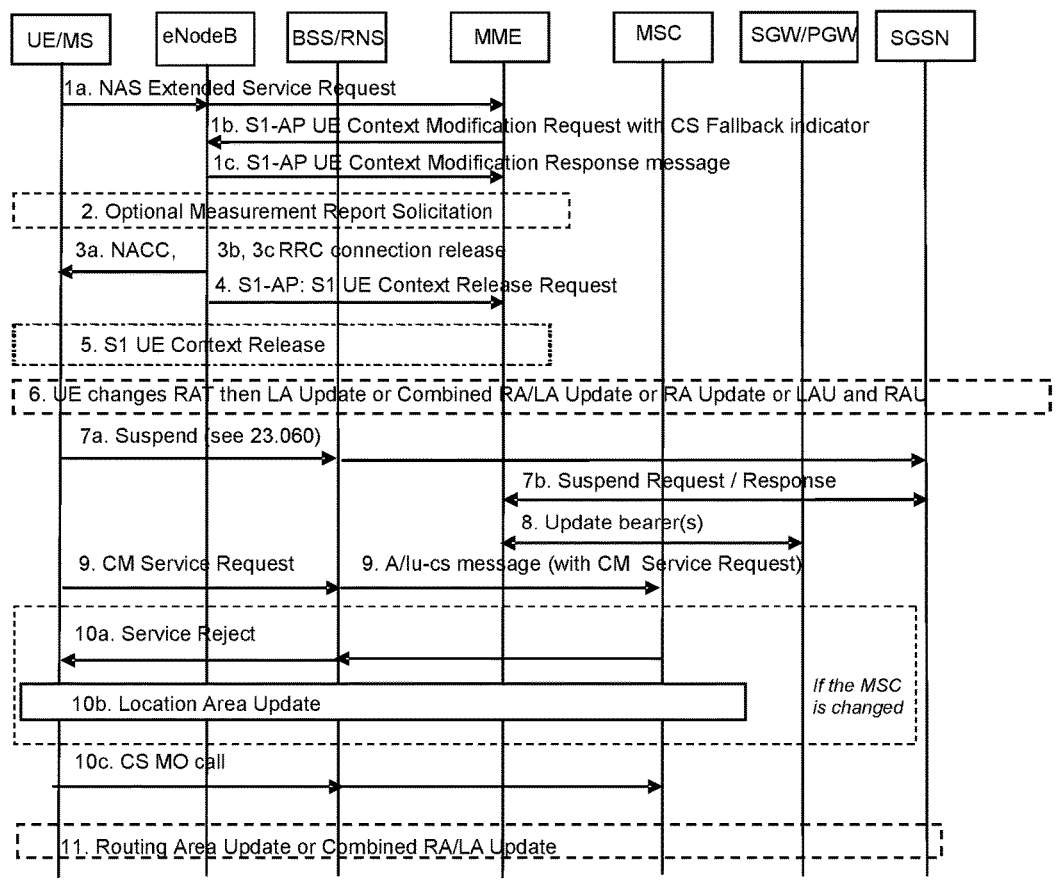
FIG. 19 shows FIG. 6.3-1: CS Call Request in E-UTRAN, Call in GERAN/UTRAN without PS HO.

This procedure (shown in Fig. 19) is executed when PS HO is not supported, in the normal case. Clause 6.6 describes the procedure when the procedure is rejected by the MME.

- 1a. The UE sends an Extended Service Request (CS Fallback Indicator) to the MME. Extended Service Request message is encapsulated in RRC and S1-AP messages. CS Fallback Indicator indicates MME to perform CS Fallback. The UE only transmits this request if it is attached to CS domain (with a combined EPS/IMSI Attach) and can not initiate an IMS voice session (because e.g. the UE is not IMS registered or IMS voice services are not supported by the serving IP-CAN, home PLMN or UE).
- 1b. The MME sends an S1-AP UE Context Modification Request message to eNB that includes a CS Fallback Indicator. This message indicates to the eNB that the UE should be moved to UTRAN/GERAN. The value of the CS Fallback Indicator is set to "CS Fallback without PS HO Required" if MME realizes that PS HO results the MME detach the UE from the network because the UE context information the MME keeps is regarding LIPA PDN connections and the LIPA service continuity is not supported.

1c. The eNB shall reply with S1-AP UE Context Modification Response message. If eNB has received an S1-AP UE Context Modification Request message that has "CS Fallback without PS HO Required" as the value of the CS Fallback Indicator, the eNB shall not try to initiate PS HO by sending a Handover Required message to the MME.

2. The eNodeB may optionally solicit a measurement report from the UE to determine the target GERAN/UTRAN cell to which the redirection procedure will be performed.

The network performs one of steps 3a or 3b or 3c.

3a. If the UE and network support inter-RAT cell change order to GERAN and the target cell is GERAN:

The eNodeB can trigger an inter-RAT cell change order (optionally with NACC) to a GERAN neighbour cell by sending an RRC message to the UE. The inter-RAT cell change order may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. Service Request procedure is considered to be successfully completed when cell change order procedure is completed successfully.

3b. If the UE or the network does not support inter-RAT PS handover from E-UTRAN to GERAN/UTRAN nor inter-RAT cell change order to GERAN or the network does not wish to use these procedures:

The eNodeB can trigger RRC connection release with redirection to GERAN or UTRAN.

3c. If the UE and network support "RRC connection release with redirection and Multi Cell System Information to GERAN/UTRAN":

The eNodeB can trigger RRC connection release with redirection to GERAN or UTRAN and include one or more physical cell identities and their associated System Information.

NOTE 1: Service Request procedure supervision timer shall be sufficiently long considering the optional measurement reporting at step 2.

4. The eNodeB sends an S1-AP UE Context Release Request message to the MME. If the target cell is GERAN and either the target cell or the UE does not support DTM the message includes an indication that the UE is not available for the PS service.

5. The MME releases the UE Context in the eNodeB as well as all eNodeB related information in the S-GW as specified in TS 23.401 [2].

In case the Cause indicates that RRC was released due to abnormal conditions, e.g. radio link failure, the MME suspends the EPS bearers (Step 8).

The UE performs one of steps 6a or 6b or 6c and THEN performs step 6d.

6a. (Step 6a is performed if step 3a, Cell Change Order to GERAN, was performed)

The UE moves to the new cell in GERAN. The UE uses the NACC information and/or receives the broadcast System Information and when it has all of the necessary information to access the GERAN cell, establishes a radio signalling connection.

6b. (Step 6b is performed if step 3b, RRC release with redirection, was performed).

The UE moves to the target RAT, identifies a suitable cell preferably of the same PLMN as received in LAI IE of combined EPS/IMSI Attach/TAU Accept message, receives the broadcast System Information and when it has the necessary information to access GERAN/UTRAN, establishes a radio signalling connection.

6c. (Step 6c is performed if step 3c, RRC connection release with redirection and Multi Cell System Information, was performed).

The UE moves to the target RAT and identifies a suitable cell preferably of the same PLMN as received in LAI IE of combined EPS/IMSI Attach/TAU Accept message. The UE uses the NACC information and/or receives the broadcast System Information and when it has all of the necessary information to access GERAN/UTRAN, the UE establishes the radio signalling connection.

6d. When the UE arrives at the target cell, if target RAT is UTRAN: The UE establishes the radio signalling connection by sending an RRC Initial Direct Transfer message as specified in TS 25.331 [7] that contains a NAS message. The CN Domain Indicator is set to "CS" in the Initial Direct Transfer message.

If target RAT is GERAN A/Gb mode: The UE establishes a radio signalling connection by using the procedures specified in TS 44.018 [4] (i.e. UE requests and is assigned a dedicated channel where it sends a SABM containing a NAS message to the BSS and the BSS responds by sending a UA). Upon receiving the SABM (containing the NAS message) the BSS sends a COMPLETE LAYER 3 INFORMATION message (containing the NAS message) to the MSC which indicates CS resources have been allocated in the GERAN cell. After the establishment of the main signalling link as described in TS 44.018 [4] the UE enters either Dual Transfer Mode or Dedicated Mode.

If the LA of the new cell is different from the one stored in the UE, the UE shall initiate a Location Area Update or a Combined RA/LA Update procedure as specified in TS 23.060 [3] for the different Network Modes of Operation (NMO). The UE shall set the "follow-on request" flag in the LAU Request in order to indicate to the MSC not to release the Iu/A connection after the LAU procedure is complete. Further the UE performs any Routing Area Update procedure as specified by TS 23.060 [3].

In NMO I a CSFB UE may perform separate LAU with "follow-on request" flag and RAU procedures instead of a Combined RA/LA Update procedure to speed up the CSFB procedure.

7. If the target RAT is GERAN and DTM is not supported, the UE starts the Suspend procedure specified in TS 23.060 [3], clause 16.2.1.1.2. This triggers the SGSN to send a Suspend Request message to the MME. The MME returns a Suspend Response to the SGSN even though the GUTI cannot be derived from the P-TMSI and RAI pair.

8. If the S1-AP UE Context Release Request message, received from the eNodeB in step 4, indicates that the UE is not available for the PS service in the target cell the MME starts the preservation and suspension of non-GBR bearers and the deactivation of GBR bearers towards S-GW and P-GW(s). The MME stores in the UE context that UE is in suspended status.

NOTE 2: Step 8 can not be triggered by the Suspend procedure since the full GUTI can not be derived from the P-TMSI and RAI included in the Suspend Request message.

9. The UE continues with the MO call setup procedure with sending CM Service Request.

10a. If the UE is not registered in the MSC serving the 2G/3G cell or the UE is not allowed in the LA, the MSC shall reject the service request, if implicit location update is not performed.

10b. A UE detecting that the MSC rejected the service request shall perform the Location Area Update or a Combined RA/LA procedure according to existing GERAN or UTRAN procedures as specified in TS 23.060 [3] for the different Network Modes of Operation (NMO).

10c. The UE initiates the CS call establishment procedure.

11. After the CS voice call is terminated and if the UE is in GERAN and PS services are suspended, then the UE shall resume PS services as specified in TS 23.060 [3]. A Gn/Gp -SGSN will follow TS 23.060 [3] to resume the PDP Context(s). An S4 SGSN will follow TS 23.060 [3] to resume the bearers, and informs the S-GW and P-GW(s) to resume the suspended bearers. If the UE has returned to E-UTRAN after the CS voice call was terminated, then the UE shall resume PS service by sending TAU to MME. The MME will in addition inform S-GW and P-GW(s) to resume the suspended bearers. Resuming the suspended bearers in the S-GW and in the P-GW should be done by implicit resume using the Modify Bearer request message if it is triggered by the procedure in operation, e.g. RAU, TAU or Service Request. The S-GW is aware of the suspend state of the bearers and will forward the Modify Bearer request to the P-GW. Explicit resume using the Resume Notification message should be used in cases when Modify Bearer Request is not triggered by the procedure in operation.

If the UE remains on UTRAN/GERAN after the CS voice call is terminated the UE performs normal mobility management procedures as defined in TS 23.060 [3] and TS 24.008 [21].

==================End of Change=========================================

==================Begin of Change=======================================

7.4 Mobile Terminating call in Active Mode - No PS HO support

Figure 20:
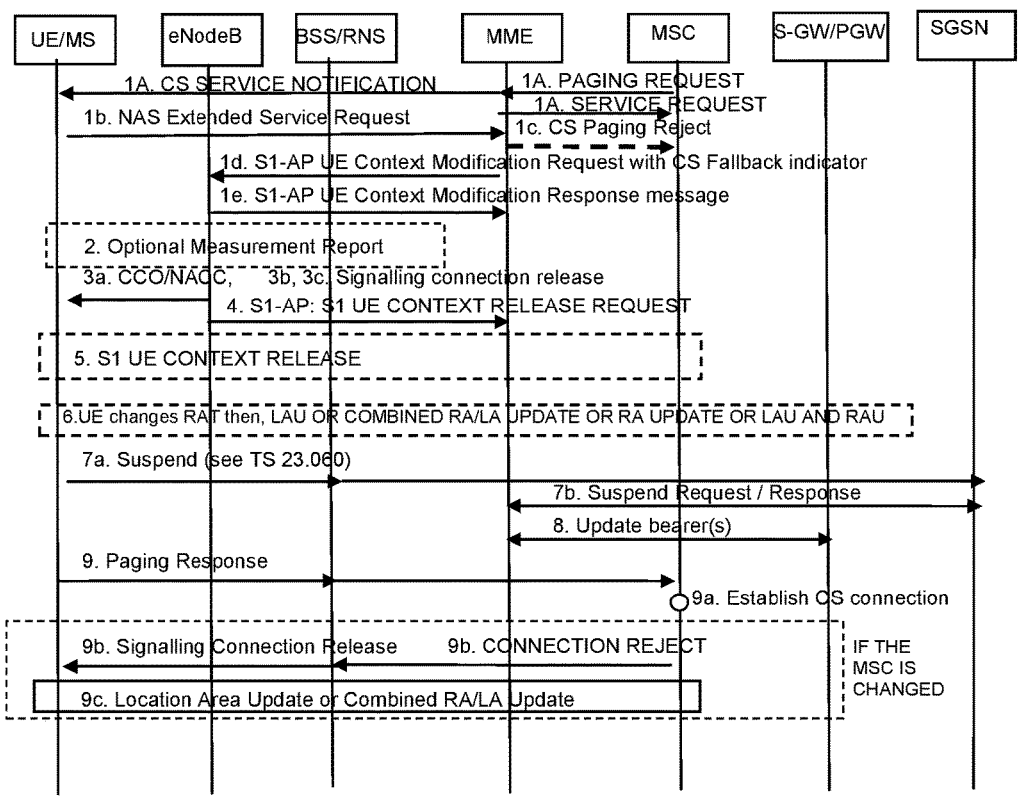
FIG. 20 shows FIG. 7.4-1: CS Page in E-UTRAN, Call in GERAN/UTRAN without PS HO.

This procedure (shown in Fig. 20) is executed when PS HO is not supported, in the normal case. Clause 6.6 describes the procedure when the procedure is rejected by the MME.

1a. The MSC receives an incoming voice call and responds by sending a Paging Request (IMSI or TMSI, optional Caller Line Identification and Connection Management information) to the MME over a SGs interface. The MSC only sends a CS Page for an UE that provides location update information using the SGs interface. In active mode the MME has an established S1 connection and if the MME did not return the "SMS-only" indication to the UE during Attach or Combined TA/LA Update procedures, the MME reuses the existing connection to relay the CS Service Notification to the UE.

If the MME returned the "SMS-only" indication to the UE during Attach or Combined TA/LA Update procedures, the MME shall not send the CS Page to the UE and sends CS Paging Reject towards MSC to stop CS Paging procedure, and this CSFB procedure stops.

The eNB forwards the paging message to the UE. The message contains CN Domain indicator and, if received from the MSC, the Caller Line Identification.

The MME immediately sends the SGs Service Request message to the MSC containing an indication that the UE was in connected mode. The MSC uses this connected mode indication to start the Call Forwarding on No Reply timer for that UE and the MSC should send an indication of user alerting to the calling party. Receipt of the SGs Service Request message stops the MSC retransmitting the SGs interface Paging message.

NOTE 1: The pre-configured policy may be used by UE to avoid being disturbed without Caller Line Identification display and the detailed handling is to be decided by CT WG1 and CT WG6.

NOTE 2: This procedure can also take place immediately after MSC receives MAP_PRN from HSS, if pre-paging is deployed. Caller Line Identification is also provided in the case of pre-paging.

1b. UE sends an Extended Service Request (CS Fallback Indicator, Reject or Accept) message to the MME. Extended Service Request message is encapsulated in RRC and S1-AP messages. CS Fallback Indicator indicates MME to perform CS Fallback. The UE may decide to reject CSFB based on Caller Line Identification.

1c. Upon receiving the Extended Service Request (CSFB, Reject), the MME sends Paging Reject towards MSC to stop CS Paging procedure and this CSFB procedure stops.

1d. The MME sends an S1-AP UE Context Modification Request message to eNodeB that includes a CS Fallback Indicator. This message indicates to the eNB that the UE should be moved to UTRAN/GERAN. The value of the CS Fallback Indicator is set to "CS Fallback without PS HO Required" if MME realizes that PS HO results the MME detach the UE from the network because the UE context information the MME keeps is regarding LIPA PDN connections and the LIPA service continuity is not supported.

1e. The eNB shall reply with S1-AP UE Context Modification Response message. If eNB has received an S1-AP UE Context Modification Request message that has "CS Fallback without PS HO Required" as the value of the CS Fallback Indicator, the eNB shall not try to initiate PS HO by sending a Handover Required message to the MME.

2. The eNodeB may optionally solicit a measurement report from the UE to determine the target GERAN/UTRAN cell to which the redirection procedure will be performed.

The network performs one of steps 3a or 3b or 3c.

3a. If the UE and network support inter-RAT cell change order to GERAN and the target cell is GERAN:

The eNodeB can trigger an inter-RAT cell change order (optionally with NACC) to a GERAN neighbour cell by sending an RRC message to the UE. The inter-RAT cell change order may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. Service Request procedure is considered to be successfully completed when cell change order procedure is completed successfully.

3b. If the UE or the network does not support inter-RAT PS handover from E-UTRAN to GERAN/UTRAN nor inter-RAT cell change order to GERAN:

The eNodeB can trigger RRC connection release with redirection to GERAN or UTRAN instead of PS HO or NACC.

3c. If the UE and network support "RRC connection release with redirection and Multi Cell System Information to GERAN/UTRAN":

The eNodeB can trigger RRC connection release with redirection to GERAN or UTRAN and include one or more physical cell identities and their associated System Information.

NOTE 3: Service Request procedure supervision timer shall be sufficiently long considering the optional measurement reporting at step 2.

4. The eNodeB sends an S1-AP UE Context Release Request message to the MME. If the target cell is GERAN and either the target cell or the UE does not support DTM the message includes an indication that the UE is not available for PS service.

5. The MME releases the UE Context in the eNodeB as well as all eNodeB related information in the S-GW as specified in TS 23.401 [2].

In case the Cause indicates that RRC was released due to abnormal conditions, e.g. radio link failure, the MME suspends the EPS bearers (Step 8).

The UE performs one of steps 6a or 6b or 6c and THEN performs step 6d.

6a. (Step 6a is performed if step 3a, Cell Change Order to GERAN, was performed)

The UE moves to the new cell in GERAN. The UE uses the NACC information and/or receives the broadcast System Information and when it has the necessary information to access the GERAN cell, establishes a radio signalling connection.

6b. (Step 6b is performed if step 3b, RRC release with redirection, was performed)

> The UE moves to the target RAT, identifies a suitable cell preferably of the same PLMN as received in LAI IE of combined EPS/IMSI Attach/TAU Accept message,, receives the broadcast System Information and when it has the necessary information to access GERAN/UTRAN, establishes a radio signalling connection.

6c. (Step 6c is performed if step 3c, RRC connection release with redirection and Multi Cell System Information, was performed)

> The UE moves to the target RAT and identifies a suitable cell preferably of the same PLMN as received in LAI IE of combined EPS/IMSI Attach/TAU Accept message. The UE uses the NACC information and/or receives the broadcast System Information and when it has the necessary information to access GERAN/UTRAN, the UE establishes the radio signalling connection.

6d. If the LA of the new cell is different from the one stored in the UE, the UE shall initiate a Location Area Update or a Combined RA/LA Update as specified in TS 23.060 [3] for the different Network Modes of Operation (NMO). The UE shall set the "CSMT" flag in the LAU Request. The "CSMT" flag is used to avoid missing MT call in roaming retry case. In NMO I, the UE in GERAN may perform LA update over the RR connection instead of combined RA/LA update over the packet access as defined in TS 24.008 [21], clause 4.7.5.2.5, unless enhanced CS establishment in DTM is supported. Further the UE performs any Routing Area Update procedure as specified in TS 23.060 [3].

> In NMO I a CSFB UE should perform LAU (and if it does so, shall set the "CSMT" flag) and RAU procedures instead of a Combined RA/LA Update procedure to speed up the CSFB procedure.

> When the MSC receives a LA Update Request, it shall check for pending terminating CS calls and, if the "CSMT" flag is set, maintain the CS signalling connection after the Location Area Update procedure for pending terminating CS calls.

7. If the target RAT is GERAN and DTM is not supported, the UE starts the Suspend procedure specified in TS 23.060 [3], clause 16.2.1.1.2. This triggers the SGSN to send a Suspend Request message to the MME. The MME returns a Suspend Response to the SGSN even though GUTI cannot be derived from the P-TMSI and RAI pair.

8. If the S1-AP UE Context Release Request message, received from the eNodeB in step 4, indicates that the UE is not available for the PS services in the target cell, the MME starts the preservation and suspension of non-GBR bearers and the deactivation of GBR bearers towards S-GW and P-GW(s). The MME stores in the UE context that the UE is in suspended status.

NOTE 4: Step 8 can not be triggered by the Suspend procedure since the full GUTI can not be derived from the P-TMSI and RAI included in the Suspend Request message.

9. If the UE does not initiate a LAU procedure, the UE responds to the paging by sending a Paging Response message as specified in TS 44.018 [4] or TS 25.331 [7]. When received at the BSS/RNS, the Paging Response is forwarded to the MSC.

NOTE 6: The MSC should be prepared to receive a Paging Response after a relatively long time from when the CS Paging Request was sent (step 1a).

9a. If UE is registered in the MSC serving the 2G/3G cell and the UE is allowed in the LA the MSC shall establish the CS call.

9b. If the UE is not registered in the MSC that receives the Paging Response or the UE is not allowed in the LA, the MSC shall reject the Paging Response by releasing the A/Iu-cs connection. The BSS/RNS in turn releases the signalling connection for CS domain.

9c. The signalling connection release shall trigger the UE to obtain the LAI, which causes the initiation of a Location Area Update or a Combined RA/LA procedure as specified in TS 23.060 [3] for the different Network Modes of Operation (NMO).

The Location Area Update triggers the Roaming Retry for CS Fallback procedure as defined in clause 7.5.

After performing the LAU procedure the MSC shall establish the CS call if the UE is allowed in the LA. With the exception of steps 1a and 1c, above, Call Forwarding (see TS 23.082 [31]) is performed on the basis of the TS 24.008 [21] signalling received on the GERAN/UTRAN cell.

After the CS voice call is terminated and if the UE is still in GERAN and PS services are suspended, then the UE shall resume PS services as specified in TS 23.060 [3]. A Gn/Gp-SGSN will follow TS 23.060 [10] to resume the PDP Context(s). An S4 SGSN will follow TS 23.060 [10] to resume the bearers, and informs the S-GW and P-GW(s) to resume the suspended bearers. If the UE has returned to E-UTRAN after the CS voice call was terminated, then the UE shall resume PS service by sending TAU to MME. The MME will in addition inform S-GW and P-GW(s) to resume the suspended bearers. Resuming the suspended bearers in the S-GW and in the P-GW should be done by implicit resume using the Modify Bearer request message if it is triggered by the procedure in operation e.g. RAU, TAU or Service Request. The S-GW is aware of the suspend state of the bearers and shall forward the Modify Bearer request to the P-GW. Explicit resume using the Resume Notification message should be used in cases when Modify Bearer Request is not triggered by the procedure in operation.

If the UE remains on UTRAN/GERAN after the CS voice call is terminated the UE performs normal mobility management procedures as defined in TS 23.060 [3] and TS 24.008 [21].

=================End of Change=======================================

- Change for one embodiment for 3GPP TS 36.417

=================Begin of Change======================================

9.2.3.21 CS Fallback Indicator

The IE indicates that a fallback to the CS domain is needed.

| IE/Group Name | Presence | Range | IE type and reference | Semantics description |
|---|---|---|---|---|
| CS Fallback Indicator | M | | ENUMERATED(CS Fallback required, CS Fallback without PS HO required ,..., CS Fallback High Priority) | |

==============End of Change=========================================

- Change for one embodiment for 3GPP TS 23.272

===========================Begin of Change====================================

6.3 Mobile Originating call in Active Mode – No PS HO support

Figure 21:
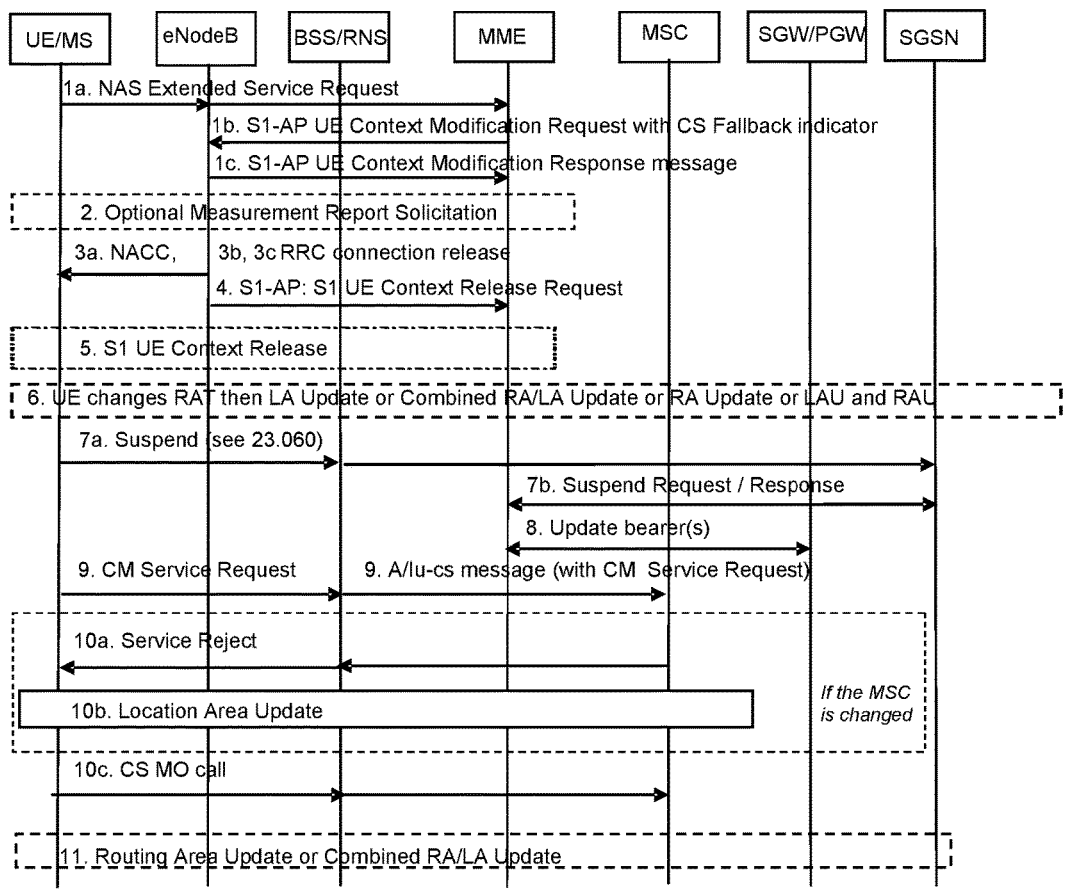
FIG. 21 shows FIG. 6.3-1: CS Call Request in E-UTRAN, Call in GERAN/UTRAN without PS HO.

This procedure (shown in Fig. 21) is executed when PS HO is not supported, in the normal case. Clause 6.6 describes the procedure when the procedure is rejected by the MME.

1a. The UE sends an Extended Service Request (CS Fallback Indicator) to the MME. Extended Service Request message is encapsulated in RRC and S1-AP messages. CS Fallback Indicator indicates MME to perform CS Fallback. The UE only transmits this request if it is attached to CS domain (with a combined EPS/IMSI Attach) and can not initiate an IMS voice session (because e.g. the UE is not IMS registered or IMS voice services are not supported by the serving IP-CAN, home PLMN or UE).

1b. The MME sends an S1-AP UE Context Modification Request message to eNB that includes a CS Fallback Indicator. This message indicates to the eNB that the UE should be moved to UTRAN/GERAN.

1c. The eNB shall reply with S1-AP UE Context Modification Response message.

2. The eNodeB may optionally solicit a measurement report from the UE to determine the target GERAN/UTRAN cell to which the redirection procedure will be performed.

The network performs one of steps 3a or 3b or 3c.

3a. If the UE and network support inter-RAT cell change order to GERAN and the target cell is GERAN:

The eNodeB can trigger an inter-RAT cell change order (optionally with NACC) to a GERAN neighbour cell by sending an RRC message to the UE. The inter-RAT cell change order may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. Service Request procedure is considered to be successfully completed when cell change order procedure is completed successfully.

3b. If the UE or the network does not support inter-RAT PS handover from E-UTRAN to GERAN/UTRAN nor inter-RAT cell change order to GERAN or the network does not wish to use these procedures or HeNB determines that the UE only has LIPA PDN connections based on the existence of Correlation TEID:

The eNodeB can trigger RRC connection release with redirection to GERAN or UTRAN.

3c. If the UE and network support "RRC connection release with redirection and Multi Cell System Information to GERAN/UTRAN":

The eNodeB can trigger RRC connection release with redirection to GERAN or UTRAN and include one or more physical cell identities and their associated System Information.

NOTE 1: Service Request procedure supervision timer shall be sufficiently long considering the optional measurement reporting at step 2.

4. The eNodeB sends an S1-AP UE Context Release Request message to the MME. If the target cell is GERAN and either the target cell or the UE does not support DTM the message includes an indication that the UE is not available for the PS service.

5. The MME releases the UE Context in the eNodeB as well as all eNodeB related information in the S-GW as specified in TS 23.401 [2].

In case the Cause indicates that RRC was released due to abnormal conditions, e.g. radio link failure, the MME suspends the EPS bearers (Step 8).

The UE performs one of steps 6a or 6b or 6c and THEN performs step 6d.

6a. (Step 6a is performed if step 3a, Cell Change Order to GERAN, was performed)

The UE moves to the new cell in GERAN. The UE uses the NACC information and/or receives the broadcast System Information and when it has all of the necessary information to access the GERAN cell, establishes a radio signalling connection.

6b. (Step 6b is performed if step 3b, RRC release with redirection, was performed).

The UE moves to the target RAT, identifies a suitable cell preferably of the same PLMN as received in LAI IE of combined EPS/IMSI Attach/TAU Accept message, receives the broadcast System Information and when it has the necessary information to access GERAN/UTRAN, establishes a radio signalling connection.

6c. (Step 6c is performed if step 3c, RRC connection release with redirection and Multi Cell System Information, was performed).

The UE moves to the target RAT and identifies a suitable cell preferably of the same PLMN as received in LAI IE of combined EPS/IMSI Attach/TAU Accept message. The UE uses the NACC information and/or receives the broadcast System Information and when it has all of the necessary information to access GERAN/UTRAN, the UE establishes the radio signalling connection.

6d. When the UE arrives at the target cell, if target RAT is UTRAN: The UE establishes the radio signalling connection by sending an RRC Initial Direct Transfer message as specified in TS 25.331 [7] that contains a NAS message. The CN Domain Indicator is set to "CS" in the Initial Direct Transfer message.

If target RAT is GERAN A/Gb mode: The UE establishes a radio signalling connection by using the procedures specified in TS 44.018 [4] (i.e. UE requests and is assigned a dedicated channel where it sends a SABM containing a NAS message to the BSS and the BSS responds by sending a UA). Upon receiving the SABM (containing the NAS message) the BSS sends a COMPLETE LAYER 3 INFORMATION message (containing the NAS message) to the MSC which indicates CS resources have been allocated in the GERAN cell. After the establishment of the main signalling link as described in TS 44.018 [4] the UE enters either Dual Transfer Mode or Dedicated Mode.

If the LA of the new cell is different from the one stored in the UE, the UE shall initiate a Location Area Update or a Combined RA/LA Update procedure as specified in TS 23.060 [3] for the different Network Modes of Operation (NMO). The UE shall set the "follow-on request" flag in the LAU Request in order to indicate to the MSC not to release the Iu/A connection after the LAU procedure is complete. Further the UE performs any Routing Area Update procedure as specified by TS 23.060 [3].

In NMO I a CSFB UE may perform separate LAU with "follow-on request" flag and RAU procedures instead of a Combined RA/LA Update procedure to speed up the CSFB procedure.

7. If the target RAT is GERAN and DTM is not supported, the UE starts the Suspend procedure specified in TS 23.060 [3], clause 16.2.1.1.2. This triggers the SGSN to send a Suspend Request message to the MME. The MME returns a Suspend Response to the SGSN even though the GUTI cannot be derived from the P-TMSI and RAI pair.

8. If the S1-AP UE Context Release Request message, received from the eNodeB in step 4, indicates that the UE is not available for the PS service in the target cell the MME starts the preservation and suspension of non-GBR bearers and the deactivation of GBR bearers towards S-GW and P-GW(s). The MME stores in the UE context that UE is in suspended status.

NOTE 2: Step 8 can not be triggered by the Suspend procedure since the full GUTI can not be derived from the P-TMSI and RAI included in the Suspend Request message.

9. The UE continues with the MO call setup procedure with sending CM Service Request.

10a. If the UE is not registered in the MSC serving the 2G/3G cell or the UE is not allowed in the LA, the MSC shall reject the service request, if implicit location update is not performed.

10b. A UE detecting that the MSC rejected the service request shall perform the Location Area Update or a Combined RA/LA procedure according to existing GERAN or UTRAN procedures as specified in TS 23.060 [3] for the different Network Modes of Operation (NMO).

10c. The UE initiates the CS call establishment procedure.

11. After the CS voice call is terminated and if the UE is in GERAN and PS services are suspended, then the UE shall resume PS services as specified in TS 23.060 [3]. A Gn/Gp -SGSN will follow TS 23.060 [3] to resume the PDP Context(s). An S4 SGSN will follow TS 23.060 [3] to resume the bearers, and informs the S-GW and P-GW(s) to resume the suspended bearers. If the UE has returned to E-UTRAN after the CS voice call was terminated, then the UE shall resume PS service by sending TAU to MME. The MME will in addition inform S-GW and P-GW(s) to resume the suspended bearers. Resuming the suspended bearers in the S-GW and in the P-GW should be done by implicit resume using the Modify Bearer request message if it is triggered by the procedure in operation, e.g. RAU, TAU or Service Request. The S-GW is aware of the suspend state of the bearers and will forward the Modify Bearer request to the P-GW. Explicit resume using the Resume Notification message should be used in cases when Modify Bearer Request is not triggered by the procedure in operation.

If the UE remains on UTRAN/GERAN after the CS voice call is terminated the UE performs normal mobility management procedures as defined in TS 23.060 [3] and TS 24.008 [21].

==================End of Change=======================================

- Change for one embodiment for 3GPP TS 23.008

==================Begin of Change=====================================

*2.13.yService continuity support*

Service continuity support parameter indicates if service continuity for LIPA PDN connections is supported upon idle mode or connected mode mobility between cells for the corresponding to a PDN connection requested by the UE with a LIPA APN or with a request for connectivity type "LIPA". If LIPA connectivity is prohibited on that PDN, the value will be always true. Service continuity support can be scalar binary or two dimensional binary flags to indicate in-bound service continuity and out-bound service continuity. If in-bound service continuity flag is "true", service continuity will be provided when the UE moves into H(e)NB sub-system. If out-bound service continuity flag is "true", service continuity will be provided when the UE moves out of H(e)NB sub-system. The indicator can also contain a list of CSG IDs in which service continuity is supported for the APN.

Service continuity support is permanent data and is conditionally stored in the HSS, MME and SGSN.

==================End of Change======================================

==================Begin of Change======================================

5.2 PS Network Access Mode Storage (GPRS)

Table 5.2: Overview of data used for PS Network Access Mode (GPRS)

| PARAMETER | Subclause | HLR | VLR | Gn/Gp-SGSN | GGSN | TYPE |
|---|---|---|---|---|---|---|
| IMSI | 2.1.1.1 | M | M | C | C | P |
| Network Access Mode | 2.1.1.2 | M | - | C note1 | - | P |
| IMSI Unauthenticated indicator | 2.1.1.3 | - | - | C | C | T |
| International MS ISDN number | 2.1.2 | M | M | M | M | P |
| multinumbering MSISDNs | 2.1.3 | C | - | - | - | P |
| Basic MSISDN indicator | 2.1.3.1 | C | - | - | - | P |
| MSISDN-Alert indicator | 2.1.3.2 | C | - | - | - | P |
| P-TMSI | 2.1.5 | - | - | C | - | T |
| TLLI | 2.1.6 | - | - | C | - | T |
| Random TLLI | 2.1.7 | - | - | C | - | T |
| IMEI | 2.1.9 | - | - | C | C | T |
| IMEISV | 2.2.3 | C | - | C | C | T |
| RAND/SRES and Kc | 2.3.1 | - | - | C | - | T |
| RAND, XRES, CK, IK, AUTN | 2.3.2 | M | - | C | - | T |
| Ciphering Key Sequence Number | 2.3.3 | - | - | M | - | T |
| Key Set Identifier (KSI) | 2.3.4 | - | - | M | - | T |
| Selected Ciphering Algorithm | 2.3.5 | - | - | M | - | T |
| Current Kc | 2.3.6 | - | - | M | - | T |
| P-TMSI Signature | 2.3.7 | - | - | C | - | T |
| Routing Area Identity | 2.4.3 | - | - | M | - | T |
| VLR Number | 2.4.5 | M | - | C note2 | - | T |
| SGSN Number | 2.4.8.1 | M | C note2 | - | - | T |
| GGSN Number | 2.4.8.2 | M | - | - | - | P |
| RSZI Lists | 2.4.11.1 | C | - | - | - | P |
| Zone Code List | 2.4.11.2 | - | - | C | - | P |
| RA not allowed flag | 2.4.14a | - | - | M | - | T |
| SGSN area restricted flag | 2.4.14 | M | - | - | - | T |
| Roaming Restricted in the SGSN due to unsupported feature | 2.4.15.3 | M | - | M | - | T |
| Cell Global ID or Service Area ID | 2.4.16 | - | - | C | - | T |
| LSA Identity | 2.4.17.1 | C | C | C | - | P |
| LSA Priority | 2.4.17.2 | C | C | C | - | P |
| LSA Preferential Access Indicator | 2.4.17.2A | C | C | C | - | P |
| LSA Active Mode Support Indicator | 2.4.17.2B | C | C | C | | P |
| LSA Only Access Indicator | 2.4.17.3 | C | C | C | - | P |
| LSA Active Mode Indicator | 2.4.17.4 | C | C | C | - | P |
| VPLMN Identifier | 2.4.17.5 | C | - | - | - | P |
| Access Restriction Data | 2.4.18 | C | - | C | - | P |
| IP-SM-GW number | 2.4.20 | C | - | - | - | T |
| Closed Subscriber Group Information | 2.4.22 | C | C | C | - | P |
| Provision of teleservice | 2.5.2 | C | - | C | - | P |
| Transfer of SM option | 2.5.4 | M | - | - | - | P |
| MNRG | 2.7.2 | M | - | M | M | T |
| MM State | 2.7.3 | - | - | M | - | T |
| Subscriber Data Confirmed by HLR Indicator | 2.7.4.2 | - | - | M | - | T |
| Location Info Confirmed by HLR Indicator | 2.7.4.3 | - | - | M | - | T |
| MS purged for GPRS flag | 2.7.6 | M | - | - | - | T |
| MNRR-SGSN | 2.7.7A | C | - | - | - | T |
| Subscriber Status | 2.8.1 | C | - | C | - | P |
| Barring of outgoing calls | 2.8.2.1 | C | - | - | - | P |
| Barring of roaming | 2.8.2.3 | C | - | - | - | P |
| Barring of Packet Oriented Services | 2.8.2.8 | C | - | C | - | P |
| ODB PLMN-specific data | 2.8.3 | C | - | C | - | P |
| Notification to CSE flag for ODB | 2.8.4 | C | - | - | - | T |
| gsmSCF address list for ODB | 2.8.5 | C | - | - | - | P |
| Trace Activated in SGSN | 2.11.7 | C | - | C | - | P |

| | | | | | | |
|---|---|---|---|---|---|---|
| Trace Reference 2 | 2.11.9 | C | - | C | C | P |
| Trace depth | 2.11.10 | C | - | C | C | P |
| List of NE types to trace | 2.11.11 | C | - | C | C | P |
| Triggering events | 2.11.12 | C | - | C | C | P |
| List of interfaces to trace | 2.11.13 | C | - | C | C | P |
| PDP Type | 2.13.1 | C | - | C | M | P |
| PDP Address | 2.13.2 | C | - | C | M | P |
| NSAPI | 2.13.3 | - | - | C | C | T |
| PDP State | 2.13.4 | - | - | C | - | T |
| New SGSN Address | 2.13.5 | - | - | C | - | T |
| Access Point Name | 2.13.6 | C | - | C | C | P/T |
| GGSN Address in Use | 2.13.7 | - | - | C | - | T |
| VPLMN Address Allowed | 2.13.8 | C | - | C | - | P |
| Dynamic Address | 2.13.9 | - | - | - | C | T |
| SGSN Address | 2.13.10 | - | - | - | M | T |
| GGSN-list | 2.13.11 | M | - | - | - | T |
| Quality of Service Subscribed | 2.13.12 | C | - | C | - | P |
| Quality of Service Requested | 2.13.13 | - | - | C | - | T |
| Quality of Service Negotiated | 2.13.14 | - | - | C | M | T |
| SND | 2.13.15 | - | - | C | C | T |
| SNU | 2.13.16 | - | - | C | C | T |
| DRX Parameters | 2.13.17 | - | - | M | - | T |
| Compression | 2.13.18 | - | - | C | - | T |
| NGAF | 2.13.19 | - | - | C note2 | - | T |
| Classmark | 2.13.20 | - | - | M | - | T |
| TEID | 2.13.21 | - | - | C | C | T |
| Radio Priority | 2.13.22 | - | - | C | - | T |
| Radio Priority SMS | 2.13.23 | - | - | C | - | T |
| PDP Context Identifier | 2.13.24 | C | - | C | - | T |
| PDP Context Charging Characteristics | 2.13.25 | C | - | C | C | P |
| UE level APN-OI-Replacement | 2.13.29 | C | - | C | - | P |
| Subscribed-RFSP-ID | 2.13.33 | C | - | C | - | P |
| APN Restriction | 2.13.43 | - | - | C | C | P |
| Service continuity support | 2.13.y | C | - | C | - | P |
| RFSP-ID in Use | 2.13.108 | - | - | C | - | T |
| APN level APN-OI-Replacement | 2.13.109 | C | - | C | - | P |
| GPRS CAMEL Subscription Information (GPRS-CSI) | 2.14.1.10/2.14.4.4 | C | - | C | - | C |
| MO Short Message Service CAMEL Subscription Information(MO-SMS-CSI) | 2.14.1.8/2.14.4.1 | C | - | C | - | C |
| MT Short Message Service CAMEL Subscription Information(MT-SMS-CSI) | 2.14.1.9/2.14.4.2. | C | - | C | - | C |
| MO-SMS-CSI SGSN Negotiated CAMEL Capability Handling | 2.14.2.1 | C | - | - | - | P |
| MT-SMS-CSI SGSN Negotiated CAMEL Capability Handling | 2.14.2.1 | C | - | - | - | P |
| Mobility Management for GPRS event notification (MG-CSI) | 2.14.1.12/2.14.4.4 | C | - | C | - | C |
| MG-CSI Negotiated CAMEL Capability Handling | 2.14.2.1 | C | - | - | - | P |
| GPRS-CSI Negotiated CAMEL Capability Handling | 2.14.2.1 | C | - | - | - | T |
| SGSN Supported CAMEL Phases | 2.14.2.3 | C | - | - | - | T |
| SGSN Offered CAMEL4 CSIs | 2.14.2.2A | C | - | - | - | T |
| GsmSCF address for CSI | 2.14.2.4 | C | - | - | - | P |
| Age Indicator | 2.16.1 | C | - | C | - | T |
| Privacy Exception List | 2.16.1.1 | C | - | C | - | P |
| GMLC Numbers | 2.16.1.2 | C | - | C | - | P |
| MO-LR List | 2.16.1.3 | C | - | C | - | P |
| Service Types | 2.16.1.4 | C | - | C | - | P |
| Subscribed Charging Characteristics | 2.19.1 | C | - | C | C | P |
| ICS Indicator | 2.20.1 | C | C | C | - | P |
| STN-SR | 2.21.1 | C | - | C | - | P |

The HLR column indicates only GPRS related use, i.e. if the HLR uses a parameter in non-GPRS Network Access Mode but not in GPRS Network Access Mode, it is not mentioned in this table 5.2.

NOTE 1: This parameter is relevant in the SGSN only when the Gs interface is installed.

NOTE 2: The VLR column is applicable if Gs interface is installed. It only indicates GPRS related data to be stored and is only relevant to GPRS subscribers registered in VLR.

For special condition of storage see in clause 2. See clause 4 for explanation of M, C, T and P in table 5.2.

===============End of Change=====================================

================Begin of Change=====================================

5.2 APS Network Access Mode Storage (EPS)

Table 5.2A-1: Overview of data used for PS Network Access Mode (EPS 3GPP access)

| PARAMETER | Subclause | HSS | VLR (see note3) | S4-SGSN | MME | S-GW | PDN-GW | TYPE |
|---|---|---|---|---|---|---|---|---|
| IMSI | 2.1.1.1 | M | C | C | C | C | C | P |
| Network Access Mode | 2.1.1.2 | M | - | - | C (see note 1) | - | - | P |
| IMSI Unauthenticated indicator | 2.1.1.3 | - | - | C | C | C | C | T |
| International MS ISDN number | 2.1.2 | M | - | M | M | M | M | P |
| P-TMSI | 2.1.5 | - | - | C | - | - | - | T |
| TLLI | 2.1.6 | - | - | C | - | - | - | T |
| Random TLLI | 2.1.7 | - | - | C | - | - | - | T |
| IMEI | 2.1.9 | C | - | C | C | C | C | T |
| IMEISV | 2.2.3 | C | - | C | C | - | - | T |
| RAND/SRES and Kc | 2.3.1 |   | - | C | - | - | - | T |
| RAND, XRES, CK, IK, AUTN | 2.3.2 | M | - | C | C | - | - | T |
| RAND, XRES, KASME, AUTN | 2.3.2 | M | - |   | C | - | - | T |
| Ciphering Key Sequence Number | 2.3.3 | C | - | M | - | - | - | T |
| Key Set Identifier (KSI) | 2.3.4 | - | - | M | - | - | - | T |
| KSI$_{ASME}$ | 2.3.4 | - | - |   | M | - | - | T |
| Selected Ciphering Algorithm | 2.3.5 | - | - | M | - | - | - | T |
| Current Kc | 2.3.6 | - | - | M | - | - | - | T |
| P-TMSI Signature | 2.3.7 | - | - | C | - | - | - | T |
| Routing Area Identity | 2.4.3 | - | - | M | - | - | - | T |
| IWF number | 2.4.8.3 | C | - | - | - | - | - | T |
| RSZI Lists | 2.4.11.1 | C | - |   | - | - | - | P |
| Zone Code List | 2.4.11.2 | - | - | C | C | - | - | P |
| SGSN area restricted Flag | 2.4.14 | M | - | - | - | - | - | T |
| RA not allowed flag | 2.4.14a | - | - | M | - | - | - | T |
| TA not allowed flag | 2.4.14b | - | - |   | M | - | - | T |
| Roaming Restricted in the SGSN due to unsupported feature | 2.4.15.3 | M | - | M | - | - | - | T |
| Roaming Restricted in the MME due to unsupported feature | 2.4.15.3a | M | - | - | M | - | - | T |
| Cell Global Identity | 2.4.16 | - | - | - | C | - | - | T |
| Access Restriction Data | 2.4.18 | C | - | C | C | - | - | T |
| Closed Subscriber Group Information | 2.4.22 | C | C | C | C | - | - | P |
| Subscriber Data Confirmed by HLR/HSS Indicator | 2.7.4.2 | - | - | M | M | - | - | T |
| Location Info Confirmed by HLR/HSS Indicator | 2.7.4.3 | - | - | M | M | - | - | T |
| MS purged for EPS flag | 2.7.6A | M | - | - | - | - | - | T |
| URRP-MME | 2.7.9.1 | C | - | - | C | - | - | T |
| URRP-SGSN | 2.7.9.2 | C | - | C | - | - | - | T |
| Subscriber Status | 2.8.1 | C | - | C | C | - | - | P |
| Barring of outgoing calls | 2.8.2.1 | C | - | C | - | - | - | P |
| Barring of roaming | 2.8.2.3 | C | - | - | - | - | - | P |
| Barring of Packet Oriented Services | 2.8.2.8 | C | - | C | C | - | - | P |
| ODB PLMN-specific data | 2.8.3 | C | - | C | - | - | - | P |
| Trace Activated in SGSN | 2.11.7 | C | - | C | - | - | - | P |
| Trace Reference 2 | 2.11.9 | C | C | C | C | - | - | P |
| Trace depth | 2.11.10 | C | C | C | C | - | - | P |

| PARAMETER | Subclause | HSS | VLR (see note3) | S4-SGSN | MME | S-GW | PDN-GW | TYPE |
|---|---|---|---|---|---|---|---|---|
| List of NE types to trace | 2.11.11 | C | C | C | C | - | - | P |
| Triggering events | 2.11.12 | C | C | C | C | - | - | P |
| List of interfaces to trace | 2.11.13 | C | C | C | C | - | - | P |
| IP address of trace collection entity | 2.11.14 | C | C | C | C | C | C | P |
| Access Point Name (APN). | 2.13.6 | M | - | M | M | M | M | P |
| MME name | 2.13.26 | M | C | - | - | - | - | T |
| VLR name | 2.13.27 | - | - | - | C (see note 2) | - | - | T |
| NEAF | 2.13.28 | - | - | - | C (see note 2) | - | - | T |
| UE level APN-OI-Replacement | 2.13.29 | C | - | - | C | - | - | P |
| Subscribed UE-AMBR | 2.13.30 | M | - | M | M | - | - | P |
| Used UE-AMBR | 2.13.30A | - | - | - | C | - | - | T |
| APN-Configuration-Profile | 2.13.31 | M | - | M | M | - | - | P |
| Subscribed APN-AMBR | 2.13.32 | M | - | M | M | M | M | P |
| Used APN-AMBR | 2.13.32A | - | - | C | C | - | C | T |
| Subscribed-RFSP-ID | 2.13.33 | C | - | - | C | - | - | P |
| GUTI | 2.13.34 | - | - | - | C | - | - | T |
| ME identity (IMEISV) | 2.13.35 | C | - | C | C | - | - | T |
| Selected NAS Algorithm | 2.13.36 | - | - | - | M | - | - | T |
| Selected AS Algorithm | 2.13.37 | - | - | - | M | - | - | T |
| Context Identifier | 2.13.38 | M | - | M | M | M | M | P |
| PDN Address | 2.13.39 | C | - | C | C | C | C | P/T (see note4) |
| VPLMN Address Allowed | 2.13.40 | M | - | M | M | - | - | P |
| PDN GW identity | 2.13.41 | M | - | - | M | - | - | P/T (see note4) |
| Tracking Area List | 2.13.42 | - | - | - | M | - | - | T |
| APN Restriction | 2.13.43 | | - | C | C | C | C | P |
| APN in use | 2.13.44 | - | - | M | M | M | M | T |
| TAI of last TAU | 2.13.45 | - | - | - | M | - | - | T |
| Cell Identity Age | 2.13.46 | - | - | - | C | - | - | T |
| MME F-TEID for S11 | 2.13.47 | - | - | - | C | C | - | T |
| MME UE S1AP ID | 2.13.48 | - | - | - | C | - | - | T |
| S-GW F-TEID for S11 | 2.13.49 | - | - | - | C | C | - | T |
| S4-SGSN F-TEID for S4 (control plane) | 2.13.50 | | | C | | | | T |
| S4-SGSN F-TEID for S4 (User plane) | 2.13.51 | | | C | | | | T |
| S-GW F-TEID for S5/S8 (control plane) | 2.13.52 | - | - | - | C | C | C | T |
| S-GW F-TEID for S1-U | 2.13.53 | - | - | - | C | C | - | T |
| S-GW F-TEID for S5/S8 (user plane) | 2.13.54 | - | - | - | - | C | C | T |
| eNodeB Address | 2.13.55 | - | - | - | C | - | - | T |
| eNodeB UE S1AP ID | 2.13.56 | - | - | - | C | - | - | T |
| eNodeB F-TEID for S1-U | 2.13.57 | - | - | - | - | C | - | T |
| E-UTRAN/UTRAN Key Set flag | 2.13.58 | - | - | - | C | - | - | T |
| Selected CN operator id | 2.13.59 | - | - | - | C | - | - | T |
| UE Radio Access Capability | 2.13.60 | - | - | - | C | - | - | T |
| Location Change Report Required | 2.13.62 | - | - | C | C | - | - | T |

| PARAMETER | Subclause | HSS | VLR (see note3) | S4-SGSN | MME | S-GW | PDN-GW | TYPE |
|---|---|---|---|---|---|---|---|---|
| UE specific DRX parameters | 2.13.63 | - | - | - | C | - | - | T |
| PDN GW F-TEID for S5/S8 (user plane) | 2.13.64 | - | - | C | C | C | C | T |
| PDN GW F-TEID for S5/S8 (control plane) | 2.13.65 | - | - | C | C | C | C | T |
| EPS Bearer ID | 2.13.66 | - | - | C | C | C | C | T |
| EPS Bearer QoS | 2.13.67 | | | C | C | C | C | T |
| UL TFT | 2.13.68 | - | - | - | C | C | C | T |
| DL TFT | 2.13.69 | - | - | - | C | C | C | T |
| Charging Id | 2.13.70 | - | - | C | - | C | C | T |
| EPS PDN Connection Charging Characteristics | 2.13.71 | C | - | C | C | C | C | P |
| Default bearer | 2.13.72 | - | - | - | C | C | C | T |
| URRP-MME | 2.13.73 | C | - | - | C | | | T |
| RAT Type (Access Type) | 2.13.75 | C | - | C | C | C | C | T |
| Diameter Server Identity of the HSS | 2.13.99 | | | C | C | | | T |
| SGSN name | 2.13.100 | M | - | - | - | - | - | T |
| S-GW F-TEID for S12 | 2.13.101 | | | | | C | | T |
| RNC F-TEID for S12 | 2.13.102 | | | | | C | | T |
| MME F-TEID for S3 | 2.13.103 | | | C | C | | | T |
| S4-SGSN F-TEID for S3 | 2.13.104 | | | C | C | | | T |
| PDN GW Allocation Type | 2.13.105 | M | | | M | | | P |
| S-GW F-TEID for S4 (control plane) | 2.13.106 | | | C | | C | | T |
| S-GW F-TEID for S4 (user plane) | 2.13.107 | | | C | | C | | T |
| RFSP-ID in Use | 2.13.108 | - | - | C | C | - | - | T |
| APN level APN-OI-Replacement | 2.13.109 | C | - | C | C | - | - | P |
| PDN Connection ID | 2.13.111 | - | - | - | - | C | C | T |
| MS Network Capability | 2.13.112 | - | - | C | C | - | - | T |
| Voice Domain Preference and UE's Usage Setting | 2.13.113 | - | - | C | C | - | - | T |
| Service continuity support | 2.13.y | C | - | C | C | - | - | P |
| Privacy Exception List | 2.16.1.1 | C | - | C | - | - | - | P |
| GMLC Numbers | 2.16.1.2 | C | - | C | - | - | - | P |
| MO-LR List | 2.16.1.3 | C | - | C | - | - | - | P |
| Service Types | 2.16.1.4 | C | - | C | - | - | - | P |
| Subscribed Charging Characteristics | 2.19.1 | C | - | C | C | - | - | P |
| ICS Indicator | 2.20.1 | C | C | C | C | - | - | P |
| STN-SR | 2.21.1 | C | - | C | C | - | - | P |

NOTE 1: This parameter is relevant in the MME only when the SGs interface is installed.
NOTE 2: Only is applicable if SGs interface is installed. It only indicates EPS related data to be stored and is only relevant to EPS subscribers registered in VLR.
NOTE 3: The VLR column is applicable if SGs/Sv interface is installed. It only indicates EPS related data to be stored and is only relevant to EPS subscribers registered in VLR.
NOTE 4: If Static IP address allocation provisioned in the subscriber profile in the HSS is chosen, PDN address is permanent data.

For special condition of storage see in clause 2. See clause 4 for explanation of M, C, T and P in table 5.2A-1.

Table 5.2A-2: Overview of data used for PS Network Access Mode (EPS non 3GPP access)

| PARAMETER | Subclause | HSS | MME | S-GW | PDN-GW | ePDG | 3GPP AAA server | 3GPP AAA server Proxy | TYPE |
|---|---|---|---|---|---|---|---|---|---|
| RAND, XRES, CK, IK, AUTN | 2.3.2 | M | - | - | - | - | M | - | T |
| RAND, XRES, KASME, AUTN | 2.3.2 | M | - | - | - | - | M | - | T |
| Access Network Identity | 2.3.8 | C | - | - | - | - | C | - | T |
| Trace Reference 2 | 2.11.9 | C | C | - | - | - | C | - | P |
| Trace depth | 2.11.10 | C | C | - | - | - | C | - | P |
| List of NE types to trace | 2.11.11 | C | C | - | - | - | C | - | P |
| Triggering events | 2.11.12 | C | C | - | - | - | C | - | P |
| List of interfaces to trace | 2.11.13 | C | C | - | - | - | C | - | P |
| IP address of Trace Collection Entity | 2.11.14 | C | C | - | - | - | C | - | P |
| APN-Configuration-Profile | 2.13.31 | M | - | - | C | C | C | - | T |
| PDN Address | 2.13.39 | C | - | C | C | - | - | - | T/P (see Note) |
| RAT Type (Access Type) | 2.13.75 | C | - | C | C | C | C | - | T |
| Permanent User Identity | 2.13.79 | M | - | M | M | M | M | - | P |
| Mobility Capabilities | 2.13.80 | - | - | - | M | C | C | - | T |
| MAG IP address | 2.13.81 | | - | | | - | C | - | T |
| Visited Network Identifier | 2.13.82 | C | - | - | C | C | C | - | T |
| EAP payload | 2.13.83 | - | - | - | M | M | M | - | P |
| MIP Subscriber profile | 2.13.86 | M | - | - | M | - | - | - | P |
| Uplink S5 GRE Key | 2.13.87 | - | C | C | C | - | - | - | T |
| Downlink S5 GRE Key | 2.13.88 | - | - | C | C | - | - | - | T |
| Uplink S8 GRE Key | 2.13.89 | - | C | C | C | - | - | - | T |
| Downlink S8 GRE Key | 2.13.90 | - | - | C | C | - | - | - | T |
| S2a GRE Keys | 2.13.91 | - | - | C | C | C | - | - | T |
| S2b GRE Keys | 2.13.92 | - | - | C | C | C | - | - | T |
| Mobile Node Identifier | 2.13.93 | - | - | C | C | - | - | - | T |
| IPv4 Default Router Address | 2.13.94 | - | - | C | C | - | - | - | T |
| Link-local address | 2.13.95 | - | - | C | C | - | - | - | T |
| Non 3GPP User Data | 2.13.96 | - | - | - | - | - | - | - | |
| 3GPP AAA Server Identity | 2.13.97 | C | - | - | C | C | | - | T |
| Selected IP mobility mode | 2.13.98 | - | - | - | C | C | C | - | T |
| Diameter Server Identity of HSS | 2.13.99 | - | C | - | - | - | C | - | T |
| Unauthenticated IMSI | 2.13.110 | - | - | C | C | - | - | - | T |
| PDN Connection ID | 2.13.111 | - | - | C | C | C | - | - | T |
| Subscribed Charging Characteristics | 2.19.1 | M | - | - | - | - | C | - | P |
| Master session Key | 3B.3.5 | - | - | - | C | C | C | - | T |
| NOTE: If Static IP address allocation provisioned in the subscriber profile in the HSS is chosen, PDN address is permanent data. | | | | | | | | | |

For special condition of storage see in clause 2. See clause 4 for explanation of M, C, T and P in table 5.2A-2.

Table 5.2.A-3 contains additional parameter to be hold when optimised handover to 3GPP2 is supported.

Table 5.2A-3: Overview of data used for PS Network Access Mode (optimized handover to 3GPP2)

| PARAMETER | Subclause | HSS | MME | S-GW | PDN-GW | ePDG | 3GPP AAA server | 3GPP AAA server Proxy | TYPE |
|---|---|---|---|---|---|---|---|---|---|
| Access Restriction Data | 2.4.18 | C | C | - | - | - | - | - | T |
| Barring of Packet Oriented Services | 2.8.2.8 | C | C | - | - | - | - | - | P |
| RAT Type | 2.13.75 | C | - | - | - | - | - | - | T |
| S101 HRPD access node IP address | 2.13.76 | - | C | - | - | - | - | - | T |
| S103 Forwarding Address | 2.13.77 | - | C | C | - | - | - | - | T |
| S103 GRE key(s) | 2.13.78 | - | C | C | - | - | - | - | T |

===========End of Change=====================================

- Change for one embodiment for 29.272

=================Begin of Change=====================================

*5.2.1.1.2 Detailed behaviour of the MME and the SGSN*

The MME shall make use of this procedure to update the MME identity stored in the HSS (e.g. at initial attach, inter MME tracking area update or radio contact after HSS reset).

The SGSN shall make use of this procedure to update the SGSN identity stored in the HSS (e.g. at initial attach, inter SGSN routing area update or radio contact after HSS reset).

For UEs receiving emergency services, in which the UE was not successfully authenticated, the MME or SGSN shall not make use of the Update Location procedure.

If the Update Location request is to be sent due to an inter node (SGSN to MME) update and the previous SGSN is a Gn/Gp SGSN, the MME shall set the "Single-Registration-Indication" flag in the ULR-Flags information element in the request.

If the Update Location request is to be sent due to an initial attach, the MME or SGSN shall set the "Initial-Attach-Indicator" flag in the ULR-Flags information element in the request.

A combined MME/SGSN shall set the "Skip Subscriber Data" flag in the ULR-Flags if subscriber data are already available due to a previous location update.

A combined MME/SGSN that has chosen the option to include the SGSN Number within ULR sent over S6a shall be prepared to receive a single subscription data update message (IDR or DSR) from the HSS when the subscription data is modified.

If the MME or SGSN knows about the homogeneity of the support of IMS Voice over PS Sessions in all TAs or RAs associated to that serving node (i.e., it is supported in all the TA/RAs or it is not supported in any of the TA/RAs), it shall include this indication to the HSS in the "Homogeneous Support of IMS Voice over PS Sessions" IE.

The MME or SGSN may include dynamic APN and PGW ID data in the list of Active-APN AVPs, in order to restore this information in the HSS after a Reset procedure.

A standalone MME shall not indicate its support for any SGSN specific features (such as SMS related features), and it shall not request explicitly the download of GPRS data (via the GPRS-Subscription-Data-Indicator flag; see clause 7.3.7).

For a standalone MME or SGSN, if EPS or GPRS subscription data is received, the standalone MME or SGSN shall replace all of the EPS or GPRS subscription data of the user in the MME or SGSN. Any optional EPS or GPRS data not received, but stored in the standalone MME or SGSN, shall be deleted.

For a combined MME/SGSN, if EPS subscription data of the user is received, it shall replace all of the EPS subscription data of the user. Any optional EPS data not received by the combined MME/ SGSN, but stored in the MME/SGSN, shall be deleted.

For a combined MME/SGSN, if GPRS subscription data of the user is received, it shall replace all of the GPRS subscription data of the user. Any optional GPRS data not received by the combined MME/ SGSN, but stored in the MME/SGSN, shall be deleted.

When receiving an Update Location response from the HSS, the MME or SGSN shall check the result code. If it indicates success the MME or SGSN shall store the received subscription profile (if any).

For UEs receiving emergency services (i.e. emergency attached UEs or normal attached UEs with a UE Requested PDN Connection for emergency services), and if the MME or SGSN supports emergency services for users in limited service state, the MME or SGSN shall proceed even if the Update Location procedure fails (e.g. authenticated users with roaming restrictions or RAT-Type restrictions in HSS).

When receiving GPRS-Subscription-Data AVP in the response, the SGSN or combined MME/SGSN shall delete all the stored PDP-Contexts, if there are any, and then store all the received PDP-Contexts.

When receiving the APN-Configuration-Profile AVP in a ULA, the MME or SGSN shall delete all the stored APN-Configurations, if there are any, and then store all the received APN-Configurations.

If the service continuity support information is present for an APN and it indicates that service continuity shall be supported, then the MME or SGSN shall allow the service continuity when the UE moves between a H(e)NB cell or a CSG cell and a macro cell or a cell that is not a CSG cell. If the service continuity support information indicates that service continuity shall not be supported, then the MME or SGSN shall not allow the service continuity.

If the service continuity support information for is not present, the MME or SGSN shall allow the service continuity when the UE moves towards any cell.

If the subscription data received for a certain APN indicates that the APN was authorized as a consequence of having the Wildcard APN in the user subscription in HSS, then the MME shall not store this APN data beyond the lifetime of the UE session and the MME shall delete them upon disconnection of the UE.

If trace data are received in the subscriber data, the MME or SGSN shall start a Trace Session. For details, see 3GPP TS 32.422 [23].

==================End of Change=========================================

=================Begin of Change========================================

7.3.1 General

The following table specifies the Diameter AVPs defined for the S6a/S6d interface protocol and S13/S13' interface protocol, their AVP Code values, types, possible flag values and whether or not the AVP may be encrypted. The Vendor-ID header of all AVPs defined in this specification shall be set to 3GPP (10415).

For all AVPs which contain bit masks and are of the type Unsigned32, e.g., ULR-Flags, DSR-Flags, PUA-Flags, etc., bit 0 shall be the least significant bit. For example, to get the value of bit 0, a bit mask of 0x0001 should be used.

Table 7.3.1/1: S6a/S6d and S13/S13' specific Diameter AVPs

| Attribute Name | AVP Code | Section defined | Value Type | AVP Flag rules | | | | May Encr. |
| --- | --- | --- | --- | --- | --- | --- | --- | --- |
| | | | | Must | May | Should not | Must not | |
| Subscription-Data | 1400 | 7.3.2 | Grouped | M, V | | | | No |
| Terminal-Information | 1401 | 7.3.3 | Grouped | M, V | | | | No |
| IMEI | 1402 | 7.3.4 | UTF8String | M, V | | | | No |
| Software-Version | 1403 | 7.3.5 | UTF8String | M, V | | | | No |
| QoS-Subscribed | 1404 | 7.3.77 | OctetString | M, V | | | | No |
| ULR-Flags | 1405 | 7.3.7 | Unsigned32 | M, V | | | | No |
| ULA-Flags | 1406 | 7.3.8 | Unsigned32 | M, V | | | | No |
| Visited-PLMN-Id | 1407 | 7.3.9 | OctetString | M, V | | | | No |
| Requested-EUTRAN-Authentication-Info | 1408 | 7.3.11 | Grouped | M, V | | | | No |
| Requested-UTRAN-GERAN-Authentication-Info | 1409 | 7.3.12 | Grouped | M, V | | | | No |
| Number-Of-Requested-Vectors | 1410 | 7.3.14 | Unsigned32 | M, V | | | | No |
| Re-Synchronization-Info | 1411 | 7.3.15 | OctetString | M, V | | | | No |
| Immediate-Response-Preferred | 1412 | 7.3.16 | Unsigned32 | M, V | | | | No |
| Authentication-Info | 1413 | 7.3.17 | Grouped | M, V | | | | No |
| E-UTRAN-Vector | 1414 | 7.3.18 | Grouped | M, V | | | | No |
| UTRAN-Vector | 1415 | 7.3.19 | Grouped | M, V | | | | No |
| GERAN-Vector | 1416 | 7.3.20 | Grouped | M, V | | | | No |
| Network-Access-Mode | 1417 | 7.3.21 | Enumerated | M, V | | | | No |
| HPLMN-ODB | 1418 | 7.3.22 | Unsigned32 | M, V | | | | No |
| Item-Number | 1419 | 7.3.23 | Unsigned32 | M, V | | | | No |
| Cancellation-Type | 1420 | 7.3.24 | Enumerated | M, V | | | | No |
| DSR-Flags | 1421 | 7.3.25 | Unsigned32 | M, V | | | | No |
| DSA-Flags | 1422 | 7.3.26 | Unsigned32 | M, V | | | | No |
| Context-Identifier | 1423 | 7.3.27 | Unsigned32 | M, V | | | | No |
| Subscriber-Status | 1424 | 7.3.29 | Enumerated | M, V | | | | No |
| Operator-Determined-Barring | 1425 | 7.3.30 | Unsigned32 | M, V | | | | No |
| Access-Restriction-Data | 1426 | 7.3.31 | Unsigned32 | M, V | | | | No |
| APN-OI-Replacement | 1427 | 7.3.32 | UTF8String | M, V | | | | No |
| All-APN-Configurations-Included-Indicator | 1428 | 7.3.33 | Enumerated | M, V | | | | No |
| APN-Configuration-Profile | 1429 | 7.3.34 | Grouped | M, V | | | | No |
| APN-Configuration | 1430 | 7.3.35 | Grouped | M, V | | | | No |
| EPS-Subscribed-QoS-Profile | 1431 | 7.3.37 | Grouped | M, V | | | | No |
| VPLMN-Dynamic-Address-Allowed | 1432 | 7.3.38 | Enumerated | M, V | | | | No |
| STN-SR | 1433 | 7.3.39 | OctetString | M, V | | | | No |
| Alert-Reason | 1434 | 7.3.83 | Enumerate | M, V | | | | No |
| AMBR | 1435 | 7.3.41 | Grouped | M, V | | | | No |
| CSG-Subscription-Data | 1436 | 7.3.78 | Grouped | M. V | | | | No |
| CSG-Id | 1437 | 7.3.79 | Unsigned32 | M, V | | | | No |
| PDN-GW-Allocation-Type | 1438 | 7.3.44 | Enumerated | M, V | | | | No |
| Expiration-Date | 1439 | 7.3.80 | Time | M, V | | | | No |
| RAT-Frequency-Selection-Priority-ID | 1440 | 7.3.46 | Unsigned32 | M, V | | | | No |
| IDA-Flags | 1441 | 7.3.47 | Unsigned32 | M, V | | | | No |
| PUA-Flags | 1442 | 7.3.48 | Unsigned32 | M, V | | | | No |
| NOR-Flags | 1443 | 7.3.49 | Unsigned32 | M, V | | | | No |
| User-Id | 1444 | 7.3.50 | UTF8String | V | | | M | No |

| | | | | | | | |
|---|---|---|---|---|---|---|---|
| Equipment-Status | 1445 | 7.3.51 | Enumerated | M, V | | | No |
| Regional-Subscription-Zone-Code | 1446 | 7.3.52 | OctetString | M, V | | | No |
| RAND | 1447 | 7.3.53 | OctetString | M, V | | | No |
| XRES | 1448 | 7.3.54 | OctetString | M, V | | | No |
| AUTN | 1449 | 7.3.55 | OctetString | M, V | | | No |
| KASME | 1450 | 7.3.56 | OctetString | M, V | | | No |
| Trace-Collection-Entity | 1452 | 7.3.98 | Address | M, V | | | No |
| Kc | 1453 | 7.3.59 | OctetString | M, V | | | No |
| SRES | 1454 | 7.3.60 | OctetString | M, V | | | No |
| PDN-Type | 1456 | 7.3.62 | Enumerated | M, V | | | No |
| Roaming-Restricted-Due-To-Unsupported-Feature | 1457 | 7.3.81 | Enumerated | M, V | | | No |
| Trace-Data | 1458 | 7.3.63 | Grouped | M, V | | | No |
| Trace-Reference | 1459 | 7.3.64 | OctetString | M, V | | | No |
| Trace-Depth | 1462 | 7.3.67 | Enumerated | M, V | | | No |
| Trace-NE-Type-List | 1463 | 7.3.68 | OctetString | M, V | | | No |
| Trace-Interface-List | 1464 | 7.3.69 | OctetString | M, V | | | No |
| Trace-Event-List | 1465 | 7.3.70 | OctetString | M, V | | | No |
| OMC-Id | 1466 | 7.3.71 | OctetString | M, V | | | No |
| GPRS-Subscription-Data | 1467 | 7.3.72 | Grouped | M, V | | | No |
| Complete-Data-List-Included-Indicator | 1468 | 7.3.73 | Enumerated | M, V | | | No |
| PDP-Context | 1469 | 7.3.74 | Grouped | M, V | | | No |
| PDP-Type | 1470 | 7.3.75 | OctetString | M, V | | | No |
| 3GPP2-MEID | 1471 | 7.3.6 | OctetString | M, V | | | No |
| Specific-APN-Info | 1472 | 7.3.82 | Grouped | M, V | | | No |
| LCS-Info | 1473 | 7.3.84 | Grouped | M, V | | | No |
| GMLC-Number | 1474 | 7.3.85 | OctetString | M, V | | | No |
| LCS-PrivacyException | 1475 | 7.3.86 | Grouped | M, V | | | No |
| SS-Code | 1476 | 7.3.87 | OctetString | M, V | | | No |
| SS-Status | 1477 | 7.3.88 | Grouped | M, V | | | No |
| Notification-To-UE-User | 1478 | 7.3.89 | Enumerated | M, V | | | No |
| External-Client | 1479 | 7.3.90 | Grouped | M, V | | | No |
| Client-Identity | 1480 | 7.3.91 | OctetString | M, V | | | No |
| GMLC-Restriction | 1481 | 7.3.92 | Enumerated | M, V | | | No |
| PLMN-Client | 1482 | 7.3.93 | Enumerated | M, V | | | No |
| Service-Type | 1483 | 7.3.94 | Grouped | M, V | | | No |
| ServiceTypeIdentity | 1484 | 7.3.95 | Unsigned32 | M, V | | | No |
| MO-LR | 1485 | 7.3.96 | Grouped | M, V | | | No |
| Teleservice-List | 1486 | 7.3.99 | Grouped | M, V | | | No |
| TS-Code | 1487 | 7.3.100 | OctetString | M, V | | | No |
| Call-Barring-Infor-List | 1488 | 7.3.101 | Grouped | M, V | | | No |
| SGSN-Number | 1489 | 7.3.102 | OctetString | M, V | | | No |
| IDR-Flags | 1490 | 7.3.103 | Unsigned32 | M, V | | | No |
| ICS-Indicator | 1491 | 7.3.104 | Enumerated | V | | M | No |
| IMS-Voice-Over-PS-Sessions-Supported | 1492 | 7.3.106 | Enumerated | V | | M | No |
| Homogeneous-Support-of-IMS-Voice-Over-PS-Sessions | 1493 | 7.3.107 | Enumerated | V | | M | No |
| Last-UE-Activity-Time | 1494 | 7.3.108 | Time | V | | M | No |
| EPS-User-State | 1495 | 7.3.110 | Grouped | V | | M | No |
| EPS-Location-Information | 1496 | 7.3.111 | Grouped | V | | M | No |
| MME-User-State | 1497 | 7.3.112 | Grouped | V | | M | No |
| SGSN-User-State | 1498 | 7.3.113 | Grouped | V | | M | No |

| User-State | 1499 | 7.3.114 | Enumerated | V | | | M | No |
|---|---|---|---|---|---|---|---|---|
| MME-Location Information | 1600 | 7.3.115 | Grouped | V | | | M | No |
| SGSN-Location-Information | 1601 | 7.3.116 | Grouped | V | | | M | No |
| E-UTRAN-Cell-Global-Identity | 1602 | 7.3.117 | OctetString | V | | | M | No |
| Tracking-Area-Identity | 1603 | 7.3.118 | OctetString | V | | | M | No |
| Cell-Global-Identity | 1604 | 7.3.119 | OctetString | V | | | M | No |
| Routing-Area-Identity | 1605 | 7.3.120 | OctetString | V | | | M | No |
| Location-Area-Identity | 1606 | 7.3.121 | OctetString | V | | | M | No |
| Service-Area-Identity | 1607 | 7.3.122 | OctetString | V | | | M | No |
| Geographical-Information | 1608 | 7.3.123 | OctetString | V | | | M | No |
| Geodetic-Information | 1609 | 7.3.124 | OctetString | V | | | M | No |
| Current-Location-Retrieved | 1610 | 7.3.125 | Enumerated | V | | | M | No |
| Age-Of-Location-Information | 1611 | 7.3.126 | Unsigned32 | V | | | M | No |
| Active-APN | 1612 | 7.3.127 | Grouped | V | | | M | No |
| Service continuity support | 1613 | 7.3.x | Enumerated | V | | | M | No |
| NOTE 1: The AVP header bit denoted as "M", indicates whether support of the AVP is required. The AVP header bit denoted as "V", indicates whether the optional Vendor-ID field is present in the AVP header. For further details, see IETF RFC 3588 [4]. | | | | | | | | |

The following table specifies the Diameter AVPs re-used by the S6a/S6d interface protocol from existing Diameter Applications, including a reference to their respective specifications and when needed, a short description of their use within S6a and S6d.

Any other AVPs from existing Diameter Applications, except for the AVPs from Diameter Base Protocol, do not need to be supported. The AVPs from Diameter Base Protocol are not included in table 7.3.1/2, but they may be re-used for the S6a/S6d protocol and the S13/S13' protocol.

Table 7.3.1/2: S6a/S6d and S13/S13' re-used Diameter AVPs

| Attribute Name | Reference | Comments |
|---|---|---|
| Service-Selection | IETF RFC 5778 [20] | See section 7.3.36 |
| 3GPP-Charging-Characteristics | 3GPP TS 29.061 [21] | See 3GPP TS 32.251 [33] Annex A and 3GPP TS 32.298 [22] section 5.1.2.2.7 This attribute holds the EPS PDN Connection Charging Characteristics data for an EPS APN Configuration, or the PDP context Charging Characteristics for GPRS PDP context, or the Subscribed Charging Characteristics data for the subscriber level 3GPP Charging Characteristics; refer to 3GPP TS 23.008 [30]. |
| Supported-Features | 3GPP TS 29.229 [9] | |
| Feature-List-ID | 3GPP TS 29.229 [9] | |
| Feature-List | 3GPP TS 29.229 [9] | See section 7.3.10 |
| Served-Party-IP-Address | 3GPP TS 32.299 [8] | holds the PDN IP Address of the user |
| QoS-Class-Identifier | 3GPP TS 29.212 [10] | |
| Allocation-Retention-Priority | 3GPP TS 29.212 [10] | See section 7.3.40 |
| Priority-Level | 3GPP TS 29.212 [10] | |
| Pre-emption-Capability | 3GPP TS 29.212 [10] | |
| Pre-emption-Vulnerability | 3GPP TS 29.212 [10] | |
| Max-Requested-Bandwidth-DL | 3GPP TS 29.214 [11] | |
| Max-Requested-Bandwidth-UL | 3GPP TS 29.214 [11] | |
| RAT-Type | 3GPP TS 29.212 [10] | See section 7.3.13 |
| MSISDN | 3GPP TS 29.329 [25] | |
| MIP6-Agent-Info | IETF Draft RFC 5447 [26] | |
| MIP-Home-Agent-Address | IETF RFC 4004 [27] | |
| MIP-Home-Agent-Host | IETF RFC 4004 [27] | |
| PDP-Address | 3GPP TS 32.299 [8] | |
| Confidentiality-Key | 3GPP TS 29.229 [9] | See section 7.3.57 |
| Integrity-Key | 3GPP TS 29.229 [9] | See section 7.3.58 |
| Visited-Network-Identifier | 3GPP TS 29.229 [9] | See section 7.3.105 |
| GMLC-Address | 3GPP TS 29.173 [37] | See section 7.3.109 |

==================End of Change==================================

==================Begin of Change=====================================

*7.3.35APN-Configuration*

The APN-Configuration AVP is of type Grouped. It shall contain the information related to the user's subscribed APN configurations. The Context-Identifier in the APN-Configuration AVP shall identify that APN configuration, and it shall not have a value of zero. Furthermore, the Context-Identifier in the APN-Configuration AVP shall uniquely identify the EPS APN configuration per subscription. For a particular EPS user having multiple APN configurations, the Service-Selection AVP values shall be unique across APN-Configuration AVPs.

The AVP format shall conform to:

APN-Configuration ::= <AVP header: 1430 10415>

{ Context-Identifier }

* 2 [ Served-Party-IP-Address ]

{ PDN-Type }

{ Service-Selection}

[ EPS-Subscribed-QoS Profile ]

[ VPLMN-Dynamic-Address-Allowed ]

[MIP6-Agent-Info ]

[ Visited-Network-Identifier ]

[ PDN-GW-Allocation-Type ]

[ 3GPP-Charging-Characteristics ]

[ AMBR ]

*[ Specific-APN-Info ]

[ APN-OI-Replacement ]

[Service continuity support]

*[ AVP ]

The AMBR included in this grouped AVP shall include the AMBR associated to this specific APN configuration (APN-AMBR).

The Served-Party-IP-Address AVP may be present 0, 1 or 2 times. The AVP shall contain the IPv4 address, IPv6 address and/or the IPv6 prefix of the user, if static IP address allocation is used. For the IPv6 prefix, the lower 64 bits of the address shall be set to zero.

The APN-OI-Replacement included in this grouped AVP shall include the APN-OI-Replacement associated with this APN configuration. This APN-OI-Replacement has higher priority than UE level APN-OI-Replacement.

The Visited-Network-Identifier AVP indicates the PLMN where the PGW was allocated, in case of dynamic PGW assignment.

NOTE: If interworking with MAP is needed, the Context-Identifier will be in the range of 1 and 50.

================End of Change=========================================

================Begin of Change=========================================

7.3.74 PDP-Context

The PDP-Context AVP is of type Grouped. For a particular GPRS user having multiple PDP Context configurations, the Service-Selection AVP values may be the same for different PDP-Context AVPs.

AVP format

PDP-Context ::= <AVP header: 1469 10415>
    { Context-Identifier }
    { PDP-Type }
    [ PDP-Address ]
    { QoS-Subscribed }
    [ VPLMN-Dynamic-Address-Allowed ]
    { Service-Selection }
    [3GPP-Charging-Characteristics]
    [Service continuity support]
    *[AVP]

================End of Change====================================

================Begin of Change==================================

*7.3.x Service continuity support*

The service continuity support AVP is of type Grouped. It shall contain two service continuity flag AVPs. First flag is the inbound service continuity support flag and the second flag is the out-bound service continuity support flag.

AVP format

Service continuity support ::= <AVP header: 1613 10415>

[Service continuity flag]

[Service continuity flag]

*7.3.y Service continuity flag*

The service continuity flag AVP is of type unsigned32. It shall indicate if service continuity in one direction for the connection is supported when the UE moves between a H(e)NB cell and a macro cell or a H(e)NB cell that belongs to different Residential/Enterprise network.

The following values are defined:

Service continuity is not supported (0)

Service continuity is supported (1)

==============End of Change======================================

- Change for one embodiment for 3GPP TS 23.401

================Begin of Change==================================

5.7.1 HSS

IMSI is the prime key to the data stored in the HSS. The data held in the HSS is defined in Table 5.7.1-1 here below.

The table below is applicable to E-UTRAN in standalone operation only.

Table 5.7.1-1: HSS data

| Field | Description |
|---|---|
| IMSI | IMSI is the main reference key. |
| MSISDN | The basic MSISDN of the UE (Presence of MSISDN is optional). |
| IMEI / IMEISV | International Mobile Equipment Identity - Software Version Number |
| MME Identity | The Identity of the MME currently serving this MS. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/ Serving GW / PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform a DNS resolution. This replacement applies for all the APNs in the subscriber's profile. See TS 23.003 [4] clause 9.1.2 for more information on the format of domain names that are allowed in this field. |
| RFSP Index | An index to specific RRM configuration in the E-UTRAN |
| URRP-MME | UE Reachability Request Parameter indicating that UE activity notification from MME has been requested by the HSS. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription. |
| CSG service continuity | Contains a list of CSG IDs in which service continuity for the subscriber (independently of the APN) is supported. |

| Field | Description |
| --- | --- |
| Each subscription profile contains one or more PDN subscription contexts: | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| Access Point Name (APN) | A label according to DNS naming conventions describing the access point to the packet data network (or a wildcard) (NOTE 6). |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |
| EPS PDN Subscribed Charging Characteristics | The charging characteristics of this PDN Subscribed context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Service Continuity Support | For LIPA or H(e)NB SIPTO, indicates if service continuity is supported. For the other type of PDN, the value is always true. |
| Homogenous Support of IMS Over PS Sessions for MME | Indicates whether or not "IMS Voice over PS Sessions" is supported homogeneously in all TAs in the serving MME. |
| List of APN - PDN GW ID relations (for PDN subscription context with wildcard APN): | |
| APN - P-GW relation #n | The APN and the identity of the dynamically allocated PDN GW of a PDN connection that is authorised by the PDN subscription context with the wildcard APN. The PDN GW identity may be either an FQDN or an IP address. The PDN GW identity refers to a specific PDN GW. |

NOTE 1: IMEI and SVN are stored in HSS when the Automatic Device Detection feature is supported, see clause 15.5 of TS 23.060 [7].

NOTE 2: The 'EPS subscribed QoS profile' stored in HSS is complementary to the legacy 'GPRS subscribed QoS profile'.

NOTE 3: Void.

NOTE 4: How to indicate which of the PDN subscription contexts stored in the HSS is the default one for the UE is defined in stage 3.

NOTE 5: To help with the selection of a co-located or topologically appropriate PDN GW and Serving GW, the PDN GW identity shall be in the form of an FQDN.

NOTE 6: The "Access Point Name (APN)" field in the table above contains the APN-NI part of the APN.

NOTE 7: Service Continuity Support Indication can be scalar binary or two dimensional binary flags to indicate in-bound service continuity and out-bound service continuity. If in-bound service continuity flag is "true", service continuity will be provided when the UE moves into H(e)NB sub-system. If out-bound service continuity flag is "true", service continuity will be provided when the UE moves out of H(e)NB sub-system. The indicator can also contain a list of CSG IDs in which service continuity is supported for the APN.

Note 8: If the CSG Service Continuity list of CSG IDs is provided, the validity in such CSG IDs supersedes the per-APN information on service continuity.

An expired CSG subscription should not be removed from the HSS subscription data before it is removed from the UE's Allowed CSG list or Operator CSG list. When a CSG subscription is cancelled it should be handled as an expired subscription in HSS subscription data to allow for removing it from UE's Allowed CSG list or Operator CSG list first.

One (and only one) of the PDN subscription contexts stored in the HSS may contain a wild card APN (see TS 23.003 [9]) in the Access Point Name field.

The PDN subscription context marked as the default one shall not contain a wild card APN.

The PDN subscription context with a wildcard APN shall not contain a statically allocated PDN GW.

5.7.2 MME

The MME maintains MM context and EPS bearer context information for UEs in the ECM-IDLE, ECM-CONNECTED and EMM-DEREGISTERED states. Table 5.7.2-1 shows the context fields for one UE.

Table 5.7.2-1: MME MM and EPS bearer Contexts

| Field | Description |
|---|---|
| IMSI | IMSI (International Mobile Subscriber Identity) is the subscribers permanent identity. |
| IMSI-unauthenticated-indicator | This is an IMSI indicator to show the IMSI is unauthenticated. |
| MSISDN | The basic MSISDN of the UE. The presence is dictated by its storage in the HSS. |
| MM State | Mobility management state ECM-IDLE, ECM-CONNECTED, EMM-DEREGISTERED. |
| GUTI | Globally Unique Temporary Identity. |
| ME Identity | Mobile Equipment Identity – (e.g. IMEI/IMEISV) Software Version Number |
| Tracking Area List | Current Tracking area list |
| TAI of last TAU | TAI of the TA in which the last Tracking Area Update was initiated. |
| E-UTRAN Cell Global Identity | Last known E-UTRAN cell |
| E-UTRAN Cell Identity Age | Time elapsed since the last E-UTRAN Cell Global Identity was acquired |
| CSG ID | Last known CSG ID when the UE was active |
| CSG membership | Last known CSG membership of the UE when the UE was active |
| Access mode | Access mode of last known ECGI when the UE was active |
| Authentication Vector | Temporary authentication and key agreement data that enables an MME to engage in AKA with a particular user. An EPS Authentication Vector consists of four elements:<br>a) network challenge RAND,<br>b) an expected response XRES,<br>c) Key $K_{ASME}$,<br>d) a network authentication token AUTN. |
| UE Radio Access Capability | UE radio access capabilities. |
| MS Classmark 2 | GERAN/UTRAN CS domain core network classmark (used if the MS supports SRVCC to GERAN or UTRAN) |
| MS Classmark 3 | GERAN CS domain radio network classmark (used if the MS supports SRVCC to GERAN) |
| Supported Codecs | List of codecs supported in the CS domain (used if the MS supports SRVCC to GERAN or UTRAN) |
| UE Network Capability | UE network capabilities including security algorithms and key derivation functions supported by the UE |
| MS Network Capability | For a GERAN and/or UTRAN capable UE, this contains information needed by the SGSN. |
| UE Specific DRX Parameters | UE specific DRX parameters for A/Gb mode, Iu mode and S1-mode |
| Selected NAS Algorithm | Selected NAS security algorithm |
| Selected AS Algorithm | Selected AS security algorithms. |
| eKSI | Key Set Identifier for the main key $K_{ASME}$. Also indicates whether the UE is using security keys derived from UTRAN or E-UTRAN security association. |
| $K_{ASME}$ | Main key for E-UTRAN key hierarchy based on CK, IK and Serving network identity |
| NAS Keys and COUNT | $K_{NASint}$, $K\_{NASenc}$, and NAS COUNT parameter. |
| Selected CN operator id | Selected core network operator identity (to support network sharing as defined in TS 23.251 [24]). |
| Recovery | Indicates if the HSS is performing database recovery. |
| Access Restriction | The access restriction subscription information. |
| ODB for PS parameters | Indicates that the status of the operator determined barring for packet oriented services. |
| APN-OI Replacement | Indicates the domain name to replace the APN-OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |

| Field | Description |
| --- | --- |
| MME IP address for S11 | MME IP address for the S11 interface (used by S-GW) |
| MME TEID for S11 | MME Tunnel Endpoint Identifier for S11 interface. |
| S-GW IP address for S11/S4 | S-GW IP address for the S11 and S4 interfaces |
| S-GW TEID for S11/S4 | S-GW Tunnel Endpoint Identifier for the S11 and S4 interfaces. |
| SGSN IP address for S3 | SGSN IP address for the S3 interface (used if ISR is activated for the GERAN and /or UTRAN capable UE) |
| SGSN TEID for S3 | SGSN Tunnel Endpoint Identifier for S3 interface (used if ISR is activated for the E-UTRAN capable UE) |
| eNodeB Address in Use | The IP address of the eNodeB currently used. |
| eNB UE S1AP ID | Unique identity of the UE within eNodeB. |
| MME UE S1AP ID | Unique identity of the UE within MME. |
| Subscribed UE-AMBR | The Maximum Aggregated uplink and downlink MBR values to be shared across all Non-GBR bearers according to the subscription of the user. |
| UE-AMBR | The currently used Maximum Aggregated uplink and downlink MBR values to be shared across all Non-GBR bearers. |
| EPS Subscribed Charging Characteristics | The charging characteristics for the MS e.g. normal, prepaid, flat rate and/or hot billing. |
| Subscribed RFSP Index | An index to specific RRM configuration in the E-UTRAN that is received from the HSS. |
| RFSP Index in Use | An index to specific RRM configuration in the E-UTRAN that is currently in use. |
| Trace reference | Identifies a record or a collection of records for a particular trace. |
| Trace type | Indicates the type of trace |
| Trigger id | Identifies the entity that initiated the trace |
| OMC identity | Identifies the OMC that shall receive the trace record(s). |
| URRP-MME | URRP-MME indicating that the HSS has requested the MME to notify the HSS regarding UE reachability at the MME |
| CSG Subscription Data | The CSG Subscription Data is a list of CSG IDs for the visiting PLMN and for each CSG ID optionally an associated expiration date which indicates the point in time when the subscription to the CSG ID expires; an absent expiration date indicates unlimited subscription. |
| CSG service continuity | Contains a list of CSG IDs in which service continuity for the subscriber (independently of the APN) is supported. |

| Field | Description |
| --- | --- |
| For each active PDN connection: | |
| APN in Use | The APN currently used. This APN shall be composed of the APN Network Identifier and the default APN Operator Identifier, as specified in TS 23.003 [4], clause 9.1.2. Any received value in the APN OI Replacement field is not applied here. |
| APN Restriction | Denotes the restriction on the combination of types of APN for the APN associated with this EPS bearer Context. |
| APN Subscribed | The subscribed APN received from the HSS. |
| PDN Type | IPv4, IPv6 or IPv4v6 |
| IP Address(es) | IPv4 address and/or IPv6 prefix<br>NOTE: The MME might not have information on the allocated IPv4 address. Alternatively, following mobility involving a pre-release 8 SGSN, this IPv4 address might not be the one allocated to the UE. |
| EPS PDN Charging Characteristics | The charging characteristics of this PDN connection, e.g. normal, prepaid, flat-rate and/or hot billing. |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| VPLMN Address Allowed | Specifies whether the UE is allowed to use the APN in the domain of the HPLMN only, or additionally the APN in the domain of the VPLMN. |
| PDN GW Address in Use (control plane) | The IP address of the PDN GW currently used for sending control plane signalling. |
| PDN GW TEID for S5/S8 (control plane) | PDN GW Tunnel Endpoint Identifier for the S5/S8 interface for the control plane. |
| MS Info Change Reporting Action | Need to communicate change in User Location Information to the PDN GW with this EPS bearer Context. |
| CSG Information Reporting Action | Need to communicate change in User CSG Information to the PDN GW with this EPS bearer Context.<br>This field denotes separately whether the MME/SGSN are requested to send changes in User CSG Information for (a) CSG cells, (b) hybrid cells in which the subscriber is a CSG member and (c) hybrid cells in which the subscriber is not a CSG member. |
| EPS subscribed QoS profile | The bearer level QoS parameter values for that APN's default bearer (QCI and ARP) (see clause 4.7.3). |
| Subscribed APN-AMBR | The Maximum Aggregated uplink and downlink MBR values to be shared across all Non-GBR bearers, which are established for this APN, according to the subscription of the user. |
| APN-AMBR | The Maximum Aggregated uplink and downlink MBR values to be shared across all Non-GBR bearers, which are established for this APN, as decided by the PDN GW. |
| PDN GW GRE Key for uplink traffic (user plane) | PDN GW assigned GRE Key for the S5/S8 interface for the user plane for uplink traffic. (For PMIP-based S5/S8 only) |
| Default bearer | Identifies the EPS Bearer Id of the default bearer within the given PDN connection. |
| Service Continuity Support | For LIPA or H(e)NB SIPTO, indicates if service continuity is supported. For the other type of PDN, the value is always true. |

| Field | Description |
|---|---|
| For each bearer within the PDN connection: | |
| EPS Bearer ID | An EPS bearer identity uniquely identifies an EPS bearer for one UE accessing via E-UTRAN |
| TI | Transaction Identifier |
| IP address for S1-u | IP address of the S-GW for the S1-u interfaces. |
| TEID for S1u | Tunnel Endpoint Identifier of the S-GW for the S1-u interface. |
| PDN GW TEID for S5/S8 (user plane) | P-GW Tunnel Endpoint Identifier for the S5/S8 interface for the user plane. (Used for S-GW change only).<br>NOTE: The PDN GW TEID is needed in MME context as S-GW relocation is triggered without interaction with the source S-GW, e.g. when a TAU occurs. The Target S-GW requires this Information Element, so it must be stored by the MME. |
| PDN GW IP address for S5/S8 (user plane) | P GW IP address for user plane for the S5/S8 interface for the user plane. (Used for S-GW change only).<br>NOTE: The PDN GW IP address for user plane is needed in MME context as S-GW relocation is triggered without interaction with the source S-GW, e.g. when a TAU occurs. The Target S GW requires this Information Element, so it must be stored by the MME. |
| EPS bearer QoS | QCI and ARP<br>optionally: GBR and MBR for GBR bearer |
| TFT | Traffic Flow Template. (For PMIP-based S5/S8 only) |

Table 5.7.2-2: MME Emergency Configuration Data

The MME Emergency Configuration Data is used instead of UE subscription data received from the HSS, for all emergency bearer services that are established by an MME on UE request.

| Field | Description |
|---|---|
| Emergency Access Point Name (em APN) | A label according to DNS naming conventions describing the access point used for Emergency PDN connection (wild card not allowed). |
| Emergency QoS profile | The bearer level QoS parameter values for Emergency APN's default bearer (QCI and ARP). The ARP is an ARP value reserved for emergency bearers. |
| Emergency APN-AMBR | The Maximum Aggregated uplink and downlink MBR values to be shared across all Non-GBR bearers, which are established for the Emergency APN, as decided by the PDN GW. |
| Emergency PDN GW identity | The statically configured identity of the PDN GW used for emergency APN. The PDN GW identity may be either an FQDN or an IP address. |
| Non-3GPP HO Emergency PDN GW identity | The statically configured identity of the PDN GW used for emergency APN when a PLMN supports handover to non-3GPP access. The PDN GW identity may be either an FQDN or an IP address.(NOTE 1) |
| NOTE-1: The FQDN always resolves to one PDN GW. | |

NOTE: QCI for Emergency APN's default bearer is set per operator configuration.

=============End of Change=========================================

What is claimed is:

1. A method in a core network communicatively connected with a first radio access network (RAN) comprising a first network element, and a second RAN comprising a second network element, comprising:
receiving, by a mobility management node in the core network, a first Non Access Stratum (NAS) message via the second network element from a User Equipment (UE), wherein the UE has, with the first network element, one or more packet data network (PDN) connections;
detecting, by the mobility management node, that the UE is connected to the second network element that is different from the first network element that has a first identifying characteristic, wherein the detecting comprises determining that the first NAS message is received with a second identifying characteristic of the second network element different from the first identifying characteristic associated with the one or more PDN connections, the first identifying characteristic stored at the mobility management node; and
in response to the determining that the first NAS message is received with the second identifying characteristic of the second network element different from the first identifying characteristic:
determining that the UE has only one or more selected IP traffic offload (SIPTO) PDN connections;
in response to determining that the UE has only one or more SIPTO PDN connections, sending, by the mobility management node, a second NAS message including a cause code with a value that represents "No EPS Bearer Context Activated".

2. The method of claim 1, wherein the first and second identifying characteristics comprise first and second closed subscriber group (CSG) identities.

3. The method of claim 1, wherein the first and second identifying characteristics comprise first and second Radio Access Technology (RAT) types.

4. The method of claim 1, wherein the first and second identifying characteristics comprise first and second cell identifiers.

5. The method of claim 1, wherein the first NAS message comprises a TRACKING AREA UPDATE REQUEST message, and the second NAS message comprises a TRACKING AREA UPDATE REJECT message.

6. The method of claim 1, wherein the first NAS message comprises a SERVICE REQUEST message, and the second NAS message comprises a SERVICE REJECT message.

7. The method of claim 1, further comprising storing the first identifying characteristic in a memory of the mobility management mode.

8. The method of claim 1, where the second identifying characteristic indicates that there is no service continuity for a SIPTO PDN connection at a cell in the second RAN.

9. The method of claim 8, where when the second identifying characteristic indicates that there is no service continuity for the SIPTO PDN connection at the cell in the second RAN when the cell in the second RAN is a CSG cell having a second CSG identity that is different from a first CSG identity associated with a cell in the first RAN, or (2) that the cell in the second RAN does not have an associated CSG identity.

10. A mobility management node for use in a core network communicatively connected with a first radio access network (RAN) comprising a first network element, and a second RAN comprising a second network element, the mobility management node comprising:
at least one processor configured to:
receive a first Non Access Stratum (NAS) message via the second network element from a User Equipment (UE), wherein the UE has, with the first network element, one or more packet data network (PDN) connections;
detect that the UE is connected to the second network element that is different from the first network element that has a first identifying characteristic, wherein the detecting comprises determining that the first NAS message is received with a second identifying characteristic of the second network element different from the first identifying characteristic associated with the one or more PDN connections, the first identifying characteristic stored at the mobility management node; and
in response to the determining that the first NAS message is received with the second identifying characteristic of the second network element different from the first identifying characteristic:
determine that the UE has only one or more selected IP traffic offload (SIPTO) PDN connections;
in response to determining that the UE has only one or more SIPTO PDN connections, send a second NAS message including a cause code with a value that represents "No EPS Bearer Context Activated".

11. The mobility management node of claim 10, wherein the first and second identifying characteristics comprise first and second closed subscriber group (CSG) identities.

12. The mobility management node of claim 10, wherein the first and second identifying characteristics comprise first and second Radio Access Technology (RAT) types.

13. The mobility management node of claim 10, wherein the first and second identifying characteristics comprise first and second cell identifiers.

14. The mobility management node of claim 10, wherein the first NAS message comprises a TRACKING AREA UPDATE REQUEST message, and the second NAS message comprises a TRACKING AREA UPDATE REJECT message.

15. The mobility management node of claim 10, wherein the first NAS message comprises a SERVICE REQUEST message, and the second NAS message comprises a SERVICE REJECT message.

16. The mobility management node of claim 10, further comprising a memory to store the first identifying characteristic.

17. The mobility management node of claim 10, where the second identifying characteristic indicates that there is no service continuity for a SIPTO PDN connection at a cell in the second RAN.

18. The mobility management node of claim 17, where when the second identifying characteristic indicates that there is no service continuity for the SIPTO PDN connection at the cell in the second RAN when the cell in the second RAN is a CSG cell having a second CSG identity that is different from a first CSG identity associated with a cell in the first RAN, or (2) that the cell in the second RAN does not have an associated CSG identity.

19. A non-transitory storage medium storing instructions that upon execution cause a mobility management node in a core network communicatively connected with a first radio access network (RAN) comprising a first network element and a second RAN comprising a second network element, to:

receive a first Non Access Stratum (NAS) message via the second network element from a User Equipment (UE), wherein the UE has, with the first network element, one or more packet data network (PDN) connections;

detect that the UE is connected to the second network element that is different from the first network element that has a first identifying characteristic, wherein the detecting comprises determining that the first NAS message is received with a second identifying characteristic of the second network element different from the first identifying characteristic associated with the one or more PDN connections, the first identifying characteristic stored at the mobility management node; and in response to the determining that the first NAS message is received with the second identifying characteristic of the second network element different from the first identifying characteristic:

determine that the UE has only one or more selected IP traffic offload (SIPTO) PDN connections;

in response to determining that the UE has only one or more SIPTO PDN connections, send a second NAS message including a cause code with a value that represents "No EPS Bearer Context Activated".

* * * * *

UNITED STATES PATENT AND TRADEMARK OFFICE
CERTIFICATE OF CORRECTION

PATENT NO. : 10,098,049 B2
APPLICATION NO. : 15/055027
DATED : October 9, 2018
INVENTOR(S) : Chen Ho Chin, Noun Choi and Stefano Faccin It is certified that error appears in the above-identified patent and that said Letters Patent is hereby corrected as shown below:

In the Specification

Column 35, Line 50:
Now reads: "at east"; should read -- at least --

Column 36, Line 30:
Now reads: "at east"; should read -- at least --

Column 157/158, Line 3:
Now reads: "at east"; should read -- at least --

Column 157/158, Line 19:
Now reads: "at east"; should read -- at least --

Column 163/164, Line 25:
Now reads: "at east"; should read -- at least --

Column 165/166, Line 20:
Now reads: "at east"; should read -- at least --

Signed and Sealed this
Twenty-first Day of November, 2023

Katherine Kelly Vidal
*Director of the United States Patent and Trademark Office*